US012786295B2

(12) United States Patent
Tang

(10) Patent No.: US 12,786,295 B2
(45) Date of Patent: Nov. 3, 2026

(54) FOLDABLE ELECTRONIC DEVICE AND HOUSING APPARATUS

(71) Applicant: HUAWEI TECHNOLOGIES CO., LTD., Shenzhen (CN)

(72) Inventor: Zecheng Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 18/842,373

(22) PCT Filed: Mar. 13, 2023

(86) PCT No.: PCT/CN2023/081117
§ 371 (c)(1),
(2) Date: Aug. 28, 2024

(87) PCT Pub. No.: WO2023/174215
PCT Pub. Date: Sep. 21, 2023

(65) Prior Publication Data

US 2025/0184415 A1 Jun. 5, 2025

(30) Foreign Application Priority Data

Mar. 15, 2022 (CN) ......................... 202210253382.3
Mar. 23, 2022 (CN) ......................... 202210289761.8

(51) Int. Cl.
*H04M 1/02* (2006.01)

(52) U.S. Cl.
CPC ........ *H04M 1/0214* (2013.01); *H04M 1/0206* (2013.01); *H04M 1/0243* (2013.01); *H04M 1/0245* (2013.01)

(58) Field of Classification Search
CPC ............. H04M 1/0214; H04M 1/0206; H04M 1/0243; H04M 1/0245
See application file for complete search history.

(56) References Cited

U.S. PATENT DOCUMENTS 9,009,984 B2 * 4/2015 Caskey ............... H04M 1/0247 33/355 R
10,289,258 B2 * 5/2019 Lee ......................... G06F 3/048
(Continued)

FOREIGN PATENT DOCUMENTS

CN 111915986 A 11/2020
CN 113805646 A 12/2021
(Continued)

*Primary Examiner* — Un C Cho

(57) ABSTRACT

The electronic device has a triple-fold structure and includes a connector. When a first housing and a second housing are in an open state, and the second housing and a third housing are in an open state, a second end of the connector is connected between the second housing and a second moving member of a second hinge assembly, to prevent the second housing and the third housing from being folded relative to the second hinge assembly. When the second housing and the third housing are in the open state, and the first housing and the second housing are folded relative to each other from the open state to a first closed state, the second end of the connector moves in a direction away from the second hinge assembly, so that the second housing and the third housing are capable of being folded relative to the second hinge assembly.

20 Claims, 66 Drawing Sheets

(56) References Cited

U.S. PATENT DOCUMENTS

| | | | | |
|---|---|---|---|---|
| 2024/0397649 | A1* | 11/2024 | Yan | H04M 1/0247 |
| 2025/0055932 | A1* | 2/2025 | Bae | H04M 1/0243 |
| 2025/0142748 | A1* | 5/2025 | Lee | F16C 11/04 |

FOREIGN PATENT DOCUMENTS

| | | | | |
|---|---|---|---|---|
| CN | 217847355 | U | 11/2022 | |
| WO | 2021093951 | A1 | 5/2021 | |
| WO | WO-2026079745 | A1 * | 4/2026 | G09F 9/30 |

* cited by examiner

FOLDABLE ELECTRONIC DEVICE AND HOUSING APPARATUS

CROSS-REFERENCE TO RELATED APPLICATIONS

This application is a national stage of International Application No. PCT/CN2023/081117, filed Mar. 13, 2023, which claims priority to Chinese Patent Application No. 202210289761.8, filed Mar. 23, 2022 and Chinese Patent Application No. 202210253382.3, filed on Mar. 15, 2022. All the aforementioned applications are hereby incorporated by reference in their entireties.

TECHNICAL FIELD

This application relates to the field of electronic product technologies, and in particular, to a foldable electronic device and a housing apparatus.

BACKGROUND

An existing foldable electronic device mostly uses a two-fold structure. However, due to limitations of a structure and a size of the existing electronic device with the two-fold structure, it is difficult for the existing electronic device to meet increasing diversified requirements of a user, for example, a requirement of increasing a display area. Therefore, an electronic device with a structure of three or more folds emerges.

In addition, an electronic device with a multi-fold structure like a triple-fold structure has a complex moving mechanism and diversified folding manners. If the user uses an improper folding sequence, the moving mechanism of the electronic device with the multi-fold structure like the triple-fold structure is damaged, and a service life of the electronic device is affected.

SUMMARY

This application provides a foldable electronic device and a housing apparatus. The electronic device provided in this application has a triple-fold structure, to meet diversified requirements of a user. In addition, the electronic device is provided with a connection apparatus, so that the electronic device needs to be folded in a specific sequence, to ensure smooth movement of a folding assembly. This reduces a damage risk of the folding assembly, implements strong reliability, and prolongs a service life of the electronic device.

According to a first aspect, this application provides a foldable electronic device.

The electronic device includes a first housing, a second housing, a third housing, a first hinge assembly, and a second hinge assembly. The first hinge assembly is connected between the first housing and the second housing, the first housing and the second housing are capable of being unfolded or folded relative to each other through the hinge assembly, the second hinge assembly is connected between the second housing and the third housing, and the second housing and the third housing are capable of being unfolded or folded relative to each other through the second hinge assembly. The electronic device further includes a connector. The connector includes a first end and a second end, the first end of the connector is close to the first hinge assembly, and the second end of the connector is close to the second hinge assembly.

When the first housing and the second housing are in an open state, and the second housing and the third housing are in an open state, the second end of the connector is connected between the second housing and the second hinge assembly, to prevent the second housing and the third housing from being folded relative to the second hinge assembly. When the second housing and the third housing are in the open state, and the first housing and the second housing are folded relative to each other from the open state to a first closed state through the first hinge assembly, the second end of the connector moves in a direction away from the second hinge assembly. When the first housing and the second housing are in the first closed state, the second housing and the third housing are capable of being folded relative to the second hinge assembly.

The electronic device provided in this application can be folded in a specific sequence, moves smoothly, and has a long service life.

In some implementations, the connector is slidably connected to the second housing.

In this implementation, the second housing may be provided with a sliding slot, and the sliding slot may extend to end faces on left and right sides of the second housing. The connector is located in the sliding slot of the second housing, and may slide along the sliding slot, so as to slide relative to the second housing through the sliding slot. The second housing may further be provided with a through hole, and openings at two ends of the through hole may be respectively located on the end faces on the left and right sides of the second housing. The connector is located in the through hole of the second housing, and may slide along the through hole, to be slidably connected to the second housing through the through hole. In addition, the connector may alternatively be slidably connected to the second housing through another structure. This is not limited in this application.

In some implementations, when the first housing and the second housing are in the first closed state, the second housing and the third housing are capable of being unfolded relative to the second hinge assembly. When the second housing and the third housing are in the open state, and the first housing and the second housing are unfolded relative to each other from the first closed state to the open state through the first hinge assembly, the second end of the connector moves in a direction close to the second hinge assembly, so that the second end of the connector is connected between the second housing and the second hinge assembly.

In this implementation, the electronic device can further be unfolded in a specific sequence, moves smoothly, and has a long service life.

In some implementations, the first hinge assembly includes a first moving member. When the second housing and the third housing are in the open state, and the first housing and the second housing are folded relative to each other from the open state to the first closed state through the first hinge assembly, the first moving member of the first hinge assembly moves in a direction away from the second housing, to form an avoidance space between the first moving member and the second housing; and the first end of the connector enters the avoidance space, and the second end of the connector moves in the direction away from the second hinge assembly.

In this implementation, the avoidance space is formed between the first moving member and the second housing, the first end of the connector enters the avoidance space, and the second end of the connector moves in the direction away from the second hinge assembly, so that the second housing and the third housing can be folded relative to the second hinge assembly.

In some implementations, the first hinge assembly includes a main shaft, a first swing arm, and a second swing arm, the second swing arm includes a rotating end and a sliding end, the rotating end of the second swing arm is rotatably connected to the main shaft of the first hinge assembly, and the sliding end of the second swing arm is slidably connected to the second housing; and the first moving member includes the second swing arm. When the first housing and the second housing are in the open state, the first end of the connector is close to the sliding end of the second swing arm of the first hinge assembly. When the second housing and the third housing are in the open state, and the first housing and the second housing are folded relative to each other from the open state to the first closed state through the first hinge assembly, the first swing arm and the second swing arm of the first hinge assembly are folded relative to each other, and the sliding end of the second swing arm of the first hinge assembly moves in the direction away from the second housing, to form the avoidance space between the sliding end of the second swing arm and the second housing.

In this implementation, the first end of the connector enters the avoidance space, and the second end of the connector moves in the direction away from the second hinge assembly, so that the second housing and the third housing can be folded relative to the second hinge assembly.

In some implementations, the second hinge assembly includes a main shaft, a first mounting bracket, and a second mounting bracket. The first mounting bracket is fastened to the second housing. The second mounting bracket is fastened to the third housing. When the first housing and the second housing are in the open state, and the second housing and the third housing are in the open state, the first mounting bracket and the second mounting bracket of the second hinge assembly are unfolded relative to each other, and the first mounting bracket is fastened to the main shaft of the second hinge assembly through the second end of the connector. When the second housing and the third housing are in the open state, and the first housing and the second housing are folded relative to each other from the open state to the first closed state, the second end of the connector moves in the direction away from the main shaft of the second hinge assembly. When the first housing and the second housing are in the first closed state, the first mounting bracket and the main shaft of the second hinge assembly are capable of moving relative to each other.

In this implementation, the second end of the connector moves in the direction away from the main shaft of the second hinge assembly, so that the first end of the connector enters the avoidance space. The second end of the connector moves in the direction away from the main shaft of the second hinge assembly, so that the second housing and the third housing can be folded relative to the second hinge assembly.

In some implementations, a through hole is provided on the first mounting bracket of the second hinge assembly, a groove is provided on the main shaft of the second hinge assembly, and an opening of the groove faces the through hole of the first mounting bracket of the second hinge assembly. When the first housing and the second housing are in the open state, and the second housing and the third housing are in the open state, the second end of the connector passes through the first mounting bracket of the second hinge assembly through the through hole, and is inserted into the groove, to fasten the first mounting bracket to the main shaft of the second hinge assembly. When the second housing and the third housing are in the open state, and the first housing and the second housing are folded relative to each other from the open state to the first closed state, the second end of the connector moves in the direction away from the groove. When the first housing and the second housing are in the first closed state, the second end of the connector leaves the groove, and the first mounting bracket and the main shaft of the second hinge assembly are capable of moving relative to each other.

In this implementation, the second end of the connector leaves the groove, and the first mounting bracket and the main shaft of the second hinge assembly can move relative to each other, so that the second housing and the third housing can be folded relative to the second hinge assembly.

In some implementations, the electronic device further includes a driving piece, and at least one of the connector, the first hinge assembly, the second hinge assembly, or the second housing is provided with the driving piece. When the second housing and the third housing are in the open state, and the first housing and the second housing are folded relative to each other from the open state to the first closed state through the first hinge assembly, the driving piece is configured to drive the second end of the connector to move in the direction away from the second hinge assembly.

In this implementation, the driving piece is configured to drive the second end of the connector to move in the direction away from the second hinge assembly, so that the second housing and the third housing can be folded relative to the second hinge assembly.

In some implementations, the driving piece is an elastic piece, the driving piece is disposed at the second end of the connector, one end of the driving piece abuts against the connector, and the other end of the driving piece abuts against the second hinge assembly.

In this implementation, when the second housing and the third housing are in the open state, and the first housing and the second housing are in the open state, two ends of the driving piece respectively abut against a limiting flange of the connector and the first mounting bracket of the second hinge assembly, so that the driving piece is in a compressed state. The second end of the connector passes through the first mounting bracket of the second hinge assembly and is clamped into the main shaft, to prevent the second housing and the third housing from being folded relative to the second hinge assembly.

When the second housing and the third housing are in the open state, and the first housing and the second housing are folded relative to each other from the open state to the first closed state through the first hinge assembly, the driving piece changes from the compressed state to a stretched state, to generate push force. The limiting flange moves in a direction close to the first hinge assembly under an action of the push force, so that the connector moves in a direction away from the second hinge assembly under an action of the push force, and leaves the main shaft. In this case, the first mounting bracket and the main shaft of the second hinge assembly can move relative to each other, so that the second housing and the third housing can be folded relative to the second hinge assembly.

In some implementations, the driving piece includes a first magnetic piece and a second magnetic piece, the first magnetic piece and the second magnetic piece are respectively fastened to the sliding end of the second swing arm of the first hinge assembly and the first end of the connector, attraction force exists between the first magnetic piece and the second magnetic piece, and the first end of the connector moves with the sliding end of the second swing arm of the first hinge assembly under an action of the attraction force.

In this implementation, the first end of the connector is magnetically connected to the sliding end of the second swing arm of the first hinge assembly through the driving piece. When the second housing and the third housing are in the open state, and the first housing and the second housing are folded relative to each other from the open state to the first closed state through the first hinge assembly, the sliding end of the second swing arm is away from the second mounting bracket, and the connector is driven by the driving piece to move in the direction away from the second hinge assembly, so that the second end of the connector leaves the main shaft. The first mounting bracket and the main shaft of the second hinge assembly can move relative to each other, so that the second housing and the third housing can be folded relative to the second hinge assembly.

In some implementations, the driving piece includes a third magnetic piece and a fourth magnetic piece, the third magnetic piece is fastened to the second housing and is movably sleeved on the connector, the fourth magnetic piece is fixedly sleeved on the connector and is located on a side that is of the third magnetic piece and that is close to the second hinge assembly, and attraction force exists between the third magnetic piece and the fourth magnetic piece. When the first housing and the second housing are in the open state, and the second housing and the third housing are in the open state, there is a spacing between the third magnetic piece and the fourth magnetic piece. When the first housing and the second housing are folded relative to each other from the open state to the first closed state through the first hinge assembly, the fourth magnetic piece moves in a direction close to the third magnetic piece under an action of the attraction force, so that the second end of the connector moves in a direction away from the second hinge assembly.

In this implementation, the fourth magnetic piece moves in a direction close to the third magnetic piece under an action of the attraction force, so that the second end of the connector moves in the direction away from the second hinge assembly, and the second end of the connector leaves the main shaft. The first mounting bracket and the main shaft of the second hinge assembly can move relative to each other, so that the second housing and the third housing can be folded relative to the second hinge assembly.

In some implementations, the driving piece includes a third magnetic piece and a fourth magnetic piece, the third magnetic piece is fastened to the second housing and is movably sleeved on the connector, the fourth magnetic piece is fixedly sleeved on the connector and is located on a side that is of the third magnetic piece and that is away from the second hinge assembly, and repulsion force exists between the third magnetic piece and the fourth magnetic piece. When the first housing and the second housing are in the open state, and the second housing and the third housing are in the open state, the third magnetic piece and the fourth magnetic piece are in contact with each other or have a spacing between each other. When the first housing and the second housing are folded relative to each other from the open state to the first closed state through the first hinge assembly, the fourth magnetic piece is away from the third magnetic piece under an action of the repulsion force, so that the second end of the connector moves in a direction away from the second hinge assembly.

In this implementation, the fourth magnetic piece moves in a direction away from the third magnetic piece under an action of the repulsion force, so that the second end of the connector moves in the direction away from the second hinge assembly, and the second end of the connector leaves the main shaft. The first mounting bracket and the main shaft of the second hinge assembly can move relative to each other, so that the second housing and the third housing can be folded relative to the second hinge assembly.

In some implementations, the driving piece includes a first rotating end and a second rotating end, the first rotating end of the driving piece is rotatably connected to the sliding end of the second swing arm of the first hinge assembly, and the second rotating end of the driving piece is rotatably connected to the first end of the connector.

In this implementation, when the second housing and the third housing are in the open state, and the first housing and the second housing are folded relative to each other from the open state to the first closed state through the first hinge assembly, the second swing arm pulls the connector through the driving piece to move in a direction away from the second hinge assembly, so that the second end of the connector leaves the main shaft. The first mounting bracket and the main shaft of the second hinge assembly can move relative to each other, so that the second housing and the third housing can be folded relative to the second hinge assembly.

In some implementations, the electronic device further includes a screen, and the first housing, the second housing, the third housing, the first hinge assembly, and the second hinge assembly jointly support the screen.

In this implementation, the screen moves with a housing apparatus, and the housing apparatus may drive the screen to be unfolded or folded, so that the electronic device can be unfolded to an open state, or folded to a first closed state or a second closed state. When the electronic device is in the open state, the screen is unfolded, and the screen can be displayed in full screen, so that the electronic device has a large display area, thereby improving viewing experience and operation experience of a user. When the electronic device is in the first closed state and the second closed state, a plane size of the electronic device is small, so that the user can carry and take in the electronic device conveniently. In this case, the user may also view and perform operation on an exposed screen, to meet different application scenarios.

According to a second aspect, this application further provides a housing apparatus, used in a foldable electronic device.

The housing apparatus includes a first housing, a second housing, a third housing, a first hinge assembly, and a second hinge assembly. The first hinge assembly is connected between the first housing and the second housing, the first housing and the second housing are capable of being unfolded or folded relative to each other through the hinge assembly, the second hinge assembly is connected between the second housing and the third housing, and the second housing and the third housing are capable of being unfolded or folded relative to each other through the second hinge assembly.

The housing apparatus further includes a connector. The connector includes a first end and a second end, the first end of the connector is close to the first hinge assembly, and the second end of the connector is close to the second hinge assembly. When the first housing and the second housing are in an open state, and the second housing and the third housing are in an open state, the second end of the connector is connected between the second housing and the second hinge assembly, to prevent the second housing and the third housing from being folded relative to the second hinge assembly. When the second housing and the third housing are in the open state, and the first housing and the second housing are folded relative to each other from the open state to a first closed state through the first hinge assembly, the second end of the connector moves in a direction away from the second hinge assembly. When the first housing and the second housing are in the first closed state, the second housing and the third housing are capable of being folded relative to the second hinge assembly.

The housing apparatus provided in this application can be folded in a specific sequence, moves smoothly, and has a long service life.

In some implementations, the connector is slidably connected to the second housing.

In this implementation, the second housing may be provided with a sliding slot, and the sliding slot may extend to end faces on left and right sides of the second housing. The connector is located in the sliding slot of the second housing, and may slide along the sliding slot, so as to slide relative to the second housing through the sliding slot. The second housing may further be provided with a through hole, and openings at two ends of the through hole may be respectively located on the end faces on the left and right sides of the second housing. The connector is located in the through hole of the second housing, and may slide along the through hole, to be slidably connected to the second housing through the through hole. In addition, the connector may alternatively be slidably connected to the second housing through another structure. This is not limited in this application.

In some implementations, when the first housing and the second housing are in the first closed state, the second housing and the third housing are capable of being unfolded relative to the second hinge assembly. When the second housing and the third housing are in the open state, and the first housing and the second housing are unfolded relative to each other from the first closed state to the open state through the first hinge assembly, the second end of the connector moves in a direction close to the second hinge assembly, so that the second end of the connector is connected between the second housing and the second hinge assembly.

In this implementation, the electronic device can further be unfolded in a specific sequence, moves smoothly, and has a long service life.

In some implementations, the first hinge assembly includes a first moving member. When the second housing and the third housing are in the open state, and the first housing and the second housing are folded relative to each other from the open state to the first closed state through the first hinge assembly, the first moving member of the first hinge assembly moves in a direction away from the second housing, to form an avoidance space between the first moving member and the second housing; and the first end of the connector enters the avoidance space, and the second end of the connector moves in the direction away from the second hinge assembly.

In this implementation, the avoidance space is formed between the first moving member and the second housing, the first end of the connector enters the avoidance space, and the second end of the connector moves in the direction away from the second hinge assembly, so that the second housing and the third housing can be folded relative to the second hinge assembly.

In some implementations, the first hinge assembly includes a main shaft, a first swing arm, and a second swing arm, the second swing arm includes a rotating end and a sliding end, the rotating end of the second swing arm is rotatably connected to the main shaft of the first hinge assembly, and the sliding end of the second swing arm is slidably connected to the second housing; and the first moving member includes the second swing arm. When the first housing and the second housing are in the open state, the first end of the connector is close to the sliding end of the second swing arm of the first hinge assembly. When the second housing and the third housing are in the open state, and the first housing and the second housing are folded relative to each other from the open state to the first closed state through the first hinge assembly, the first swing arm and the second swing arm of the first hinge assembly are folded relative to each other, and the sliding end of the second swing arm of the first hinge assembly moves in the direction away from the second housing, to form the avoidance space between the sliding end of the second swing arm and the second housing.

In this implementation, the first end of the connector enters the avoidance space, and the second end of the connector moves in the direction away from the second hinge assembly, so that the second housing and the third housing can be folded relative to the second hinge assembly.

In some implementations, the second hinge assembly includes a main shaft, a first mounting bracket, and a second mounting bracket. The first mounting bracket is fastened to the second housing. The second mounting bracket is fastened to the third housing. When the first housing and the second housing are in the open state, and the second housing and the third housing are in the open state, the first mounting bracket and the second mounting bracket of the second hinge assembly are unfolded relative to each other, and the first mounting bracket is fastened to the main shaft of the second hinge assembly through the second end of the connector. When the second housing and the third housing are in the open state, and the first housing and the second housing are folded relative to each other from the open state to the first closed state, the second end of the connector moves in the direction away from the main shaft of the second hinge assembly. When the first housing and the second housing are in the first closed state, the first mounting bracket and the main shaft of the second hinge assembly are capable of moving relative to each other.

In this implementation, the second end of the connector moves in the direction away from the main shaft of the second hinge assembly, so that the first end of the connector enters the avoidance space. The second end of the connector moves in the direction away from the main shaft of the second hinge assembly, so that the second housing and the third housing can be folded relative to the second hinge assembly.

In some implementations, a through hole is provided on the first mounting bracket of the second hinge assembly, a groove is provided on the main shaft of the second hinge assembly, and an opening of the groove faces the through hole of the first mounting bracket of the second hinge assembly. When the first housing and the second housing are in the open state, and the second housing and the third housing are in the open state, the second end of the connector passes through the first mounting bracket of the second hinge assembly through the through hole, and is inserted into the groove, to fasten the first mounting bracket to the main shaft of the second hinge assembly. When the second housing and the third housing are in the open state, and the first housing and the second housing are folded relative to each other from the open state to the first closed state, the second end of the connector moves in the direction away from the groove. When the first housing and the second housing are in the first closed state, the second end of the connector leaves the groove, and the first mounting bracket and the main shaft of the second hinge assembly are capable of moving relative to each other.

In this implementation, the second end of the connector leaves the groove, and the first mounting bracket and the main shaft of the second hinge assembly can move relative to each other, so that the second housing and the third housing can be folded relative to the second hinge assembly.

In some implementations, the housing apparatus further includes a driving piece, and at least one of the connector, the first hinge assembly, the second hinge assembly, or the second housing is provided with the driving piece. When the second housing and the third housing are in the open state, and the first housing and the second housing are folded relative to each other from the open state to the first closed state through the first hinge assembly, the driving piece is configured to drive the second end of the connector to move in the direction away from the second hinge assembly.

In this implementation, the driving piece is configured to drive the second end of the connector to move in the direction away from the second hinge assembly, so that the second housing and the third housing can be folded relative to the second hinge assembly.

In some implementations, the driving piece is an elastic piece, the driving piece is disposed at the second end of the connector, one end of the driving piece abuts against the connector, and the other end of the driving piece abuts against the second hinge assembly.

In this implementation, when the second housing and the third housing are in the open state, and the first housing and the second housing are in the open state, two ends of the driving piece respectively abut against a limiting flange of the connector and the first mounting bracket of the second hinge assembly, so that the driving piece is in a compressed state. The second end of the connector passes through the first mounting bracket of the second hinge assembly and is clamped into the main shaft, to prevent the second housing and the third housing from being folded relative to the second hinge assembly.

When the second housing and the third housing are in the open state, and the first housing and the second housing are folded relative to each other from the open state to the first closed state through the first hinge assembly, the driving piece changes from the compressed state to a stretched state, to generate push force. The limiting flange moves in a direction close to the first hinge assembly under an action of the push force, so that the connector moves in a direction away from the second hinge assembly under an action of the push force, and leaves the main shaft. In this case, the first mounting bracket and the main shaft of the second hinge assembly can move relative to each other, so that the second housing and the third housing can be folded relative to the second hinge assembly.

In some implementations, the driving piece includes a first magnetic piece and a second magnetic piece, the first magnetic piece and the second magnetic piece are respectively fastened to the sliding end of the second swing arm of the first hinge assembly and the first end of the connector, attraction force exists between the first magnetic piece and the second magnetic piece, and the first end of the connector moves with the sliding end of the second swing arm of the first hinge assembly under an action of the attraction force.

In this implementation, the first end of the connector is magnetically connected to the sliding end of the second swing arm of the first hinge assembly through the driving piece. When the second housing and the third housing are in the open state, and the first housing and the second housing are folded relative to each other from the open state to the first closed state through the first hinge assembly, the sliding end of the second swing arm is away from the second mounting bracket, and the connector is driven by the driving piece to move in a direction away from the second hinge assembly, so that the second end of the connector leaves the main shaft. The first mounting bracket and the main shaft of the second hinge assembly can move relative to each other, so that the second housing and the third housing can be folded relative to the second hinge assembly.

In some implementations, the driving piece includes a third magnetic piece and a fourth magnetic piece, the third magnetic piece is fastened to the second housing and is movably sleeved on the connector, the fourth magnetic piece is fixedly sleeved on the connector and is located on a side that is of the third magnetic piece and that is close to the second hinge assembly, and attraction force exists between the third magnetic piece and the fourth magnetic piece. When the first housing and the second housing are in the open state, and the second housing and the third housing are in the open state, there is a spacing between the third magnetic piece and the fourth magnetic piece. When the first housing and the second housing are folded relative to each other from the open state to the first closed state through the first hinge assembly, the fourth magnetic piece moves in a direction close to the third magnetic piece under an action of the attraction force, so that the second end of the connector moves in a direction away from the second hinge assembly.

In this implementation, the fourth magnetic piece moves in a direction close to the third magnetic piece under an action of the attraction force, so that the second end of the connector moves in the direction away from the second hinge assembly, and the second end of the connector leaves the main shaft. The first mounting bracket and the main shaft of the second hinge assembly can move relative to each other, so that the second housing and the third housing can be folded relative to the second hinge assembly.

In some implementations, the driving piece includes a third magnetic piece and a fourth magnetic piece, the third magnetic piece is fastened to the second housing and is movably sleeved on the connector, the fourth magnetic piece is fixedly sleeved on the connector and is located on a side that is of the third magnetic piece and that is away from the second hinge assembly, and repulsion force exists between the third magnetic piece and the fourth magnetic piece. When the first housing and the second housing are in the open state, and the second housing and the third housing are in the open state, the third magnetic piece and the fourth magnetic piece are in contact with each other or have a spacing between each other. When the first housing and the second housing are folded relative to each other from the open state to the first closed state through the first hinge assembly, the fourth magnetic piece is away from the third magnetic piece under an action of the repulsion force, so that the second end of the connector moves in the direction away from the second hinge assembly.

In this implementation, the fourth magnetic piece moves in a direction away from the third magnetic piece under an action of the repulsion force, so that the second end of the connector moves in the direction away from the second hinge assembly, and the second end of the connector leaves the main shaft. The first mounting bracket and the main shaft of the second hinge assembly can move relative to each other, so that the second housing and the third housing can be folded relative to the second hinge assembly.

In some implementations, the driving piece includes a first rotating end and a second rotating end, the first rotating end of the driving piece is rotatably connected to the sliding end of the second swing arm of the first hinge assembly, and the second rotating end of the driving piece is rotatably connected to the first end of the connector.

In this implementation, when the second housing and the third housing are in the open state, and the first housing and the second housing are folded relative to each other from the open state to the first closed state through the first hinge assembly, the second swing arm pulls the connector through the driving piece to move in the direction away from the second hinge assembly, so that the second end of the connector leaves the main shaft. The first mounting bracket and the main shaft of the second hinge assembly can move relative to each other, so that the second housing and the third housing can be folded relative to the second hinge assembly.

DESCRIPTION OF EMBODIMENTS

The following describes embodiments of this application with reference to the accompanying drawings in embodiments of this application. Orientation terms mentioned in embodiments of this application, for example, "up", "down", "top", and "bottom", are merely directions based on the accompanying drawings. Therefore, the orientation terms are used to better and more clearly describe and understand embodiments of this application, instead of indicating or implying that a specified apparatus or element should have a specific orientation, and be constructed and operated in the specific orientation. Therefore, this cannot be understood as a limitation on embodiments of this application.

The term "A plurality of" means at least two. The term "above" includes a present number. The term "and/or" describes an association relationship between associated objects and represents that three relationships may exist. For example, A and/or B may represent the following three cases: Only A exists, both A and B exist, and only B exists.

Terms such as "first" and "second" are used only for description purposes, and cannot be understood as an indication or implication of relative importance or an implicit indication of a quantity of indicated technical features. Therefore, a feature limited by "first" or "second" may explicitly or implicitly include one or more features.

Figure 1A:
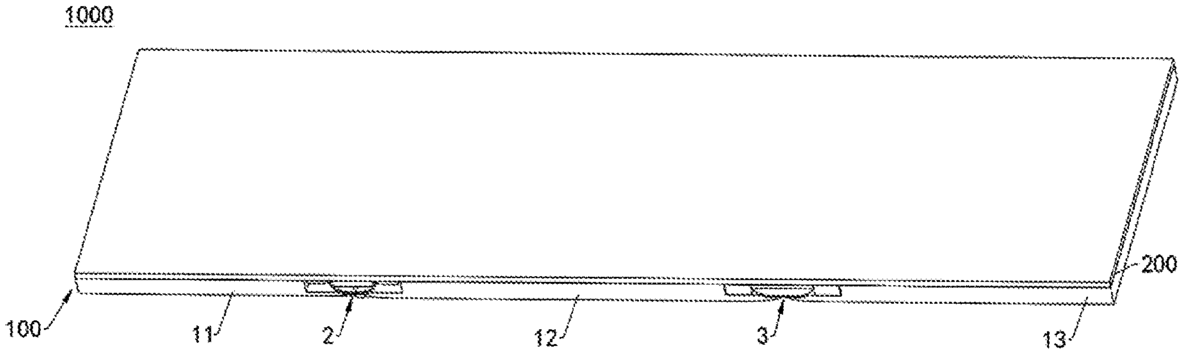
FIG. 1A is a diagram of a structure of an electronic device in an open state according to an embodiment of this application.
Figure 1B:
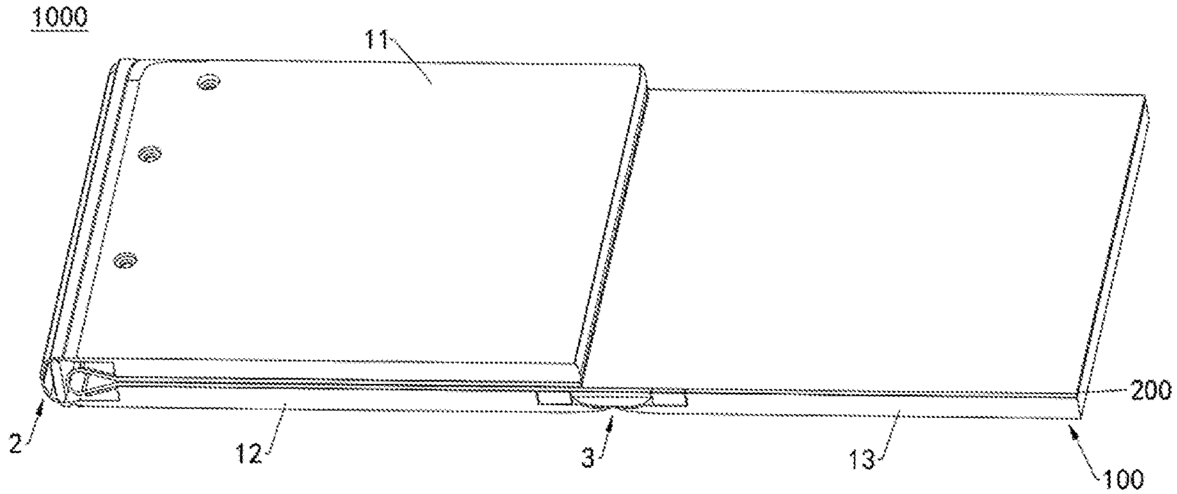
FIG. 1B is a diagram of a structure of the electronic device shown in FIG. 1A in a first closed state.
Figure 1C:
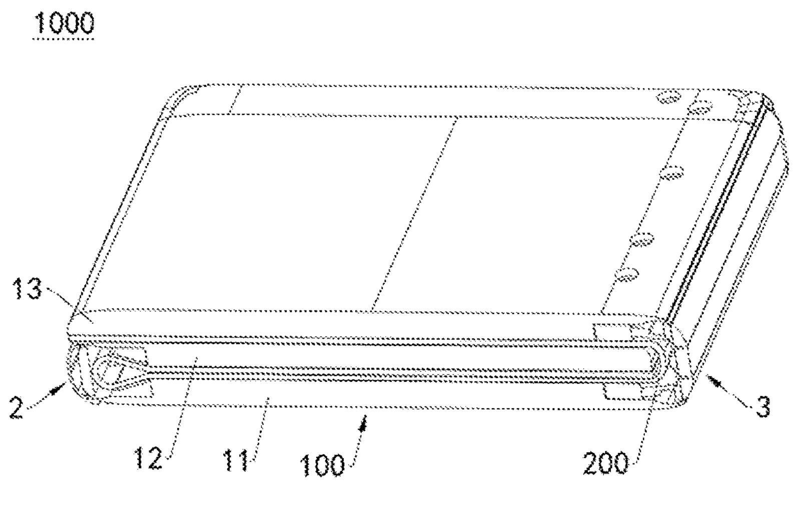
FIG. 1C is a diagram of a structure of the electronic device shown in FIG. 1A in a second closed state.

Refer to FIG. 1A to FIG. 1C together. FIG. 1A is a diagram of a structure of an electronic device 1000 in an open state according to an embodiment of this application. FIG. 1B is a diagram of a structure of the electronic device 1000 shown in FIG. 1A in a first closed state. FIG. 1C is a diagram of a structure of the electronic device 1000 shown in FIG. 1A in a second closed state.

In some embodiments, the electronic device 1000 includes a housing apparatus 100 and a screen 200, and the screen 200 is mounted on the housing apparatus 100. As shown in FIG. 1A, the housing apparatus 100 may be unfolded to an open state. As shown in FIG. 1B and FIG. 1C, the housing apparatus 100 may alternatively be folded to the first closed state and the second closed state. The housing apparatus 100 may alternatively be unfolded or folded to an intermediate state, where the intermediate state may be any state between the open state and the first closed state, or between the first closed state and the second closed state. The screen 200 moves with the housing apparatus 100, and the housing apparatus 100 may drive the screen 200 to be unfolded or folded, so that the electronic device 1000 can be unfolded to the open state, or folded to the first closed state or the second closed state. When the electronic device 1000 is in the first closed state and the second closed state, the screen 200 is located inside the housing apparatus 100. In some other embodiments, when the electronic device 1000 is in the first closed state and/or the second closed state, the screen 200 may alternatively be located outside the housing apparatus 100. This is not limited in this application.

In this embodiment, when the electronic device 1000 is in the open state, the screen 200 is unfolded, and the screen 200 can be displayed in full screen, so that the electronic device 1000 has a large display area, thereby improving viewing experience and operation experience of a user. When the electronic device 1000 is in the first closed state and the second closed state, a plane size of the electronic device 1000 is small, so that the user can carry and take in the electronic device 1000 conveniently. In this case, the user may also view and perform operation on an exposed screen 200, to meet different application scenarios.

In some embodiments, the screen 200 may be integrated with a display function and a touch sensing function. The display function of the screen 200 is used to display an image, a video, and the like, and the touch sensing function of the screen 200 is used to sense a touch action of the user, so as to implement human-machine interaction. For example, the screen 200 includes a bendable flexible display. The flexible display may be a liquid crystal display (liquid crystal display, LCD), an organic light-emitting diode (organic light-emitting diode, OLED) display, an active-matrix organic light-emitting diode (active-matrix organic light-emitting diode, AMOLED) display, a flexible light-emitting diode (flexible light-emitting diode, FLED) display, a mini-LED display, a micro-LED display, a micro-OLED display, a quantum dot light-emitting diode (quantum dot light-emitting diode, QLED) display, or the like.

In this embodiment, an example in which the electronic device 1000 is of a triple-fold structure is used for description. That is, the electronic device 1000 includes three plate parts, and two adjacent plate parts are connected through a bent part. Two adjacent plate parts may rotate toward each other to be stacked, so that the electronic device 1000 is in a two-layer or three-layer form (corresponding to the first closed state or the second closed state); or two adjacent plate parts may rotate away from each other to be unfolded, so that the electronic device 1000 is in the open state. In some other embodiments, the electronic device 1000 may alternatively be of a structure of more than four folds, or the like. That is, the electronic device 1000 includes more than four plate parts, two adjacent plate parts are connected through a bent part, and the two adjacent plate parts may rotate toward each other to be stacked or rotate away from each other to be unfolded. When the electronic device 1000 is of a structure of more than four folds, for a structure of the electronic device 1000, refer to the description of the triple-fold structure in this embodiment for adaptive design. Details are not described in this application again.

Figure 2:
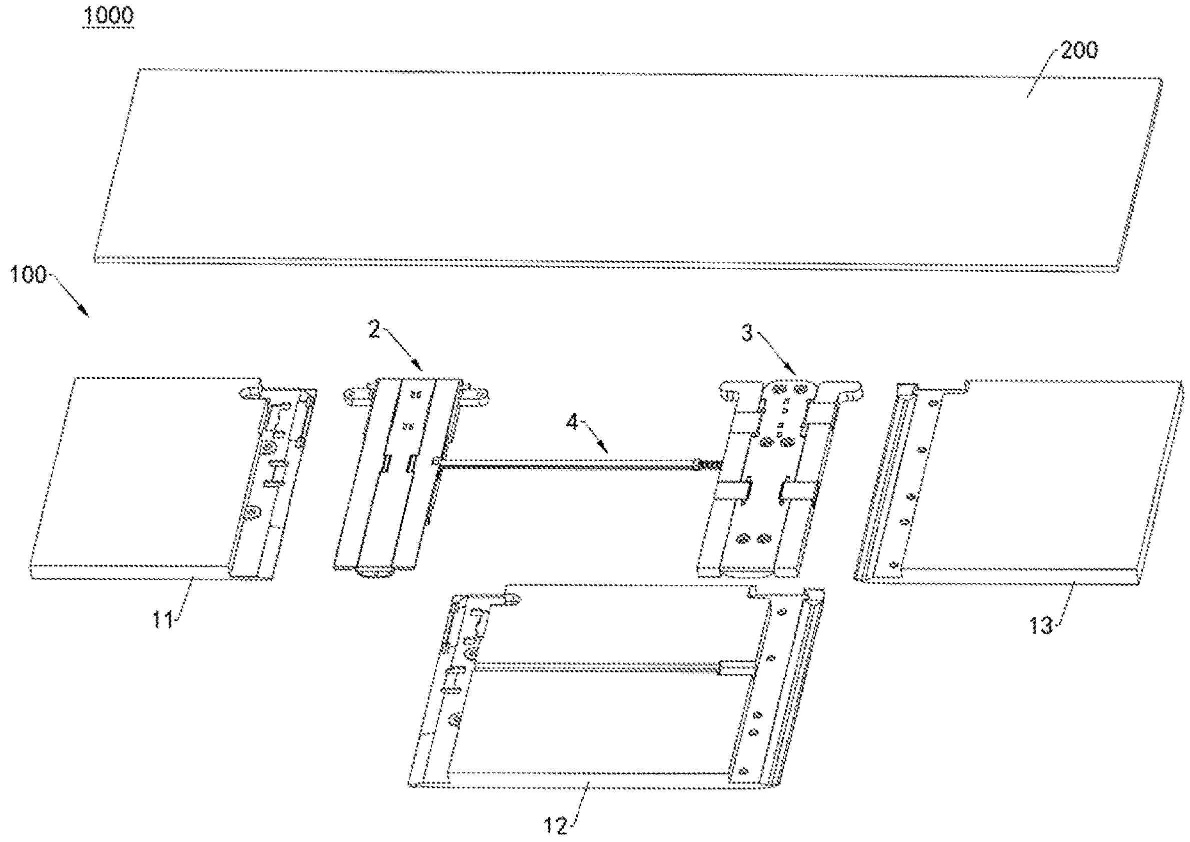
FIG. 2 is a diagram of a partial exploded structure of the electronic device shown in FIG. 1A.

Refer to FIG. 1A to FIG. 1C and FIG. 2. FIG. 2 is a diagram of a partial exploded structure of the electronic device 1000 shown in FIG. 1A.

In some embodiments, the housing apparatus 100 includes a first housing 11, a second housing 12, a third housing 13, a first hinge assembly 2, a second hinge assembly 3, and a connection apparatus 4.

The first hinge assembly 2 may be connected between the first housing 11 and the second housing 12. The first hinge assembly 2 may be deformed, so that the first housing 11 and the second housing 12 can be folded relative to each other from the open state to the first closed state, and unfolded relative to each other from the first closed state to the open state. That is, the first housing 11 and the second housing 12 can be unfolded relative to each other or folded relative to each other through the first hinge assembly 2. The second hinge assembly 3 may be connected between the second housing 12 and the third housing 13. The second hinge assembly 3 may also be deformed, so that the second housing 12 and the third housing 13 can be folded relative to each other from the first closed state to the second closed state, and unfolded relative to each other from the second closed state to the first closed state. The screen 200 can move with the first housing 11, the first hinge assembly 2, the second housing 12, the second hinge assembly 3, and the third housing 13, to implement unfolding and folding. In other words, the second housing 12 and the third housing 13 can be unfolded or folded relative to each other through the second hinge assembly 3. It should be understood that, when the electronic device 1000 is in the open state, the screen 200, the housing apparatus 100, and components of the housing apparatus 100 are correspondingly in the open state. When the electronic device 1000 is in the first closed state, the screen 200, the housing apparatus 100, and components of the housing apparatus 100 are correspondingly in the first closed state. When the electronic device 1000 is in the second closed state, the screen 200, the housing apparatus 100, and components of the housing apparatus 100 are correspondingly in the second closed state.

When the electronic device 1000 is in the open state, the first housing 11 and the second housing 12 are in the open state, the second housing 12 and the third housing 13 are in the open state, an included angle between the first housing 11 and the second housing 12 and an included angle between the second housing 12 and the third housing 13 may be approximately 180°, the first housing 11, the second housing 12, and the third housing 13 are all unfolded, and the screen 200 is unfolded. In some other embodiments, when the electronic device 1000 is in the open state, an angle between the first housing 11 and the second housing 12 and/or an angle between the second housing 12 and the third housing 13 may have a slight deviation relative to 180°, for example, is 165°, 177°, or 185°. In this case, it is also considered that the first housing 11, the second housing 12, and the third housing 13 are unfolded. The included angle between the first housing 11 and the second housing 12 is defined as an included angle between an upper side of the first housing 11 and an upper side of the second housing 12. The included angle between the second housing 12 and the third housing 13 is defined as an included angle between an upper side of the second housing 12 and an upper side of the third housing 13. In this embodiment of this application, an orientation that is the same as a light-emitting direction of the screen 200 is defined as "up", and an orientation that is opposite to the light-emitting direction of the screen 200 is defined as "down".

When the electronic device 1000 is in the first closed state, the first housing 11 and the second housing 12 are in the open state, the second housing 12 and the third housing 13 are in a folded state, the included angle between the first housing 11 and the second housing 12 may be approximately 0°, the first housing 11 and the second housing 12 are folded relative to each other, the included angle between the second housing 12 and the third housing 13 may be approximately 180°, the second housing 12 and the third housing 13 are unfolded, and the screen 200 is in a folded form.

When the electronic device 1000 is in the second closed state, the first housing 11 and the second housing 12 are in a folded state, the second housing 12 and the third housing 13 are in the folded state, the included angle between the first housing 11 and the second housing 12 may be approximately 0°, the included angle between the second housing 12 and the third housing 13 may be approximately 0°, and the screen 200 is in a folded form.

It may be understood that the first housing 11, the second housing 12, and the third housing 13 are housing parts, are configured to mount and fasten other components of the electronic device 1000, and have diversified structures. In this embodiment of this application, only some structures of the first housing 11, the second housing 12, and the third housing 13 are briefly described as examples, and are also simplified in the accompanying drawings. Specific structures of the first housing 11, the second housing 12, and the third housing 13 are not strictly limited in embodiments of this application.

In some embodiments, the first housing 11 may include a first middle frame and a first rear cover, the first middle frame is connected to one side of the first hinge assembly 2, and the first rear cover is located below the first middle frame and is fastened to the first middle frame. The first rear cover forms a part of an appearance part of the electronic device 1000. For example, the first rear cover may be a protective cover, is configured to protect a component located inside the first housing 11, and is also configured to present a part of an appearance of the electronic device 1000. In some other embodiments, the first rear cover may alternatively include a transparent cover and a display, to implement a display function and/or a touch function.

The second housing 12 may include a second middle frame and a second rear cover. The second middle frame is connected to the other side of the first hinge assembly 2, and the second rear cover is located below the second middle frame and is fastened to the second middle frame. The second rear cover forms a part of an appearance part of the electronic device 1000. For example, the second rear cover may be a protective cover, is configured to protect a component located inside the second housing 12, and is also configured to present a part of an appearance of the electronic device 1000. In some other embodiments, the second rear cover may alternatively include a transparent cover and a display, to implement a display function and/or a touch function.

The third housing 13 may include a third middle frame and a third rear cover. The third middle frame is connected to the other side of the first hinge assembly 2, and the third rear cover is located below the third middle frame and is fastened to the third middle frame. The third rear cover forms a part of an appearance part of the electronic device 1000. For example, the third rear cover may be a protective cover, is configured to protect a component located inside the third housing 13, and is also configured to present a part of an appearance of the electronic device 1000. In some other embodiments, the third rear cover may alternatively include a transparent cover and a display, to implement a display function and/or a touch function.

At least one of the first middle frame, the second middle frame, and the third middle frame may include a metal part and a plastic part, and the at least one middle frame is integrally formed through in-mold decoration (in-mold decoration, IMD) molding. When at least one of the first rear cover, the second rear cover, and the third rear cover is a protective cover, a glass material or a metal material may be used. This is not strictly limited in this application.

The first middle frame, the second middle frame, and the third middle frame each include a frame part and a middle plate part. The frame part forms a part of the appearance part of the electronic device 1000, the middle plate part is located inside the frame part, and the middle plate part may be provided with a plurality of mounting structures such as protrusions and grooves, and is configured to cooperate with another component of the electronic device 1000, so that the another component is mounted on at least one of the first middle frame, the second middle frame, and the third middle frame.

In this application, the first hinge assembly 2 connects the first housing 11 to the second housing 12. Based on a structural design of the first hinge assembly 2, the first housing 11 and the second housing 12 can be unfolded when the electronic device 1000 is in the open state, can provide a flat support environment for the screen 200 with the first hinge assembly 2, can be folded when the electronic device 1000 is in the first closed state and the second closed state, and can provide a good screen accommodating space for the screen 200 with the first hinge assembly 2, so that the screen 200 of the electronic device 1000 can meet both a large-screen display requirement and a folding and storage requirement, and the screen 200 has a low risk of being damaged and high reliability.

The second hinge assembly 3 connects the second housing 12 to the third housing 13. Based on a structural design of the second hinge assembly 3, the second housing 12 and the third housing 13 can be unfolded when the electronic device 1000 is in the open state, can provide a flat support environment for the screen 200 with the second hinge assembly 3, can be folded when the electronic device 1000 is in the second closed state, and can provide a good screen accommodating space for the screen 200 with the second hinge assembly 3, so that the screen 200 of the electronic device 1000 can meet both a large-screen display requirement and a folding and storage requirement, and the screen 200 has a low risk of being damaged and high reliability.

The connection apparatus 4 is connected between the first hinge assembly 2 and the second hinge assembly 3, and can move relative to the first hinge assembly 2 and the second hinge assembly 3, to control movement of the second hinge assembly 3, so that the housing apparatus 100 is folded in a specific sequence. In this application, due to a size design of the first hinge assembly 2 and a size design of the second hinge assembly 3, the housing apparatus 100 needs to fold the electronic device 1000 in a sequence of first folding the first housing 11, and then folding the third housing 13, so that the third housing 13, the first housing 11, and the second housing 12 are sequentially stacked, and force is balanced between every two of the three housings. In this way, the first hinge assembly 2 and the second hinge assembly 3 are prevented from being pressed or pulled to damage structures of the first hinge assembly 2 and the second hinge assembly 3, so that the first hinge assembly 2 and the second hinge assembly 3 each have a long service life and high reliability.

The following describes size designs of the first hinge assembly 2 and the second hinge assembly 3 by using examples.

Figure 3A:
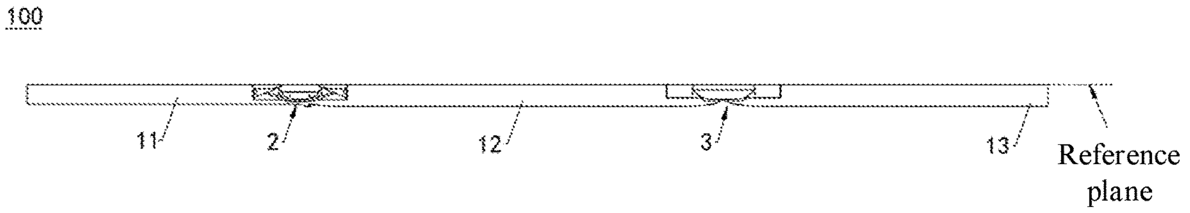
FIG. 3A is a diagram of a structure of a housing apparatus shown in FIG. 1A from another angle.
Figure 3B:
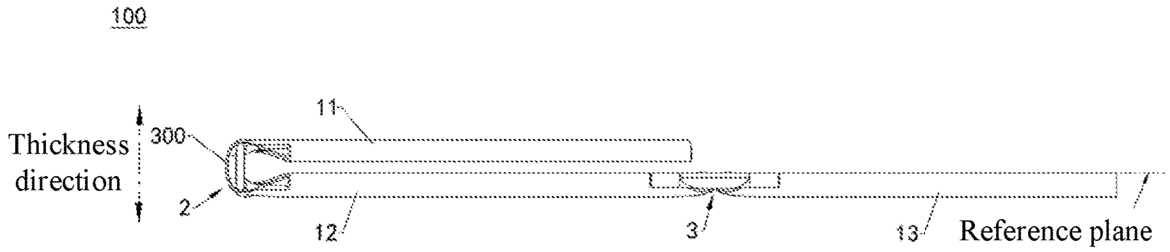
FIG. 3B is a diagram of a structure of a housing apparatus shown in FIG. 1B from another angle.
Figure 3C:
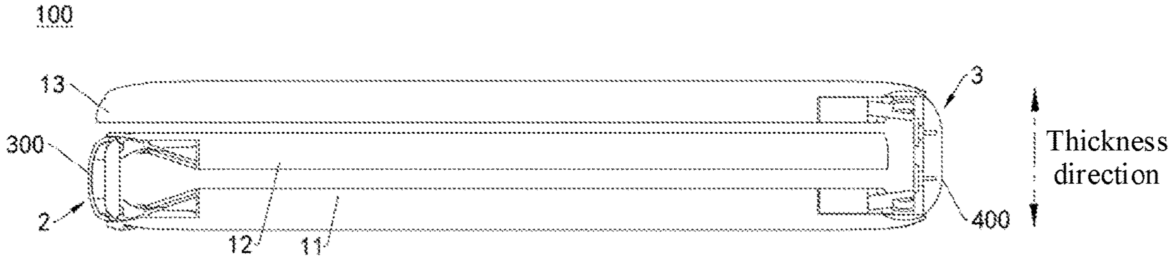
FIG. 3C is a diagram of a structure of a housing apparatus shown in FIG. 1C from another angle.

Refer to FIG. 3A to FIG. 3C. FIG. 3A is a diagram of a structure of the housing apparatus 100 shown in FIG. 1A from another angle. FIG. 3B is a diagram of a structure of the housing apparatus 100 shown in FIG. 1B from another angle. FIG. 3C is a diagram of a structure of the housing apparatus 100 shown in FIG. 1C from another angle.

In this embodiment, a plane on which an upper end of the second housing 12 is located is defined as a reference plane, and a direction perpendicular to the reference plane is defined as a thickness direction of the housing apparatus 100. The upper end of the second housing 12 may be an endpoint of a protruding ridge structure or a flat upper surface. When the housing apparatus 100 is in the open state, the first housing 11 and the second housing 12 are in the open state, the second housing 12 and the third housing 13 are in the open state, the upper end of the first housing 11 and the upper end of the third housing 13 are even with the upper end of the second housing 12, and the upper end of the first housing 11 and the upper end of the third housing 13 are also located in the reference plane. When the housing apparatus 100 is in the first closed state, the upper end of the first housing 11 may be close to the upper end of the second housing 12. In this case, a plane on which the upper end of the first housing 11 is located is parallel to the reference plane. When the housing apparatus 100 is in the second closed state, the upper end of the third housing 13 may be close to a lower end of the first housing 11. In this case, a plane on which the upper end of the third housing 13 is located is parallel to the reference plane.

In this embodiment, the first hinge assembly 2 has a first appearance surface 300, and a maximum size of the first appearance surface 300 in the thickness direction is defined as a first thickness. The second hinge assembly 3 has a second appearance surface 400, and a maximum size of the second appearance surface 400 in the thickness direction is defined as a second thickness. When the housing apparatus 100 is in the open state, the first housing 11 and the second housing 12 jointly cover the first appearance surface 300 of the first hinge assembly 2, and the second housing 12 and the third housing 13 jointly cover the second appearance surface 400 of the second hinge assembly 3. When the housing apparatus 100 is in the first closed state and the second closed state, the first appearance surface 300 of the first hinge assembly 2 is exposed relative to the first housing 11 and the second housing 12, and the first appearance surface 300 forms a part of the appearance part of the housing apparatus 100. When the housing apparatus 100 is in the second closed state, the second appearance surface 400 of the second hinge assembly 3 is exposed relative to the second housing 12 and the third housing 13, and the second appearance surface 400 forms a part of the appearance part of the electronic device 1000.

As shown in FIG. 1C and FIG. 3C, the first thickness of the first appearance surface 300 of the first hinge assembly 2 is less than the second thickness of the second appearance surface 400 of the second hinge assembly 3, and the second thickness of the second appearance surface 400 is approximately equal to a sum of sizes of the first housing 11, the second housing 12, and the third housing 13 in the thickness direction. Therefore, if the third housing 13 is folded before the first housing 11 is folded, there is no first housing 11 between the third housing 13 and the second housing 12 for supporting. In this case, the second hinge assembly 3 is damaged as the second hinge assembly 3 is under excessively large pressure for independently supporting the third housing 13. In addition, if the third housing 13 is first folded and then the first housing 11 is folded, the third housing 13 is additionally arranged between the first housing 11 and the second housing 12. In this case, the first hinge assembly 2 and the screen 200 are damaged as the first hinge assembly 2 is under excessively large pull force and the screen 200 is under excessively large pressure.

Therefore, in this embodiment, based on a size design of the first hinge assembly 2 and a size design of the second hinge assembly 3, when the electronic device 1000 is folded, the first housing 11 needs to be folded first, and then the third housing 13 needs to be folded. It may be understood that, in some other embodiments, the size designs of the first hinge assembly 2 and the second hinge assembly 3 are adjusted, or structures of the first hinge assembly 2 and the second hinge assembly 3 are designed, so that when the electronic device 1000 is folded, the third housing 13 may be first folded and then the first housing 11 is folded, or the first housing 11 and the third housing 13 may be folded at the same time. This is not limited in this application.

The following specifically describes structures of the first hinge assembly 2, the second hinge assembly 3, and the connection apparatus 4, and a connection structure between the three.

The following describes an implementation structure of the first hinge assembly 2 by using an example.

Figure 4:
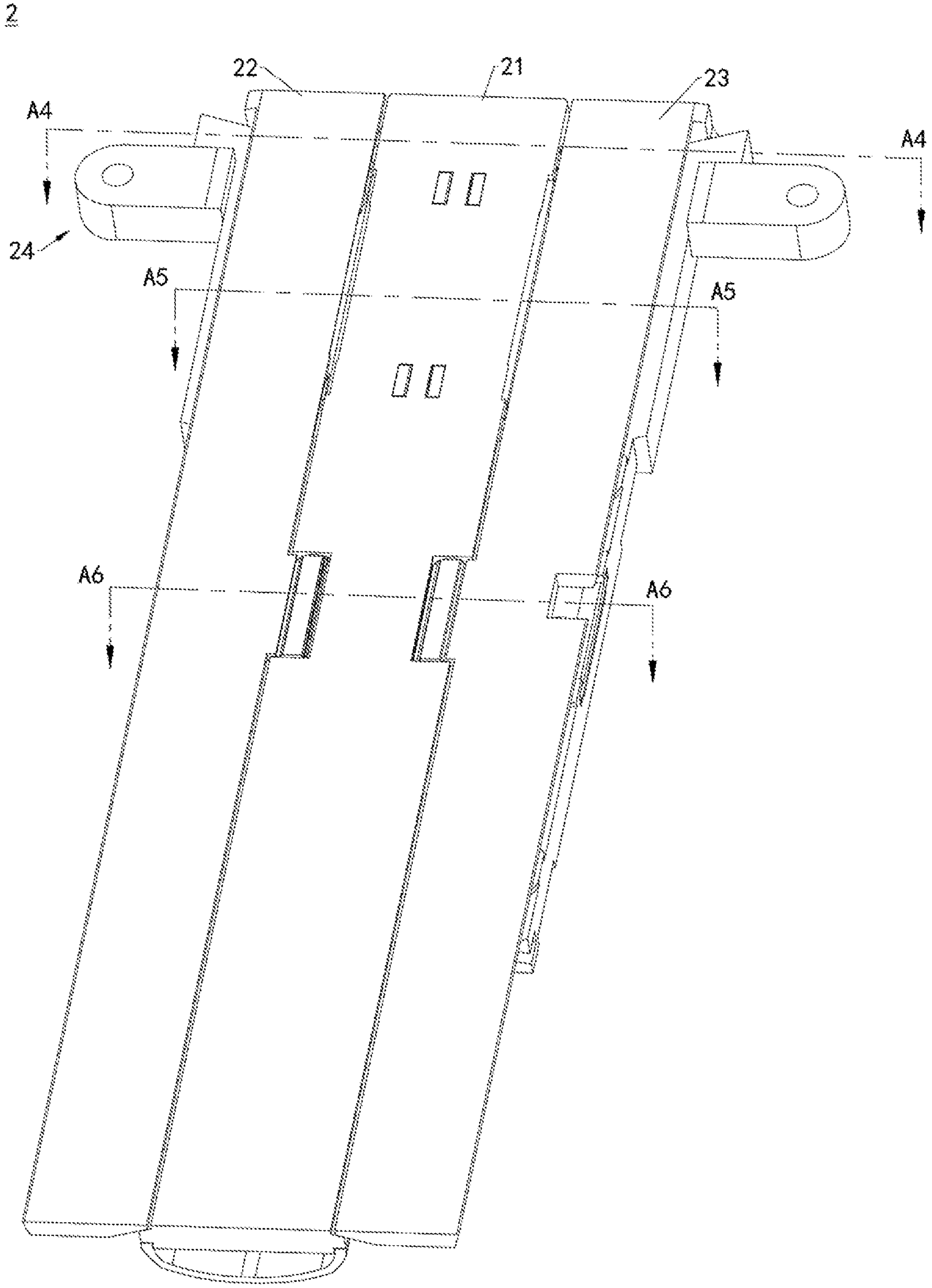
FIG. 4 is a diagram of a structure of a first hinge assembly shown in FIG. 2.
Figure 5:
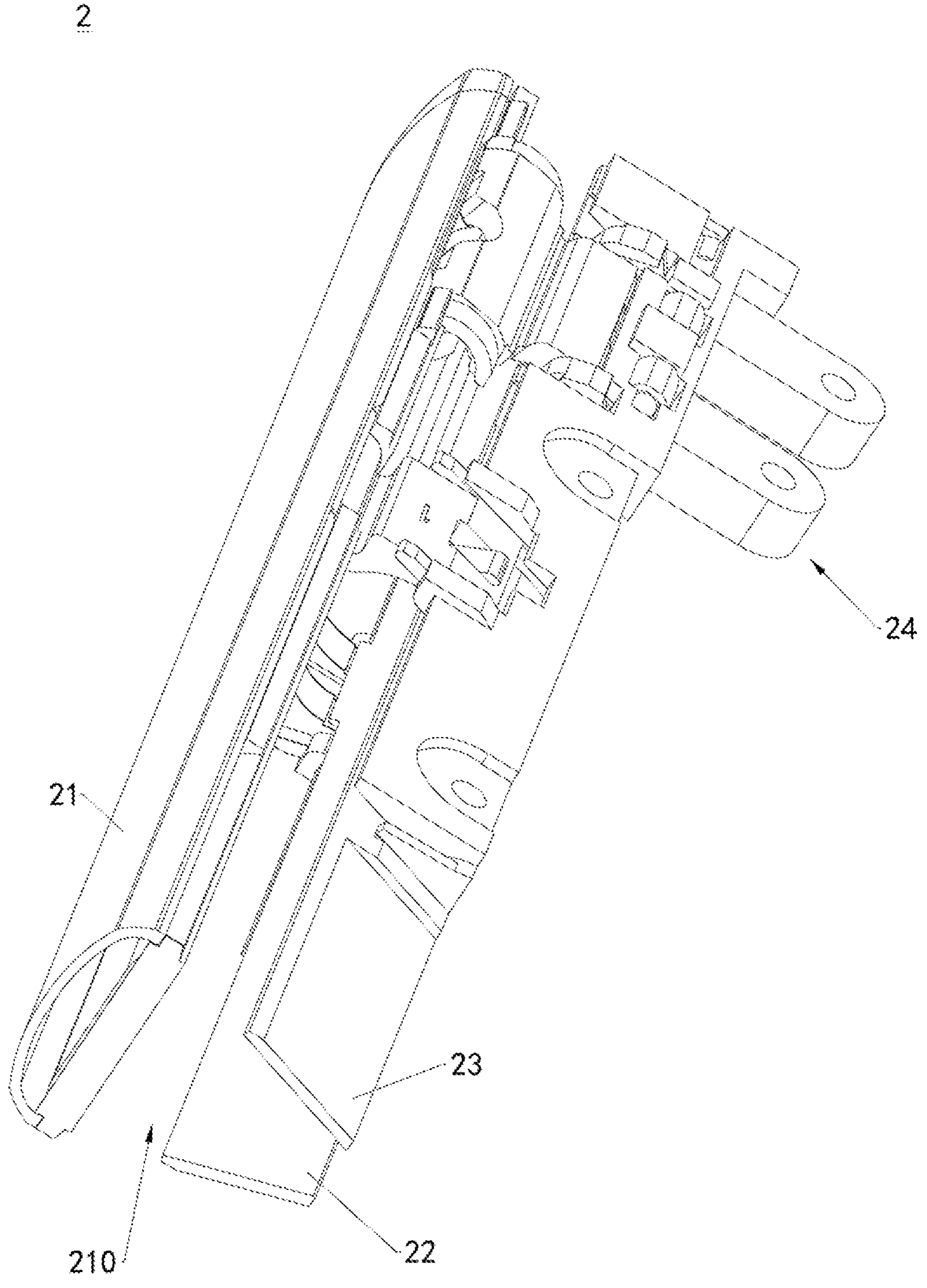
FIG. 5 is a diagram of a structure of the first hinge assembly shown in FIG. 4 in a first closed state.
Figure 6:
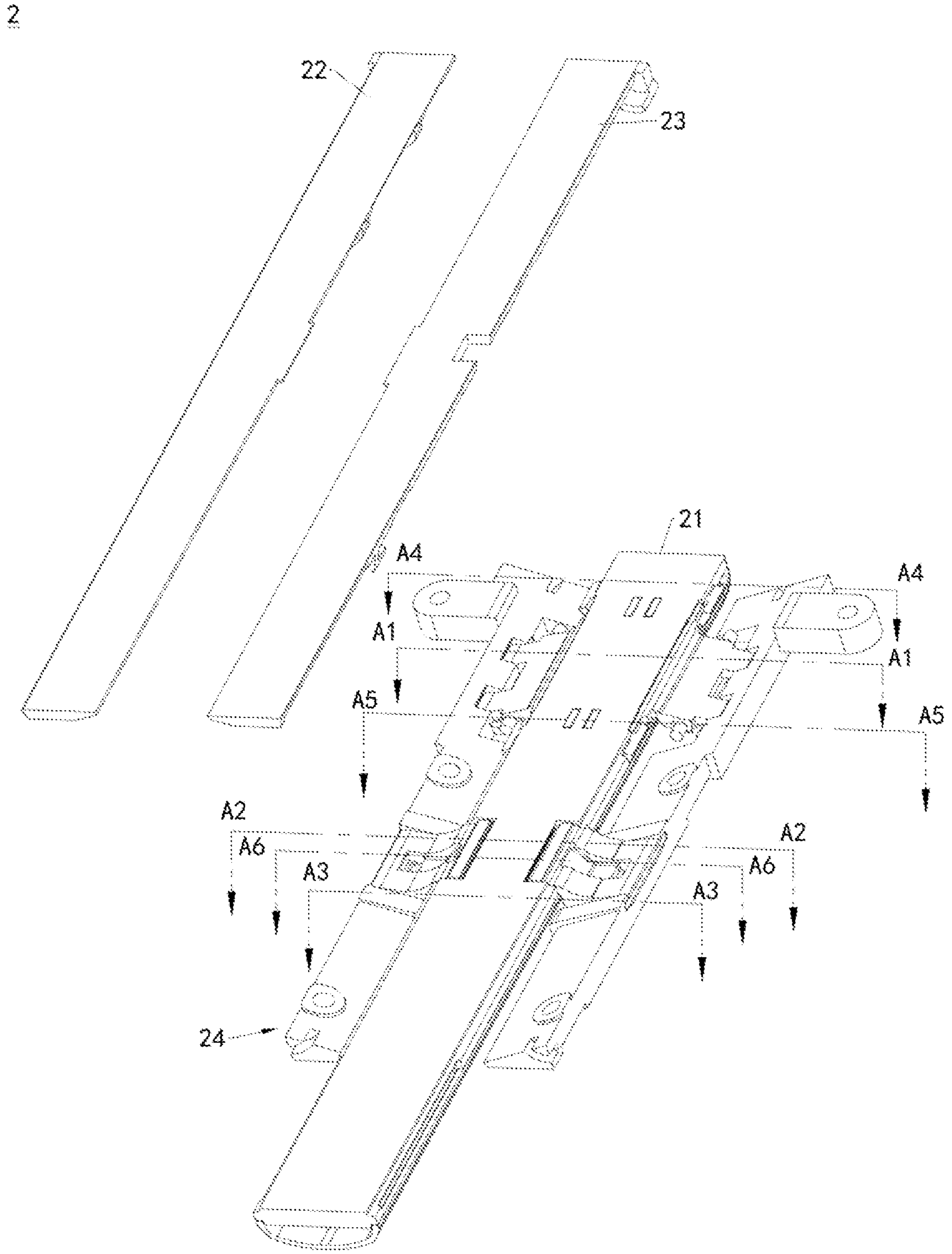
FIG. 6 is a diagram of a partial exploded structure of the first hinge assembly shown in FIG. 4.

Refer to FIG. 4, FIG. 5, and FIG. 6. FIG. 4 is a diagram of a structure of the first hinge assembly 2 shown in FIG. 2. FIG. 5 is a diagram of a structure of the first hinge assembly 2 shown in FIG. 4 in a first closed state. FIG. 6 is a diagram of a structure of a partial exploded structure of the first hinge assembly 2 shown in FIG. 4.

In some embodiments, the first hinge assembly 2 includes a main shaft 21, a first support part 22, a second support part 23, and a connection assembly 24. The main shaft 21 and the connection assembly 24 jointly form a main moving mechanism of the first hinge assembly 2. In this embodiment of this application, two ends close to the main shaft 21 are respectively defined as a top end and a bottom end, and a direction from the top end to the bottom end of the main shaft 21 is defined as an extension direction of the main shaft 21. An orientation close to the top end of the main shaft 21 is defined as a "top", and an orientation close to the bottom end of the main shaft 21 is defined as a "bottom".

For example, the connection assembly 24 is connected to the main shaft 21, can be deformed, and is unfolded or folded relative to the main shaft 21. The connection assembly 24 is further connected between the first housing 11 and the second housing 12 (refer to FIG. 2). When the connection assembly 24 is deformed relative to the main shaft 21, the first housing 11 and the second housing 12 are deformed relative to the main shaft 21, to be unfolded or folded relative to each other.

The first support part 22 and the second support part 23 are respectively connected to two sides of the connection assembly 24. The first support part 22 and the second support part 23 move with the connection assembly 24, to implement relative unfolding and relative folding. As shown in FIG. 4, in a process in which the first hinge assembly 2 is unfolded from a closed state to an open state, the first support part 22 and the second support part 23 are unfolded relative to each other, the first support part 22 and the second support part 23 are respectively located on two sides of the main shaft 21, and the first support part 22, the main shaft 21, and the second support part 23 jointly provide a flat support environment. As shown in FIG. 5, in a process in which the first hinge assembly 2 is folded from the open state to the closed state, the first support part 22 and the second support part 23 are folded relative to each other, the first support part 22 and the second support part 23 are located on a same side of the main shaft 21, a spacing between the first support part 22 and the second support part 23 gradually increases in a direction close to the main shaft 21, and the first support part 22, the second support part 23, and the main shaft 21 jointly form a screen accommodating space 210. In this case, the screen accommodating space 210 may be in a water drop shape or a shape like a water drop.

In this embodiment of this application, an example in which the first hinge assembly 2 has one connection assembly 24 is used for description. It should be understood that in some other embodiments, the first hinge assembly 2 may alternatively have more connection assemblies 24, the connection assemblies 24 may be split or combined, and structures of the plurality of connection assemblies 24 may be the same or different. This is not strictly limited in embodiments of this application.

The following describes, with reference to the accompanying drawings, structures of components of the main shaft 21 and the connection assembly 24, and a connection structure between the connection assembly 24 and the main shaft 21 in some embodiments provided in this application.

Figure 7A:
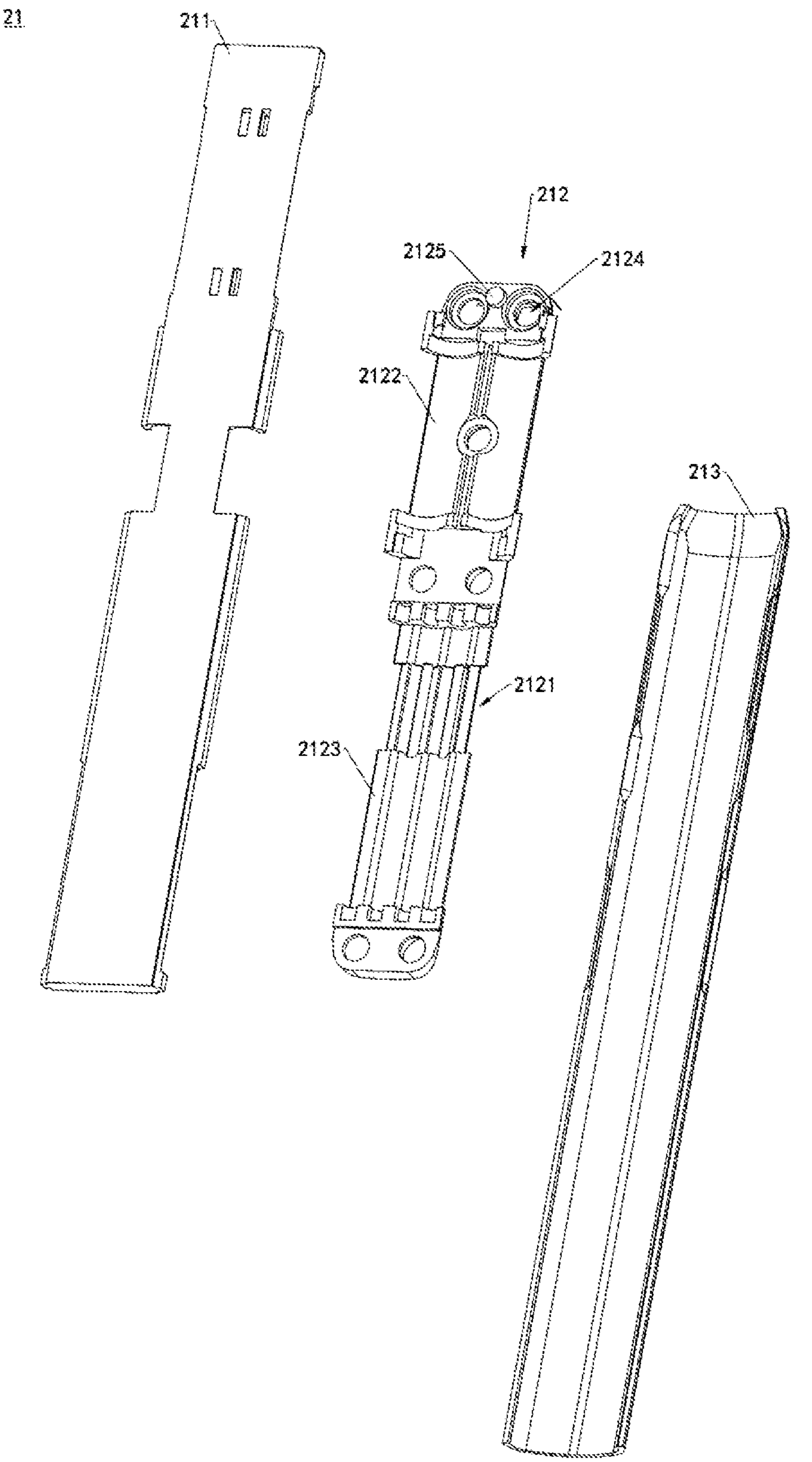
FIG. 7A is a diagram of an exploded structure of a main shaft shown in FIG. 6.
Figure 7B:
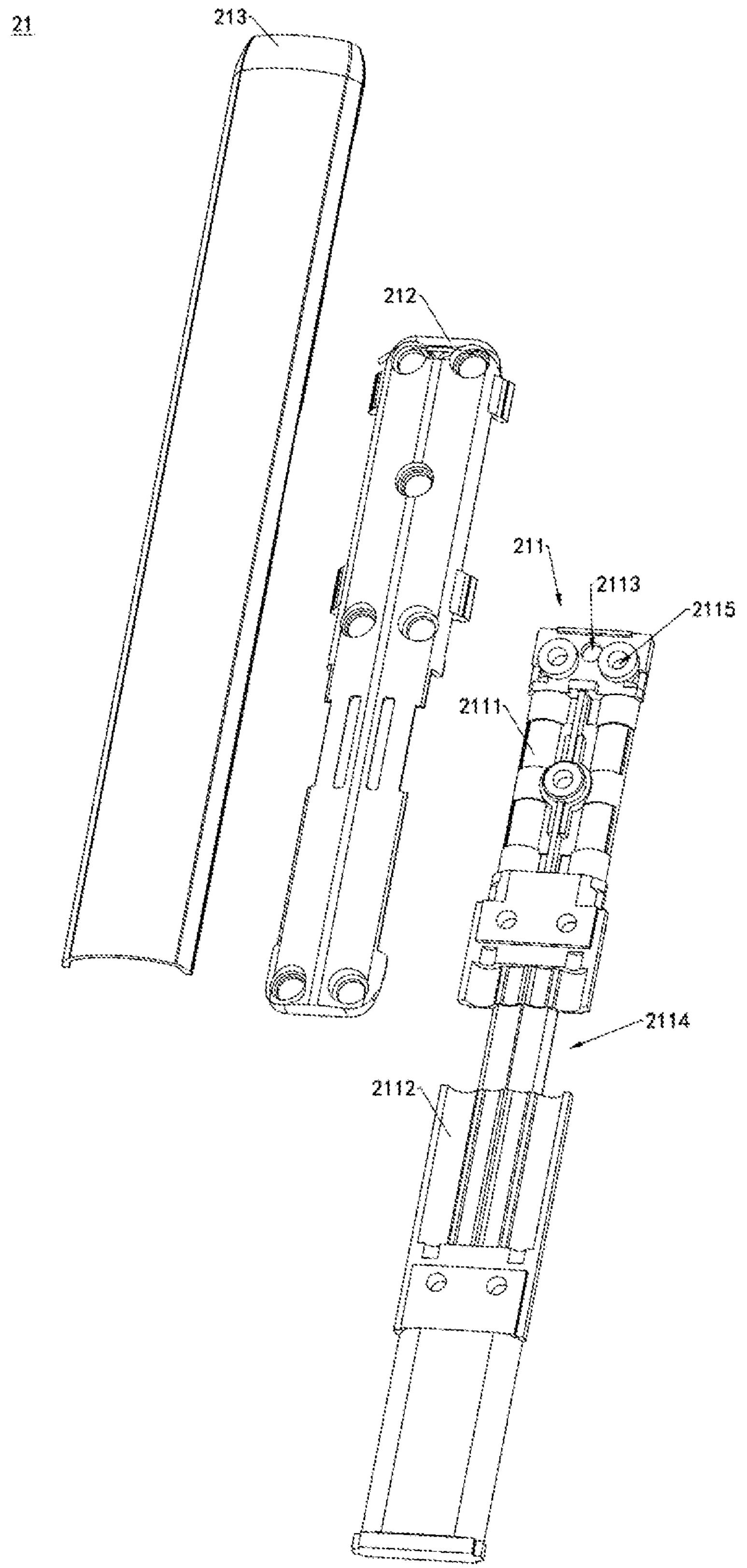
FIG. 7B is a diagram of a structure of the main shaft shown in FIG. 7A from another angle.

Refer to FIG. 6, FIG. 7A, and FIG. 7B. FIG. 7A is a diagram of an exploded structure of the main shaft 21 shown in FIG. 6. FIG. 7B is a diagram of a structure of the main shaft 21 shown in FIG. 7A from another angle. An angle of view in FIG. 7B is reversed leftward and rightward relative to an angle of view in FIG. 7A.

In some embodiments, the main shaft 21 includes a main support plate 211, a cover body 212, and a back cover 213. The cover body 212 is fastened to the main support plate 211, and forms a mounting space for mounting the connection assembly 24 with the main support plate 211. The back cover 213 is located on a side that is of the cover body 212 and that faces away from the main support plate 211, and is fastened to the main support plate 211, to form an appearance surface of the electronic device 1000, and protect the main support plate 211 and the cover body 212. In this application, a size of the cover body 212 may be less than that of the back cover 213, to reduce costs. In addition, the cover body 212 and the back cover 213 adopt a split design, to facilitate processing, assembly, and replacement. In some other embodiments, the cover body 212 and the back cover 213 may alternatively adopt an integrated structure. This is not limited in this application. It should be understood that, in some other embodiments, the main shaft 21 may alternatively have more cover bodies, and a quantity, structures, positions, and the like of cover bodies are all set corresponding to those of the connection assembly 24.

For example, as shown in FIG. 7B, a plurality of cooperation structures are disposed on a lower side that is of the main support plate 211 and that faces the cover body 212, and the plurality of cooperation structures are configured to cooperate with the cover body 212, to form a plurality of mounting spaces for mounting the connection assemblies 24. The plurality of cooperation structures each may include structures such as a groove, an opening, and a protrusion. For example, the main support plate 211 may include a first arc surface 2111 and a first wavy surface 2112. The first arc surface 2111 may be a concave arc surface. The first wavy surface 2112 may include a plurality of areas arranged in an extension direction of the main shaft 21, each area includes a plurality of concave arc surfaces, and an arrangement direction of the plurality of arc surfaces is perpendicular to the extension direction of the main shaft 21.

As shown in FIG. 7B, the main support plate 211 may be provided with a limiting hole 2113, a plurality of avoidance notches 2114, and a plurality of fastening holes 2115. The limiting hole 2113 is located at an end part of the main support plate 211, and is configured to cooperate with a limiting structure of the cover body, to limit a mounting position of the cover body 212 relative to the main support plate 211. The plurality of avoidance notches 2114 are located on two sides of the main support plate 211, and the plurality of avoidance notches 2114 are configured to avoid a mechanical part of the connection assembly 24 in a movement process of the first hinge assembly 2. The plurality of fastening holes 2115 are configured to allow fasteners to pass through. The plurality of avoidance notches 2114 and the plurality of fastening holes 2115 are all distributed at a bottom, a middle part, and a top of the main support plate 211.

For example, as shown in FIG. 7A, the cover body 212 may be approximately a cover body structure in which a middle part is recessed and two sides are raised. Two sides of the cover body 212 may be provided with a plurality of avoidance notches 2121. A plurality of cooperation structures are disposed on an upper side that is of the cover body 212 and that faces the main support plate 211, and the plurality of cooperation structures are configured to cooperate with the main support plate 211, to form a plurality of mounting spaces for mounting the connection assemblies 24. The plurality of cooperation structures each may include structures such as a groove, an opening, and a protrusion. For example, the cover body 212 may include a second arc surface 2122 and a second wavy surface 2123. The second arc surface 2122 is a concave arc surface. The second wavy surface 2123 includes a plurality of areas, and each area includes a plurality of concave arc surfaces. The second arc surface 2122 may cooperate with the first arc surface 2111 of the main support plate 211, and the second wavy surface 2123 may cooperate with the first wavy surface 2112 of the main support plate 211, to form a mounting space.

As shown in FIG. 7A, the cover body 212 may be fastened to the main support plate 211 through a plurality of fasteners. The cover body 212 may further be provided with a plurality of fastening holes 2124. The plurality of fastening holes 2124 of the cover body 212 are aligned with some of the fastening holes 2115 of the main support plate 211, and the plurality of fasteners extend into the fastening holes 2124 of the cover body 212 and the fastening holes 2115 of the main support plate 211, to lock the cover body 212 and the main support plate 211.

As shown in FIG. 7A, the cover body 212 may further be provided with a limiting post 2125. The limiting post 2125 is aligned with a limiting hole 2113 of the main support plate 211, and the limiting post 2125 penetrates into the limiting hole 2113 of the cover body 212, to limit a mounting position of the cover body 212 relative to the main support plate 211.

In this embodiment of this application, an example in which the main shaft 21 has one cover body 212 is used for description. It should be understood that in some other embodiments, the main shaft 21 may alternatively have more cover bodies, structures of a plurality of cover bodies, and connection structures of the plurality of cover bodies and the main support plate 211 may be the same or different. This is not strictly limited in embodiments of this application.

Figure 8:
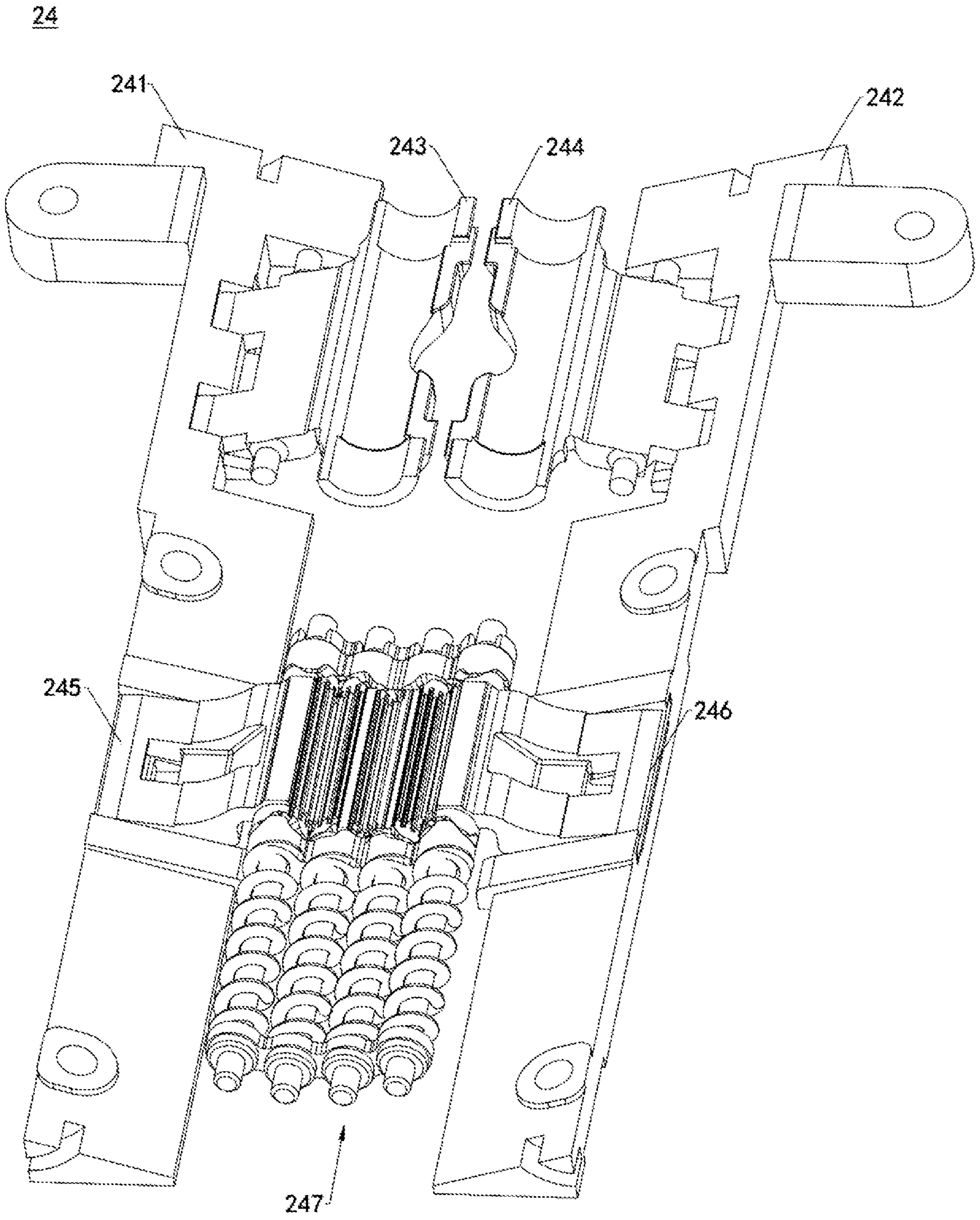
FIG. 8 is a diagram of a structure of a connection assembly shown in FIG. 6.
Figure 9:
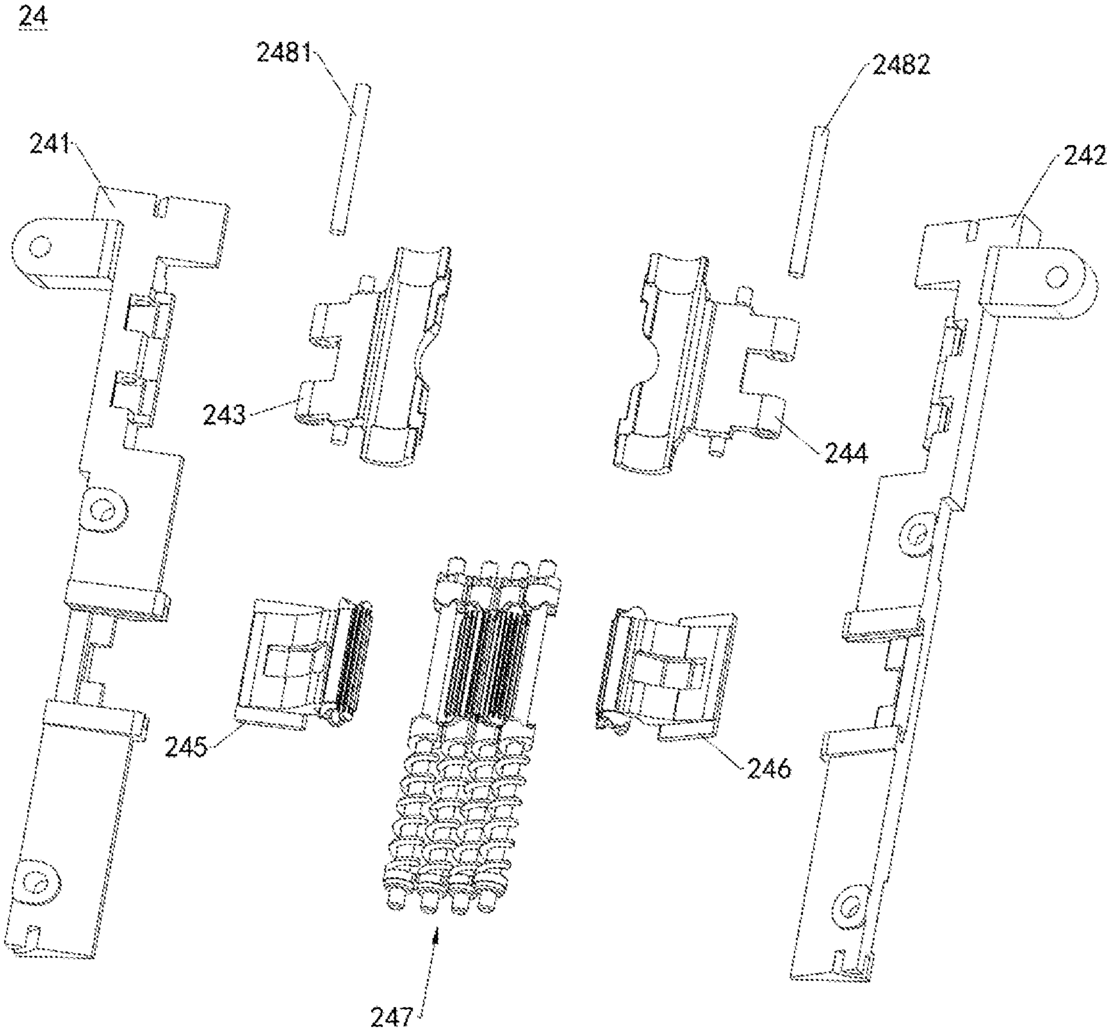
FIG. 9 is a diagram of a partial exploded structure of the connection assembly shown in FIG. 8.

Refer to FIG. 6, FIG. 8, and FIG. 9. FIG. 8 is a diagram of a structure of the connection assembly 24 shown in FIG. 6. FIG. 9 is a diagram of a partial exploded structure of the connection assembly 24 shown in FIG. 8.

In some embodiments, the connection assembly 24 includes a first mounting bracket 241, a second mounting bracket 242, a first connection arm 243, a second connection arm 244, a first swing arm 245, a second swing arm 246, and a damping assembly 247. Two ends of the first connection arm 243 are respectively connected to the main shaft 21 and the first mounting bracket 241. Two ends of the first swing arm 245 are respectively connected to the main shaft 21 and the first mounting bracket 241. Two ends of the second connection arm 244 are respectively connected to the main shaft 21 and the second mounting bracket 242. Two ends of the second swing arm 246 are respectively connected to the main shaft 21 and the second mounting bracket 242. The damping assembly 247 is mounted on the main shaft 21, and is connected to the first swing arm 245 and the second swing arm 246. The damping assembly 247 is configured to provide motion damping force in a process in which the first swing arm 245 and the second swing arm 246 rotate relative to each other.

The connection assembly 24 may further include a first rotating shaft 2481 and a second rotating shaft 2482. The first rotating shaft 2481 is configured to connect the first connection arm 243 and the first mounting bracket 241, and the second rotating shaft 2482 is configured to connect the second connection arm 244 and the second mounting bracket 242. A specific connection structure is described in the following.

Figure 10A:
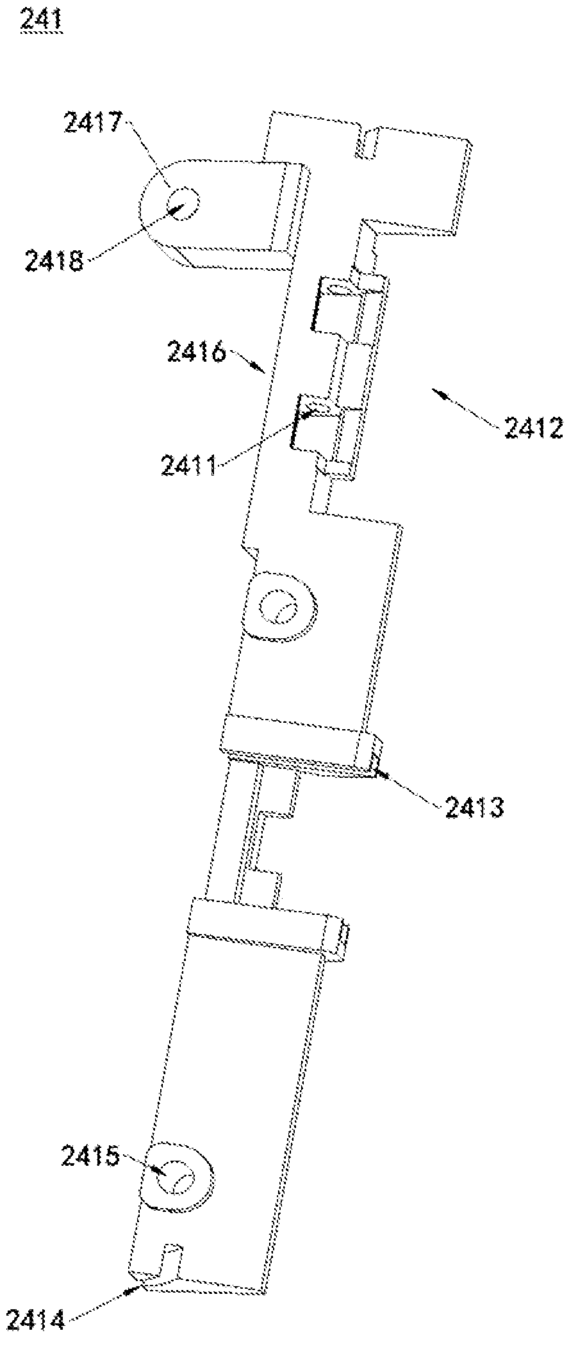
FIG. 10A is a diagram of a structure of a first mounting bracket shown in FIG. 9.

FIG. 10A is a diagram of a structure of the first mounting bracket 241 shown in FIG. 9.

In some embodiments, the first mounting bracket 241 has a first rotating shaft hole 2411, a first avoidance notch 2412, a first sliding slot 2413, a first arc-shaped groove 2414, and a plurality of fastening holes 2415. The plurality of fastening holes 2415 are configured to allow fasteners to pass through, and are fastened to the first housing 11 through the fastener. The plurality of fastening holes 2415 are all distributed at a bottom, a middle part, and a top of the first mounting bracket 241.

For example, the first mounting bracket 241 further includes a first rotatable connecting part 2416. The first rotating shaft hole 2411 is formed on the first rotatable connecting part 2416. The first avoidance notch 2412 may be located on a side of the first rotatable connecting part 2416, and is configured to avoid some structures of a mechanism connected to the first rotatable connecting part 2416.

The first mounting bracket 241 further includes a mounting space. The mounting space penetrates through a left end face and a right end face of the first mounting bracket 241. The first sliding slot 2413 is provided on a side wall of the mounting space. A structure mounted in the mounting space is slidably connected to the first sliding slot 2413.

For example, the first sliding slot 2413 has two side walls that are disposed opposite to each other, and the two side walls that are disposed opposite to each other are recessed to jointly form a guide space of the first sliding slot 2413. In other words, a side wall of the first sliding slot 2413 may have a concave guide space for guiding a sliding direction of a mechanical part mounted in the first sliding slot 2413, so that a relative sliding action between the first mounting bracket 241 and a corresponding mechanical part is easy to implement, and control precision is high.

There are two first arc-shaped grooves 2414, and the two first arc-shaped grooves 2414 are respectively formed at a bottom end and a top end of the first mounting bracket 241. A side of the first arc-shaped groove 2414 located at the bottom end of the first mounting bracket 241 may extend to a bottom end surface of the first mounting bracket 241, and a side of the first arc-shaped groove 2414 located at the top end of the first mounting bracket 241 may extend to a top end surface of the first mounting bracket 241. In some other embodiments, there may alternatively be one first arc-shaped groove 2414, and the first arc-shaped groove 2414 is formed at the bottom end or the top end of the first mounting bracket 241.

For example, the first mounting bracket 241 may further include a first clamping block 2417, and the first clamping block 2417 protrudes, to be clamped into the first housing 11. A fastening hole 2418 may be provided on the first clamping block 2417. In this application, the first mounting bracket 241 may be fastened to the first housing 11 in a manner in which a fastener passes through the fastening hole 2418.

Figure 10B:
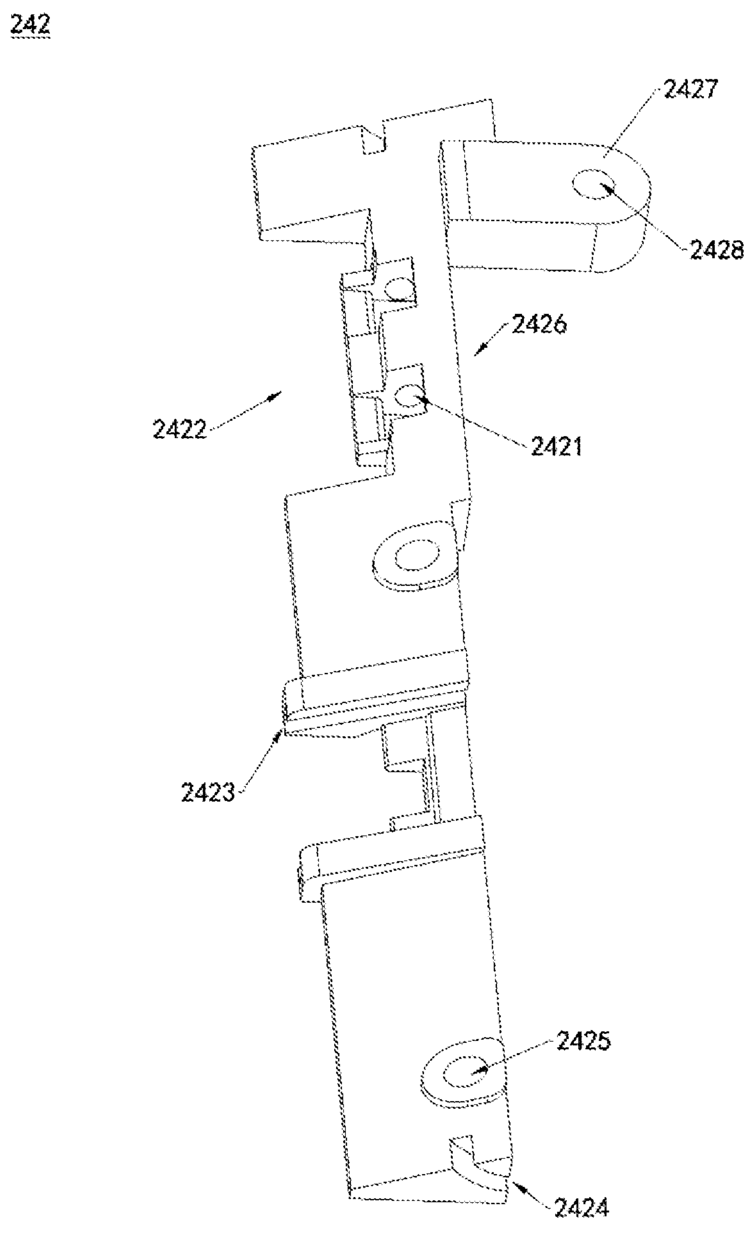
FIG. 10B is a diagram of a structure of a second mounting bracket shown in FIG. 9 from another angle.

FIG. 10B is a diagram of a structure of the second mounting bracket 242 shown in FIG. 9 from another angle.

In some embodiments, the second mounting bracket 242 has a second rotating shaft hole 230, a second avoidance notch 2422, a second sliding slot 2423, a second arc-shaped groove 2424, and a plurality of fastening holes 2425.

For example, the second mounting bracket 242 includes a second rotatable connecting part 2426. The second rotating shaft hole 230 is formed on the second rotatable connecting part 2426. The second avoidance notch 2422 may be located on a side of the second rotatable connecting part 2426, and is configured to avoid some structures of a mechanism connected to the second rotatable connecting part 2426.

The second mounting bracket 242 further includes a mounting space. The mounting space penetrates through a left end face and a right end face of the second mounting bracket 242. The second sliding slot 2423 is provided on a side wall of the mounting space. A structure mounted in the mounting space is slidably connected to the second sliding slot 2423.

The second sliding slot 2423 has two side walls that are disposed opposite to each other, and the two side walls that are disposed opposite to each other are recessed to jointly form a guide space of the second sliding slot 2423. In other words, a side wall of the second sliding slot 2423 may have a concave guide space for guiding a sliding direction of a mechanical part mounted in the second sliding slot 2423, so that a relative sliding action between the second mounting bracket 242 and a corresponding mechanical part is easy to implement, and control precision is high.

There are two second arc-shaped grooves 2424, and the two second arc-shaped grooves 2424 are respectively formed at a bottom end and a top end of the second mounting bracket 242. A side of the second arc-shaped groove 2424 located at the bottom end of the second mounting bracket 242 may extend to a bottom end surface of the second mounting bracket 242, and a side of the second arc-shaped groove 2424 located at the top end of the second mounting bracket 242 may extend to a top end surface of the second mounting bracket 242. In some other embodiments, there may alternatively be one second arc-shaped groove 2424, and the second arc-shaped groove 2424 is formed at the bottom end or the top end of the second mounting bracket 242. The plurality of fastening holes 2415 are configured to allow fasteners to pass through, and are fastened to the second housing 12 through the fastener. The plurality of fastening holes 2425 are all distributed at a bottom, a middle part, and a top of the second mounting bracket 242.

For example, the second mounting bracket 242 may further include a second clamping block 2427, and the second clamping block 2427 protrudes, to be clamped into the second housing 12. A fastening hole 24271 may be provided on the second clamping block 2427. In this application, the second mounting bracket 242 may be fastened to the second housing 12 in a manner in which a plurality of fasteners pass through the plurality of fastening holes 24271.

Figure 11A:
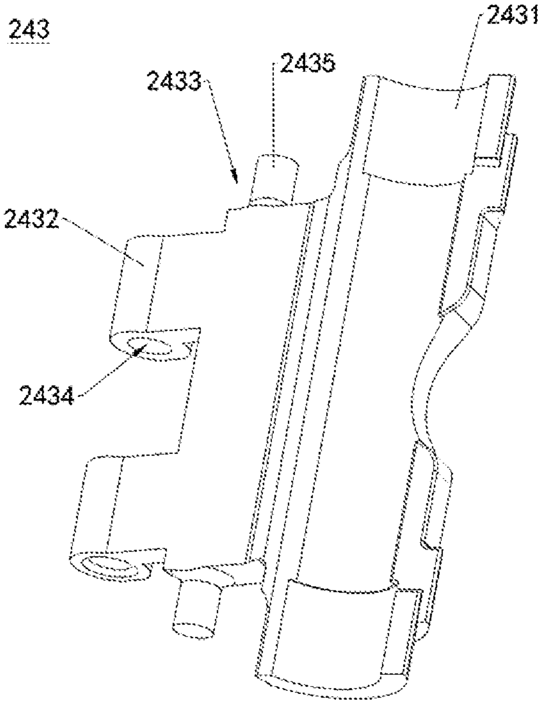
FIG. 11A is a diagram of a structure of a first connection arm shown in FIG. 9.

FIG. 11A is a diagram of a structure of the first connection arm 243 shown in FIG. 9.

In some embodiments, the first connection arm 243 includes a first end 2431 and a second end 2432, and both the first end 2431 and the second end 2432 are rotating ends. For example, the first end 2431 of the first connection arm 243 is an arc-shaped arm, and the second end 2432 of the first connection arm 243 is provided with a rotating shaft hole 2434.

The first connection arm 243 further includes a connection segment 2433 connected between the first end 2431 and the second end 2432. For example, an upper surface of the connection segment 2433 may be bent relative to an upper surface of the second end 2432 of the first connection arm 243. Sliding bumps 2435 are disposed on two sides of the connection segment 2433. Disposing of the connection segment 2433 enables a structure design of the first connection arm 243 to be more flexible, and can better meet a connection requirement and a shape requirement of the connection assembly 24 and the first hinge assembly 2.

The first connection arm 243 may be an integrally formed mechanical part, to have high structural strength. For example, the first connection arm 243 may be formed by using a computer numerical control (computer numerical control, CNC) milling process. In some other embodiments, the first connection arm 243 may alternatively be formed by using a metal injection molding process. This is not strictly limited in embodiments of this application.

Figure 11B:
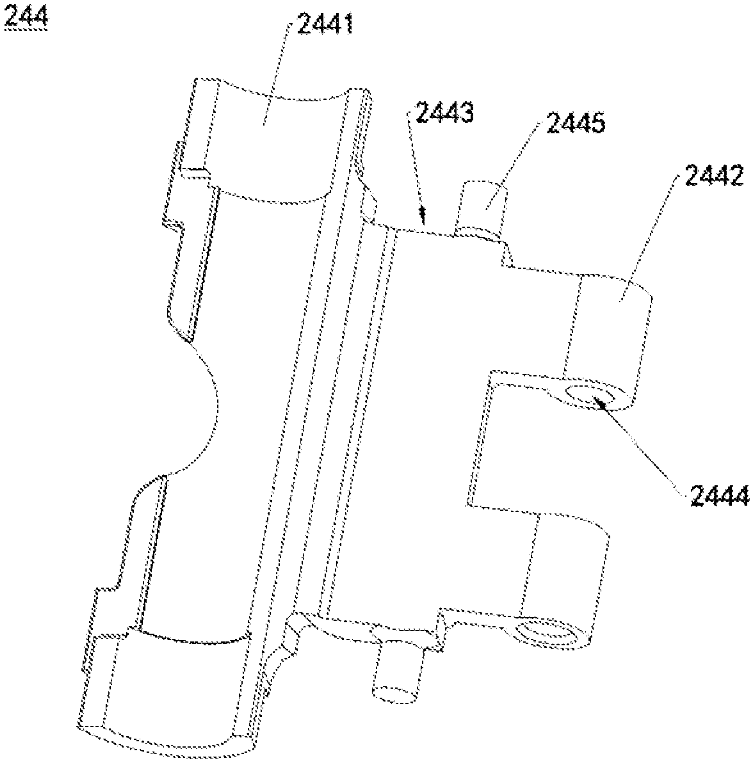
FIG. 11B is a diagram of a structure of a second connection arm shown in FIG. 9.

FIG. 11B is a diagram of a structure of the second connection arm 244 shown in FIG. 9.

In some embodiments, the second connection arm 244 includes a first end 2441 and a second end 2442, and both the first end 2441 and the second end 2442 are rotating ends. For example, the first end 2441 of the second connection arm 244 is an arc-shaped arm, and the second end 2442 of the second connection arm 244 is provided with a rotating shaft hole 2444.

The second connection arm 244 further includes a connection segment 2443 connected between the first end 2441 and the second end 2442. For example, an upper surface of the connection segment 2443 may be bent relative to an upper surface of the second end 2442 of the second connection arm 244. Sliding bumps 2445 are disposed on two sides of the connection segment 2443. Disposing of the connection segment 2443 enables a structure design of the second connection arm 244 to be more flexible, and can better meet a connection requirement and a shape requirement of the connection assembly 24 and the first hinge assembly 2.

The second connection arm 244 may be an integrally formed mechanical part, to have high structural strength. For example, the second connection arm 244 may be formed by using a computer numerical control milling process. In some other embodiments, the second connection arm 244 may alternatively be formed by using a metal injection molding process. This is not strictly limited in embodiments of this application.

In some embodiments, the first connection arm 243 and the second connection arm 244 may be the same in shape, and are of a same material, so that material types of the first hinge assembly 2 are reduced, and costs of the first hinge assembly 2 are reduced. In some other embodiments, the first connection arm 243 and the second connection arm 244 may be different in shape. This is not strictly limited in embodiments of this application.

Figure 12A:
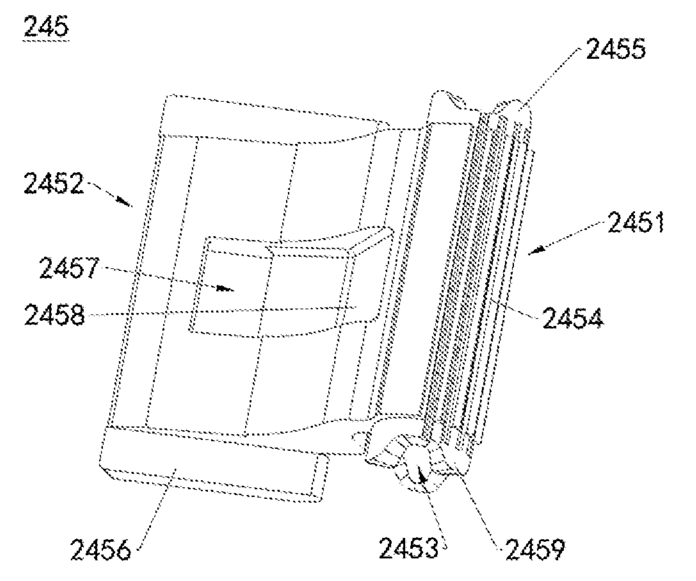
FIG. 12A is a diagram of a structure of a first swing arm shown in FIG. 9.

FIG. 12A is a diagram of a structure of the first swing arm 245 shown in FIG. 9.

In some embodiments, the first swing arm 245 includes a rotating end 2451 and a sliding end 2452. The rotating end 2451 of the first swing arm 245 is provided with a rotating shaft hole 2453, and the rotating shaft hole 2453 penetrates through the rotating end 2451 of the first swing arm 245. The rotating end 2451 of the first swing arm 245 may be provided with a structure configured to cooperate with the damping assembly 247. For example, the rotating end 2451 of the first swing arm 245 may include a plurality of meshing teeth 2454, a plurality of first protrusions 2455, and a plurality of second protrusions 2459. The plurality of meshing teeth 2454 may be located at a middle part of the rotating end 2451 of the first swing arm 245, and are located on a side away from the sliding end 2452 of the first swing arm 245. The plurality of first protrusions 2455 and the plurality of second protrusions 2459 are disposed opposite to each other at two ends of the rotating end 2451 of the first swing arm 245. The plurality of first protrusions 2455 are arranged in a ring shape and are spaced away from each other, and the plurality of first protrusions 2455 are disposed around the rotating shaft hole 2453 of the rotating end 2451 of the first swing arm 245. The plurality of second protrusions 2459 are arranged in a ring shape and are spaced away from each other, and the plurality of second protrusions 2459 are disposed around the rotating shaft hole 2453 of the rotating end 2451 of the first swing arm 245.

The sliding end 2452 of the first swing arm 245 includes sliding blocks 2456 located on two sides of the sliding end and a first cooperation space 2457, where the first cooperation space 2457 is located at middle parts of the two sliding blocks 2456, and the first cooperation space 2457 extends to an upper surface of the first swing arm 245. The first swing arm 245 has a cooperation surface 2458 facing the upper surface of the first swing arm 245, and the cooperation surface 2458 is located in the first cooperation space 2457 and is inclined to the upper surface of the first swing arm 245.

The first swing arm 245 may be an integrally formed mechanical part, to have high structural strength. For example, the first swing arm 245 may be formed by using a metal injection molding process, or may be formed by using another process. This is not strictly limited in embodiments of this application.

Figure 12B:
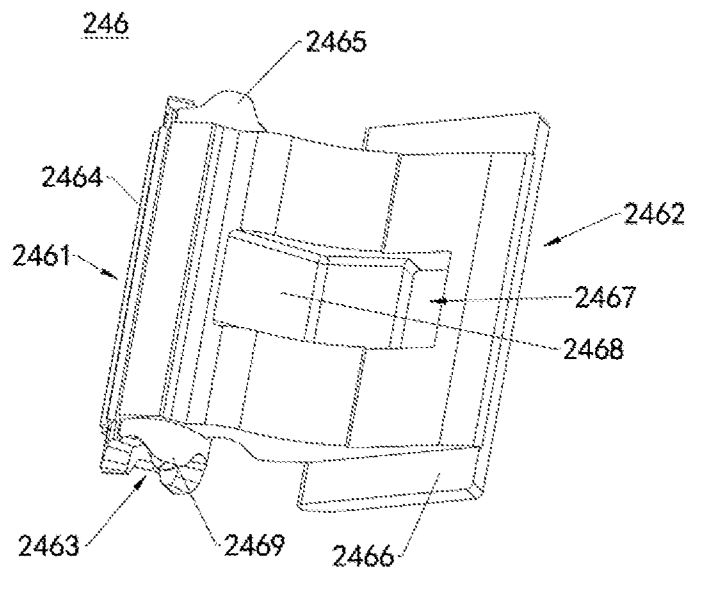
FIG. 12B is a diagram of a structure of a second swing arm shown in FIG. 9 from another angle.

FIG. 12B is a diagram of a structure of the second swing arm 246 shown in FIG. 9 from another angle.

In some embodiments, the second swing arm 246 includes a rotating end 2461 and a sliding end 2462. The rotating end 2461 of the second swing arm 246 is provided with a rotating shaft hole 2463, and the rotating shaft hole 2463 penetrates through the rotating end 2461 of the second swing arm 246. The rotating end 2461 of the second swing arm 246 may be provided with a structure configured to cooperate with the damping assembly 247. For example, the rotating end 2461 of the second swing arm 246 may include a plurality of meshing teeth 2464, a plurality of first protrusions 2465, and a plurality of second protrusions 2469. The plurality of meshing teeth 2464 may be located at a middle part of the rotating end 2461 of the second swing arm 246, and are located on a side away from the sliding end 2462 of the second swing arm 246. The plurality of first protrusions 2465 and the plurality of second protrusions 2469 are disposed opposite to each other at two ends of the rotating end 2461 of the second swing arm 246. The plurality of first protrusions 2465 are arranged in a ring shape and are spaced away from each other, and the plurality of first protrusions 2465 are disposed around the rotating shaft hole 2463 of the rotating end 2461 of the second swing arm 246. The plurality of second protrusions 2469 are arranged in a ring shape and are spaced away from each other, and the plurality of second protrusions 2469 are disposed around the rotating shaft hole 2463 of the rotating end 2461 of the second swing arm 246.

The sliding end 2462 of the second swing arm 246 includes sliding blocks 2466 located on two sides of the sliding end and a second cooperation space 2467, where the second cooperation space 2467 is located at middle parts of the two sliding blocks 2466, and the second cooperation space 2467 extends to the upper surface of the first swing arm 245. The second swing arm 246 has a cooperation surface 2468 facing the upper surface of the first swing arm 245, and the cooperation surface 2468 is located in the second cooperation space 2467 and is inclined to the upper surface of the first swing arm 245.

The second swing arm 246 may be an integrally formed mechanical part, to have high structural strength. For example, the second swing arm 246 may be formed by using a metal injection molding process, or may be formed by using another process. This is not strictly limited in embodiments of this application.

In some embodiments, the first swing arm 245 and the second swing arm 246 may be the same in shape, and are of a same material, so that material types of the first hinge assembly 2 are reduced, and costs of the first hinge assembly 2 are reduced. In some other embodiments, the first swing arm 245 and the second swing arm 246 may be different in shape. This is not strictly limited in embodiments of this application.

Figure 13:
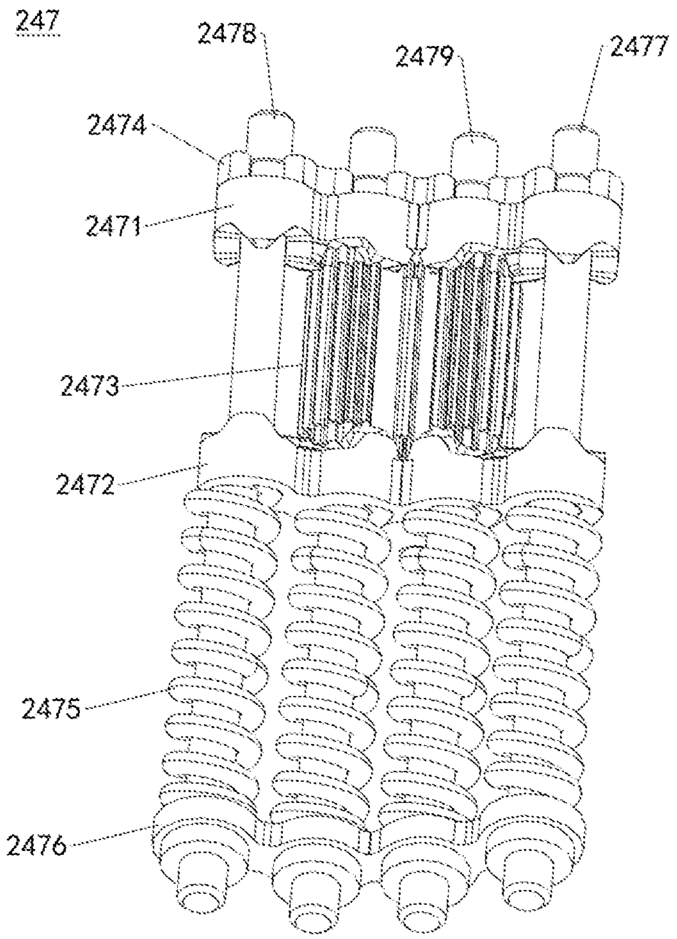
FIG. 13 is a diagram of a structure of a damping assembly shown in FIG. 9 from another angle.
Figure 14:
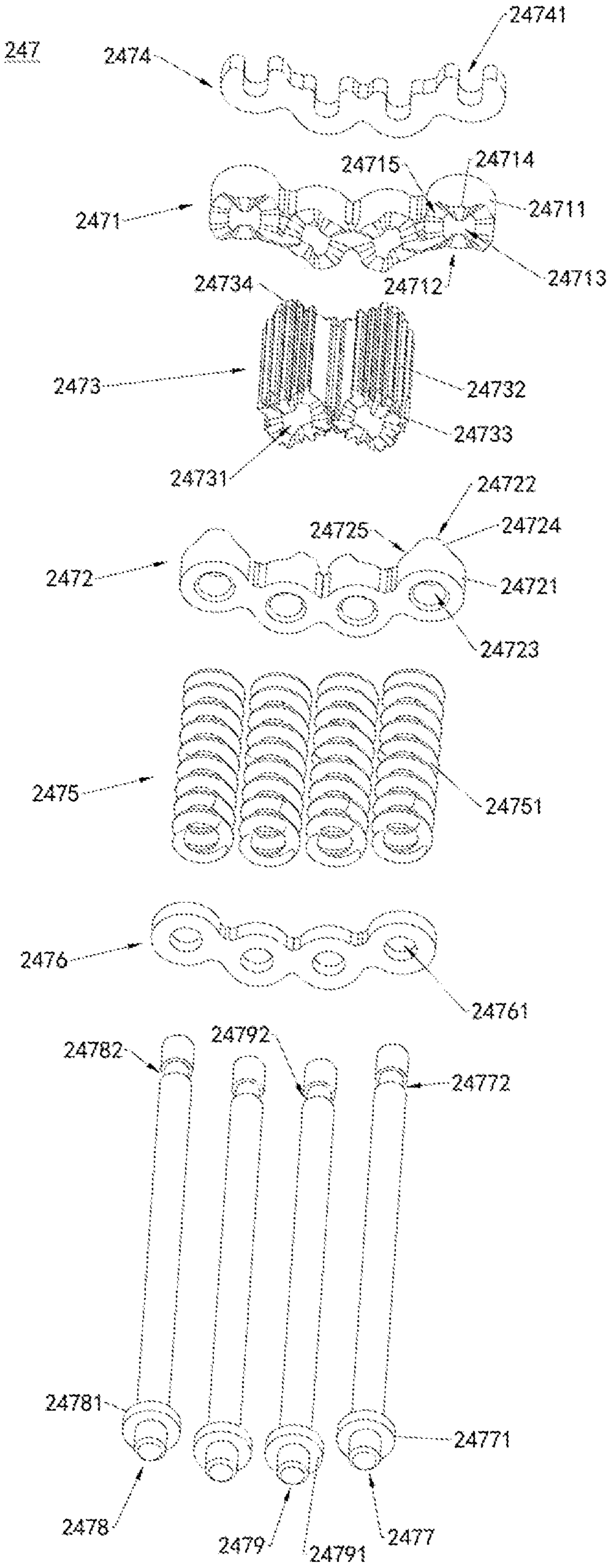
FIG. 14 is an exploded view of a structure of the damping assembly shown in FIG. 13.

Refer to FIG. 9, FIG. 13, and FIG. 14. FIG. 13 is a diagram of a structure of the damping assembly 247 shown in FIG. 9 from another angle. FIG. 14 is an exploded view of a structure of the damping assembly 247 shown in FIG. 13.

In some embodiments, the damping assembly 247 includes a first clamping member 2471, a second clamping member 2472, a plurality of synchronous gears 2473, a first fixing plate 2474, an elastic piece 2475, a second fixing plate 2476, a first rotatable connecting shaft 2477, a second rotatable connecting shaft 2478, and a plurality of third rotatable connecting shafts 2479. In this embodiment, an example in which "a quantity of synchronous gears 2473 is two, and a quantity of third rotatable connecting shafts 2479 is two" is used for illustration.

For example, the first clamping member 2471 includes a first clamping plate 24711 and a plurality of first bump groups 24712, and the plurality of first bump groups 24712 are fastened on a same side surface of the first clamping plate 24711. The first clamping plate 24711 includes a plurality of first through holes 24713, and the plurality of first through holes 24713 are spaced away from each other. The plurality of first through holes 24713 may be arranged in a straight line, an arc line, a wavy line, or the like. The plurality of first bump groups 24712 are disposed in a one-to-one correspondence with the plurality of first through holes 24713. There may be four first through holes 24713 and four first bump groups 24712. Each first bump group 24712 may include a plurality of first bumps 24714. The plurality of first bumps 24714 are arranged in a ring shape and are spaced from each other. The plurality of first bumps 24714 are disposed around the first through holes 24713, and a first clamping slot 24715 is formed between two adjacent first bumps 24714. The first clamping member 2471 may be an integrally formed mechanical part, to have high structural strength.

For example, the second clamping member 2472 includes a second clamping plate 24721 and a plurality of second bump groups 24722, and the plurality of second bump groups 24722 are fastened on a same side surface of the second clamping plate 24721. The second clamping plate 24721 includes a plurality of second through holes 24723, and the plurality of second through holes 24723 are spaced away from each other. The plurality of second bump groups 24722 are disposed in a one-to-one correspondence with the plurality of second through holes 24723. There may be four second through holes 24723 and four second bump groups 24722. Each second bump group 24722 may include a plurality of second bumps 24724. The plurality of second bumps 24724 are arranged in a ring shape and are spaced from each other. The plurality of second bumps 24724 are disposed around the second through holes 24723, and a second clamping slot 24725 is formed between two adjacent second bumps 24724. The second clamping member 2472 may be an integrally formed mechanical part, to have high structural strength.

The second clamping member 2472 and the first clamping member 2471 may be the same in structure, and are of a same material, so that material types of the first hinge assembly 2 are reduced, and costs of the first hinge assembly 2 are reduced. In some other embodiments, the second clamping member 2472 and the first clamping member 2471 may alternatively be different in structure. This is not strictly limited in this application.

The plurality of first bump groups 24712 of the first clamping member 2471 are disposed opposite to the plurality of second bump groups 24722 of the second clamping member 2472, and the plurality of first bump groups 24712 are in a one-to-one correspondence with the plurality of second bump groups 24722. For example, in the corresponding first bump group 24712 and second bump group 24722, a position of the first bump 24714 is opposite to a position of the second bump 24724, and a position of the first clamping slot 24715 is opposite to a position of the second clamping slot 24725. In some other embodiments, a position of the first bump 24714 and a position of the second bump 24724 may alternatively be staggered or in another position relationship, and a position of the first clamping slot 24715 and a position of the second clamping slot 24725 may alternatively be staggered or in another position relationship. This is not strictly limited in this application.

For example, the plurality of synchronous gears 2473 are located between the first clamping member 2471 and the second clamping member 2472, and the plurality of synchronous gears 2473 are engaged with each other. The synchronous gear 2473 is provided with a rotating shaft hole 24731. Each synchronous gear 2473 may include a plurality of meshing teeth 24732, a plurality of first protrusions 24733, and a plurality of second protrusions 24734. The plurality of meshing teeth 24732 may be located in a middle part of the synchronous gear 2473, and the plurality of meshing teeth 24732 of two adjacent synchronous gears 2473 are engaged with each other. The plurality of first protrusions 24733 and the plurality of second protrusions 24734 are disposed opposite to each other at two ends of the synchronous gear 2473. The plurality of first protrusions 24733 are arranged in a ring shape and are spaced away from each other. The plurality of first protrusions 24733 are disposed around the rotating shaft hole 24731 of the synchronous gear 2473. The plurality of second protrusions 24734 are arranged in a ring shape and are spaced away from each other. The plurality of second protrusions 24734 are disposed around the rotating shaft hole 24731 of the synchronous gear 2473.

In some use states, the plurality of first protrusions 24733 of the synchronous gear 2473 and the plurality of first bumps 24714 of one first bump group 24712 are arranged in a staggered manner to form a clamping structure, and the plurality of first protrusions 24733 are correspondingly clamped into the plurality of first clamping slots 24715. The plurality of second protrusions 24734 of the synchronous gear 2473 and the plurality of second bumps 24724 of one second bump group 24722 are arranged in a staggered manner to form a clamping structure, and the plurality of second protrusions 24734 are correspondingly clamped into the plurality of second clamping slots 24725. Shapes and positions of the plurality of first protrusions 24733 of the synchronous gear 2473 adapt to shapes and positions of the plurality of corresponding first clamping slots 24715. Shapes and positions of the plurality of second protrusions 24734 of the synchronous gear 2473 adapt to shapes and positions of the plurality of corresponding second clamping slots 24725.

The synchronous gear 2473 may be an integrally formed mechanical part, to have high structural strength. The plurality of synchronous gears 2473 may be the same in structure, and are of a same material, so that material types of the first hinge assembly 2 are reduced, and costs of the first hinge assembly 2 are reduced. In some other embodiments, the plurality of synchronous gears 2473 may alternatively be different in structure. This is not strictly limited in this application.

For example, the first fixing plate 2474 is located on a side that is of the first clamping member 2471 and that is away from the second clamping member 2472. The first fixing plate 2474 includes a plurality of slots 24741 that are spaced way from each other, and the slots 24741 extend to a side surface of the first fixing plate 2474, so that the rotatable connecting shafts (2477, 2478, 2479) may be clamped into the slots 24741 from the side surface of the first fixing plate 2474, to clamp the first fixing plate 2474. The first fixing plate 2474 may be approximately in a flat shape.

For example, the elastic piece 2475 is located on a side that is of the second clamping member 2472 and that is away from the first clamping member 2471. The elastic piece 2475 includes a plurality of springs 24751. A quantity of springs 24751 is the same as a quantity of first through holes 24713. There may be four springs 24751. In some other embodiments, the elastic piece 2475 may alternatively be made of an elastic material like an elastic rubber. This is not strictly limited in this application.

For example, the second fixing plate 2476 is located on a side that is of the elastic piece 2475 and that is away from the second clamping member 2472. The second fixing plate 2476 may be of a plate body structure. The second fixing plate 2476 includes a plurality of third through holes 24761, and the plurality of third through holes 24761 are spaced from each other. For example, the plurality of first through holes 24713, the plurality of second through holes 24723, and the plurality of third through holes 24761 may be the same in quantity, arrangement shape, and arrangement spacing. There may be four third through holes 24761.

For example, a limiting flange 24771 is disposed at a top end of the first rotatable connecting shaft 2477, and an outer diameter of the limiting flange 24771 is greater than an outer diameter of a main body part of the first rotatable connecting shaft 2477. A limiting slot 24772 is provided at a bottom end of the first rotatable connecting shaft 2477, the limiting slot 24772 shrinks inward relative to an outer surface of the main body part of the first rotatable connecting shaft 2477, and a diameter of a slot bottom wall of the limiting slot 24772 is less than an outer diameter of the main body part of the first rotatable connecting shaft 2477.

The first rotatable connecting shaft 2477 is inserted into the second fixing plate 2476, so that the first rotatable connecting shaft 2477, the second fixing plate 2476, one spring 24751, the second clamping member 2472, the first clamping member 2471, and the first fixing plate 2474 may maintain a fixed position relationship. The first rotatable connecting shaft 2477 passes through one third through hole 24761 of the second fixing plate 2476, an inner space of one spring 24751, one second through hole 24723 of the second clamping member 2472, one first through hole 24713 of the first clamping member 2471, and one slot 24741 of the first fixing plate 2474. In addition, the limiting flange 24771 of the first rotatable connecting shaft 2477 is located on a side that is of the second fixing plate 2476 and that is away from the second clamping member 2472, and abuts against the second fixing plate 2476. The first fixing plate 2474 is clamped into the limiting slot 24772 of the first rotatable connecting shaft 2477, so that the first rotatable connecting shaft 2477, the second fixing plate 2476, one spring 24751, the second clamping member 2472, the first clamping member 2471, and the first fixing plate 2474 may maintain a fixed position relationship, and the spring 24751 is in a compressed state. A bottom end of the first rotatable connecting shaft 2477 may be further fastened to the first fixing plate 2474 through welding, bonding, or the like.

For example, a limiting flange 24781 is disposed at a top end of the second rotatable connecting shaft 2478, and an outer diameter of the limiting flange 24781 is greater than an outer diameter of a main body part of the second rotatable connecting shaft 2478. A limiting slot 24782 is provided at a bottom end of the second rotatable connecting shaft 2478, the limiting slot 24782 shrinks inward relative to an outer surface of the main body part of the second rotatable connecting shaft 2478, and a diameter of a slot bottom wall of the limiting slot 24782 is less than an outer diameter of the main body part of the second rotatable connecting shaft 2478. The second rotatable connecting shaft 2478 and the first rotatable connecting shaft 2477 may be the same in structure, and are of a same material, so that material types of the first hinge assembly 2 are reduced, and costs of the first hinge assembly 2 are reduced. In some other embodiments, the second rotatable connecting shaft 2478 and the first rotatable connecting shaft 2477 may alternatively be different in structure. This is not strictly limited in this application.

The second rotatable connecting shaft 2478 is inserted into the second fixing plate 2476, so that the second rotatable connecting shaft 2478, the second fixing plate 2476, another spring 24751, the second clamping member 2472, the first clamping member 2471, and the first fixing plate 2474 maintain a fixed position relationship. The second rotatable connecting shaft 2478 passes through another third through hole 24761 of the second fixing plate 2476, an inner space of another spring 24751, another second through hole 24723 of the second clamping member 2472, another first through hole 24713 of the first clamping member 2471, and another slot 24741 of the first fixing plate 2474. In addition, the limiting flange 24781 of the second rotatable connecting shaft 2478 is located on a side that is of the second fixing plate 2476 and that is away from the second clamping member 2472 and abuts against the second fixing plate 2476. The first fixing plate 2474 is clamped into the limiting slot 24782 of the second rotatable connecting shaft 2478, so that the second rotatable connecting shaft 2478, the second fixing plate 2476, another spring 24751, the second clamping member 2472, the first clamping member 2471, and the first fixing plate 2474 may maintain a fixed position relationship, and the spring 24751 is in a compressed state. A bottom end of the second rotatable connecting shaft 2478 may be further fastened to the first fixing plate 2474 through welding, bonding, or the like.

For example, a limiting flange 24791 is disposed at a top end of the third rotatable connecting shaft 2479, and an outer diameter of the limiting flange 24791 is greater than an outer diameter of a main body part of the third rotatable connecting shaft 2479. A limiting slot 24792 is provided at a bottom end of the third rotatable connecting shaft 2479, the limiting slot 24772 shrinks inward relative to an outer surface of the main body part of the third rotatable connecting shaft 2479, and a diameter of a slot bottom wall of the limiting slot 24792 is less than an outer diameter of the main body part of the third rotatable connecting shaft 2479. The third rotatable connecting shaft 2479 and the first rotatable connecting shaft 2477 may be the same in structure, and are of a same material, so that material types of the first hinge assembly 2 are reduced, and costs of the first hinge assembly 2 are reduced. In some other embodiments, the third rotatable connecting shaft 2479 and the first rotatable connecting shaft 2477 may alternatively be different in structure. This is not strictly limited in this application.

A quantity of the third rotatable connecting shafts 2479 is the same as a quantity of synchronous gears 2473, and the third rotatable connecting shafts 2479, the synchronous gears 2473, and some springs 24751 in the elastic pieces 2475 are disposed in a one-to-one correspondence. The third rotatable connecting shaft 2479 is inserted into the second fixing plate 2476, so that the third rotatable connecting shaft 2479, the second fixing plate 2476, another spring 24751, the second clamping member 2472, the synchronous gear 2473, the first clamping member 2471, and the first fixing plate 2474 maintain a fixed position relationship. The third rotatable connecting shaft 2479 passes through another third through hole 24761 of the second fixing plate 2476, an inner space of another spring 24751, another second through hole 24723 of the second clamping member 2472, a rotating shaft hole 24731 of the synchronous gear 2473, another first through hole 24713 of the first clamping member 2471, and another slot 24741 of the first fixing plate 2474. In addition, the limiting flange 24791 of the third rotatable connecting shaft 2479 is located on a side that is of the second fixing plate 2476 and that is away from the second clamping member 2472 and abuts against the second fixing plate 2476. The first fixing plate 2474 is clamped into the limiting slot 24792 of the third rotatable connecting shaft 2479, so that the third rotatable connecting shaft 2479, the second fixing plate 2476, another spring 24751, the second clamping member 2472, the first clamping member 2471, and the first fixing plate 2474 may maintain a fixed position relationship, and the spring 24751 is in a compressed state. A bottom end of the third rotatable connecting shaft 2479 may be further fastened to the first fixing plate 2474 through welding, bonding, or the like.

It may be understood that the damping assembly 247 in this application may have a plurality of implementation structures. For example, in some other embodiments, the damping assembly 247 may indirectly limit a position of the first swing arm 245 and a position of the second swing arm 246 by limiting a position of the synchronous gear 2473. For example, a clamping structure is formed between each of the first clamping member 2471 and the second clamping member 2472, and the synchronous gear 2473, and there is no clamping structure between each of the rotating end 2451 of the first swing arm 245 and the rotating end 2461 of the second swing arm 246, and each of the first clamping member 2471 and the second clamping member 2472. In some other embodiments, the damping assembly 247 may not be disposed with the second clamping member 2472, and the first swing arm 245 and the second swing arm 246 can stay at some positions through a clamping structure between the first clamping member 2471 and the synchronous gear 2473, and a clamping structure between the first swing arm 245 and the second swing arm 246. In some other embodiments, the damping assembly 247 may not be disposed with a fixing plate, two ends of the elastic piece 2475 may respectively abut against structures of the first clamping member 2471 and the main shaft 21, so that the elastic piece 2475 is compressed between the first clamping member 2471 and the main shaft 21. In some other embodiments, the damping assembly 247 may not be provided with the synchronous gear 2473 and the third rotatable connecting shaft 2479, and the rotating end 2451 of the first swing arm 245 is directly meshed with the rotating end 2461 of the second swing arm 246. The foregoing embodiment is an example structure of the damping assembly 247. The damping assembly 247 may alternatively have another implementation structure. This is not strictly limited in this application.

Figure 15:
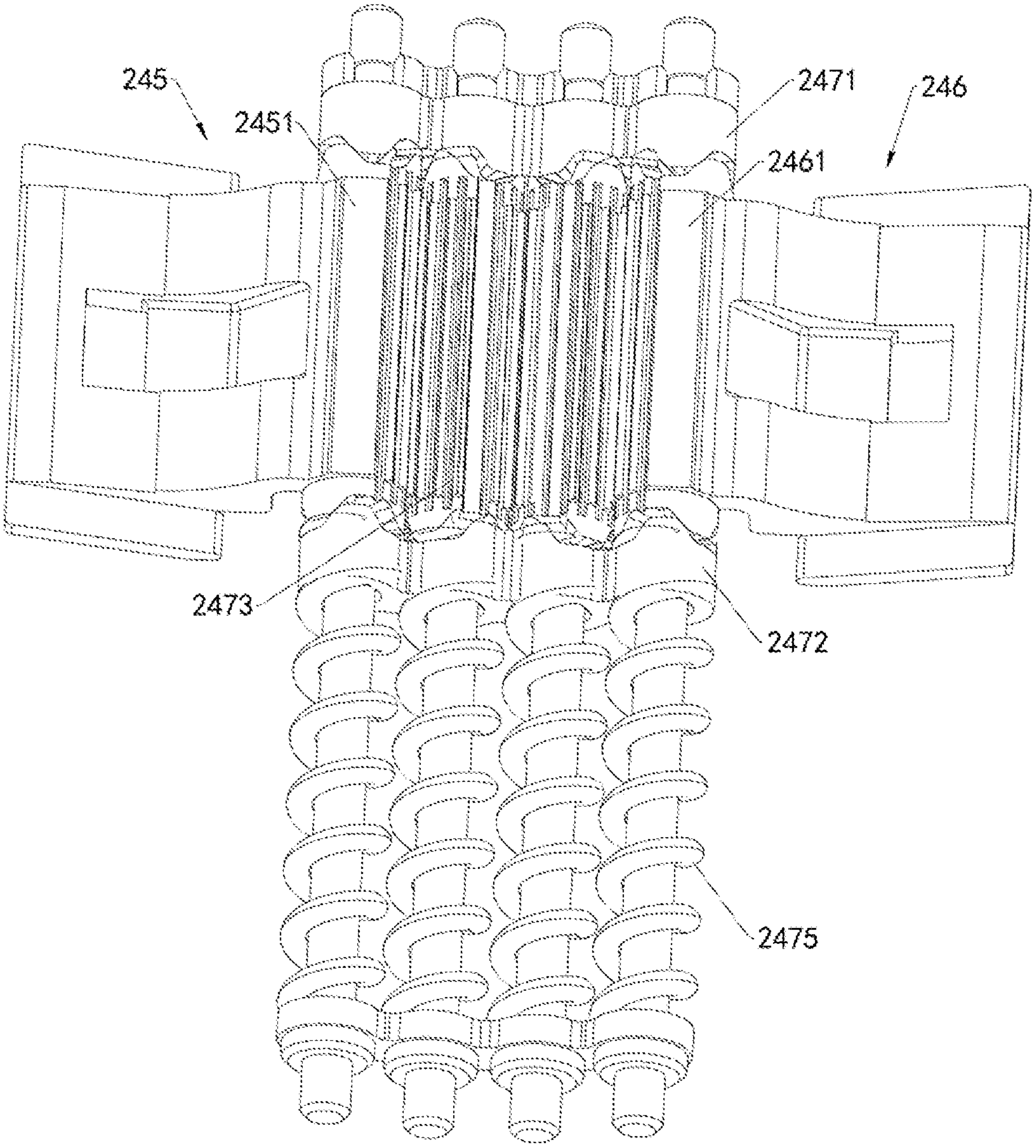
FIG. 15 is a diagram of a partial structure of the connection assembly shown in FIG. 8.

FIG. 15 is a diagram of a partial structure of the connection assembly 24 shown in FIG. 8, and with reference to a structure of the first swing arm 245 shown in FIG. 12A, a structure of the second swing arm 246 shown in FIG. 12B, and a structure of the damping assembly 247 shown in FIG. 14.

In this embodiment, the rotating end 2451 of the first swing arm 245, the rotating end 2461 of the second swing arm 246, and the synchronous gear 2473 are all clamped to the first clamping member 2471 and the second clamping member 2472, to form a clamping structure, so that the first swing arm 245 and the second swing arm 246 can stay at some positions. In addition, because a relative position relationship between components of the damping assembly 247 is stable, the elastic piece 2475 is in a compressed state, and elastic force generated by the elastic piece 2475 drives the first clamping member 2471 and the second clamping member 2472 to press the rotating end 2451 of the first swing arm 245, the synchronous gear 2473, and the rotating end 2461 of the second swing arm 246 in a cooperation manner, so that a clamping structure between the rotating end 2451 of the first swing arm 245 and the synchronous gear 2473, a clamping structure between the rotating end 2461 of the second swing arm 246 and the first clamping member 2471, and a clamping structure between the rotating end 2461 of the second swing arm 246 and the second clamping member 2472 are stable.

When the rotating end 2451 of the first swing arm 245, the rotating end 2461 of the second swing arm 246, and the synchronous gear 2473 rotate relative to the first clamping member 2471 and the second clamping member 2472, relative positions of the plurality of first protrusions (2455, 2465, 24733) and the plurality of first bumps 24714 can change to form different clamping structures, and relative positions of the plurality of second protrusions (2458, 2469, 24734) and the plurality of second bumps 24724 can change to form different clamping structures.

Specifically, when the first swing arm 245 and the second swing arm 246 move relative to each other, each of the clamping structure between the rotating end 2451 of the first swing arm 245 and the synchronous gear 2473, the clamping structure between the rotating end 2461 of the second swing arm 246 and the first clamping member 2471, and the clamping structure between the rotating end 2461 of the second swing arm 246 and the second clamping member 2472 is switched to another clamping structure. In a clamping structure switching process, the first clamping member 2471 is far away from the second clamping member 2472, the elastic piece 2475 is further compressed, and elastic force generated by the elastic piece 2475 forms motion damping force, so that the first swing arm 245 and the second swing arm 246 need to move relative to each other with specific driving force. In short, the damping assembly 247 can provide motion damping force for relative motion of the first swing arm 245 and the second swing arm 246.

Figure 16:
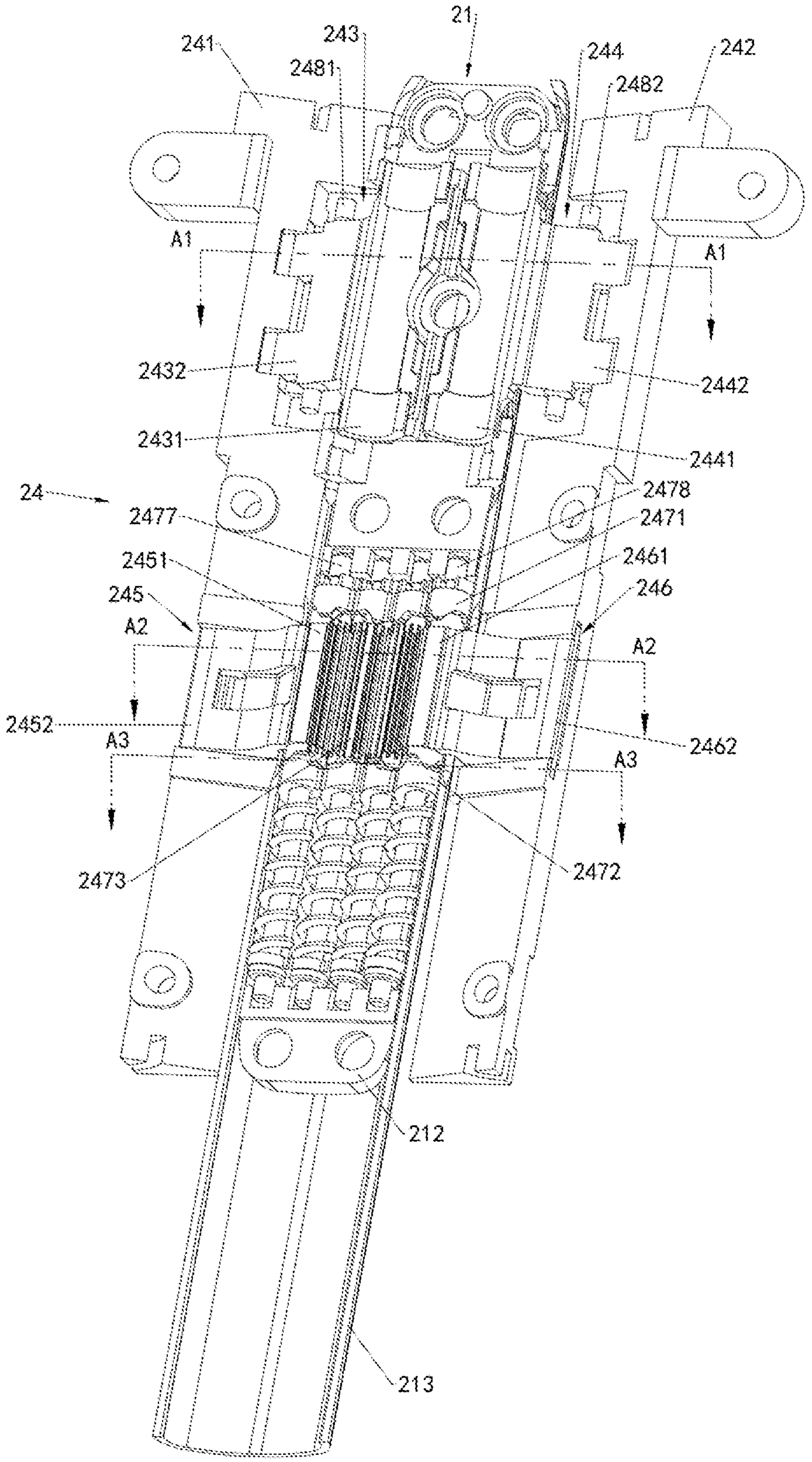
FIG. 16 is a diagram of an assembly structure of the connection assembly shown in FIG. 8 and a bottom cover body and a back cover of the main shaft shown in FIG. 7A.
Figure 17A:
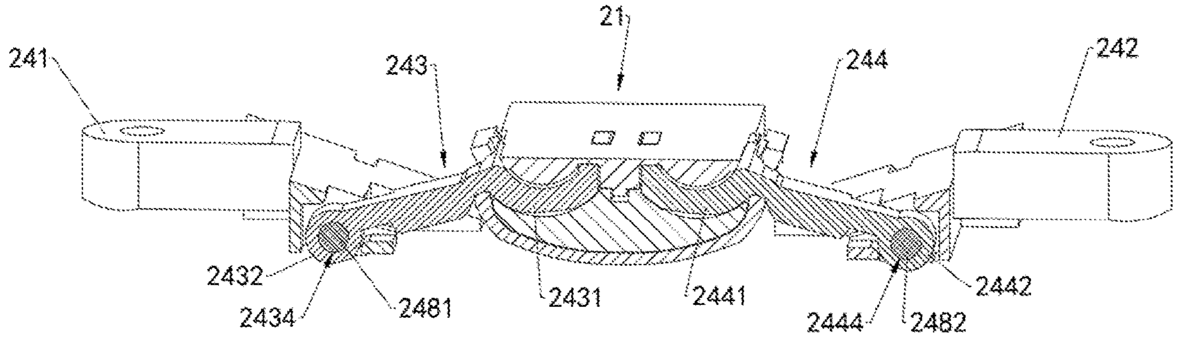
FIG. 17A is a diagram of a cross-sectional structure that is of an assembly structure of a connection assembly shown in FIG. 6 and a main shaft and that is cut along A1-A1.
Figure 17B:
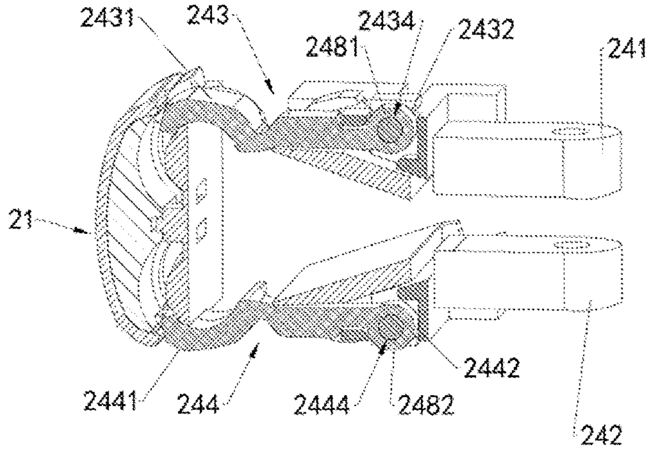
FIG. 17B is a diagram of a structure of the structure shown in FIG. 17A in a first closed state.

Refer to FIG. 16, FIG. 17A, and FIG. 17B. FIG. 16 is a diagram of an assembly structure of the connection assembly 24 shown in FIG. 8 and the bottom cover body 212 and the back cover 213 of the main shaft 21 shown in FIG. 7A. FIG. 17A is a diagram of a cross-sectional structure that is of an assembly structure of the connection assembly 24 shown in FIG. 6 and the main shaft 21 and that is cut along A1-A1. FIG. 17B is a diagram of a structure of the structure shown in FIG. 17A in a first closed state. A cross section that is cut along A1-A1 passes through the first mounting bracket 241, the first connection arm 243, the main shaft 21, the second connection arm 244, and the second mounting bracket 242. A position of A1-A1 in FIG. 6 is the same as a position of A1-A1 in FIG. 16.

In some embodiments, the first end 2431 of the first connection arm 243 is rotatably connected to the main shaft 21, and the second end 2432 of the first connection arm 243 is rotatably connected to the first mounting bracket 241. The first end 2441 of the second connection arm 244 is rotatably connected to the main shaft 21, and the second end 2442 of the second connection arm 244 is rotatably connected to the second mounting bracket 242.

The first end 2431 of the first connection arm 243 is rotatably connected to the main shaft 21 through a virtual shaft. The bottom rotating shaft 2481 passes through the rotating shaft hole 2434 of the second end 2432 of the first connection arm 243, and passes through the first rotating shaft hole 2411 of the first mounting bracket 241 (refer to FIG. 10A), to connect the second end 2432 of the first connection arm 243 and the first mounting bracket 241 through insertion. In this case, the second end 2432 of the first connection arm 243 is rotatably connected to the first mounting bracket 241 through a solid shaft.

The first end 2441 of the second connection arm 244 is rotatably connected to the main shaft 21 through a virtual shaft. The bottom rotating shaft 2482 passes through the rotating shaft hole 2444 of the second end 2442 of the second connection arm 244, and passes through the second rotating shaft hole 230 of the second mounting bracket 242 (refer to FIG. 10B), to connect the second end 2442 of the second connection arm 244 and the second mounting bracket 242 through insertion. In this case, the second end 2442 of the second connection arm 244 is rotatably connected to the second mounting bracket 242 through a solid shaft.

It may be understood that, in some other embodiments, the first end 2431 of the first connection arm 243 and/or the first end 2441 of the second connection arm 244 may alternatively be rotatably connected to the main shaft 21 through a physical shaft. This is not strictly limited in this application. In some other embodiments, the second end 2432 of the first connection arm 243 may alternatively be rotatably connected to the first mounting bracket 241 through a virtual shaft; and/or, the second end 2442 of the second connection arm 244 may alternatively be rotatably connected to the second mounting bracket 242 through a virtual shaft. This is not strictly limited in this application.

Figure 18A:
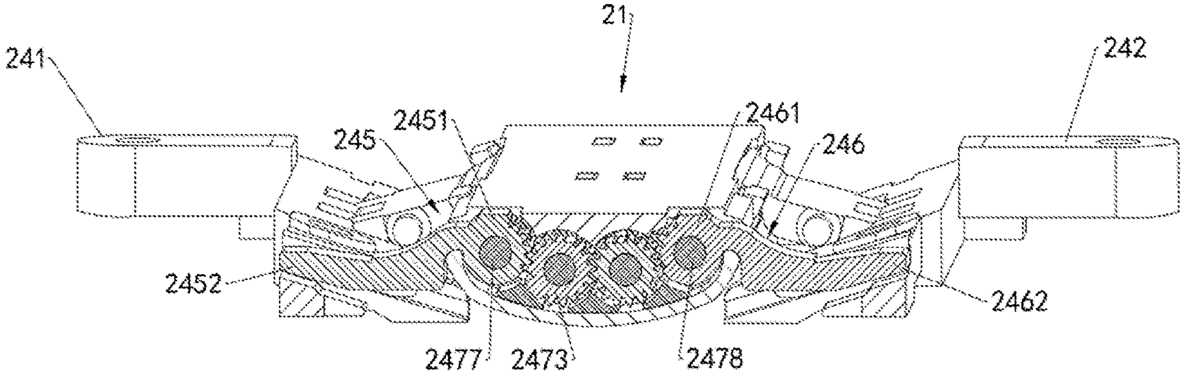
FIG. 18A is a diagram of a cross-sectional structure that is of an assembly structure of a connection assembly shown in FIG. 6 and a main shaft and that is cut along A2-A2.
Figure 18B:
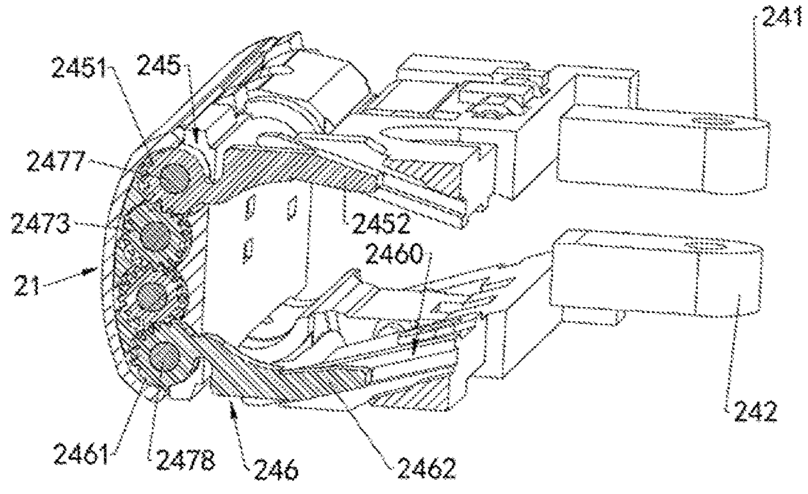
FIG. 18B is a diagram of a structure of the structure shown in FIG. 18A in a first closed state.

Refer to FIG. 16, FIG. 18A, and FIG. 18B. FIG. 18A is a diagram of a cross-sectional structure that is of an assembly structure of the connection assembly 24 shown in FIG. 6 and the main shaft 21 and that is cut along A2-A2. FIG. 18B is a diagram of a structure of the structure shown in FIG. 18A in a first closed state. A cross section that is cut along A2-A2 passes through the first mounting bracket 241, the first swing arm 245, the main shaft 21, the second swing arm 246, and the second mounting bracket 242. A position of A2-A2 in FIG. 6 is the same as a position of A2-A2 in FIG. 16.

In some embodiments, the rotating end 2451 of the first swing arm 245, the rotating end 2461 of the second swing arm 246, and the damping assembly 247 are all mounted on the main shaft 21. The first clamping member 2471 and the second clamping member 2472 of the damping assembly 247 are fixed relative to the main shaft 21. The rotating end 2451 of the first swing arm 245 is rotatably connected to the first clamping member 2471 and the second clamping member 2472 through the first rotatable connecting shaft 2477, so as to be rotatably connected to the main shaft 21. The rotating end 2461 of the second swing arm 246 is rotatably connected to the first clamping member 2471 and the second clamping member 2472 through the second rotatable connecting shaft 2478, so as to be rotatably connected to the main shaft 21. Each synchronous gear 2473 is rotatably connected to the first clamping member 2471 and the second clamping member 2472 through the third rotatable connecting shaft 2479, so as to be rotatably connected to the main shaft 21.

In this embodiment, the rotating end 2451 of the first swing arm 245 is connected to the rotating end 2461 of the second swing arm 246 through the plurality of synchronous gears 2473. Therefore, the rotating end 2451 of the first swing arm 245 and the rotating end 2461 of the second swing arm 246 are the same in rotation angle and are opposite in rotation direction, so that rotation actions of the first swing arm 245 and the second swing arm 246 relative to the main shaft 21 are kept synchronous, that is, the first swing arm 245 and the second swing arm 246 are synchronously close to or away from each other. That is, the first swing arm 245 and the second swing arm 246 are driven by the damping assembly 247 to rotate synchronously relative to the main shaft 21.

Figure 19A:
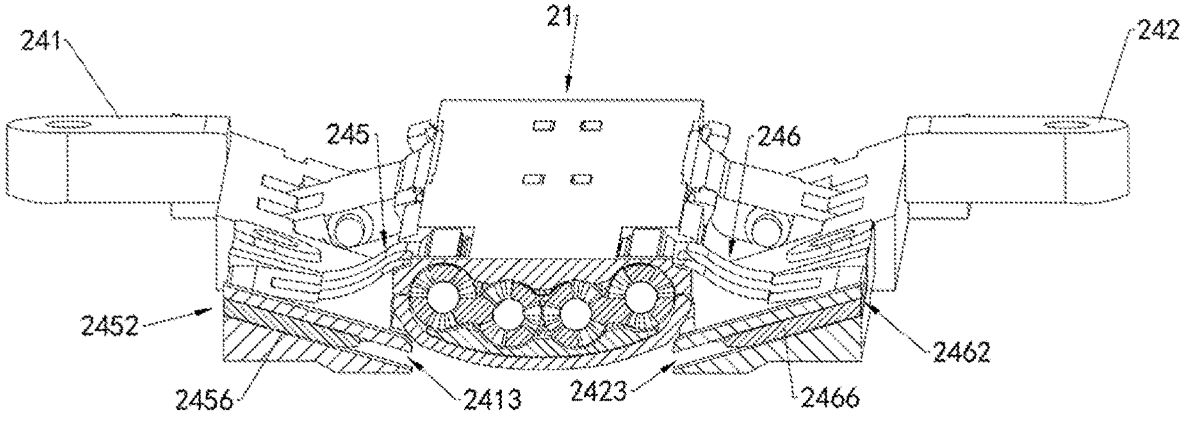
FIG. 19A is a diagram of a cross-sectional structure that is of an assembly structure of a connection assembly shown in FIG. 6 and a main shaft and that is cut along A3-A3.
Figure 19B:
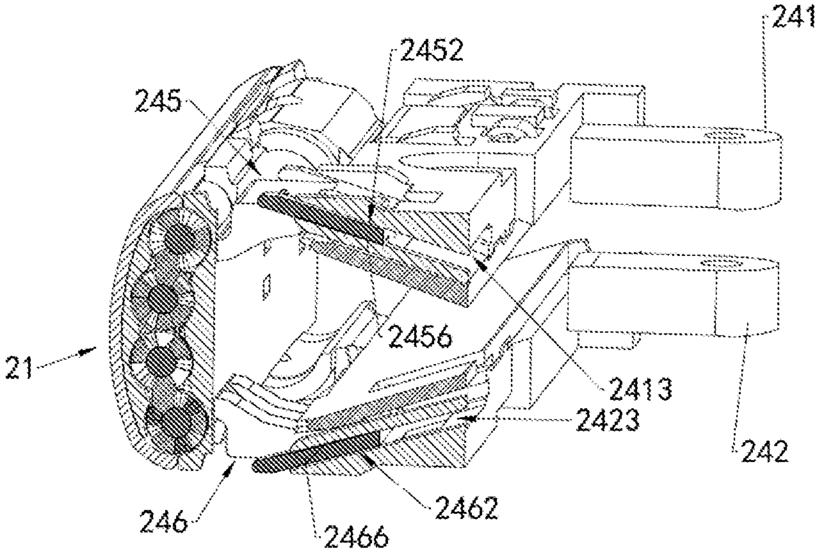
FIG. 19B is a diagram of a structure of the structure shown in FIG. 19A in a first closed state.

Refer to FIG. 16, FIG. 19A, and FIG. 19B. FIG. 19A is a diagram of a cross-sectional structure that is of an assembly structure of the connection assembly 24 shown in FIG. 6 and the main shaft 21 and that is cut along A3-A3. FIG. 19B is a diagram of a structure of the structure shown in FIG. 19A in a first closed state. A cross section that is cut along A3-A3 passes through the first mounting bracket 241, the first swing arm 245, the main shaft 21, the second swing arm 246, and the second mounting bracket 242. A position of A3-A3 in FIG. 6 is the same as a position of A3-A3 in FIG. 16.

In some embodiments, the sliding end 2452 of the first swing arm 245 may be slidably mounted in the first sliding slot 2413 of the first mounting bracket 241, to be slidably connected to the first mounting bracket 241. The sliding block 2456 at the sliding end 2452 of the first swing arm 245 is partially located in a guide space of the first sliding slot 2413, and the sliding block 2456 and the guide space cooperate to guide a sliding direction of the sliding end 2452 of the first swing arm 245 relative to the first mounting bracket 241. The sliding end 2462 of the second swing arm 246 may be slidably mounted in the second sliding slot 2423 of the second mounting bracket 242, to be slidably connected to the second mounting bracket 242. The sliding block 2466 at the sliding end 2462 of the second swing arm 246 is partially located in a guide space of the second sliding slot 2423, and the sliding block 2466 and the guide space cooperate to guide a sliding direction of the sliding end 2462 of the second swing arm 246 relative to the second mounting bracket 242.

Figure 20:
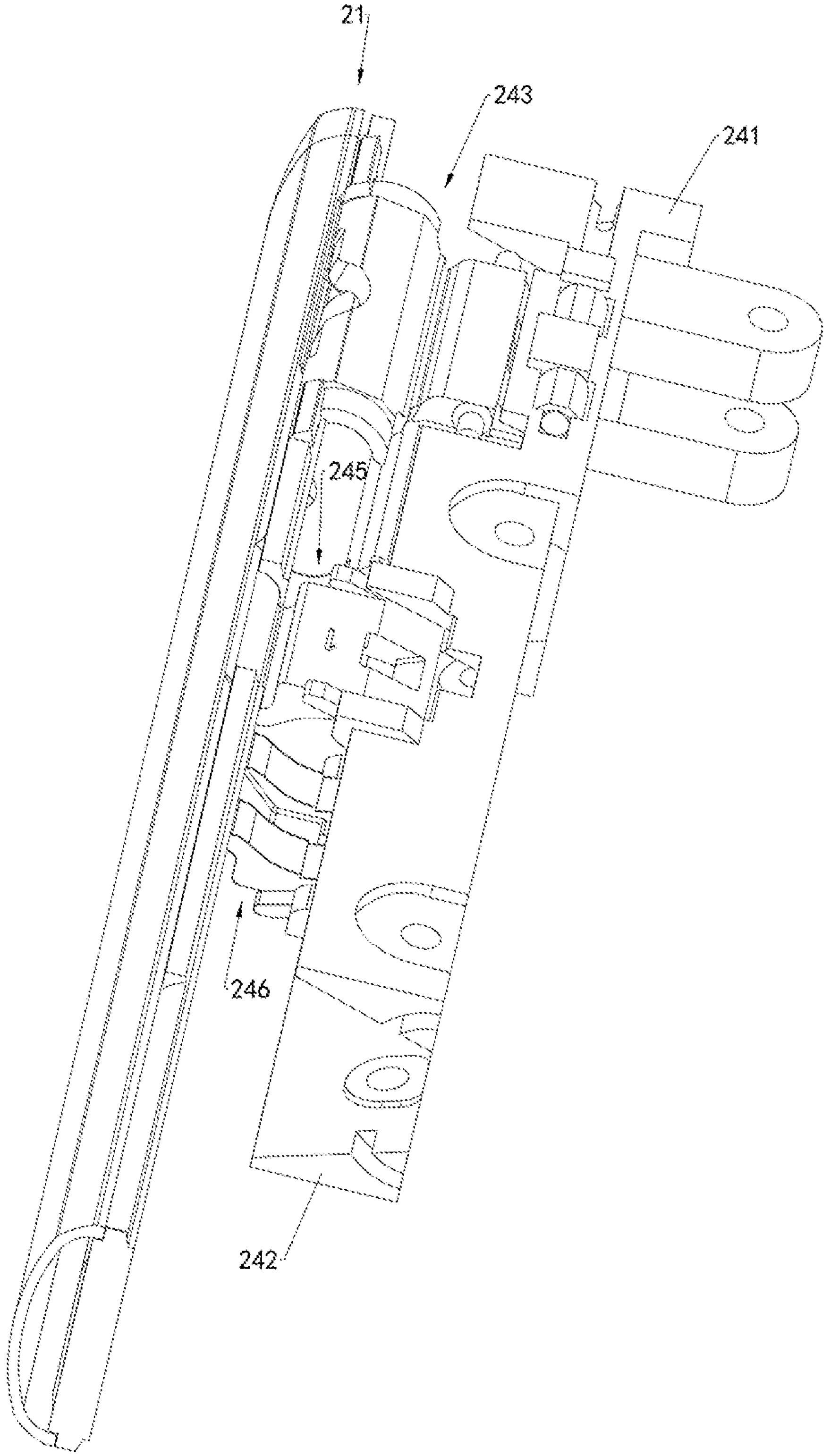
FIG. 20 is a diagram of structures of the connection assembly shown in FIG. 8 and a main shaft in a first closed state.

Refer to FIG. 17A to FIG. 18B and FIG. 20. FIG. 20 is a diagram of structures of the connection assembly 24 shown in FIG. 8 and the main shaft 21 in a first closed state.

In this application, two ends (2431 and 2432) of the first connection arm 243 of the connection assembly 24 are rotatably connected to the main shaft 21 and the first mounting bracket 241 respectively, to form a connecting rod structure. The rotating end 2451 of the first swing arm 245 is rotatably connected to the main shaft 21 and the sliding end 2452 is slidably connected to the first mounting bracket 241, to form a connecting rod sliding block structure. Two ends (2441 and 2442) of the second connection arm 244 are rotatably connected to the main shaft 21 and the second mounting bracket 242 respectively, to form a connecting rod structure. The rotating end 2461 of the second swing arm 246 is rotatably connected to the main shaft 21, and the sliding end 2462 is slidably connected to the second mounting bracket 242, to form a connecting rod sliding block structure. The first mounting bracket 241 is configured to connect to the first housing 11, and the second mounting bracket 242 is configured to connect to the second housing 12. Therefore, the connection assembly 24 of the first hinge assembly 2 connects the first housing 11 and the main shaft 21, and connects the second housing 12 and the main shaft 21 through the connecting rod structure and the connecting rod sliding block structure.

As shown in FIG. 17A, FIG. 18A, and FIG. 16, when the second housing 12 and the third housing 13 are in the open state, and the first housing 11 and the second housing 12 are unfolded relative to each other from the first closed state to the open state through the first hinge assembly 2, the first end 2431 of the first connection arm 243 is rotated into the main shaft 21, and the first end 2441 of the second connection arm 244 is rotated into the main shaft 21. The sliding end 2452 of the first swing arm 245 slides into the first mounting bracket 241, the sliding end 2462 of the second swing arm 246 slides into the second mounting bracket 242, and a distance between the first mounting bracket 241 and the main shaft 21 and a distance between the second mounting bracket 242 and the main shaft 21 are small.

As shown in FIG. 17B, FIG. 18B, and FIG. 20, when the second housing 12 and the third housing 13 are in the open state, and the first housing 11 and the second housing 12 are folded relative to each other from the open state to the first closed state through the first hinge assembly 2, the first end 2431 of the first connection arm 243 is partially rotated out of the main shaft 21, and the first end 2441 of the second connection arm 244 is partially rotated out of the main shaft 21. The sliding end 2452 of the first swing arm 245 partially slides out of the first mounting bracket 241, the sliding end 2462 of the second swing arm 246 partially slides out of the second mounting bracket 242, and a distance between the first mounting bracket 241 and the main shaft 21 and a distance between the second mounting bracket 242 and the main shaft 21 are large. Therefore, when the second housing 12 and the third housing 13 are in the open state, and the first housing 11 and the second housing 12 are unfolded relative to each other from the first closed state to the open state through the first hinge assembly 2, the first hinge assembly 2 can separately pull in the first housing 11 and the second housing 12 through the first mounting bracket 241 and the second mounting bracket 242, so that the first housing 11 and the second housing 12 are close to the main shaft 21. When the second housing 12 and the third housing 13 are in the open state, and the first housing 11 and the second housing 12 are folded relative to each other from the open state to the first closed state through the first hinge assembly 2, the first housing 11 and the second housing 12 are separately pushed away through the first mounting bracket 241 and the second mounting bracket 242, so that the first housing 11 and the second housing 12 are away from the main shaft 21. In addition, a structure of the first hinge assembly 2 can better adapt to a deformation structure of the screen 200, to reduce a risk of pulling or squeezing the screen 200, and improve reliability of the screen 200 and the electronic device 1000.

When the second housing 12 and the third housing 13 are in the open state, and the first housing 11 and the second housing 12 are folded relative to each other from the open state to the first closed state through the first hinge assembly 2, the main shaft 21 is away from the first mounting bracket 241 and the second mounting bracket 242. In addition, each of the rotating end 2451 of the first swing arm 245 and the rotating end 2461 of the second swing arm 246 is rotatably connected to the main shaft 21 through a fixed shaft. Therefore, the sliding end 2452 of the first swing arm 245 and the sliding end 2462 of the second swing arm 246 are respectively away from the first mounting bracket 241 and the second mounting bracket 242. In this case, an avoidance space 2460 may be reserved between the sliding end 2452 of the first swing arm 245 and the first mounting bracket 241, and an avoidance space 2460 may be reserved between the sliding end 2462 of the second swing arm 246 and the second mounting bracket 242, to avoid a partial structure of the connection apparatus 4, so that the connection apparatus 4 can move relative to the first hinge assembly 2.

The foregoing mainly describes a main moving mechanism of the first hinge assembly 2. The first support part 22 and the second support part 23 of the first hinge assembly 2 move relative to each other with movement of the main moving mechanism. The following describes a structure of the first support part 22, a structure of the second support part 23, a connection structure between the first support part 22 and the connection assembly 24, and a connection structure between the second support part 23 and the connection assembly 24 with reference to the accompanying drawings.

Figure 21A:
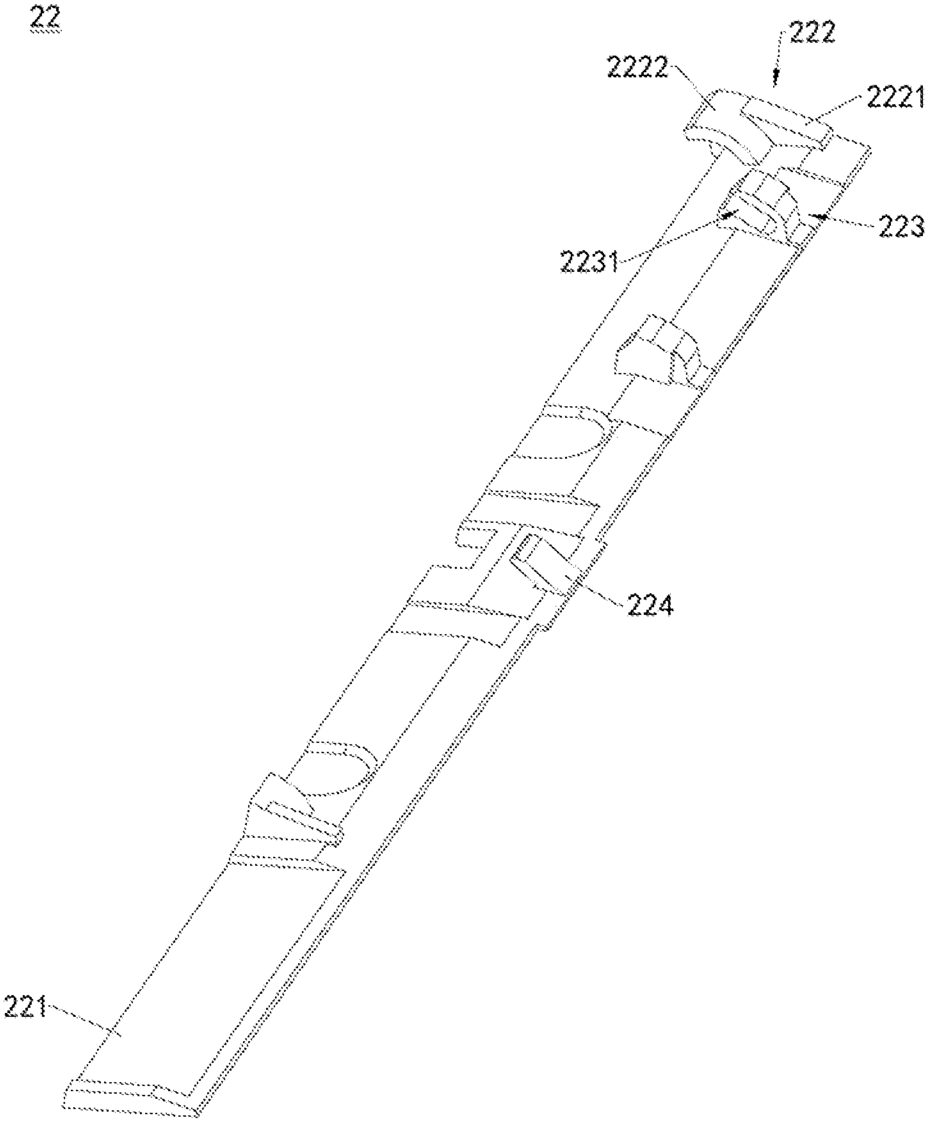
FIG. 21A is a diagram of a structure of a first support part shown in FIG. 6 from another angle.

FIG. 21A is a diagram of a structure of the first support part 22 shown in FIG. 6 from another angle.

In some embodiments, the first support part 22 includes a first support plate 221, a first rotating block 222, a first guide member 223, and a first cooperation part 224. The first rotating block 222, the first guide member 223, and the first cooperation part 224 are fastened to the first support plate 221. For example, the first support plate 221 may be made of a material with low density and specific rigidity, for example, a carbon fiber material. The first rotating block 222, the first guide member 223, and the first cooperation part 224 may be of an integrally formed structure through a metal injection molding process, to have high structural strength.

The first rotating block 222 may include a baffle plate 2221 and a second arc-shaped arm 2222. One side of the second arc-shaped arm 2222 is connected to the baffle plate 2221, and the other side of the second arc-shaped arm 2222 is suspended. The baffle plate 2221 is configured to support the second arc-shaped arm 2222, to increase structural strength of the first rotating block 222. The second arc-shaped arm 2222 is fastened to the first support plate 221.

The first guide member 223 is provided with a guide sliding slot 2231. An opening of the guide sliding slot 2231 is located on an end face of the first guide member 223, so that a mechanical part mounted in the guide sliding slot 2231 can be embedded into the guide sliding slot 2231 from the opening of the end face, and slide back and forth in an extension direction of the guide sliding slot 2231, to achieve a limiting function. For example, the extension direction of the guide sliding slot 2231 may be arc-shaped. Certainly, the extension direction of the guide sliding slot 2231 may alternatively be designed as one or a combination of a curve, a straight line, or a fold line.

The first cooperation part 224 is inclined to the first support plate 221, and is in slope cooperation with another structure to achieve a limiting function.

It should be understood that the first rotating block 222 mainly provides a rotatable connecting structure, and the first rotating block 222 may alternatively have another implementation structure. This is not strictly limited in this application. The first guide member 223 mainly provides a guide sliding slot, to guide a moving direction of another mechanical part. In this application, the first guide member 223 may not be disposed, or the moving direction of the mechanical part may be guided through another structure. This is not strictly limited in this application. The first cooperation part 224 mainly provides a cooperation structure, to cooperate with another structure. In this application, the first cooperation part 224 may not be disposed, or cooperation may be implemented through another structure. This is not strictly limited in this application.

Figure 21B:
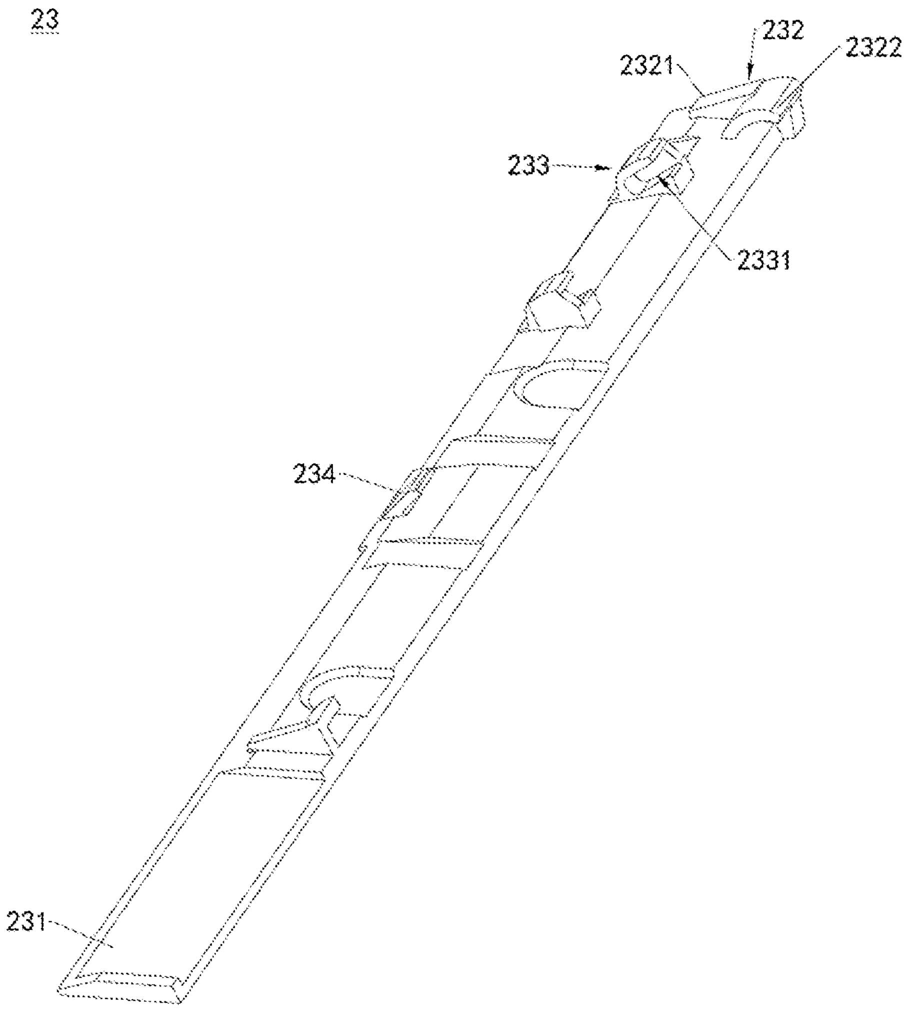
FIG. 21B is a diagram of a structure of a second support part shown in FIG. 6 from another angle.

FIG. 21B is a diagram of a structure of the second support part 23 shown in FIG. 6 from another angle.

In some embodiments, the second support part 23 includes a second support plate 231, a second rotating block 232, a second guide member 233, and a second cooperation part 234. The second rotating block 232, the second guide member 233, and the second cooperation part 234 are fastened to the second support plate 231. For example, the second support plate 231 may be made of a material with low density and specific rigidity, for example, a carbon fiber material. The second rotating block 232, the second guide member 233, and the second cooperation part 234 may be of an integrally formed structure through a metal injection molding process, to have high structural strength.

The second rotating block 232 may include a baffle plate 2321 and a second arc-shaped arm 2322. One side of the second arc-shaped arm 2322 is connected to the baffle plate 2321, and the other side of the second arc-shaped arm 2322 is suspended. The baffle plate 2321 is configured to support the second arc-shaped arm 2322, to increase structural strength of the first rotating block 222.

The second guide member 233 is provided with a guide sliding slot 2331. An opening of the guide sliding slot 2331 is located on an end face of the second guide member 233, so that a mechanical part mounted in the guide sliding slot 2331 can be embedded into the guide sliding slot 2331 from the opening of the end face, and slide back and forth in an extension direction of the guide sliding slot 2331, to achieve a limiting function. For example, the extension direction of the guide sliding slot 2331 may be arc-shaped. Certainly, the extension direction of the guide sliding slot 2331 may alternatively be designed as one or a combination of a curve, a straight line, or a fold line.

The second cooperation part 234 is inclined to the second support plate 231, and is in slope cooperation with another structure to achieve a limiting function.

It should be understood that the first rotating block 222 mainly provides a rotatable connecting structure, and the first rotating block 222 may alternatively have another implementation structure that may be the same as or different from the rotatable connecting structure. This is not strictly limited in this application. The second guide member 233 mainly provides a guide sliding slot, to guide a moving direction of another mechanical part. In this application, the moving direction of the mechanical part may be guided through another structure. This is not strictly limited in this application. The second cooperation part 234 mainly provides a cooperation structure, to cooperate with another structure. In this application, the second cooperation part 234 may not be disposed, or cooperation may be implemented through another structure. This is not strictly limited in this application.

Figure 22:
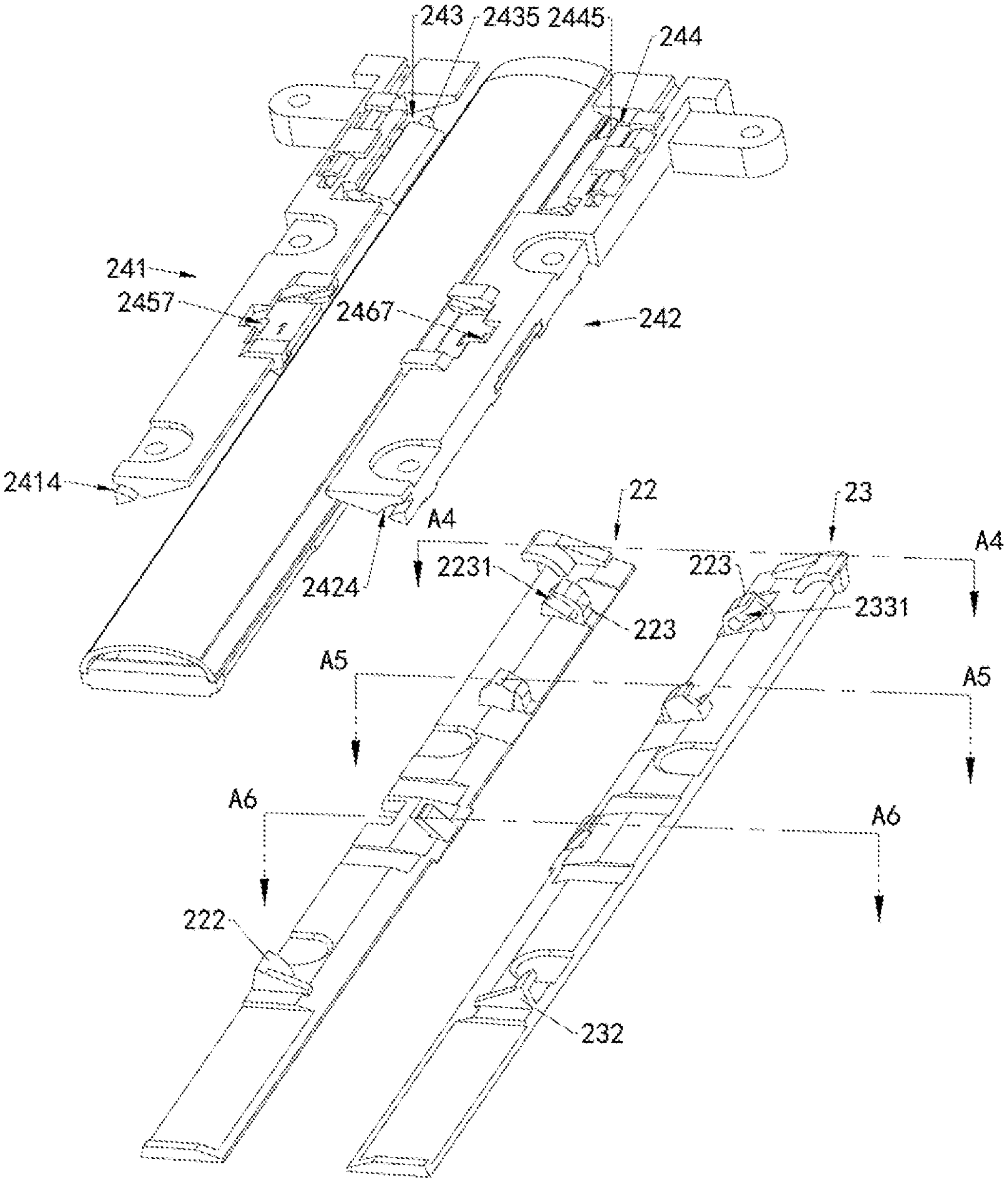
FIG. 22 is an exploded view of an exploded structure of the first hinge assembly shown in FIG. 4 from another angle.

FIG. 22 is an exploded view of an exploded structure of the first hinge assembly 2 shown in FIG. 4 from another angle. An angle of view in FIG. 22 is reversed leftward and rightward relative to an angle of view in FIG. 4.

For example, there may be two first rotating blocks 222 of the first support part 22, which are respectively located at a top end and a bottom end of the first support part 22. The two first rotating blocks 222 are respectively configured to cooperate with the two first arc-shaped grooves 2414 of the first mounting bracket 241. There may be two second rotating blocks 232 of the second support part 23, which are respectively located at a top end and a bottom end of the second support part 23. The two second rotating blocks 232 are respectively configured to cooperate with the two second arc-shaped grooves 2424 of the second mounting bracket 242. It may be understood that structures of the two first rotating blocks 222 of the first support part 22 may be the same, and structures of the two second rotating blocks 232 of the second support part 23 may also be the same, to reduce costs. In this application, the first rotating block 222 located at the top end of the first support part 22 and the second rotating block 232 located at the top end of the second support part 23 are used as an example for description.

In addition, in some other embodiments, there may be one first rotating block 222 of the first support part 22 and/or one second rotating block 232 of the second support part 23, to simplify a connection structure. Alternatively, a quantity of first rotating blocks 222 of the first support part 22 and/or a quantity of second rotating blocks 232 of the second support part 23 may be more than two, to increase connection strength between the first support part 22 and the first mounting bracket 241 and/or between the second support part 23 and the second mounting bracket 242. This is not limited in this application.

For example, there may be two first guide members 223 of the first support part 22, the two first guide members 223 are spaced away from each other, and guide sliding slots 2231 of the two first guide members 223 are disposed opposite to each other, so that sliding bumps 2435 on two sides of the first connection arm 243 are respectively mounted in the guide sliding slots 2231 of the two first guide members 223. There may be two second guide members 233 of the second support part 23, the two second guide members 233 are spaced away from each other, and guide sliding slots 2331 of the two second guide members 233 are disposed opposite to each other, so that sliding bumps 2445 on two sides of the second connection arm 244 are respectively mounted in the guide sliding slots 2331 of the two second guide members 233. It may be understood that in some other embodiments, there may be one first guide member 223 of the first support part 22 and/or one second guide member 233 of the second support part 23, to simplify a connection structure. Alternatively, a quantity of first guide members 223 of the first support part 22 and/or a quantity of second guide members 233 of the second support part 23 may be more than two, to increase connection strength between the first support part 22 and the first connection arm 243 and/or between the second support part 23 and the second connection arm 244. This is not limited in this application.

For example, the first cooperation part 224 of the first support part 22 is located in a middle part of the first support plate 221, and is configured to cooperate with the first cooperation space 2457 of the first swing arm 245. The second cooperation part 234 of the second support part 23 is located in a middle part of the second support plate 231, and is configured to cooperate with the second cooperation space 2467 of the second swing arm 246.

The following describes a connection structure between the first support part 22 and the first mounting bracket 241, a connection structure between the first connection arm 243 and the first swing arm 245, a connection structure between the second support part 23 and the second mounting bracket 242, and a connection structure between the second connection arm 244 and the second swing arm 246 with reference to the accompanying drawings.

Figure 23A:
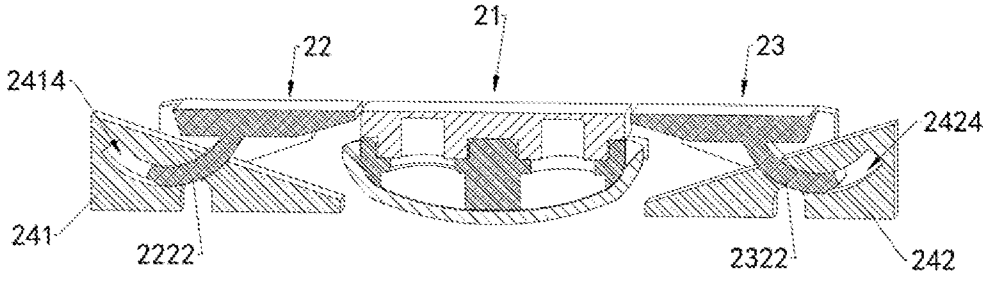
FIG. 23A is a diagram of a cross-sectional structure that is of the first hinge assembly shown in FIG. 4 and that is cut along A4-A4.
Figure 23B:
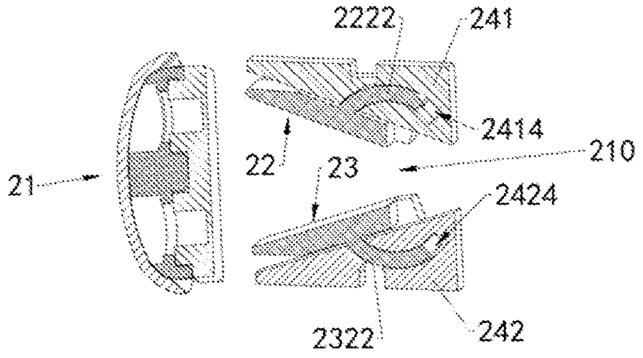
FIG. 23B is a diagram of a structure of the structure shown in FIG. 23A in a first closed state.

Refer to FIG. 23A and FIG. 23B. FIG. 23A is a diagram of a cross-sectional structure that is of the first hinge assembly 2 shown in FIG. 4 and that is cut along A4-A4. FIG. 23B is a diagram of a structure of the structure shown in FIG. 23A in a first closed state. A cross section that is cut along A4-A4 passes through the first rotating block 222 of the first support part 22, the first mounting bracket 241, the main shaft 21, the second rotating block 232 of the second mounting bracket 242, and the second support part 23. A position of A4-A4 in FIG. 4 is the same as a position of A4-A4 in each of FIG. 6 and FIG. 22.

In some embodiments, the second arc-shaped arm 2222 of the first rotating block 222 of the first support part 22 is mounted in the first arc-shaped groove 2414 of the first mounting bracket 241, and the first support part 22 is rotatably connected to the first mounting bracket 241 through a virtual shaft. That is, the first support part 22 is rotatably connected to the first mounting bracket 241. The second arc-shaped arm 2322 of the second rotating block 232 of the second support part 23 is mounted in the first arc-shaped groove 2414 of the second mounting bracket 242, and the second support part 23 is rotatably connected to the second mounting bracket 242 through a virtual shaft. That is, the second support part 23 is rotatably connected to the second mounting bracket 242.

Figure 24A:
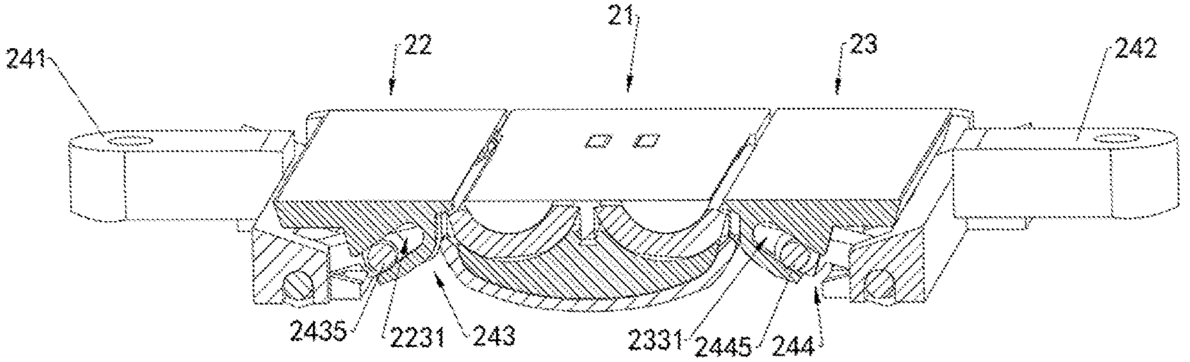
FIG. 24A is a diagram of a cross-sectional structure that is of the first hinge assembly shown in FIG. 4 and that is cut along A5-A5.
Figure 24B:
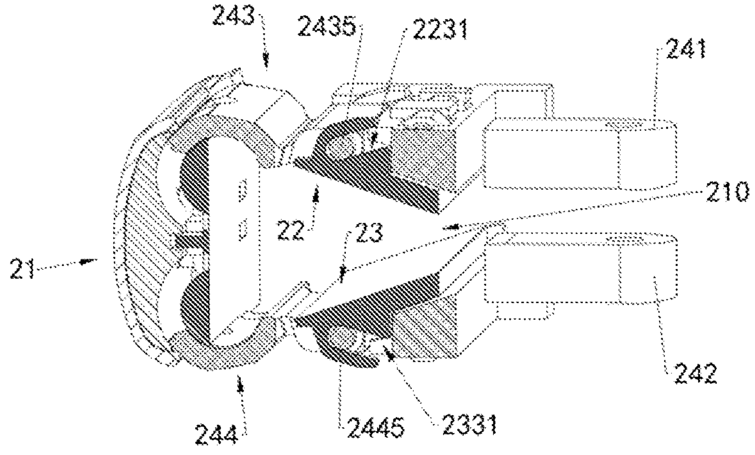
FIG. 24B is a diagram of a structure of the structure shown in FIG. 24A in a first closed state.

Refer to FIG. 24A and FIG. 24B. FIG. 24A is a diagram of a cross-sectional structure that is of the first hinge assembly 2 shown in FIG. 4 and that is cut along A5-A5. FIG. 24B is a diagram of a structure of the structure shown in FIG. 24A in a first closed state. A cross section that is cut along A5-A5 passes through the first mounting bracket 241, the first connection arm 243, the first guide member 223 of the first support part 22, the main shaft 21, the second guide member 233 of the second support part 23, the second connection arm 244, and the second mounting bracket 242. A position of A5-A5 in FIG. 4 is the same as a position of A5-A5 in each of FIG. 6 and FIG. 22.

In some embodiments, the first connection arm 243 is slidably connected to the first support part 22. The sliding bump 2435 of the first connection arm 243 is mounted in the guide sliding slot 2231 of the first guide member 223, and can slide in the guide sliding slot 2231 in an extension direction of the guide sliding slot 2231, so that the first connection arm 243 is slidably connected to the first guide member 223 and slides in the extension direction of the guide sliding slot 2231. In this way, when the first support part 22 slides relative to the first connection arm 243, a moving trajectory of the first support part 22 can be controlled through the guide sliding slot 2231. In some other embodiments, the first connection arm 243 may alternatively be slidably connected to the first guide member 223 in another manner. This is not limited in this application.

The second connection arm 244 is slidably connected to the second support part 23. The sliding bump 2445 of the second connection arm 244 is mounted in the guide sliding slot 2331 of the second guide member 233, and can slide in the guide sliding slot 2331 in an extension direction of the guide sliding slot 2331, so that the second connection arm 244 is slidably connected to the second guide member 233 and slides in the extension direction of the guide sliding slot 2331. In this way, when the second support part 23 slides relative to the second connection arm 244, a moving trajectory of the second support part 23 can be controlled through the guide sliding slot 2331. In some other embodiments, the second connection arm 244 may alternatively be slidably connected to the second guide member 233 in another manner. This is not limited in this application.

Refer to FIG. 24A and FIG. 24B. In this embodiment, the first support part 22 is slidably connected to the first connection arm 243 and is rotatably connected to the first mounting bracket 241, and the first connection arm 243 and the first mounting bracket 241 jointly define a moving trajectory of the first support part 22. The second support part 23 is slidably connected to the second connection arm 244 and is rotatably connected to the second mounting bracket 242, and the second connection arm 244 and the second mounting bracket 242 jointly define a moving trajectory of the second support part 23.

Specifically, in processes of unfolding and folding the first hinge assembly 2, the first support part 22 moves relative to the main shaft 21 with the first connection arm 243 and the first mounting bracket 241, and the first support part 22 further moves relative to the first connection arm 243 and the first mounting bracket 241. The second support part 23 moves relative to the main shaft 21 with the second connection arm 244 and the second mounting bracket 242, and the second support part 23 further moves relative to the second connection arm 244 and the second mounting bracket 242.

When the second housing 12 and the third housing 13 are in the open state, and the first housing 11 and the second housing 12 are unfolded from the first closed state to the open state through the first hinge assembly 2, as shown in FIG. 24A and FIG. 24B, the second arc-shaped arm 2222 of the first support part 22 is partially rotated out of the first arc-shaped groove 2414 of the first mounting bracket 241, the sliding bump 2435 of the first connection arm 243 slides to a distant end of the guide sliding slot 2231 of the first support part 22, and the first support part 22 is unfolded relative to the main shaft 21. The second arc-shaped arm 2322 of the second support part 23 is partially rotated out of the first arc-shaped groove 2414 of the second mounting bracket 242, the sliding bump 2445 of the second connection arm 244 slides to the distant end of the guide sliding slot 2331 of the second support part 23, and the second support part 23 is unfolded relative to the main shaft 21.

When the second housing 12 and the third housing 13 are in the open state, and the first housing 11 and the second housing 12 are folded relative to each other from the open state to the first closed state through the first hinge assembly 2, as shown in FIG. 24A and FIG. 24B, the second arc-shaped arm 2222 of the first support part 22 is rotated into the first arc-shaped groove 2414 of the first mounting bracket 241, a lower surface of the first support part 22 is close to the first mounting bracket 241, the sliding bump 2435 of the first connection arm 243 slides to a near end of the guide sliding slot 2231 of the first support part 22, and the first support part 22 is bent relative to the main shaft 21. The second arc-shaped arm 2322 of the second support part 23 is rotated into the first arc-shaped groove 2414 of the second mounting bracket 242, a lower surface of the second support part 23 is close to the second mounting bracket 242, the sliding bump 2445 of the second connection arm 244 slides to the near end of the guide sliding slot 2331 of the second support part 23, and the second support part 23 is bent relative to the main shaft 21.

The first support part 22 has a first end 22*a* away from the main shaft 21 and a second end 22*b* close to the main shaft 21, and the second support part 23 has a first end away from the main shaft 21 and a second end close to the main shaft 21. In the first closed state, a distance between the first end 22*a* of the first support part 22 and the first end of the second support part 23 is less than a distance between the second end 22*b* of the first support part 22 and the second end of the second support part 23.

Therefore, in the first closed state, the first support part 22, the main shaft 21, and the second support part 23 of the first hinge assembly 2 jointly enclose a screen accommodating space 210 that is in a shape similar to a water drop. In addition, at some positions of the first hinge assembly 2, a mechanical part of the connection assembly 24 of the first hinge assembly 2 may further cooperate with the first support part 22, the main shaft 21, and the second support part 23, to jointly enclose a screen accommodating space 210 that has a more complete water drop shape.

Figure 25A:
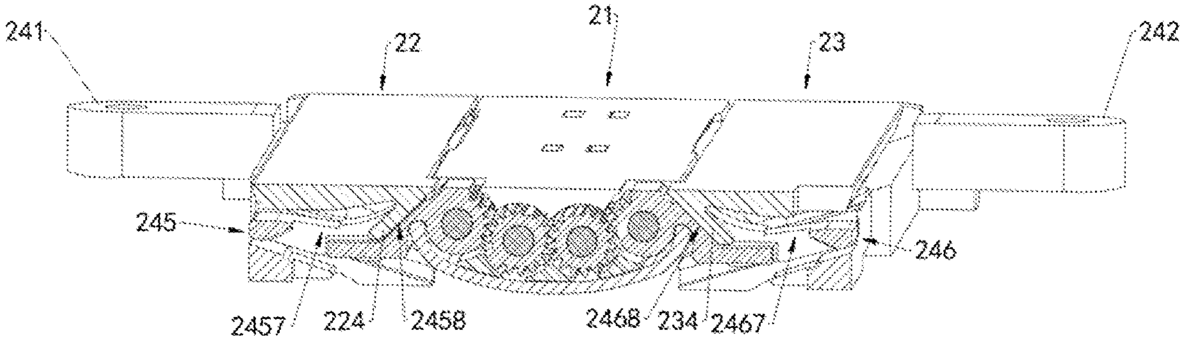
FIG. 25A is a diagram of a cross-sectional structure that is of the first hinge assembly shown in FIG. 4 and that is cut along A6-A6.
Figure 25B:
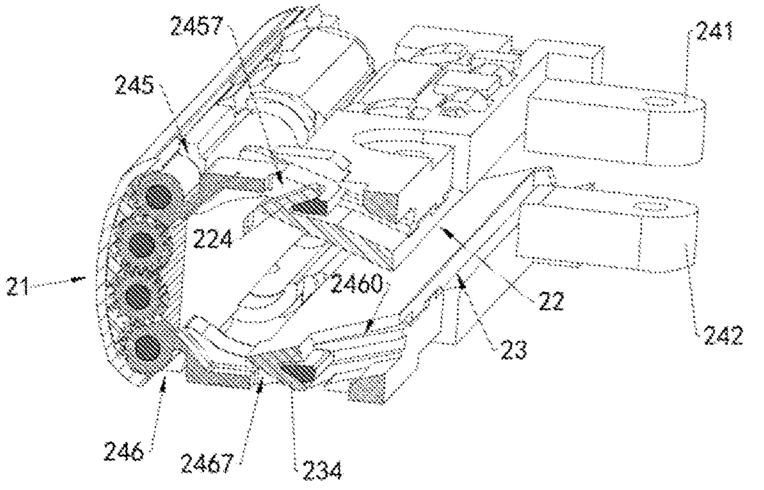
FIG. 25B is a diagram of a structure of the structure shown in FIG. 25A in a first closed state.

Refer to FIG. 25A and FIG. 25B. FIG. 25A is a diagram of a cross-sectional structure that is of the first hinge assembly 2 shown in FIG. 4 and that is cut along A6-A6. FIG. 25B is a diagram of a structure of the structure shown in FIG. 25A in a first closed state. A cross section that is cut along A6-A6 passes through the first support part 22, the first mounting bracket 241, the first swing arm 245, the main shaft 21, the second swing arm 246, the second mounting bracket 242, and the second support part 23. A position of A6-A6 in FIG. 4 is the same as a position of A6-A6 in each of FIG. 6 and FIG. 22.

For example, the first cooperation part 224 of the first support part 22 is mounted in the first cooperation space 2457 of the first swing arm 245, to cooperate with the structure of the first swing arm 245, so as to provide support for the first support part 22. The second cooperation part 234 of the second support part 23 is mounted in the second cooperation space 2467 of the second swing arm 246, to cooperate with the structure of the second swing arm 246, so as to provide support for the second support part 23.

For example, in the open state, a lower surface of the first cooperation part 224 of the first support part 22 is an oblique surface, and is in contact with or abuts against the cooperation surface 2458 of the first swing arm 245, and the lower surface of the first cooperation part 224 is in slope cooperation with the cooperation surface 2458 of the first swing arm 245, so that the first swing arm 245 can provide support for the first support part 22, to keep the first support part 22 in an unfolded state. A lower surface of the second cooperation part 234 of the second support part 23 is an oblique surface, and is in contact with or abuts against the cooperation surface 2468 of the second swing arm 246, and the lower surface of the second cooperation part 234 is in slope cooperation with the cooperation surface 2468 of the second swing arm 246, so that the second swing arm 246 can provide support for the second support part 23, to keep the second support part 23 in an unfolded state.

When the second housing 12 and the third housing 13 are in the open state, and the first housing 11 and the second housing 12 are folded relative to each other from the open state to the first closed state through the first hinge assembly 2, the first support part 22 moves in a direction close to the first swing arm 245, to drive the first cooperation part 224 of the first support part 22 to move in the first cooperation space 2457. The lower surface of the first support part 22 is close to the first swing arm 245. An inner side surface of the first cooperation part 224 is attached to a side wall of the first cooperation space 2457, to improve connection strength between the first swing arm 245 and the first support part 22. A surface that is of the first cooperation part 224 and that faces the first support part 22 is an "inner side surface" of the first cooperation part 224.

The second support part 23 moves in a direction close to the second swing arm 246, to drive the second cooperation part 234 of the second support part 23 to move in the second cooperation space 2467. The lower surface of the second support part 23 is close to the second swing arm 246. An inner side surface of the second cooperation part 234 is attached to a side wall of the second cooperation space 2467, to improve connection strength between the second swing arm 246 and the second support part 23. A surface that is of the second cooperation part 234 and that faces the second support part 23 is an "inner side surface" of the second cooperation part 234.

In addition, when the second housing 12 and the third housing 13 are in the open state, and the first housing 11 and the second housing 12 are folded relative to each other from the open state to the first closed state through the first hinge assembly 2, the sliding end 2462 of the second swing arm 246 slides relative to the second mounting bracket 242, to reserve an avoidance space 2460. The second support part 23 may be further provided with an avoidance notch, and the avoidance notch communicates with the avoidance space 2460, to expand the avoidance space 2460.

The following describes an implementation structure of the second hinge assembly 3 by using an example with the accompanying drawings.

Figure 26:
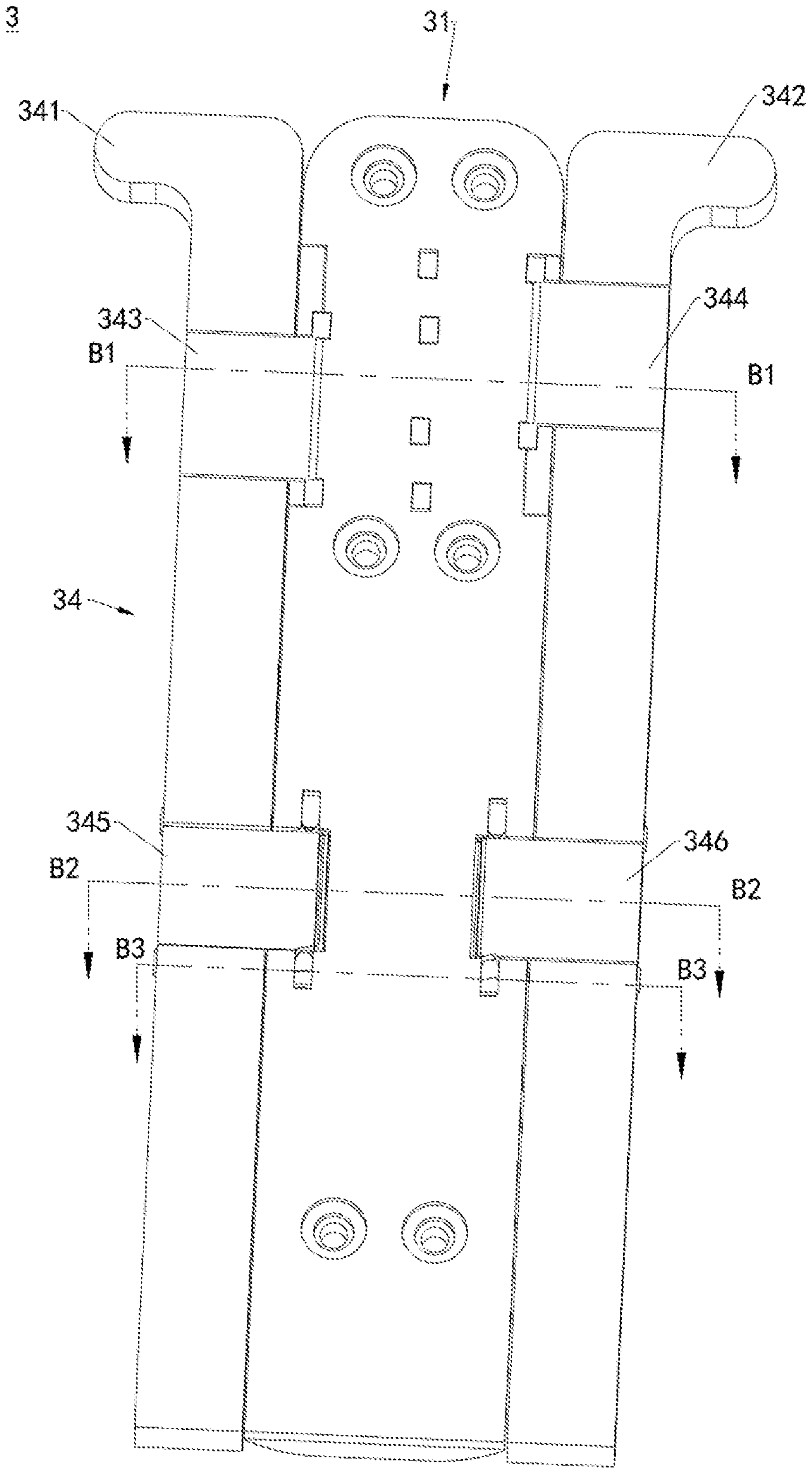
FIG. 26 is a diagram of a structure of a second hinge assembly shown in FIG. 2 in an open state.
Figure 27:
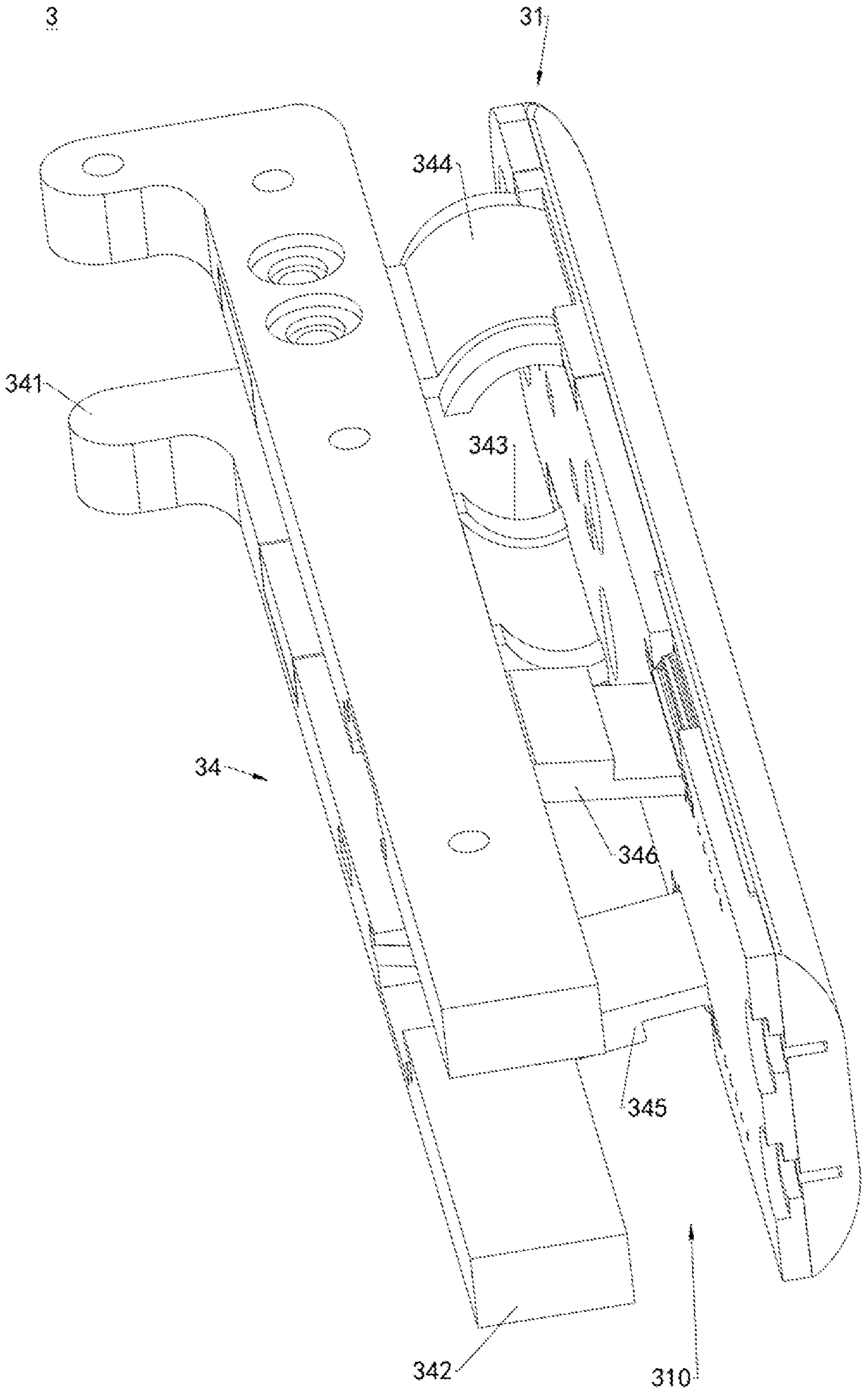
FIG. 27 is a diagram of a structure of the second hinge assembly shown in FIG. 26 in a second closed state.

Refer to FIG. 26 and FIG. 27. FIG. 26 is a diagram of a structure of the second hinge assembly 3 shown in FIG. 2 in an open state. FIG. 27 is a diagram of a structure of the second hinge assembly 3 shown in FIG. 26 in a second closed state.

In some embodiments, the second hinge assembly 3 includes a main shaft 31 and a connection assembly 34. The main shaft 31 and the connection assembly 34 jointly form a main moving mechanism of the second hinge assembly 3. In this embodiment of this application, two ends close to the main shaft 31 are respectively defined as a top end and a bottom end, and a direction from the top end to the bottom end of the main shaft 31 is defined as an extension direction of the main shaft 31. An orientation close to the top end of the main shaft 31 is defined as a "top", and an orientation close to the bottom end of the main shaft 31 is defined as a "bottom".

For example, the connection assembly 34 is connected to the main shaft 31, can be deformed, and is unfolded or folded relative to the main shaft 31. The connection assembly 34 is further connected between the second housing 12 and the third housing 13 (refer to FIG. 2). When the connection assembly 34 is deformed relative to the main shaft 31, the second housing 12 and the third housing 13 are deformed relative to the main shaft 31, to be unfolded or folded relative to each other.

In this embodiment of this application, an example in which the second hinge assembly 3 has one connection assembly 34 is used for description. It should be understood that in some other embodiments, the second hinge assembly 3 may alternatively have more connection assemblies 34, the connection assemblies 34 may be split or combined, and structures of the plurality of connection assemblies 34 may be the same or different. This is not strictly limited in embodiments of this application.

The following describes a structure of each component of the second hinge assembly 3 by using an example with reference to the accompanying drawings. First, a structure of the main shaft 31 is described.

Figure 28A:
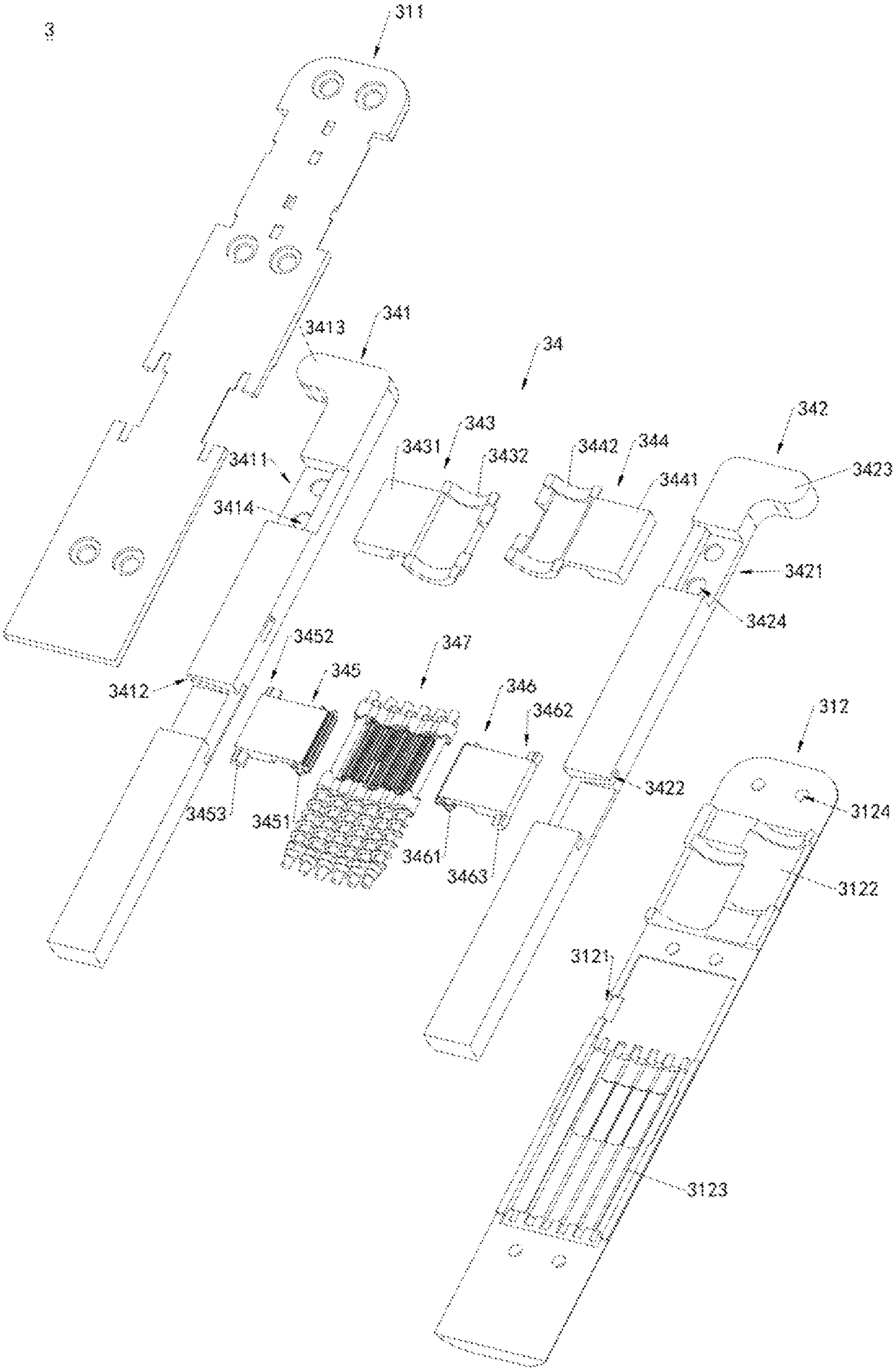
FIG. 28A is a diagram of an exploded structure of the second hinge assembly shown in FIG. 26.
Figure 28B:
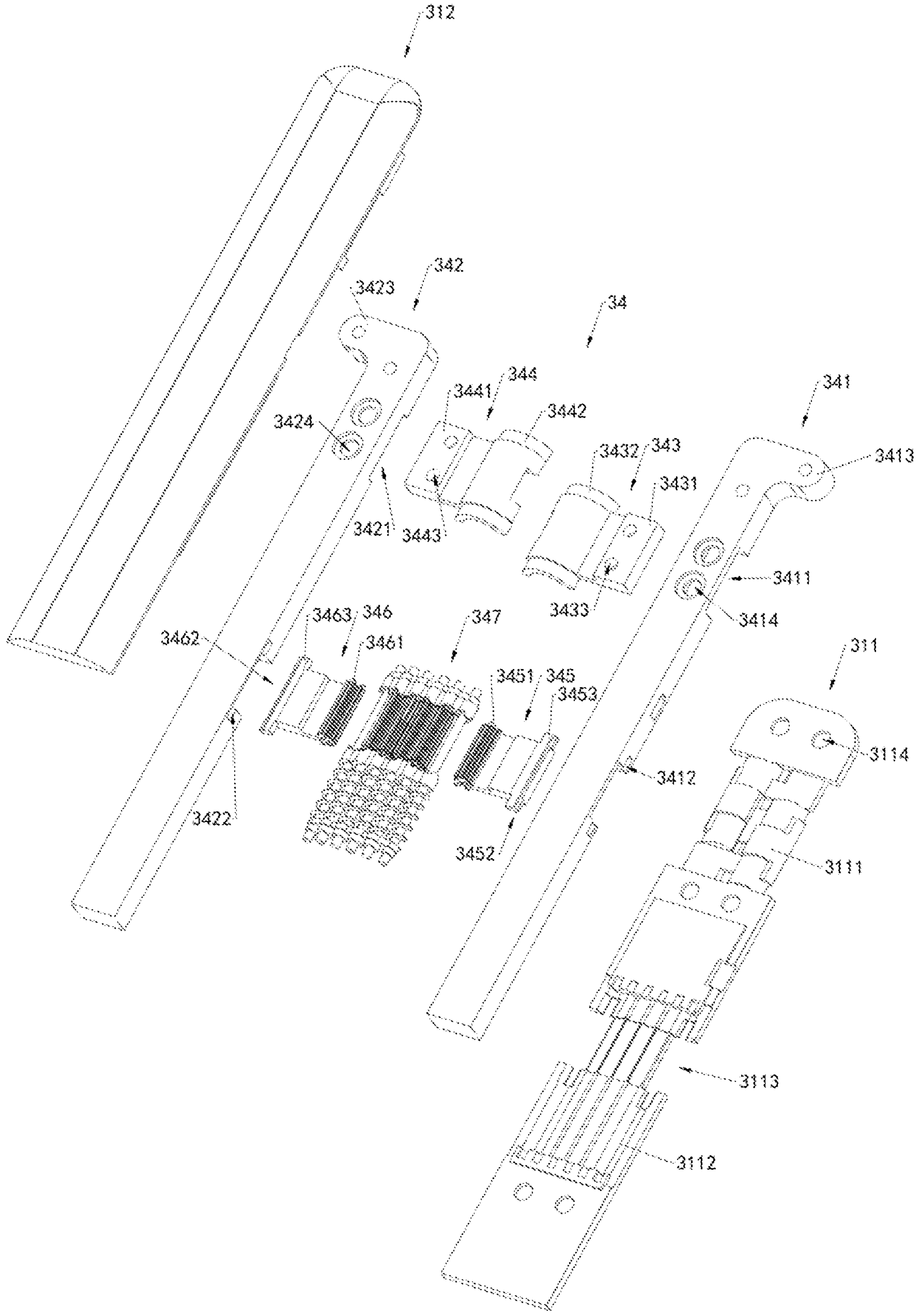
FIG. 28B is a diagram of the structure shown in FIG. 28A from another angle.

Refer to FIG. 28A and FIG. 28B. FIG. 28A is a diagram of an exploded structure of the second hinge assembly 3 shown in FIG. 26. FIG. 28B is a diagram of the structure shown in FIG. 28A from another angle. A view angle of FIG. 28B is reversed leftward and rightward relative to a view angle of FIG. 28A.

In some embodiments, as shown in FIG. 28A, the main shaft 31 includes a main support plate 311 and a cover body 312. The cover body 312 is fastened to the main support plate 311, and a mounting space for mounting the connection assembly 34 is formed between the cover body 312 and the main support plate 311. It should be understood that, in some other embodiments, the main shaft 31 may alternatively have more cover bodies, and a quantity, structures, positions, and the like of cover bodies are all set corresponding to those of the connection assembly 34.

For example, as shown in FIG. 28B, a plurality of cooperation structures are disposed on a lower side that is of the main support plate 311 and that faces the cover body 312, and the plurality of cooperation structures are configured to cooperate with the cover body 312, to form a plurality of mounting spaces for mounting the connection assemblies 34. The plurality of cooperation structures each may include structures such as a groove, an opening, and a protrusion. For example, the main support plate 311 may include a first arc surface 3111 and a first wavy surface 3112. The first arc surface 3111 may be a concave arc surface. The first wavy surface 3112 may include a plurality of areas arranged in an extension direction of the main shaft 31, each area includes a plurality of concave arc surfaces, and an arrangement direction of the plurality of arc surfaces is perpendicular to the extension direction of the main shaft 31.

The main support plate 311 may be provided with a plurality of avoidance notches 3113 and a plurality of fastening holes 3114. The plurality of avoidance notches 3113 are located on two sides of the main support plate 311, and the plurality of avoidance notches 3113 are configured to avoid a mechanical part of the connection assembly 34 in a movement process of the second hinge assembly 3. The plurality of fastening holes 3114 are configured to allow fasteners to pass through. The plurality of avoidance notches 3113 and the plurality of fastening holes 3114 are all distributed at a bottom, a middle part, and a top of the main support plate 311.

For example, as shown in FIG. 28A, the cover body 312 may be approximately a cover body structure in which a middle part is recessed and two sides are raised. A side part of the cover body 312 may be provided with an avoidance notch 3121. A plurality of cooperation structures are disposed on an upper side that is of the cover body 312 and that faces the main support plate 311, and the plurality of cooperation structures are configured to cooperate with the main support plate 311, to form a plurality of mounting spaces for mounting the connection assemblies 34. The plurality of cooperation structures each may include structures such as a groove, an opening, and a protrusion. For example, the cover body 312 may include a second arc surface 3122 and a second wavy surface 3123. The second arc surface 3122 is a concave arc surface. The second wavy surface 3123 includes a plurality of areas, and each area includes a plurality of concave arc surfaces. The second arc surface 3122 may cooperate with the first arc surface 3111 of the main support plate 311, and the second wavy surface 3123 may cooperate with the first wavy surface 3112 of the main support plate 311, to form a mounting space.

The cover body 312 may be fastened to the main support plate 311 through a plurality of fasteners. The cover body 312 may further be provided with a plurality of fastening holes 3124. The plurality of fastening holes 3124 of the cover body 312 are aligned with some of the fastening holes 3114 of the main support plate 311, and the plurality of fasteners extend into the fastening holes 3124 of the cover body 312 and the fastening holes 3114 of the main support plate 311, to lock the cover body 312 and the main support plate 311.

In this embodiment of this application, an example in which the main shaft 31 has one cover body 312 is used for description. It should be understood that in some other embodiments, the main shaft 31 may alternatively have more cover bodies, structures of a plurality of cover bodies, and connection structures of the plurality of cover bodies and the main support plate 311 may be the same or different. This is not strictly limited in embodiments of this application. Then, a structure of connection assembly 34 is described.

In some embodiments, as shown in FIG. 28A, the connection assembly 34 includes a first mounting bracket 341, a second mounting bracket 342, a first connection arm 343, a second connection arm 344, a first swing arm 345, a second swing arm 346, and a damping assembly 347. Two ends of the first connection arm 343 are respectively connected to the main shaft 31 and the first mounting bracket 341. Two ends of the first swing arm 345 are respectively connected to the main shaft 31 and the first mounting bracket 341. Two ends of the second connection arm 344 are respectively connected to the main shaft 31 and the second mounting bracket 342. Two ends of the second swing arm 346 are respectively connected to the main shaft 31 and the second mounting bracket 342. The damping assembly 347 is mounted on the main shaft 31, and is connected to the first swing arm 345 and the second swing arm 346. The damping assembly 347 is configured to provide motion damping force in a process in which the first swing arm 345 and the second swing arm 346 rotate relative to each other.

It may be understood that the connection assembly 34 may not be provided with the damping assembly 347. This is not limited in this application.

As shown in FIG. 28A and FIG. 28B, the first mounting bracket 341 has a first mounting groove 3411, a first sliding slot 3412, a first clamping block 3413, and a plurality of fastening holes 3414.

For example, an opening of the first mounting groove 3411 is located on an upper surface of the first mounting bracket 341, and is configured to fasten and mount a structure connected to the first mounting bracket 341. A groove wall of the first mounting groove 3411 may be provided with the fastening hole 3414.

For example, the first mounting bracket 341 further includes a mounting space. The mounting space penetrates through a left end face and a right end face of the first mounting bracket 341. The first sliding slot 3412 is provided on a side wall of the mounting space. A structure mounted in the mounting space is slidably connected to the first sliding slot 3412.

For example, the first sliding slot 3412 has two side walls that are disposed opposite to each other, and the two side walls that are disposed opposite to each other are recessed to jointly form a guide space of the first sliding slot 3412. In other words, a side wall of the first sliding slot 3412 may have a concave guide space for guiding a sliding direction of a mechanical part mounted in the first sliding slot 3412, so that a relative sliding action between the first mounting bracket 341 and a corresponding mechanical part is easy to implement, and control precision is high.

For example, the first mounting bracket 341 may further include a first clamping block 3413, and the first clamping block 3413 protrudes, to be clamped into the second housing 12. A fastening hole 3414 may be provided on the first clamping block 3413. In this application, the first mounting bracket 341 may be fastened to the second housing 12 in a manner in which a fastener passes through the fastening hole 3414.

The second mounting bracket 342 has a second mounting groove 3421, a second sliding slot 3422, a second clamping block 3423, and a plurality of fastening holes 3424.

For example, an opening of the second mounting groove 3421 is located on an upper surface of the second mounting bracket 342, and is configured to fasten and mount a structure connected to the second mounting bracket 342. A groove wall of the second mounting groove 3421 may be provided with the fastening hole 3424.

For example, the second mounting bracket 342 further includes a mounting space. The mounting space penetrates through a left end face and a right end face of the second mounting bracket 342. The second sliding slot 3422 is provided on a side wall of the mounting space. A structure mounted in the mounting space is slidably connected to the second sliding slot 3422.

For example, the second sliding slot 3422 has two side walls that are disposed opposite to each other, and the two side walls that are disposed opposite to each other are recessed to jointly form a guide space of the second sliding slot 3422. In other words, a side wall of the second sliding slot 3422 may have a concave guide space for guiding a sliding direction of a mechanical part mounted in the second sliding slot 3422, so that a relative sliding action between the second mounting bracket 342 and a corresponding mechanical part is easy to implement, and control precision is high.

For example, the second mounting bracket 342 may further include a second clamping block 3423, and the second clamping block 3423 protrudes, to be clamped into the second housing 12. A fastening hole 3424 may be provided on the second clamping block 3423. In this application, the second mounting bracket 342 may be fastened to the second housing 12 in a manner in which a fastener passes through the fastening hole 3424.

In some embodiments, the first mounting bracket 341 and the second mounting bracket 342 may be the same in shape, and are of a same material, so that material types of the second hinge assembly 3 are reduced, and costs of the second hinge assembly 3 are reduced. In some other embodiments, the first mounting bracket 341 and the second mounting bracket 342 may be different in shape. This is not strictly limited in embodiments of this application.

In some embodiments, as shown in FIG. 28A and FIG. 28B, the first connection arm 343 includes a fixed end 3431 and a rotating end 3432. For example, a fastening hole 3433 is provided at the fixed end 3431 of the first connection arm 343, and the rotating end 3432 of the first connection arm 343 is an arc-shaped arm.

The fixed end 3431 of the first connection arm 343 is fixedly mounted in the first mounting groove 3411 of the first mounting bracket 341. A fastener may pass through the fastening hole 3414 of the first mounting groove 3411 and the fastening hole 3433 at the fixed end 3431 of the first connection arm 343, so that the first connection arm 343 is fastened to the first mounting bracket 341. It may be understood that, in some other embodiments, the fixed end 3431 of the first connection arm 343 may alternatively be fastened to the first mounting bracket 341 through welding, bonding, and the like. This is not limited in this application.

The first connection arm 343 may be an integrally formed mechanical part, to have high structural strength. For example, the first connection arm 343 may be formed by using a computer numerical control milling process. In some other embodiments, the first connection arm 343 may alternatively be formed by using a metal injection molding process. This is not strictly limited in embodiments of this application.

In some embodiments, the second connection arm 344 includes a fixed end 3441 and a rotating end 3442. For example, a fastening hole 3443 is provided at the fixed end 3441 of the second connection arm 344, and the rotating end 3442 of the second connection arm 344 is an arc-shaped arm.

The fixed end 3441 of the second connection arm 344 is fixedly mounted in the second mounting groove 3421 of the second mounting bracket 342. A fastener may pass through the fastening hole 3424 of the second mounting groove 3421 and the fastening hole 3443 at the fixed end 3441 of the second connection arm 344, so that the second connection arm 344 is fastened to the second mounting bracket 342. It may be understood that, in some other embodiments, the fixed end 3441 of the second connection arm 344 may alternatively be fastened to the second mounting bracket 342 through welding, bonding, and the like. This is not limited in this application.

The second connection arm 344 may be an integrally formed mechanical part, to have high structural strength. For example, the second connection arm 344 may be formed by using a computer numerical control milling process. In some other embodiments, the second connection arm 344 may alternatively be formed by using a metal injection molding process. This is not strictly limited in embodiments of this application.

In some embodiments, the first connection arm 343 and the second connection arm 344 may be the same in shape, and are of a same material, so that material types of the second hinge assembly 3 are reduced, and costs of the second hinge assembly 3 are reduced. In some other embodiments, the first connection arm 343 and the second connection arm 344 may be different in shape. This is not strictly limited in embodiments of this application.

In some embodiments, as shown in FIG. 28A and FIG. 28B, the first swing arm 345 includes a rotating end 3451 and a sliding end 3452. The rotating end 3451 of the first swing arm 345 may be provided with a structure configured to cooperate with the damping assembly 347. For a structure of the rotating end 3451 of the first swing arm 345, refer to the rotating end 2451 of the first swing arm 245 of the first hinge assembly 2. Details are not described herein again. The sliding end 3452 of the first swing arm 345 includes sliding blocks 3453 located on two sides of the sliding end.

The first swing arm 345 may be an integrally formed mechanical part, to have high structural strength. For example, the first swing arm 345 may be formed by using a metal injection molding process, or may be formed by using another process. This is not strictly limited in embodiments of this application.

In some embodiments, the second swing arm 346 includes a rotating end 3461 and a sliding end 3462. The rotating end 3461 of the second swing arm 346 may be provided with a structure configured to cooperate with the damping assembly 347. For a structure of the rotating end 3461 of the second swing arm 346, refer to the rotating end 2461 of the second swing arm 246 of the first hinge assembly 2. Details are not described herein again. The sliding end 3462 of the second swing arm 346 includes sliding blocks 3463 located on two sides of the sliding end.

The second swing arm 346 may be an integrally formed mechanical part, to have high structural strength. For example, the second swing arm 346 may be formed by using a metal injection molding process, or may be formed by using another process. This is not strictly limited in embodiments of this application.

In some embodiments, the first swing arm 345 and the second swing arm 346 may be the same in shape, and are of a same material, so that material types of the second hinge assembly 3 are reduced, and costs of the second hinge assembly 3 are reduced. In some other embodiments, the first swing arm 345 and the second swing arm 346 may be different in shape. This is not strictly limited in embodiments of this application.

In this application, for a structure of the damping assembly 347, refer to a structure of the damping assembly 247 of the first hinge assembly 2. For a connection structure of the damping assembly 347, the first swing arm 345, and the second swing arm 346, refer to a connection structure of the damping assembly 247 of the first hinge assembly 2, the first swing arm 245, and the second swing arm 246. For example, the damping assembly 347 may also include a plurality of synchronous gears. The rotating end 3451 of the first swing arm 345 is connected to the rotating end 3461 of the second swing arm 346 through a plurality of synchronous gears. Therefore, the rotating end 3451 of the first swing arm 345 and the rotating end 3461 of the second swing arm 346 are the same in rotation angle and are opposite in rotation direction, so that rotation actions of the first swing arm 345 and the second swing arm 346 relative to the main shaft 31 are kept synchronous, that is, the first swing arm 345 and the second swing arm 346 are synchronously close to or away from each other. That is, the first swing arm 345 and the second swing arm 346 are driven by the damping assembly 347 to rotate synchronously relative to the main shaft 31.

In this application, the first mounting bracket 341 and the second mounting bracket 342 are respectively connected to two sides of the main shaft 31. The first mounting bracket 341 moves with the first connection arm 343 and the first swing arm 345, and the second mounting bracket 342 moves with the second connection arm 344 and the second swing arm 346, to implement relative unfolding and relative folding. As shown in FIG. 26, in the process in which the second hinge assembly 3 is unfolded from the first closed state to the open state, the first mounting bracket 341 and the second mounting bracket 342 are unfolded relative to each other, the first mounting bracket 341 and the second mounting bracket 342 are respectively located on two sides of the main shaft 31, and the first mounting bracket 341, the main shaft 31, and the second mounting bracket 342 jointly provide a flat support environment. As shown in FIG. 5, in the process in which the second hinge assembly 3 is folded from the open state to the first closed state, the first mounting bracket 341 and the second mounting bracket 342 are folded relative to each other, the first mounting bracket 341 and the second mounting bracket 342 are located on a same side of the main shaft 31, and the first mounting bracket 341, the second mounting bracket 342, and the main shaft 31 jointly form a screen accommodating space 310.

Figure 29:
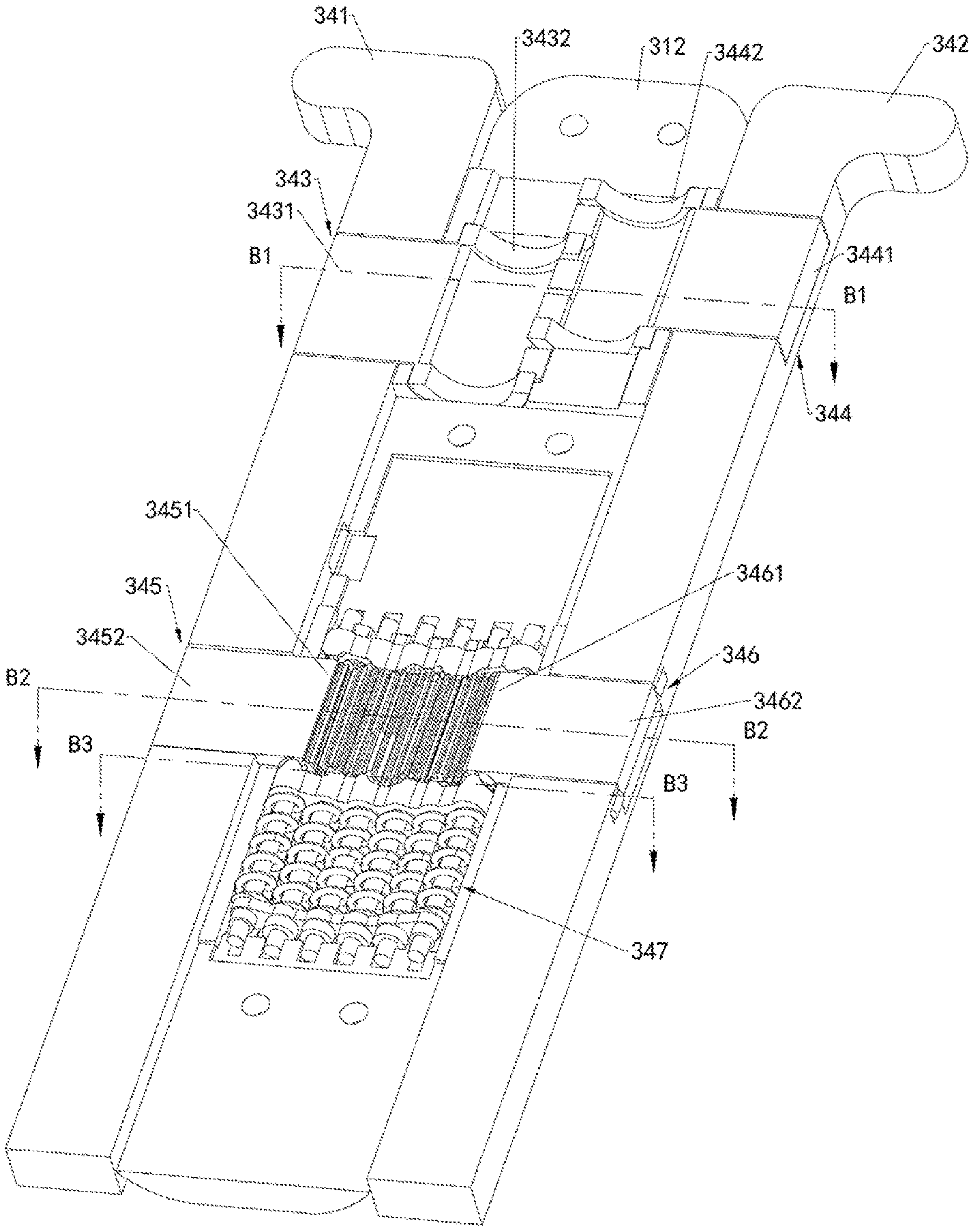
FIG. 29 is a diagram of an assembly structure of a connection assembly shown in FIG. 28A and a bottom cover body of a main shaft.
Figure 30A:
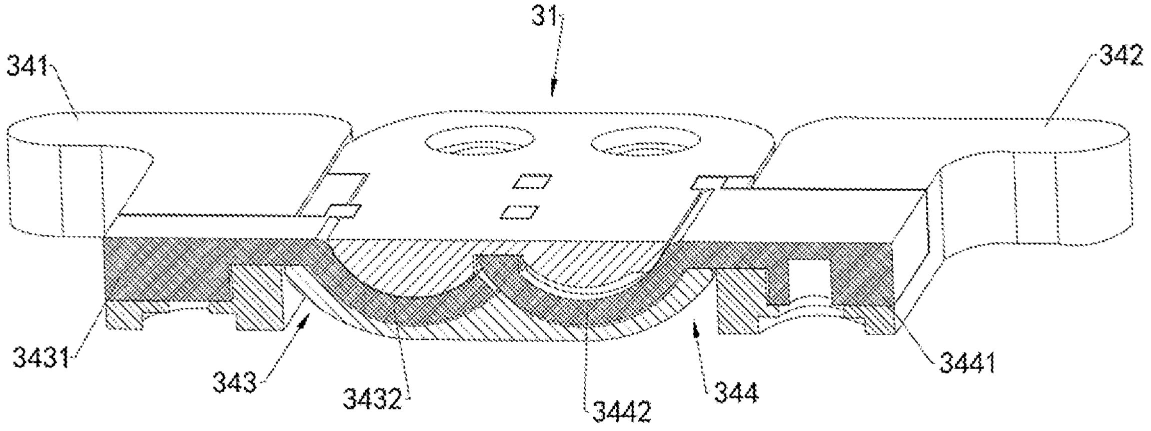
FIG. 30A is a diagram of a cross-sectional structure that is of an assembly structure of a connection assembly shown in FIG. 26 and a main shaft and that is cut along B1-B1.
Figure 30B:
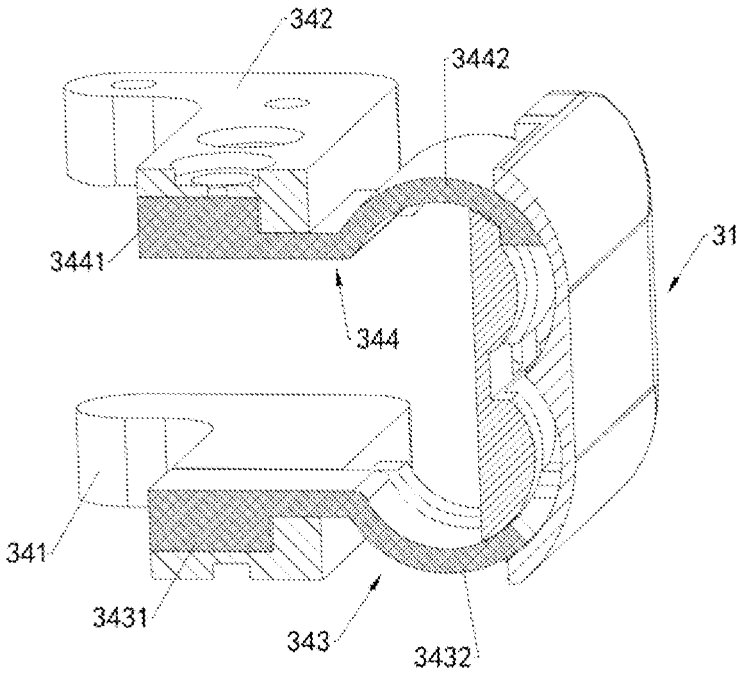
FIG. 30B is a diagram of a structure of the structure shown in FIG. 30A in a second closed state.

Refer to FIG. 29, FIG. 30A, and FIG. 30B. FIG. 29 is a diagram of an assembly structure of the connection assembly 34 shown in FIG. 28A and a bottom cover body 312 of the main shaft 31. FIG. 30A is a diagram of a cross-sectional structure that is of an assembly structure of the connection assembly 34 shown in FIG. 26 and the main shaft 31 and that is cut along B1-B1. FIG. 30B is a diagram of a structure of the structure shown in FIG. 30A in a second closed state. A cross section that is cut along B1-B1 passes through the first mounting bracket 341, the first connection arm 343, the main shaft 31, the second connection arm 344, and the second mounting bracket 342. A position of B1-B1 in FIG. 26 is the same as a position of B1-B1 in FIG. 29.

In some embodiments, the fixed end 3431 of the first connection arm 343 is fastened to the first mounting bracket 341, and the rotating end 3432 of the first connection arm 343 is rotatably connected to the main shaft 31. The fixed end 3441 of the second connection arm 344 is fastened to the second mounting bracket 342, and the rotating end 3442 of the second connection arm 344 is rotatably connected to the main shaft 31.

The rotating end 3432 of the first connection arm 343 is rotatably connected to the main shaft 31 through a virtual shaft. The rotating end 3442 of the second connection arm 344 is rotatably connected to the main shaft 31 through a virtual shaft.

It may be understood that, in some other embodiments, the rotating end 3432 of the first connection arm 343 and/or the rotating end 3442 of the second connection arm 344 may alternatively be rotatably connected to the main shaft 31 through a physical shaft. This is not strictly limited in this application.

Figure 31A:
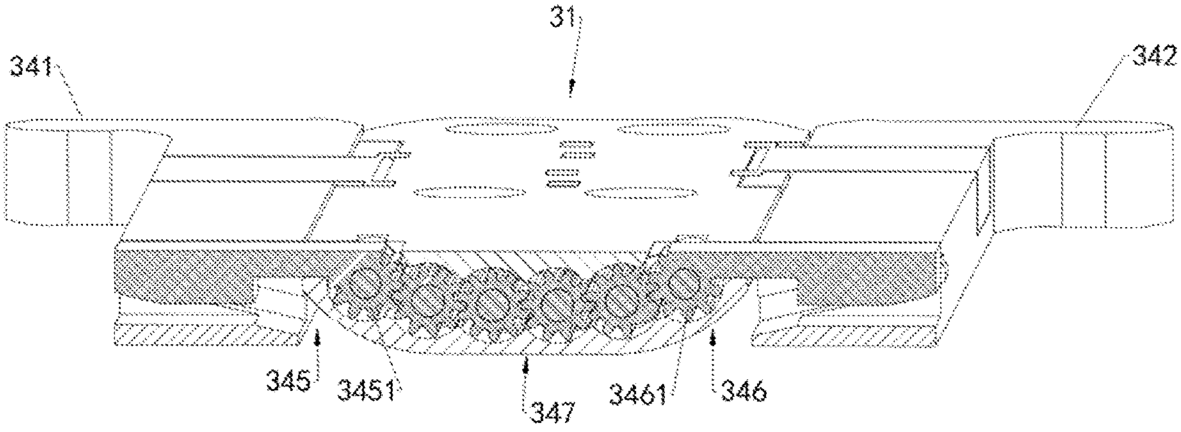
FIG. 31A is a diagram of a cross-sectional structure that is of an assembly structure of a connection assembly shown in FIG. 26 and a main shaft and that is cut along B2-B2.
Figure 31B:
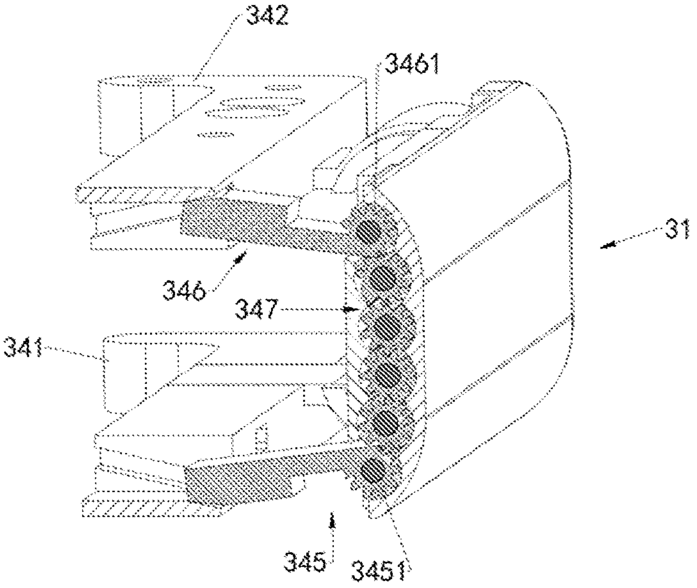
FIG. 31B is a diagram of a structure of the structure shown in FIG. 31A in a second closed state.

Refer to FIG. 29, FIG. 31A, and FIG. 31B. FIG. 31A is a diagram of a cross-sectional structure that is of an assembly structure of the connection assembly 34 shown in FIG. 26 and the main shaft 31 and that is cut along B2-B2. FIG. 31B is a diagram of a structure of the structure shown in FIG. 31A in a second closed state. A cross section that is cut along B2-B2 passes through the first mounting bracket 341, the first swing arm 345, the main shaft 31, the second swing arm 346, and the second mounting bracket 342. A position of B2-B2 in FIG. 26 is the same as a position of B2-B2 in FIG. 29.

In some embodiments, the rotating end 3451 of the first swing arm 345, the rotating end 3461 of the second swing arm 346, and the damping assembly 347 are all mounted on the main shaft 31. In this embodiment, for a connection structure of the first swing arm 345, the second swing arm 346, the damping assembly 347, and the main shaft 31, refer to a connection structure of the first swing arm 245, the second swing arm 246, the damping assembly 247, and the main shaft 21 of the first hinge assembly 2. Details are not described herein again.

Figure 32A:
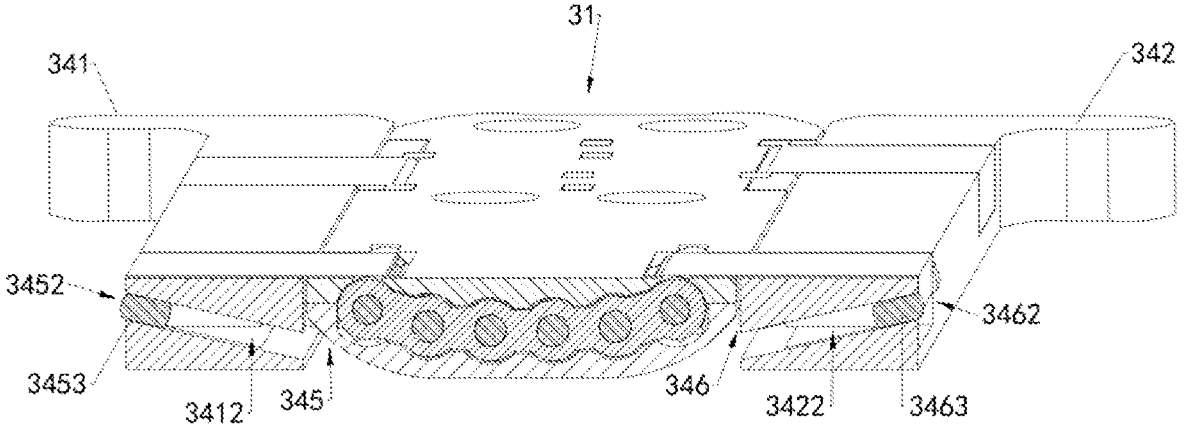
FIG. 32A is a diagram of a cross-sectional structure that is of an assembly structure of a connection assembly shown in FIG. 26 and a main shaft and that is cut along B3-B3.
Figure 32B:
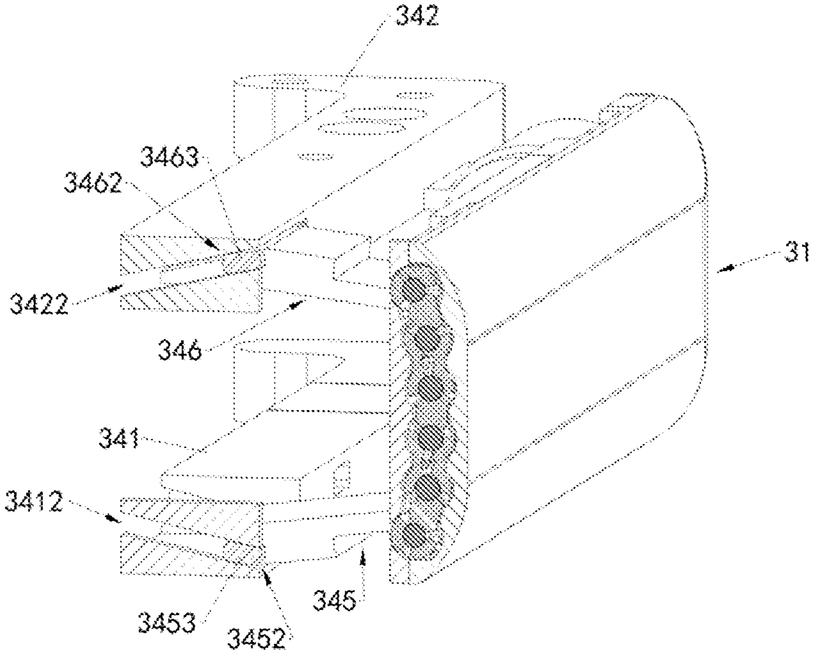
FIG. 32B is a diagram of a structure of the structure shown in FIG. 32A in a second closed state.

Refer to FIG. 29, FIG. 32A, and FIG. 32B. FIG. 32A is a diagram of a cross-sectional structure that is of an assembly structure of the connection assembly 34 shown in FIG. 26 and the main shaft 31 and that is cut along B3-B3. FIG. 32B is a diagram of a structure of the structure shown in FIG. 32A in a second closed state. A cross section that is cut along B3-B3 passes through the first mounting bracket 341, the first swing arm 345, the main shaft 31, the second swing arm 346, and the second mounting bracket 342. A position of B3-B3 in FIG. 26 is the same as a position of B3-B3 in FIG. 29.

In some embodiments, the sliding end 3452 of the first swing arm 345 may be slidably mounted in the first sliding slot 3412 of the first mounting bracket 341, to be slidably connected to the first mounting bracket 341. The sliding block 3453 at the sliding end 3452 of the first swing arm 345 is partially located in a guide space of the first sliding slot 3412, and the sliding block 3453 and the guide space cooperate to guide a sliding direction of the sliding end 3452 of the first swing arm 345 relative to the first mounting bracket 341. The sliding end 3462 of the second swing arm 346 may be slidably mounted in the second sliding slot 3422 of the second mounting bracket 342, to be slidably connected to the second mounting bracket 342. The sliding block 3463 at the sliding end 3462 of the second swing arm 346 is partially located in a guide space of the second sliding slot 3422, and the sliding block 3463 and the guide space cooperate to guide a sliding direction of the sliding end 3462 of the second swing arm 346 relative to the second mounting bracket 342.

The following describes a structure of the connection apparatus 4 and a connection structure between the connection apparatus 4 and structures such as the first hinge assembly 2, the second housing 12, and the second hinge assembly 3.

Figure 33A:
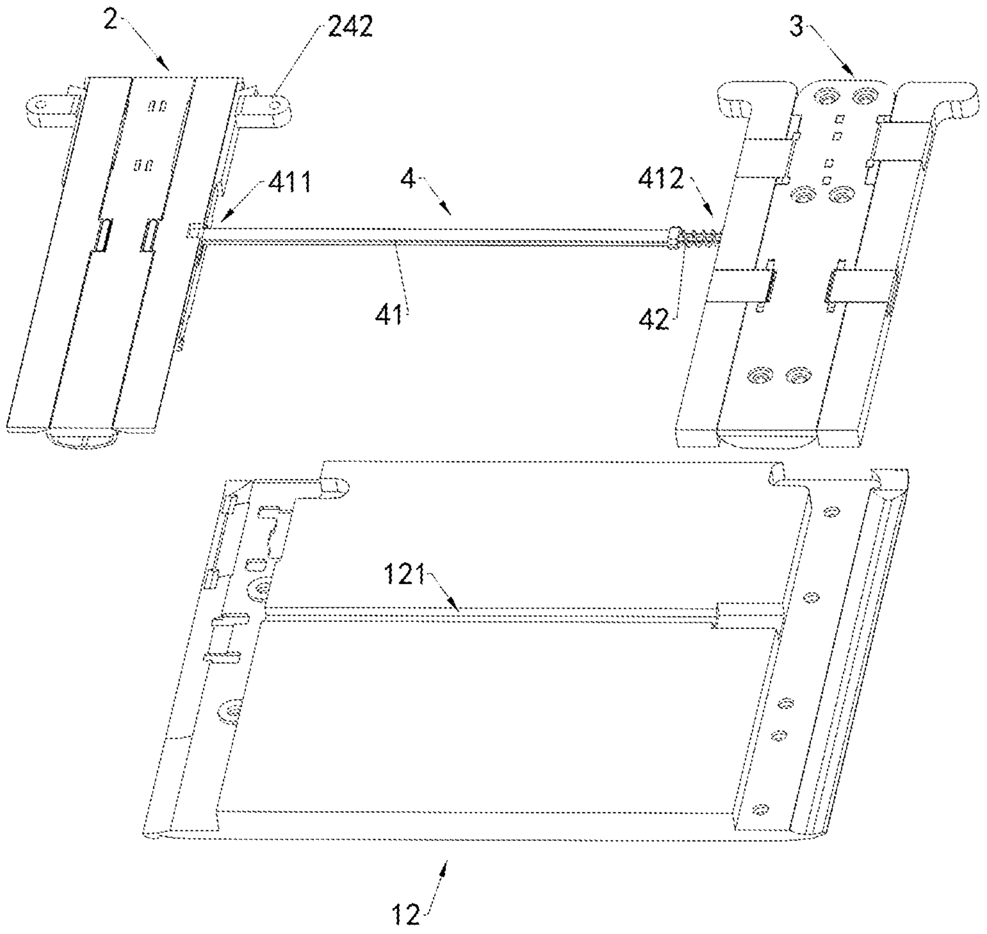
FIG. 33A is a diagram of a partial exploded structure of a partial structure of the electronic device shown in FIG. 2.
Figure 33B:
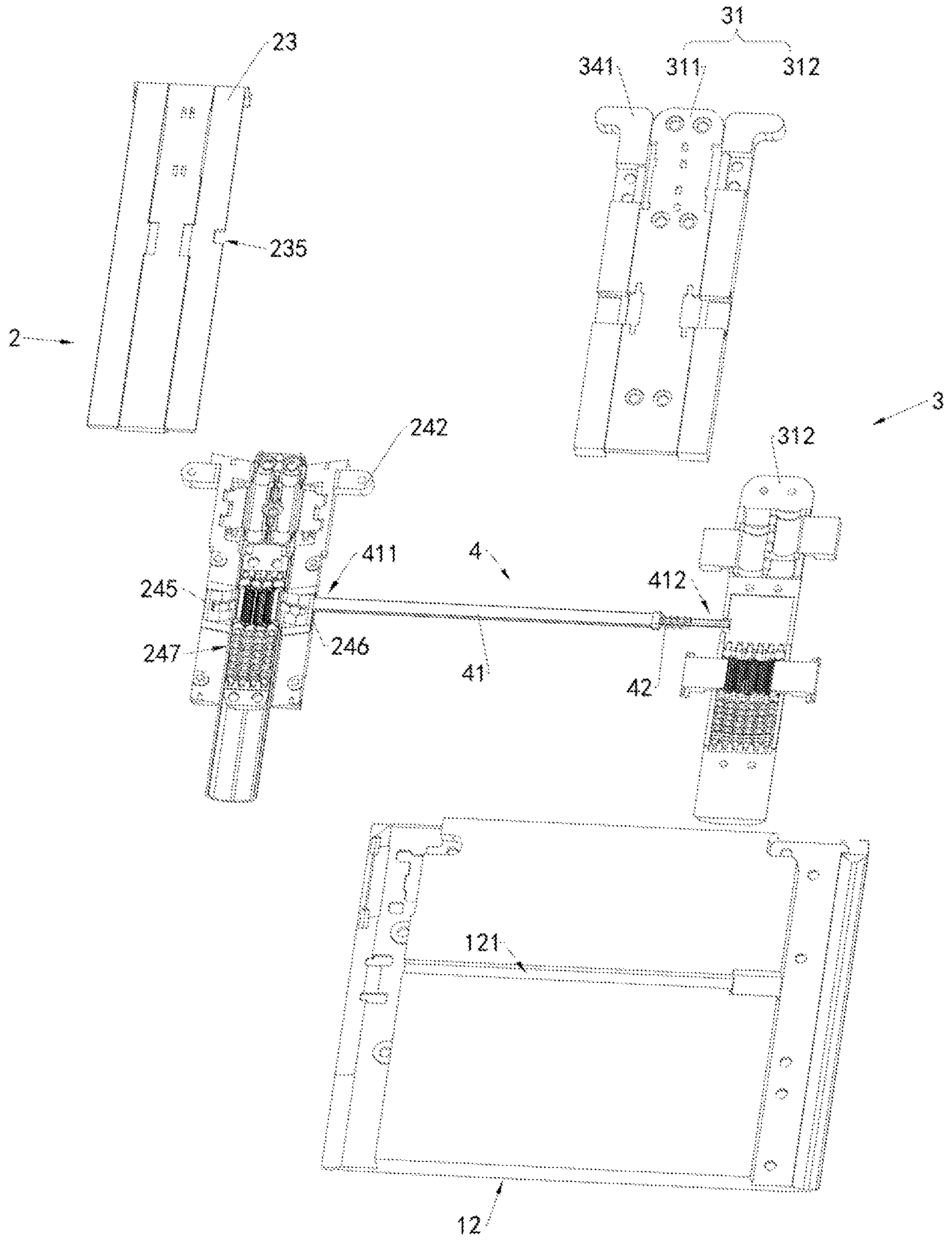
FIG. 33B is a diagram of a partial exploded structure of FIG. 33A.
Figure 33C:
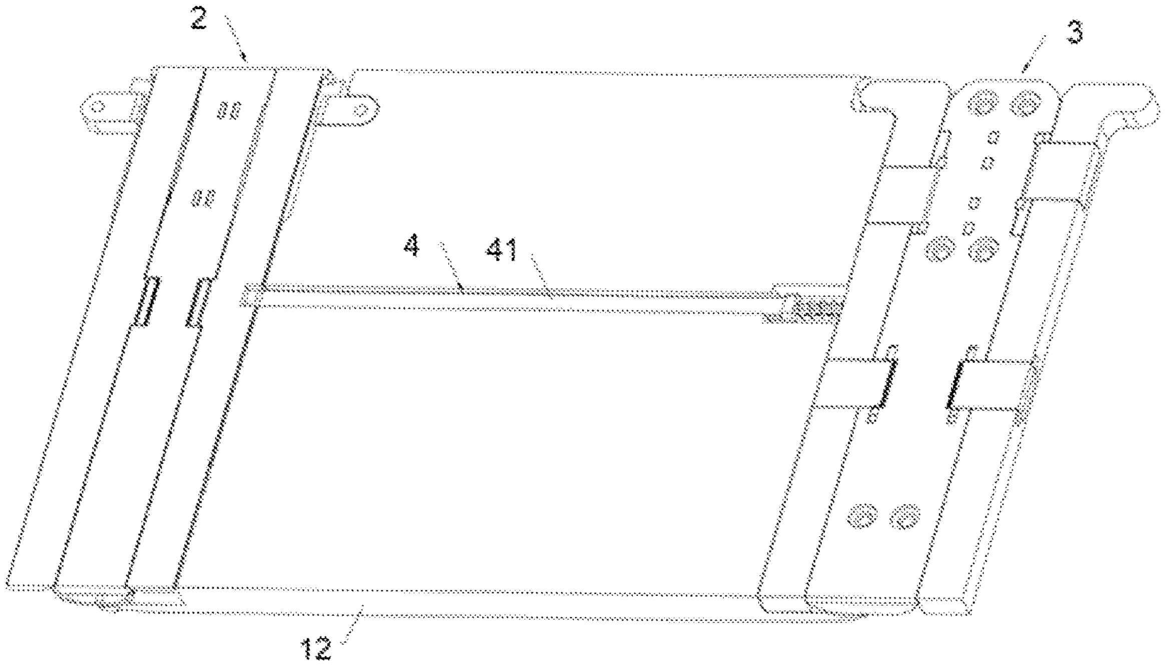
FIG. 33C is a diagram of assembling the structure shown in FIG. 33A.

Refer to FIG. 33A and FIG. 33B. FIG. 33A is a diagram of a partial exploded structure of the electronic device 1000 shown in FIG. 2. FIG. 33B is a diagram of a partial exploded structure of FIG. 33A.

For example, the connection apparatus 4 includes a connector 41 and a driving piece 42. The connector 41 includes a first end 411 and a second end 412. The first end 411 of the connector 41 is close to the first hinge assembly 2, and the second end 412 of the connector 41 is close to the second hinge assembly 3. When the second housing 12 and the third housing 13 are in the open state, and the first housing 11 and the second housing 12 are in the open state, the connector 41 can prevent the second hinge assembly 3 from moving, so that the second hinge assembly 3 is in a locked state, and the second housing 12 and the third housing 13 are prevented from being folded relative to the second hinge assembly 3.

In some embodiments, at least one of the connector 41, the first hinge assembly 2, the second hinge assembly 3, or the second housing 12 is provided with the driving piece 42. When the second housing 12 and the third housing 13 are in the open state, and the first housing 11 and the second housing 12 are folded relative to each other from the open state to the first closed state through the first hinge assembly 2, the driving piece 42 is configured to drive the second end 412 of the connector 41 to move in a direction away from the second hinge assembly 3, so that the second housing 12 and the third housing 13 are capable of being folded relative to the second hinge assembly 3. When the first housing 11 and the second housing 12 are in the first closed state, the second housing 12 and the third housing 13 are capable of moving relative to the second hinge assembly 3. The connector 41 controls movement of the second hinge assembly 3, so that the electronic device 1000 is folded in a specific sequence, to avoid damage to structures of the first hinge assembly 2 and the second hinge assembly 3 due to pressing or pulling. In this way, the first hinge assembly 2 and the second hinge assembly 3 each have a long service life and high reliability.

In some other embodiments, when the second housing 12 and the third housing 13 are in the open state, and the first housing 11 and the second housing 12 are unfolded from the first closed state to the open state through the first hinge assembly 2, the driving piece 42 may be further configured to drive the second end 412 of the connector 41 to move in a direction close to the second hinge assembly 3.

In some embodiments, the connector 41 may be slidably connected to the second housing 12. For example, the second housing 12 is provided with a sliding slot 121, and the sliding slot 121 may extend to end faces on left and right sides of the second housing 12. The connector 41 is located in the sliding slot 121 of the second housing 12, and may slide along the sliding slot 121, to be slidably connected to the second housing 12 through the sliding slot 121. In some other embodiments, the second housing 12 may further be provided with a through hole (not shown in the figure), and openings at two ends of the through hole may be respectively located on end faces on left and right sides of the second housing 12. The connector 41 is located in the through hole of the second housing 12, and may slide along the through hole, to be slidably connected to the second housing 12 through the through hole. In addition, the connector 41 may alternatively be slidably connected to the second housing 12 through another structure. This is not limited in this application.

Figure 33D:
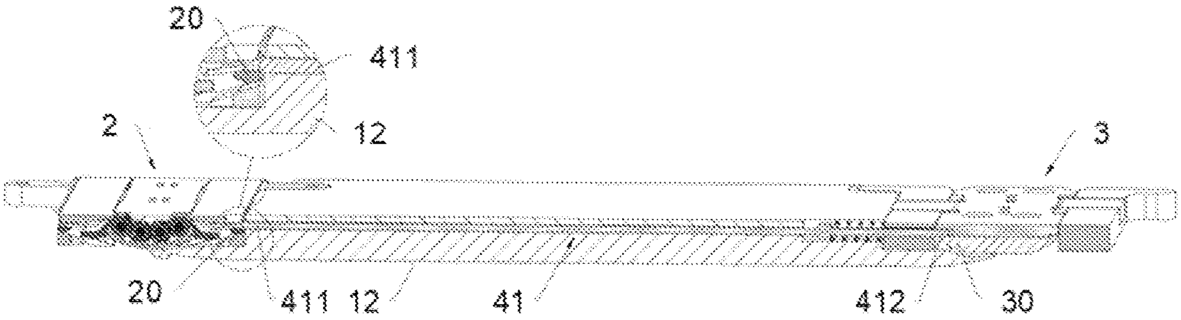
FIG. 33D is a diagram of an internal structure of the structure shown in FIG. 33C.
Figure 34A:
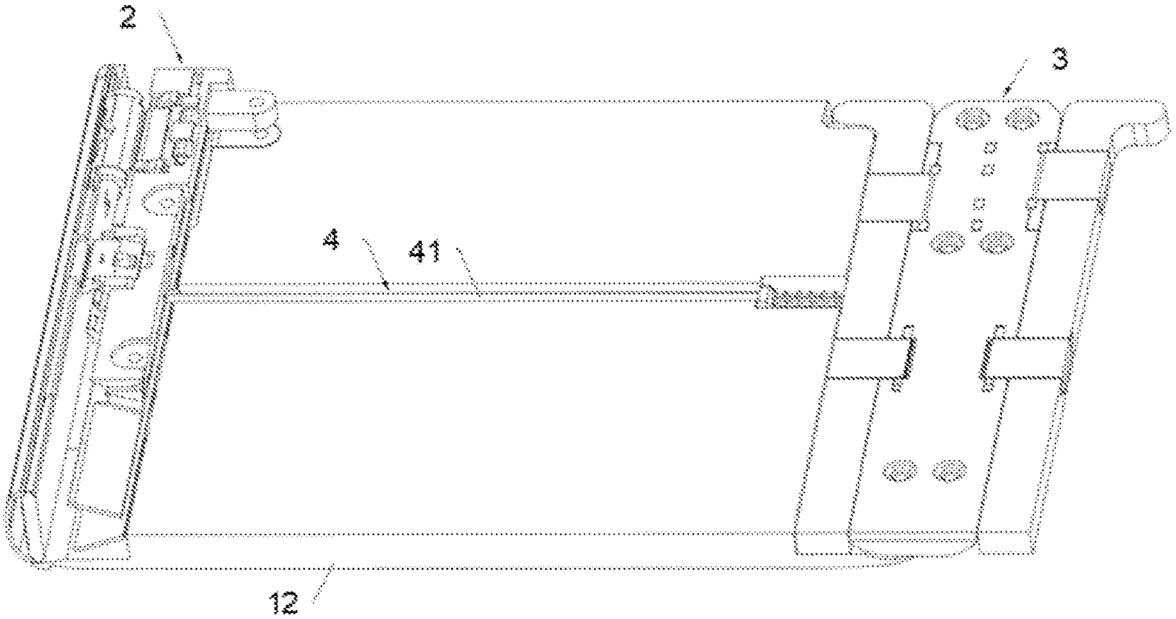
FIG. 34A is a diagram of the structure shown in FIG. 33C in a first closed state.
Figure 34B:
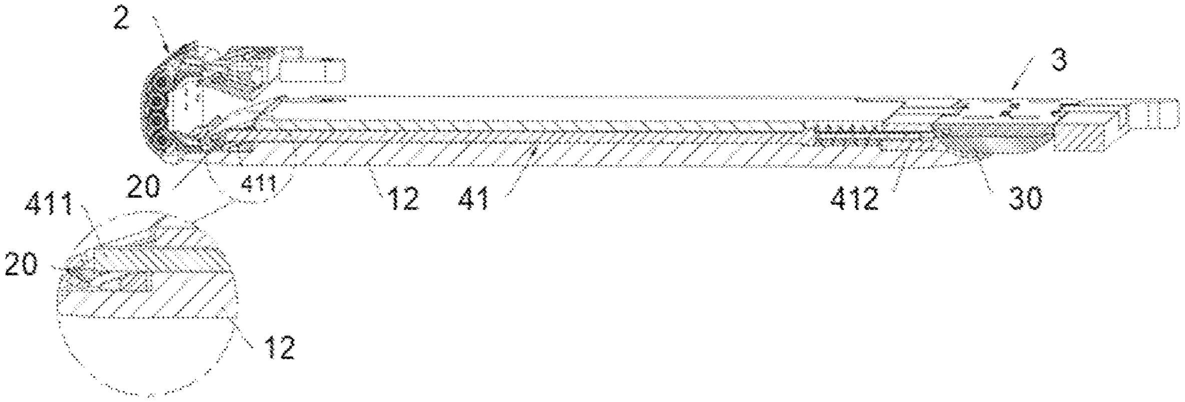
FIG. 34B is a diagram of an internal structure of the structure shown in FIG. 34A.
Figure 35A:
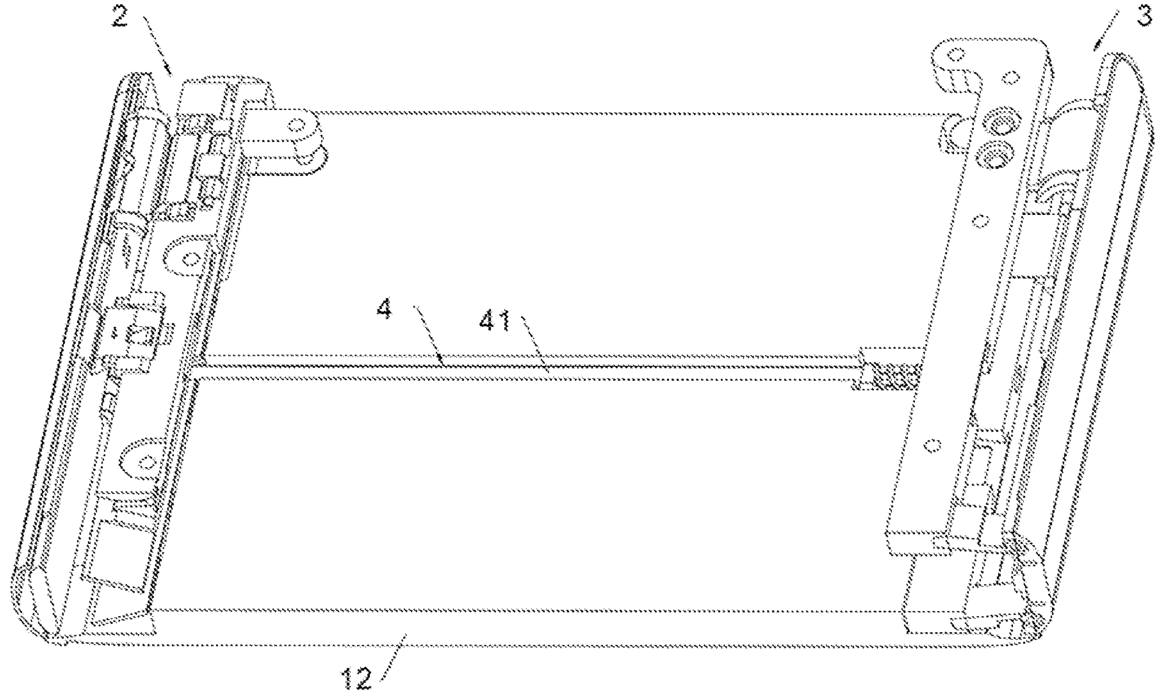
FIG. 35A is a diagram of the structure shown in FIG. 33C in a second closed state.
Figure 35B:
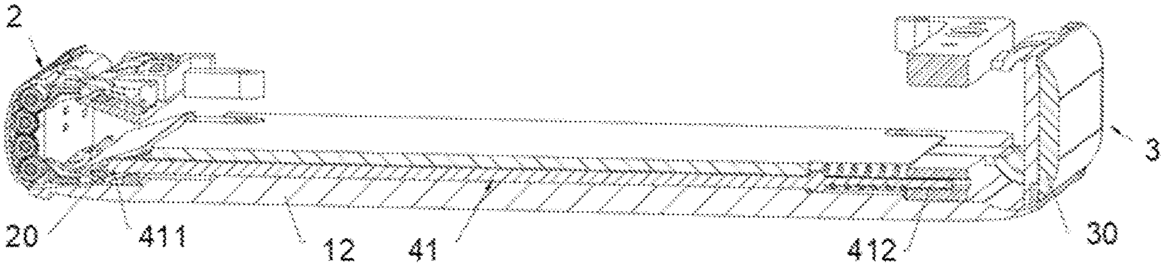
FIG. 35B is a diagram of an internal structure of the structure shown in FIG. 35A.

Refer to FIG. 33B to FIG. 35B. FIG. 33C is a diagram of assembling the structure shown in FIG. 33A. FIG. 33D is a diagram of an internal structure of the structure shown in FIG. 33C. FIG. 34A is a diagram of the structure shown in FIG. 33C in a first closed state. FIG. 34B is a diagram of an internal structure of the structure shown in FIG. 34A. FIG. 35A is a diagram of the structure shown in FIG. 33C in a second closed state. FIG. 35B is a diagram of an internal structure of the structure shown in FIG. 35A.

For example, the connection apparatus 4 may include a connector 41, that is, the electronic device 1000 includes the connector 41, and the connector 41 has a first end 411 and a second end 412 that are disposed opposite to each other. The first end 411 of the connector 41 is close to the first hinge assembly 2, and the second end 412 of the connector 41 is close to the second hinge assembly 3.

Figure 36A:
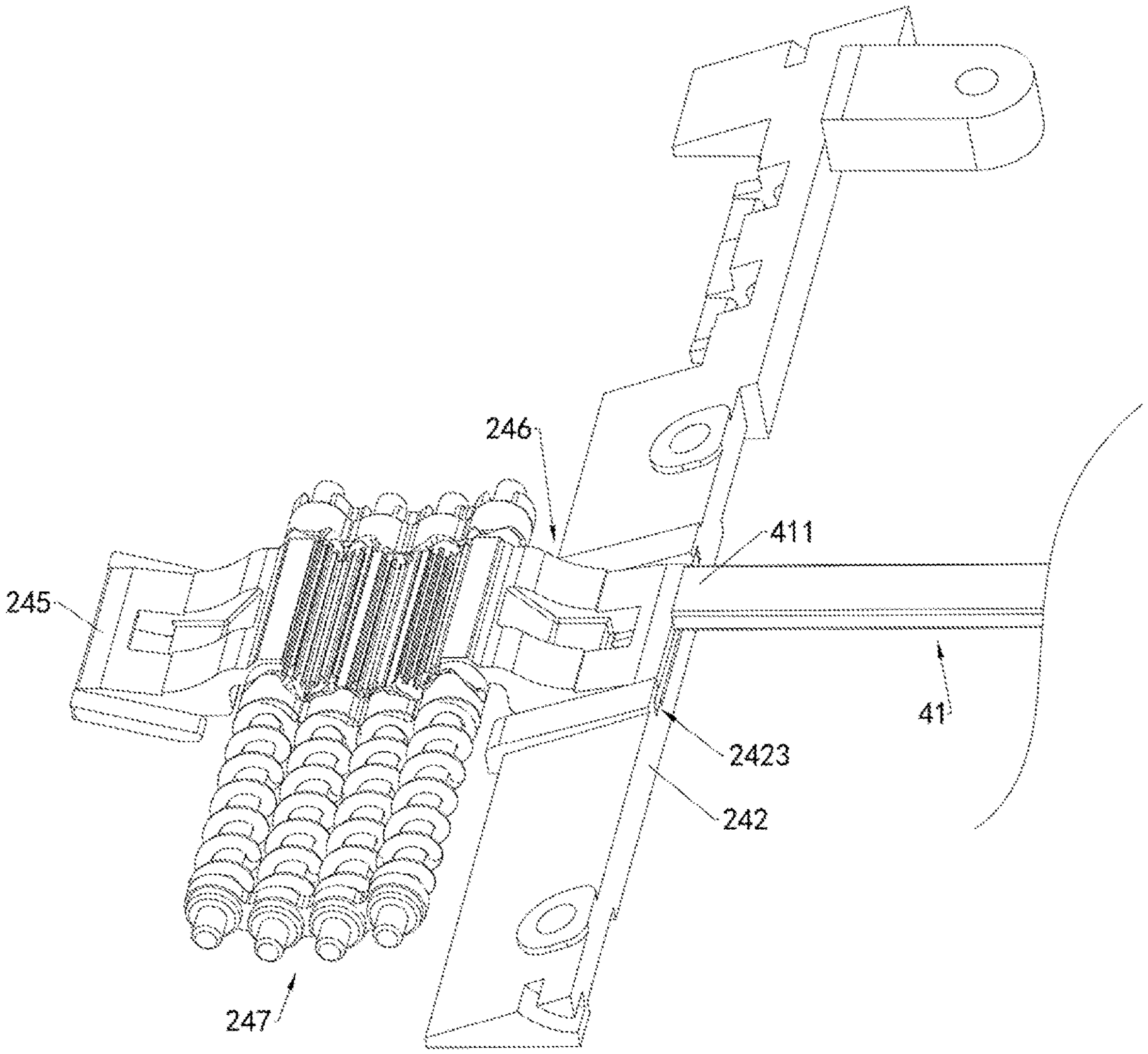
FIG. 36A is a diagram of a partial structure of a housing apparatus shown in FIG. 33B.
Figure 36B:
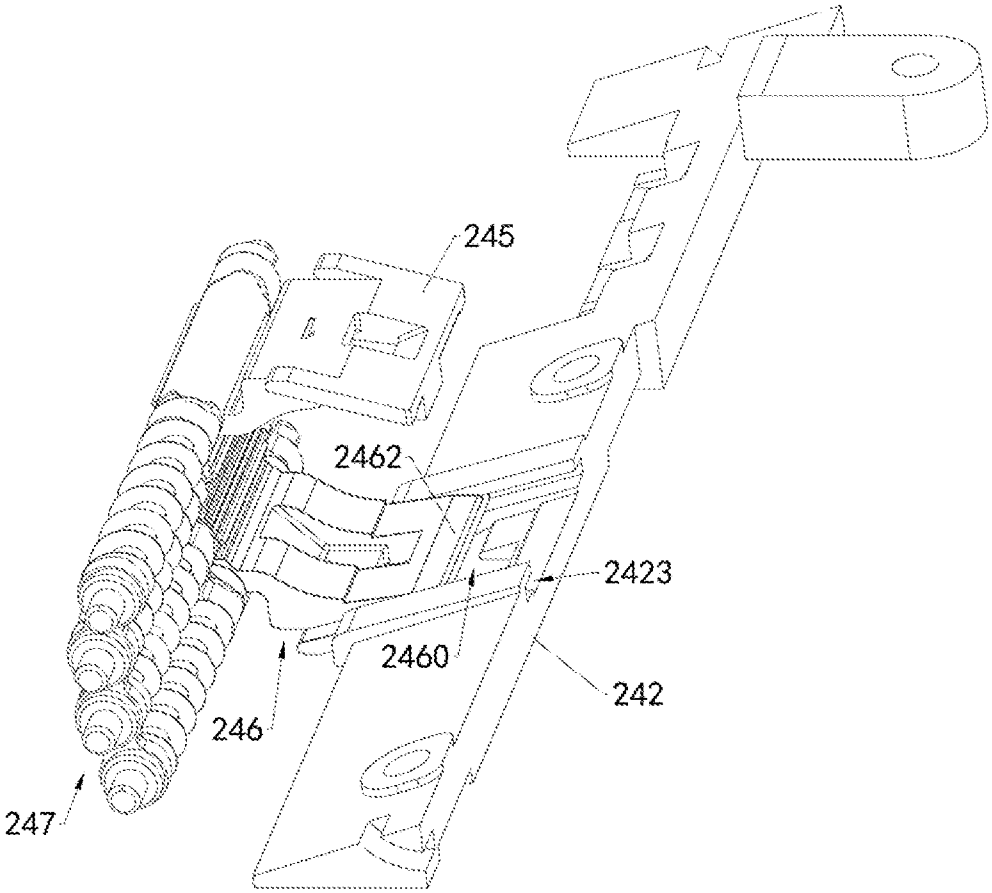
FIG. 36B is a diagram of a partial structure of the structure shown in FIG. 36A in a first closed state.
Figure 36C:
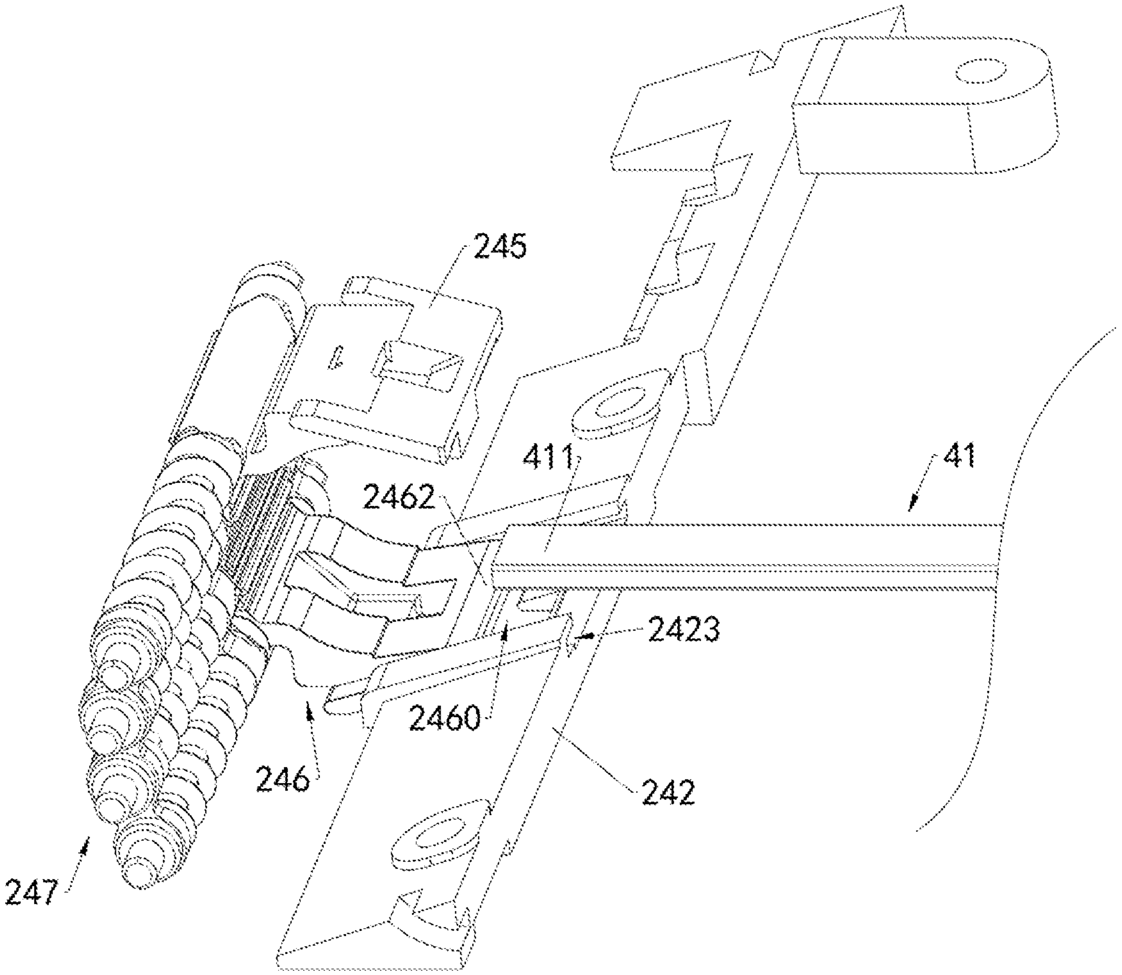
FIG. 36C is a diagram of a structure of the structure shown in FIG. 36A in a first closed state.

For example, refer to FIG. 33B to FIG. 34B and FIG. 36A to FIG. 36C. FIG. 36A is a diagram of a partial structure of the housing apparatus 100 shown in FIG. 33B. FIG. 36B is a diagram of a partial structure of the structure shown in FIG. 36A in a first closed state. FIG. 36C is a diagram of a structure of the structure shown in FIG. 36A in a first closed state. FIG. 36A shows structures of the first swing arm 245, the damping assembly 247, the second swing arm 246, the second mounting bracket 242, and the first end 411 of the connector 41 that are of the first hinge assembly 2.

As shown in FIG. 33B, FIG. 33D, and FIG. 36A, when the first housing 11 and the second housing 12 are in the open state, and the second housing 12 and the third housing 13 are in the open state, the first end 411 of the connector 41 is close to or abuts against the sliding end 2462 of the second swing arm 246 of the first hinge assembly 2.

The first swing arm 245 and the second swing arm 246 are driven by the damping assembly 247 to synchronously rotate, so that the first housing 11 and the second housing 12 are folded relative to each other from the open state to the first closed state. In addition, the sliding end 2462 of the second swing arm 246 is slidably mounted in the second sliding slot 2423 of the second mounting bracket 242. For a specific mounting manner of the sliding end 2462 of the second swing arm 246 and the second sliding slot 2423 of the second mounting bracket 242, refer to a slidable connecting structure that is between the sliding end 2462 of the second swing arm 246 and the second mounting bracket 242 and that is shown in FIG. 19A. Details are not described herein again. A quantity of second sliding slots 2423 of the second mounting bracket 242 may be two, the two second sliding slots 2423 are spaced away from each other, and an upper side and a lower side of the sliding end 2462 of the second swing arm 246 may be slidably connected to the two second sliding slots 2423 respectively.

As shown in FIG. 34A, FIG. 34B and FIG. 36B, when the second housing 12 and the third housing 13 are in the open state, and the first housing 11 and the second housing 12 are folded relative to each other from the open state to the first closed state through the first hinge assembly 2, the first swing arm 245 and the second swing arm 246 of the first hinge assembly 2 are folded relative to each other, and the sliding end 2462 of the second swing arm 246 of the first hinge assembly 2 moves in the direction away from the second housing 12, to form the avoidance space 2460 between the sliding end 2462 and the second housing 12.

As shown in FIG. 34A, FIG. 34B, and FIG. 36C, when the second housing 12 and the third housing 13 are in the open state, and the first housing 11 and the second housing 12 are folded relative to each other from the open state to the first closed state through the first hinge assembly 2, the second end 412 of the connector 41 moves in a direction away from the second hinge assembly 3, and the first end 411 of the connector 41 enters the avoidance space 2460.

Figure 36D:
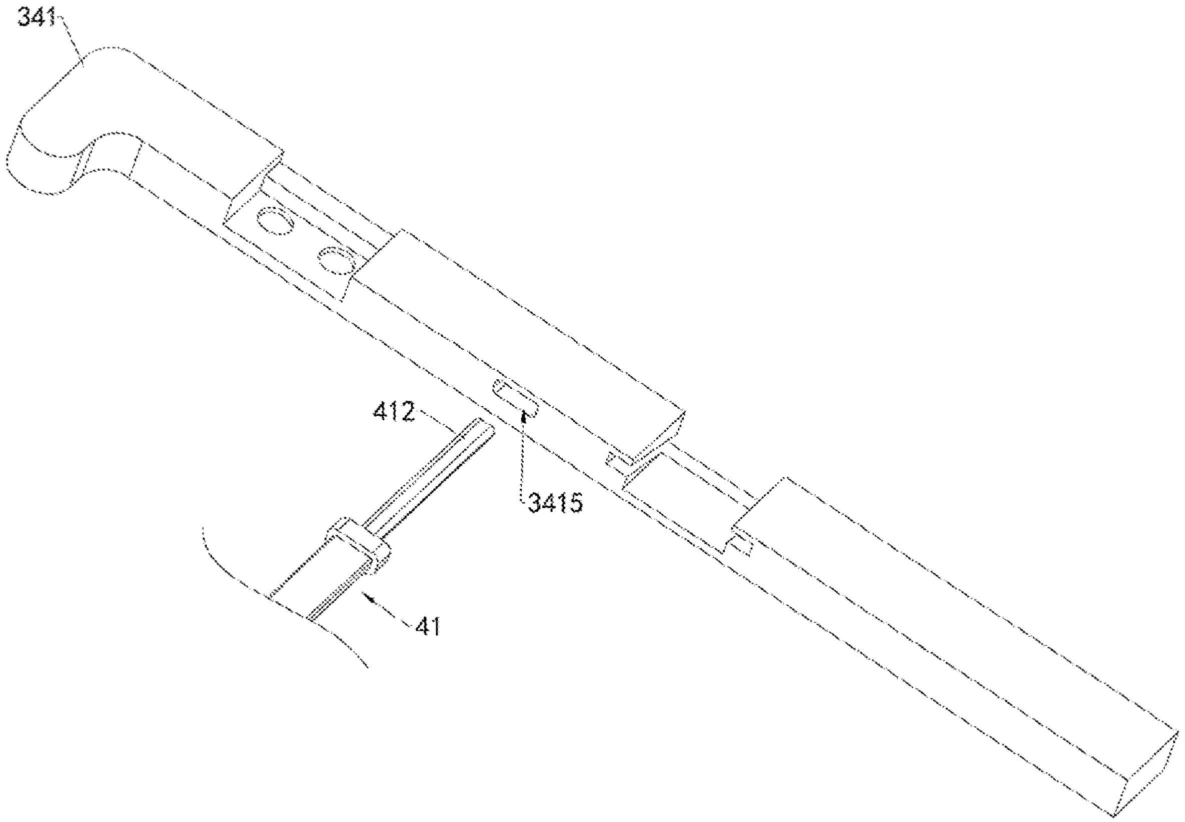
FIG. 36D is a diagram of a structure of a partial structure of a housing apparatus shown in FIG. 33B in a first closed state.
Figure 36E:
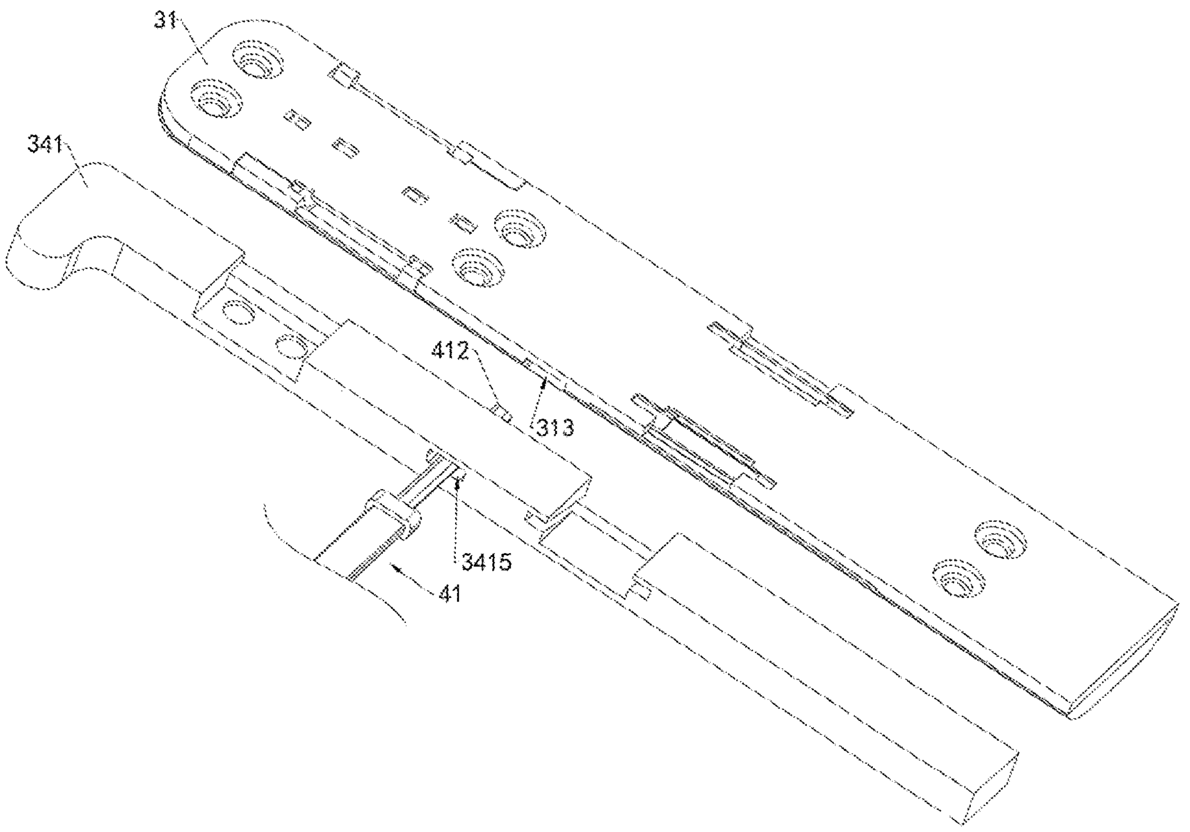
FIG. 36E is a schematic exploded view of a part of the structure shown in FIG. 36D.

Refer to FIG. 36D and FIG. 36E. FIG. 36D is a diagram of a structure of a partial structure of the housing apparatus 100 shown in FIG. 33B in a first closed state. FIG. 36E is a schematic exploded view of a part of the structure shown in FIG. 36D. FIG. 36D shows structures of the first swing arm 245, the damping assembly 247, the second swing arm 246, the second mounting bracket 242, the first end 411 of the connector 41, and the second support part 23.

For example, the second support part 23 may be provided with an avoidance notch 235, and at least a part of the avoidance notch 235 may be disposed opposite to an area between two second sliding slots 2423 of the second mounting bracket 242, to avoid the first end 411 of the connector 41.

Figure 36F:
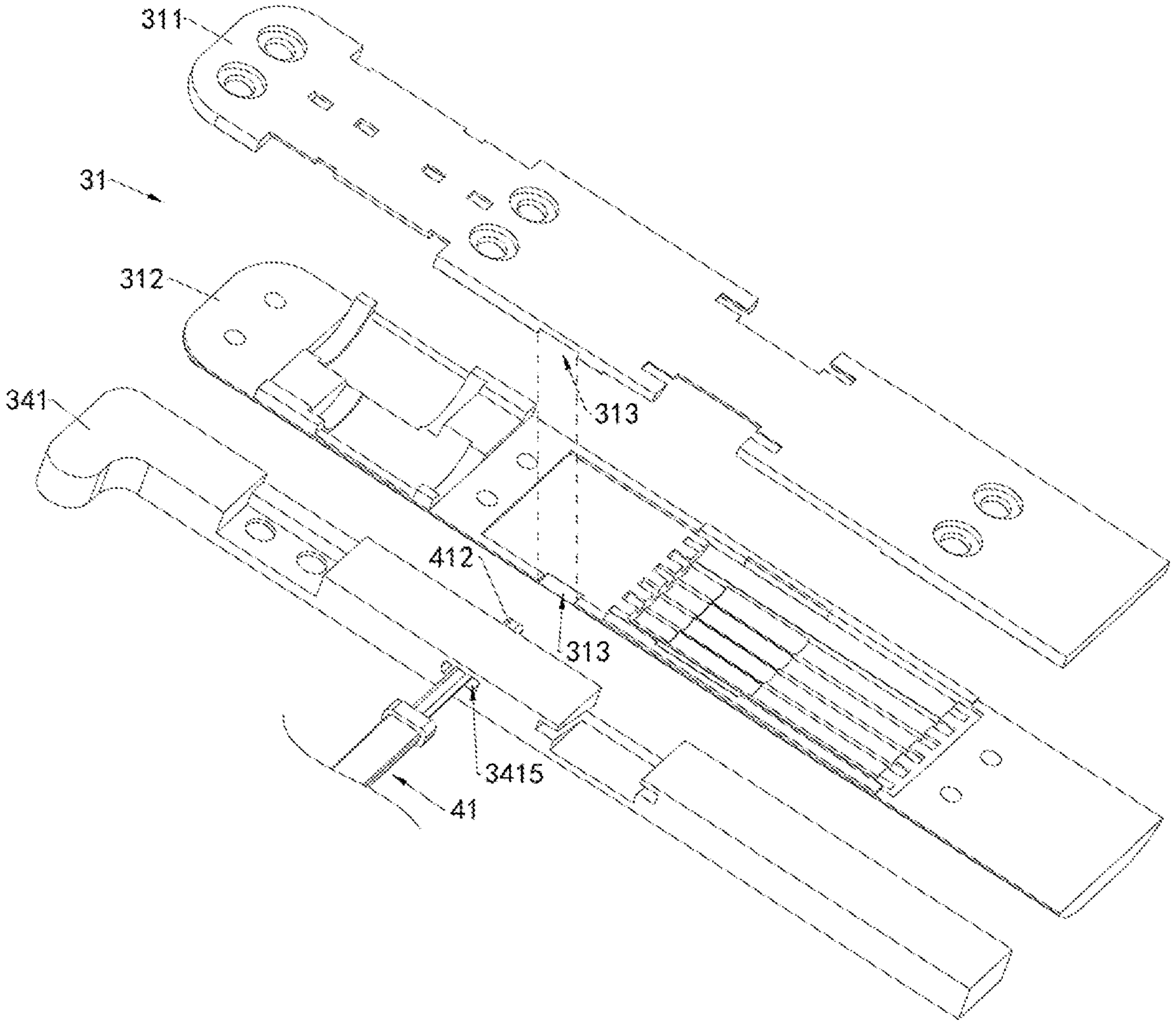
FIG. 36F is a diagram of a partial structure of a housing apparatus shown in FIG. 33B.

FIG. 36F is a diagram of a partial structure of the housing apparatus 100 shown in FIG. 33B. FIG. 36F shows structures of the second end 412 of the connector 41 and the first mounting bracket 341 of the second hinge assembly 3.

The first mounting bracket 341 of the second hinge assembly 3 is provided with a through hole 3415. The second end 412 of the connector 41 can pass through the first mounting bracket 341 through the through hole 3415.

Figure 36G:
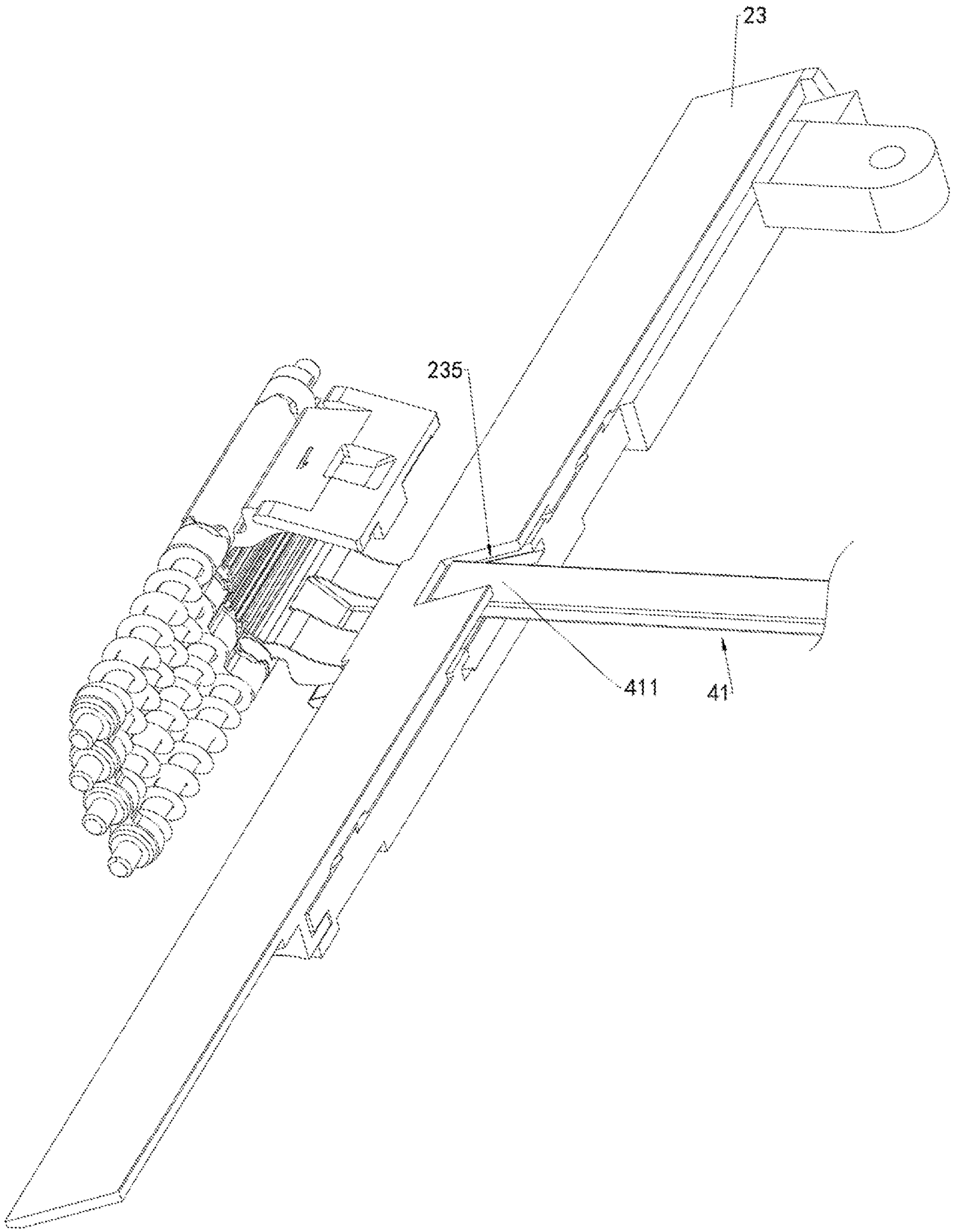
FIG. 36G is a diagram of a partial structure of a housing apparatus shown in FIG. 33B.

Refer to FIG. 36F and FIG. 36G. FIG. 36G is a diagram of a partial structure of the housing apparatus 100 shown in FIG. 33B. FIG. 36G shows structures of the second end 412 of the connector 41, and the first mounting bracket 341 and the main shaft 31 of the second hinge assembly 3.

The main shaft 31 of the second hinge assembly 3 may be provided with a groove 313, and an opening of the groove 313 faces the through hole 3415 of the first mounting bracket 341. For example, the opening of the groove 313 is at least partially disposed opposite to the through hole 3415 of the first mounting bracket 341. The second end 412 of the connector 41 can pass through the first mounting bracket 341 through the through hole 3415, and be inserted into the groove 313, to prevent relative movement between the main shaft 31 and the first mounting bracket 341.

Figure 36H:
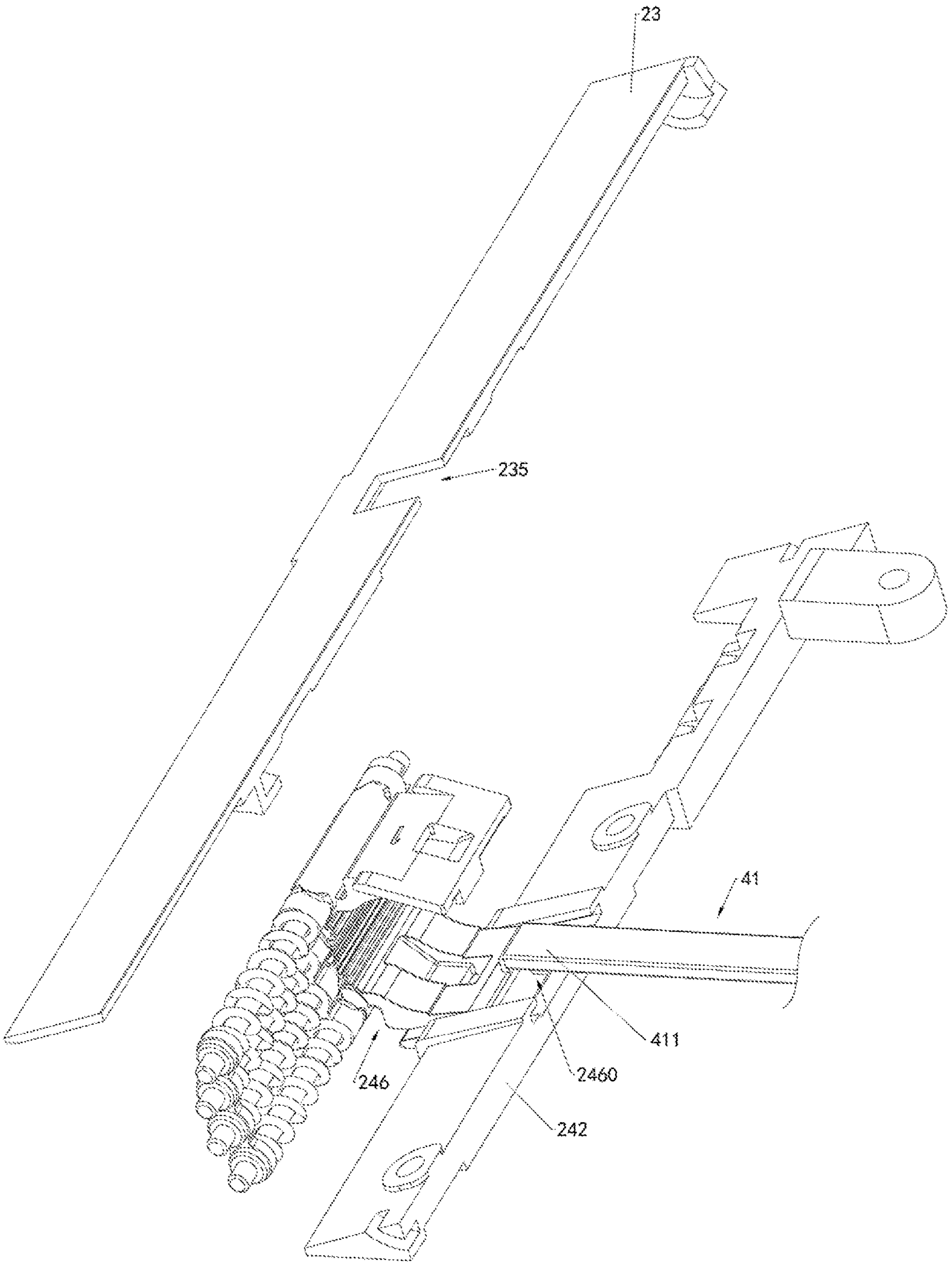
FIG. 36H is a schematic exploded view of a part of the structure shown in FIG. 36G.

Refer to FIG. 36G and FIG. 36H. FIG. 36H is a schematic exploded view of a part of the structure shown in FIG. 36G.

For example, as shown in FIG. 36H, the main shaft 31 includes a main support plate 311 and a cover body 312. The cover body 312 is fastened to the main support plate 311, and a mounting space for mounting the connection assembly is formed between the cover body 312 and the main support plate 311. For structures of the main support plate 311 and the cover body 312 of the main shaft 31 and a connection structure between components, refer to the structures of the main support plate 311 and the cover body 312 that are shown in FIG. 28A and FIG. 28B and the connection structure between components. Details are not described herein again.

The main support plate 311 of the main shaft 31 may be provided with a groove, and one end of the groove of the main support plate 311 extends to a lower surface of the main support plate 311. The cover body 312 may also be provided with a groove, and one end of the groove of the cover body 312 extends to an upper surface of the cover body 312. The groove of the main support plate 311 and the groove of the cover body 312 are disposed opposite to each other, and are combined into the groove 313. For example, the groove of the main support plate 311 and the groove of the cover body 312 may be of a symmetric structure, for example, both are rectangular grooves or hemispherical grooves. In some other embodiments, the groove of the main support plate 311 and the groove of the cover body 312 may alternatively be of an asymmetric structure. For example, the groove of the main support plate 311 may be a rectangular groove, and the groove of the cover body 312 may be a hemispherical groove.

Figure 36I:
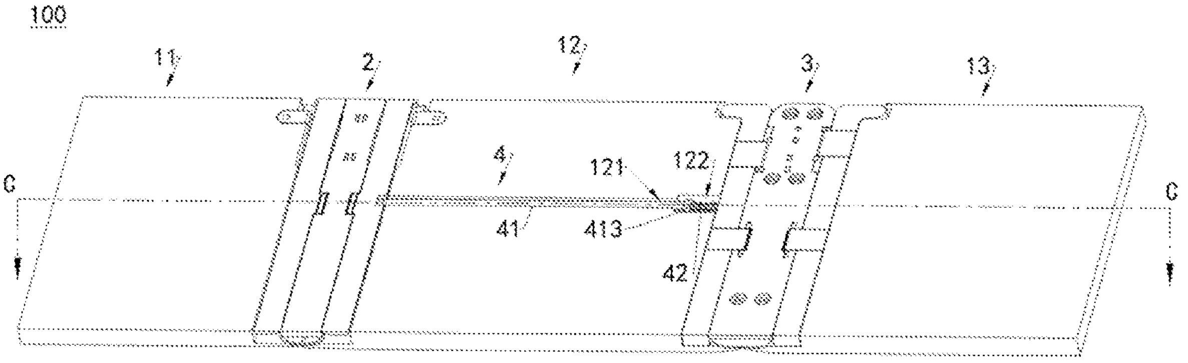
FIG. 36I is a diagram of a structure of a housing apparatus shown in FIG. 2 in some embodiments.
Figure 36J:
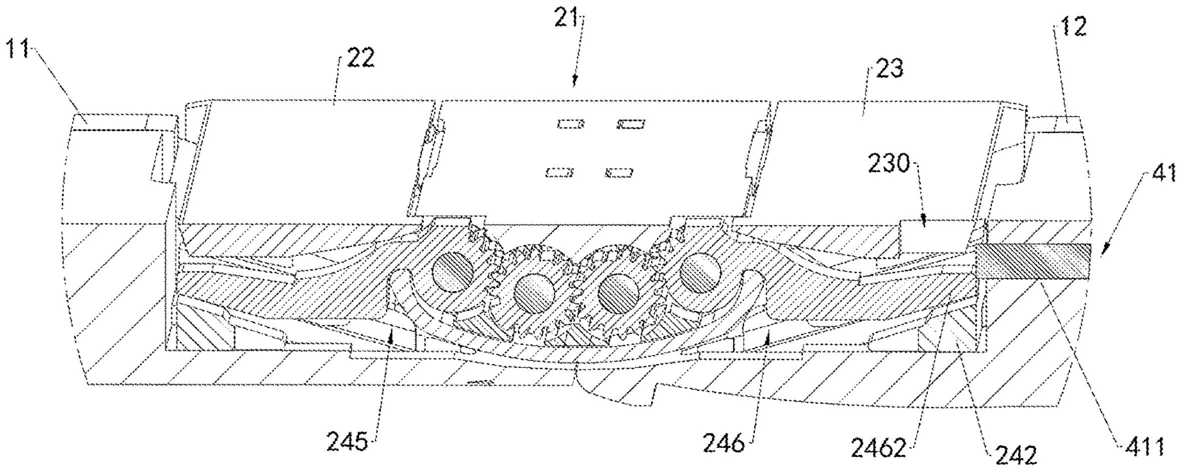
FIG. 36J is a diagram of a partial cross-sectional structure that is of the structure shown in FIG. 36I and that is cut along C-C in Embodiment 1.
Figure 36K:
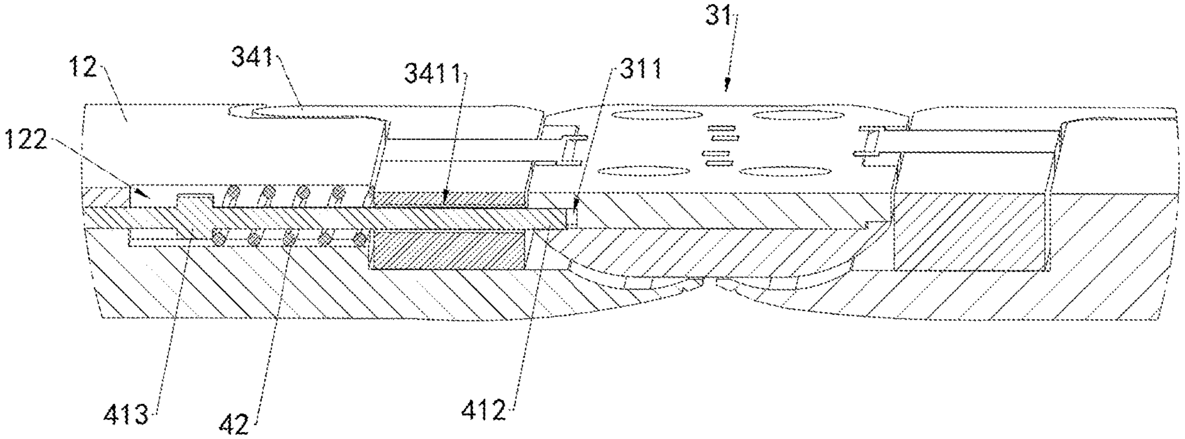
FIG. 36K is a diagram of another partial cross-sectional structure that is of the structure shown in FIG. 36I and that is cut along C-C in Embodiment 1.
Figure 36L:
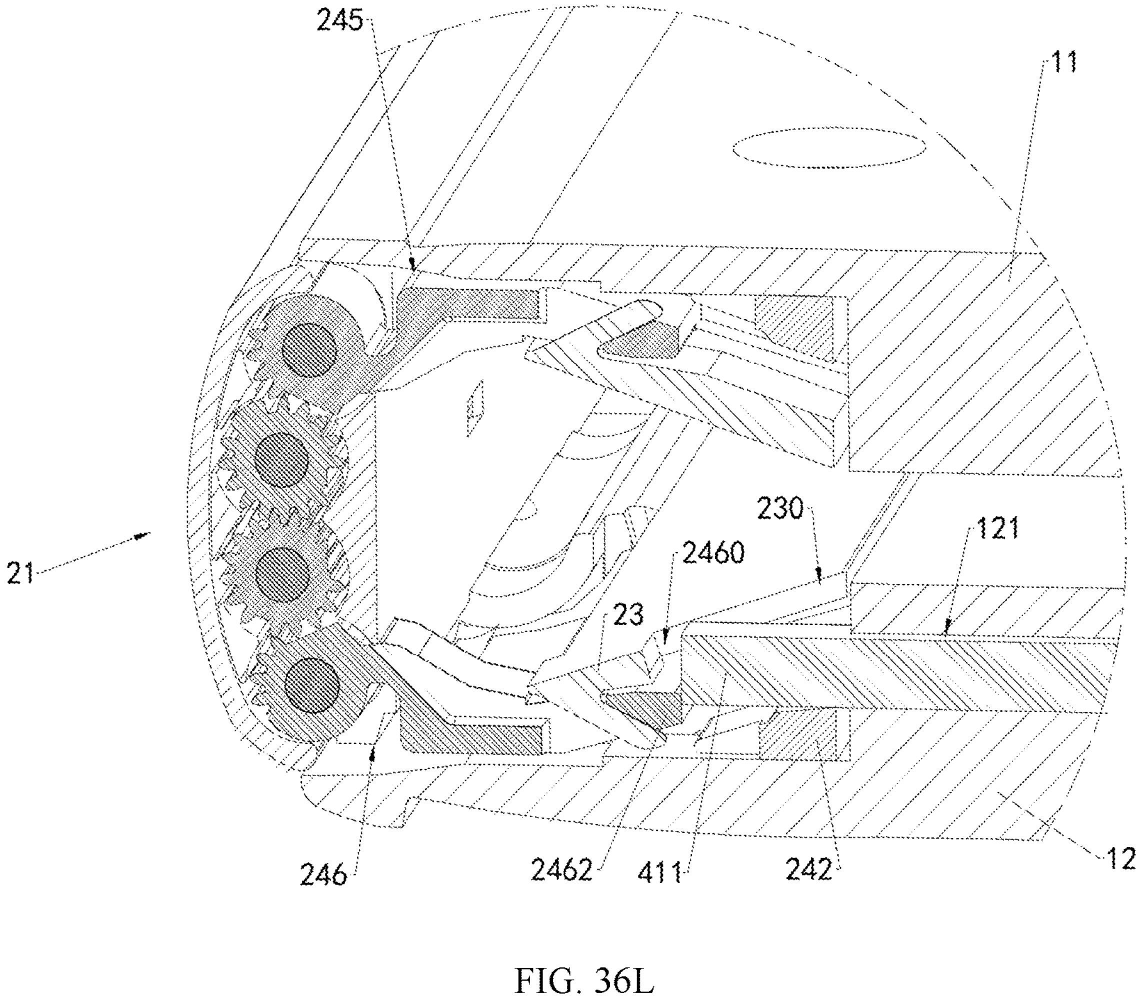
FIG. 36L is a diagram of a structure of the structure shown in FIG. 36J in a first closed state.
Figure 36M:
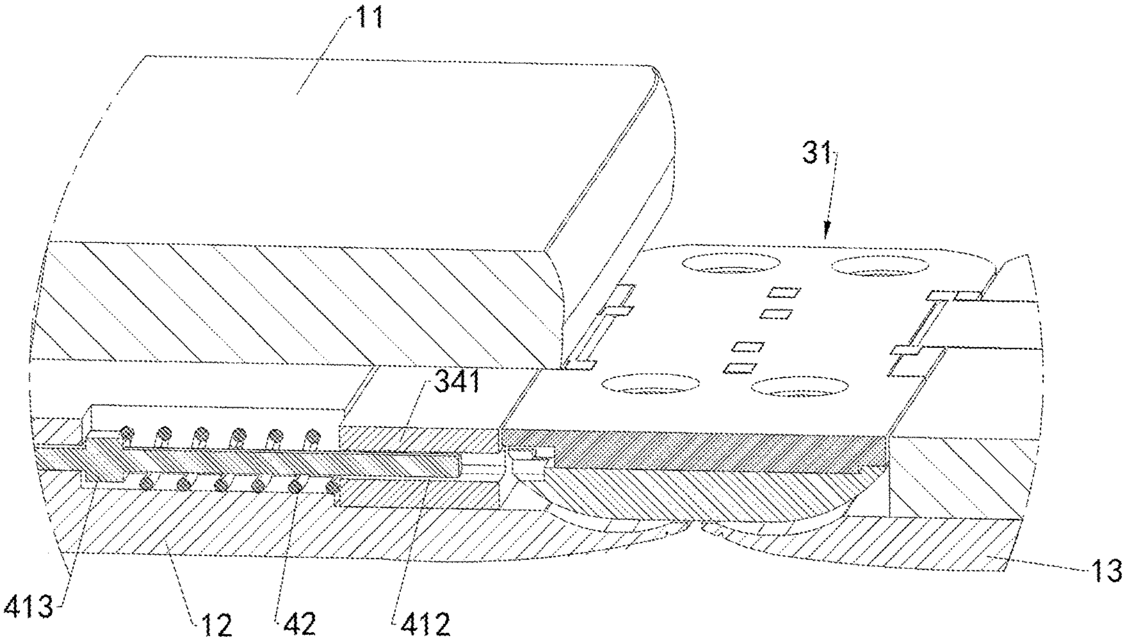
FIG. 36M is a diagram of a structure of the structure shown in FIG. 36K in a first closed state.

Refer to FIG. 36I to FIG. 36M. FIG. 36I is a diagram of a structure of the housing apparatus 100 shown in FIG. 2 in some embodiments. FIG. 36J is a diagram of a partial cross-sectional structure that is of the structure shown in FIG. 36I and that is cut along C-C in Embodiment 1. FIG. 36K is a diagram of another partial cross-sectional structure that is of the structure shown in FIG. 36I and that is cut along C-C in Embodiment 1. FIG. 36L is a diagram of a structure of the structure shown in FIG. 36J in a first closed state. FIG. 36M is a diagram of a structure of the structure shown in FIG. 36K in a first closed state. A cross-sectional structure that is cut at FIG. 36J passes through the first housing 11, the first hinge assembly 2, the second housing 12, and the connection apparatus 4, and a cross-sectional structure that is cut at FIG. 36K passes through the second housing 12, the second hinge assembly 3, the third housing 13, and the connection apparatus 4.

In this application, in an assembly process of the electronic device 1000, two sides of the first hinge assembly 2 may be respectively fastened to the first housing 11 and the second housing 12, and two sides of the second hinge assembly 3 may be respectively fastened to the second housing 12 and the third housing 13. The first mounting bracket 241 of the first hinge assembly 2 may be fastened to the first housing 11 through a fastener or in another manner. The second mounting bracket 242 of the first hinge assembly 2 may be fastened to the second housing 12 through a fastener or in another manner. The first mounting bracket 341 of the second hinge assembly 3 may be fastened to the second housing 12 through a fastener or in another manner. The second mounting bracket 342 of the second hinge assembly 3 may be fastened to the third housing 13 through a fastener or in another manner. As shown in FIG. 36J and FIG. 36L, the first housing 11 and the second housing 12 may be unfolded and folded relative to each other through deformation of the first hinge assembly 2, to switch between the open state and the first closed state. As shown in FIG. 36K and FIG. 36M, the second housing 12 and the third housing 13 may be unfolded and folded relative to each other through deformation of the second hinge assembly 3, to switch between the first closed state and a second closed state.

When the first housing 11 and the second housing 12 are in the open state, and the second housing 12 and the third housing 13 are in the open state, as shown in FIG. 36A and FIG. 36J, the first swing arm 245 and the second swing arm 246 of the first hinge assembly 2 are unfolded relative to the main shaft 21, and the first end 411 of the connector 41 abuts against the sliding end 2462 of the second swing arm 246 of the first hinge assembly 2. As shown in FIG. 36A and FIG. 36K, the second end 412 of the connector 41 passes through the first mounting bracket 341 of the second hinge assembly 3 and is clamped into the main shaft 31, to prevent relative movement between the first mounting bracket 341 and the main shaft 31 of the second hinge assembly 3, and prevent movement of the second hinge assembly 3. In this case, the second hinge assembly 3 is in a locked state, which prevents the second housing 12 and the third housing 13 from being folded relative to the second hinge assembly 3.

In this embodiment, the first swing arm 345 and the second swing arm 346 are driven by the damping assembly 347 to rotate synchronously relative to the main shaft 31. When the second end 412 of the connector 41 prevents relative movement between the first mounting bracket 341 and the main shaft 31 of the second hinge assembly 3, the second swing arm 346 is prevented from rotating relative to the main shaft 31, and the second mounting bracket 342 and the third housing 13 are prevented from rotating relative to the main shaft 31, that is, the second hinge assembly 3 is prevented from moving, and the second housing 12 and the third housing 13 are prevented from being folded relative to the second hinge assembly 3.

As shown in FIG. 36A, FIG. 36B, FIG. 36J, and FIG. 36L, when the second housing 12 and the third housing 13 are in the open state, and the first housing 11 and the second housing 12 are folded relative to each other from the open state to the first closed state through the first hinge assembly 2, the first swing arm 245 and the second swing arm 246 rotate synchronously relative to the main shaft 21. In addition, the sliding end 2462 of the second swing arm 246 slides in a direction away from the second housing 12 relative to the second mounting bracket 242, to reserve an avoidance space 2460 between the sliding end 2462 of the second swing arm 246 and the second housing 12. The first end 411 of the connector 41 moves in a direction away from the second housing 12, and enters the avoidance space 2460.

As shown in FIG. 36K and FIG. 36M, when the second housing 12 and the third housing 13 are in the open state, and the first housing 11 and the second housing 12 are folded relative to each other from the open state to the first closed state through the first hinge assembly 2, the driving piece 42 pushes the connector 41 to move in a direction away from the second hinge assembly 3, the second end 412 of the connector 41 moves in a direction away from the second housing 12 along with the first end 411 of the connector 41, and the second end 412 of the connector 41 moves in the direction away from the second hinge assembly 3.

As shown in FIG. 36M, when the first housing 11 and the second housing 12 are in the first closed state, there is a distance between the second end 412 of the connector 41 and the main shaft 31, and the first mounting bracket 341 of the second hinge assembly 3 can move relative to the main shaft 31, that is, the second housing 12 and the third housing 13 can move relative to the second hinge assembly 3.

In conclusion, when the second housing 12 and the third housing 13 are in the open state, and the first housing 11 and the second housing 12 are folded relative to each other from the open state to the first closed state through the first hinge assembly 2, the first swing arm 245 and the second swing arm 246 of the first hinge assembly 2 are folded relative to the main shaft 21, the sliding end 2462 of the second swing arm 246 slides in a direction away from the second housing 12 relative to the second mounting bracket 242, to reserve the avoidance space 2460 between the sliding end 2462 and the second mounting bracket 242, and the first end 411 of the connector 41 enters the avoidance space 2460. The driving piece 42 pushes the connector 41 to move in the direction away from the second hinge assembly 3, and leaves the main shaft 31.

In the process, contrary to the process in which the second housing 12 and the third housing 13 are in the open state, and the first housing 11 and the second housing 12 are folded relative to each other from the open state to the first closed state through the first hinge assembly 2, in which the second housing 12 and the third housing 13 are in the open state, and the first housing 11 and the second housing 12 are unfolded relative to each other from the first closed state to the open state through the first hinge assembly 2, the first swing arm 245 and the second swing arm 246 of the first hinge assembly 2 are unfolded relative to the main shaft 21, the sliding end 2462 of the second swing arm 246 slides relative to the second mounting bracket 242 in a direction close to the second housing 12, and is in contact with and pushes the connector 41 to slide in a direction close to the second hinge assembly 3, that is, the second end 412 of the connector 41 moves in a direction close to the second hinge assembly 3, so that the second end 412 of the connector 41 passes through the first mounting bracket 341 of the second hinge assembly 3 and is clamped into the main shaft 31, that is, the second end 412 of the connector 41 is connected between the second housing 12 and the second hinge assembly 3. For example, when the first housing 11 and the second housing 12 are in the first closed state, the sliding end 2462 of the second swing arm 246 may be in contact with the connector 41, or may be at a distance from the connector 41. This is not limited in this application.

For example, as shown in FIG. 36J and FIG. 36L, an opening of the through hole 3415 of the first mounting bracket 341 faces an accommodating groove 122 of the second housing 12. When the first housing 11 and the second housing 12 are in the open state, and the second housing 12 and the third housing 13 are in the open state, the second end 412 of the connector 41 passes through the first mounting bracket 341 of the second hinge assembly 3 through the through hole 3415, and is inserted into the groove 313, to fasten the first mounting bracket 341 to the main shaft 31 of the second hinge assembly 3.

When the second housing 12 and the third housing 13 are in the open state, and the first housing 11 and the second housing 12 are folded relative to each other from the open state to the first closed state through the first hinge assembly 2, the second end 412 of the connector 41 moves in the direction away from the groove 313. When the first housing 11 and the second housing 12 are in the first closed state, the second end 412 of the connector 41 leaves the groove 313, and the first mounting bracket 341 and the main shaft 31 of the second hinge assembly 3 can move relative to each other.

On the contrary, when the second housing 12 and the third housing 13 are in the open state, and the first housing 11 and the second housing 12 are unfolded from the first closed state to the open state, the second end 412 of the connector 41 moves in a direction close to the groove 313, the second end 412 of the connector 41 can be inserted into the through hole 3415 of the first mounting bracket 341 from an accommodating groove 122 of the second housing 12, and is inserted into the groove 313 of the main shaft 31 through the through hole 3415 of the first mounting bracket 341, to prevent movement of the second hinge assembly 3, and prevent the second housing 12 and the third housing 13 from being folded relative to the second hinge assembly 3.

For example, as shown in FIG. 36D, FIG. 36E, and FIG. 36L, a side of the avoidance notch 235 of the second support part 23 extends to an end face that is of the second support part 23 and that faces the second housing 12, to provide an avoidance space when the first end 411 of the connector 41 moves away from the second housing 12. When the first housing 11 and the second housing 12 are in the first closed state, the avoidance notch 235 may communicate with the avoidance space 2460 between the two second sliding slots 2423 of the second mounting bracket 242, to expand the avoidance space 2460, so as to avoid the first end 411 of the connector 41.

For example, the first hinge assembly 2 includes a first moving member 20, the second hinge assembly 3 includes a second moving member 30, and the first end 411 of the connection apparatus 4 is connected to the first moving member 20 of the first hinge assembly 2.

Refer to FIG. 33D and FIG. 34B. When the first housing 11 and the second housing 12 are in the open state, and the second housing 12 and the third housing 13 are in the open state, the second end 412 of the connector 41 is connected between the second housing 12 and the second moving member 30 of the second hinge assembly 3, to prevent the second housing 12 and the third housing 13 from being folded relative to the second hinge assembly 3. When the second housing 12 and the third housing 13 are in the open state, and the first housing 11 and the second housing 12 are folded relative to each other from the open state to the first closed state through the first hinge assembly 2, the first moving member 20 of the first hinge assembly 2 moves in a direction away from the second housing 12, to form an avoidance space 2460 between the first moving member 20 and the second housing 12. The first end 411 of the connector 41 enters the avoidance space 2460, and the second end 412 of the connector 41 moves in a direction away from the second moving member 30 of the second hinge assembly 3, so that the second housing 12 and the third housing 13 can be folded relative to the second hinge assembly 3.

On the contrary, when the second housing 12 and the third housing 13 are in the open state, and the first housing 11 and the second housing 12 are unfolded from the first closed state to the open state through the first hinge assembly 2, the first moving member 20 of the first hinge assembly 2 moves in a direction close to the second housing 12, and pushes the first end 411 of the connector 41 to move in a direction away from the first hinge assembly 2, and the second end 412 of the connector 41 moves in a direction close to the second moving member 30 of the second hinge assembly 3.

Refer to FIG. 33D, FIG. 34B, FIG. 36J, and FIG. 36L. In this embodiment, the first moving member 20 of the first hinge assembly 2 may include the second swing arm 246.

When the first housing 11 and the second housing 12 are in the open state, the first end 411 of the connector 41 is close to the sliding end 2462 of the second swing arm 246 of the first hinge assembly 2.

When the second housing 12 and the third housing 13 are in the open state, and the first housing 11 and the second housing 12 are folded relative to each other from the open state to the first closed state through the first hinge assembly 2, the first swing arm 245 and the second swing arm 246 of the first hinge assembly 2 are folded relative to each other, the sliding end 2462 of the second swing arm 246 of the first hinge assembly 2 moves in the direction away from the second housing 12, to form the avoidance space 2460 between the sliding end 2462 of the second swing arm 246 and the second housing 12, so that the first end 411 of the connector 41 can move in a direction away from the second housing 12.

On the contrary, when the second housing 12 and the third housing 13 are in the open state, and the first housing 11 and the second housing 12 are unfolded from the first closed state to the open state through the first hinge assembly 2, the first swing arm 245 and the second swing arm 246 of the first hinge assembly 2 are unfolded relative to each other, and the sliding end 2462 of the second swing arm 246 of the first hinge assembly 2 moves in a direction close to the second housing 12, and pushes the first end 411 of the connector 41 to move in a direction away from the first hinge assembly 2.

As shown in FIG. 33D and FIG. 34B, in some other embodiments, the second swing arm 246 may further have another structure. For example, a connection structure may be disposed between the second swing arm 246 and the first swing arm 245, so that the second swing arm 246 can move with the first swing arm 245 relative to the second housing 12 (the second housing 12). In some other embodiments, the first moving member 20 may include one or more structures of the main shaft 21, the first swing arm 245, the first mounting bracket 241, and the first housing 11. This is not limited in this application. When the second housing 12 and the third housing 13 are in the open state, and the first housing 11 and the second housing 12 are folded relative to each other from the open state to the first closed state through the first hinge assembly 2, the main shaft 21, the first swing arm 245, the first mounting bracket 241, the first housing 11, and the like can move in a direction away from the second housing 12.

Refer to FIG. 33D, FIG. 34B, FIG. 36K, and FIG. 36M. The first mounting bracket 341 is fastened to the second housing 12, and the second mounting bracket 342 is fastened to the third housing 13. In this embodiment, the second moving member 30 of the second hinge assembly 3 may include the main shaft 31. When the first housing 11 and the second housing 12 are in the open state, and the second housing 12 and the third housing 13 are in the open state, the first mounting bracket 341 and the second mounting bracket 342 of the second hinge assembly 3 are unfolded relative to each other, and the first mounting bracket 341 is fastened to the main shaft 31 of the second hinge assembly 3 through the second end 412 of the connector 41.

When the second housing 12 and the third housing 13 are in the open state, and the first housing 11 and the second housing 12 are folded relative to each other from the open state to the first closed state, the second end 412 of the connector 41 moves in the direction away from the main shaft 31 of the second hinge assembly 3. When the first housing 11 and the second housing 12 are in the first closed state, the first mounting bracket 341 and the main shaft 31 of the second hinge assembly 3 are capable of moving relative to each other.

On the contrary, when the second housing 12 and the third housing 13 are in the open state, and the first housing 11 and the second housing 12 are unfolded from the first closed state to the open state, the second end 412 of the connector 41 moves in a direction close to the main shaft 31 of the second hinge assembly 3, so that the second end 412 of the connector 41 is fastened to the first mounting bracket 341 and the main shaft 31 of the second hinge assembly 3.

As shown in FIG. 33D and FIG. 34B, in some other embodiments, the second moving member 30 may further include the first swing arm 345. In this embodiment, when the first housing 11 and the second housing 12 are in the open state, and the second housing 12 and the third housing 13 are in the open state, the second end 412 of the connector 41 may alternatively be clamped into the first swing arm 345, to prevent the first swing arm 345 from sliding relative to the first mounting bracket 341, so as to prevent the second housing 12 and the third housing 13 from being folded relative to the second hinge assembly 3. In some other embodiments, the second moving member 30 of the second hinge assembly 3 may further include another structure. When the first housing 11 and the second housing 12 are in the first closed state, and the second housing 12 and the third housing 13 are folded relative to each other from the open state to the second closed state through the second hinge assembly 3, another structure can move relative to the second housing 12 (the second housing 12). This is not limited in this application.

For example, the connector 41 may be further provided with a limiting member (not shown in the figure), and the limiting member is configured to limit a moving distance of the connector 41 relative to the second hinge assembly 3. A structure of the limiting member is not limited in this application.

In this application, the driving piece 42 may have a plurality of implementations. The following describes a structure of the driving piece 42 as an example.

Figure 37:
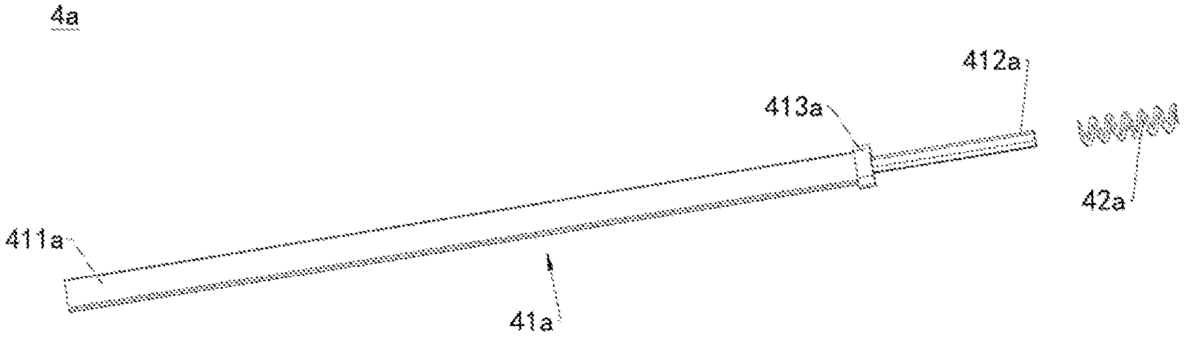
FIG. 37 is a diagram of an exploded structure of a connection apparatus shown in FIG. 33A in Embodiment 1.
Figure 38:
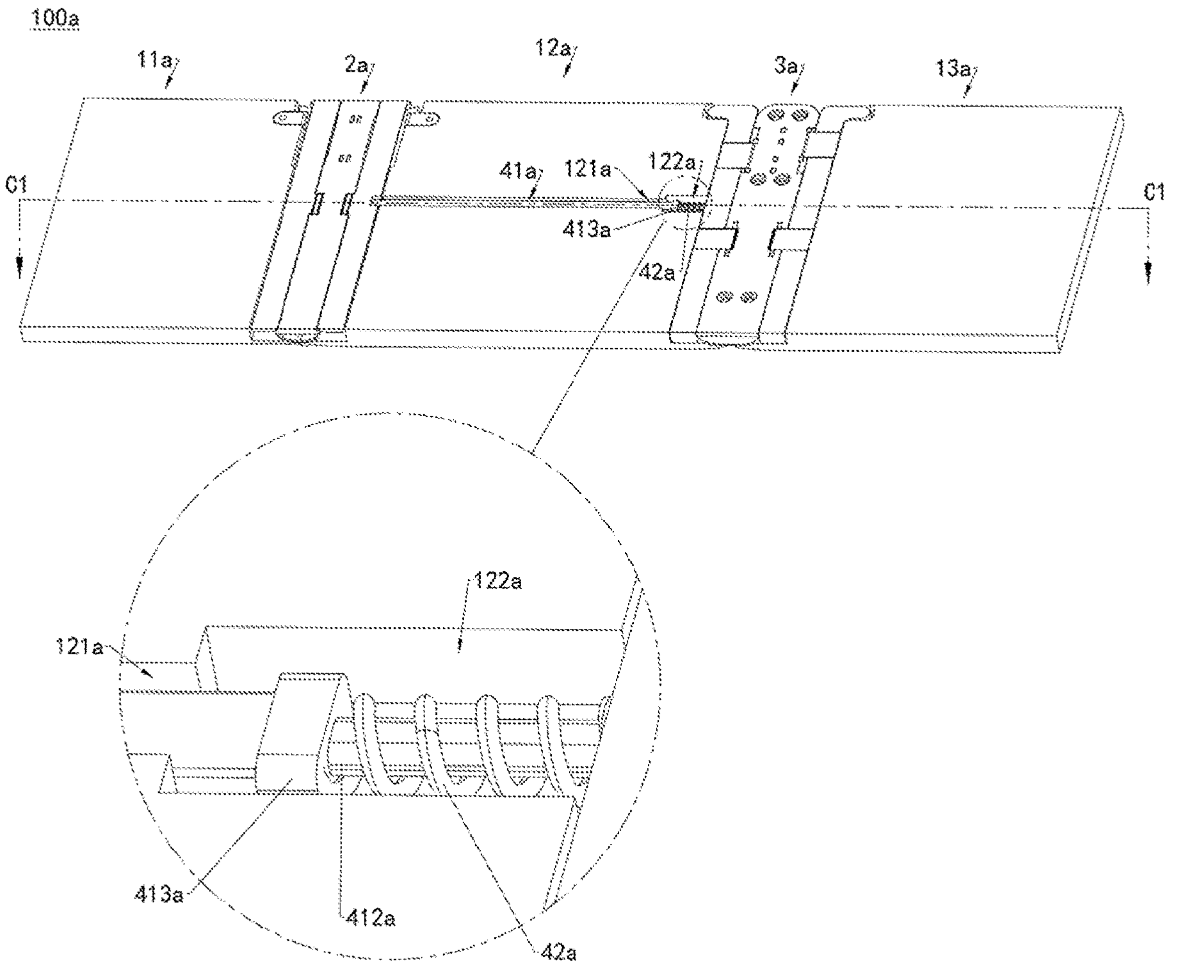
FIG. 38 is a diagram of a structure of a housing apparatus shown in FIG. 2 in Embodiment 1.

Refer to FIG. 37 and FIG. 38. FIG. 37 is a diagram of an exploded structure of the connection apparatus 4 shown in FIG. 33A in Embodiment 1. FIG. 38 is a diagram of a structure of the housing apparatus 100 shown in FIG. 2 in Embodiment 1. In Embodiment 1, for structures of a first housing 11*a*, a first hinge assembly 2*a*, a second housing 12*a*, a second hinge assembly 3*a*, a third housing 13*a*, and a connector 41*a* of a housing apparatus 100*a* of an electronic device 1000*a* and connection structures between components, refer to structures of the first housing 11, the first hinge assembly 2, the second housing 12, the second hinge assembly 3, the third housing 13, and the connector 41 of the electronic device 1000 shown in FIG. 36A to FIG. 36M and connection structures between components. Details are not described herein again.

The following describes only a structure of a driving piece 42*a*, a connection structure between the driving piece 42*a* and another structure, and a difference between the driving piece 42*a* and the connector 41*a*.

In Embodiment 1, the connector 41*a* may be provided with a limiting flange 413*a*, and an outer diameter of the limiting flange 413*a* is greater than an outer diameter of a main body part of the connector 41*a*. For example, the driving piece 42*a* may be sleeved on the connector 41*a*, and is located on a side that is of the limiting flange 413*a* and that is close to a second end 412*a* of the connector 41*a*. The driving piece 42*a* may be located between the limiting flange 413*a* and the second end 412*a* of the connector 41*a*. The driving piece 42*a* may be pushed by the limiting flange 413*a* to move relative to the connector 41*a*. In some other embodiments, the driving piece 42*a* may alternatively be located on a side that is of the limiting flange 413*a* and that is close to the first end 411*a*, and the driving piece 42*a* may be located between the limiting flange 413*a* and the first end 411*a* of the connector 41*a*.

For example, the second housing 12*a* may further be provided with an accommodating groove 122*a*, and the accommodating groove 122*a* communicates with a sliding slot 121*a*. The limiting flange 413*a* may be mounted in the accommodating groove 122*a*. One end of the driving piece 42*a* may be connected to the limiting flange 413*a*, and the other end of the driving piece 42*a* may be connected to a groove wall of the accommodating groove 122*a*. The accommodating groove 122*a* may be located at an end part that is of the second housing 12*a* and that is close to the second hinge assembly 3*a*, or may be located in a middle part of the second housing 12*a*.

For example, the driving piece 42*a* may be an elastic piece, for example, a spring or another structure that can be elastically deformed. The driving piece 42*a* (the elastic piece) is disposed at a second end of the connector 41*a*, one end of the driving piece 42*a* abuts against the connector 41*a*, and the other end of the driving piece 42*a* abuts against the second hinge assembly 3*a*.

Figure 39A:
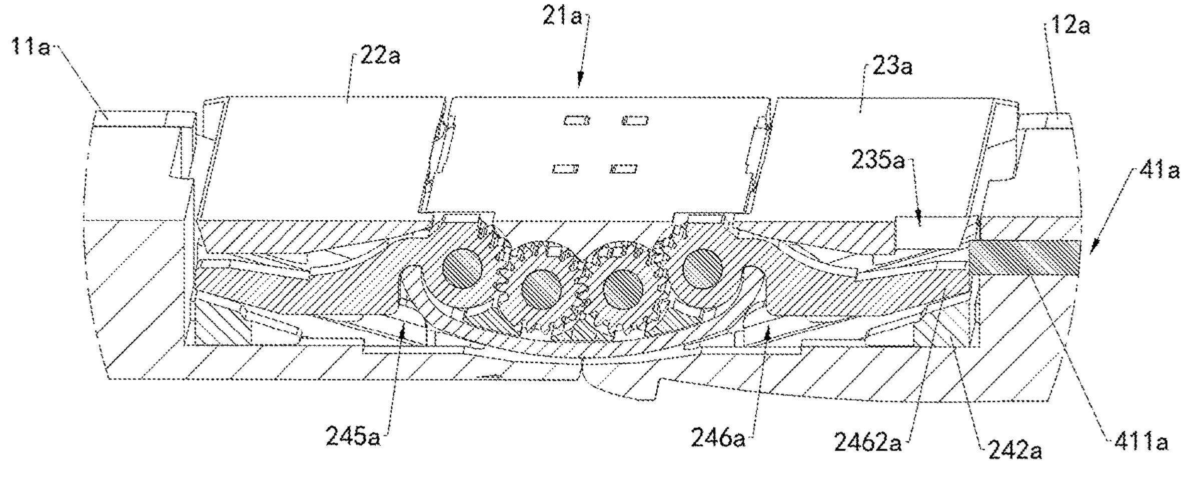
FIG. 39A is a diagram of a partial cross-sectional structure that is of the structure shown in FIG. 38 and that is cut along C1-C1 in Embodiment 1.
Figure 39B:
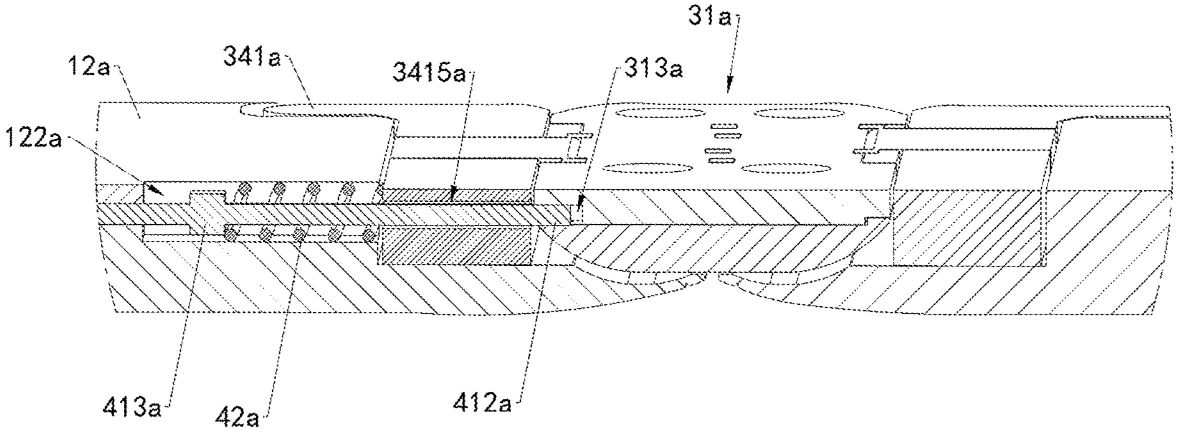
FIG. 39B is a diagram of another partial cross-sectional structure that is of the structure shown in FIG. 38 and that is cut along C1-C1 in Embodiment 1.
Figure 39C:
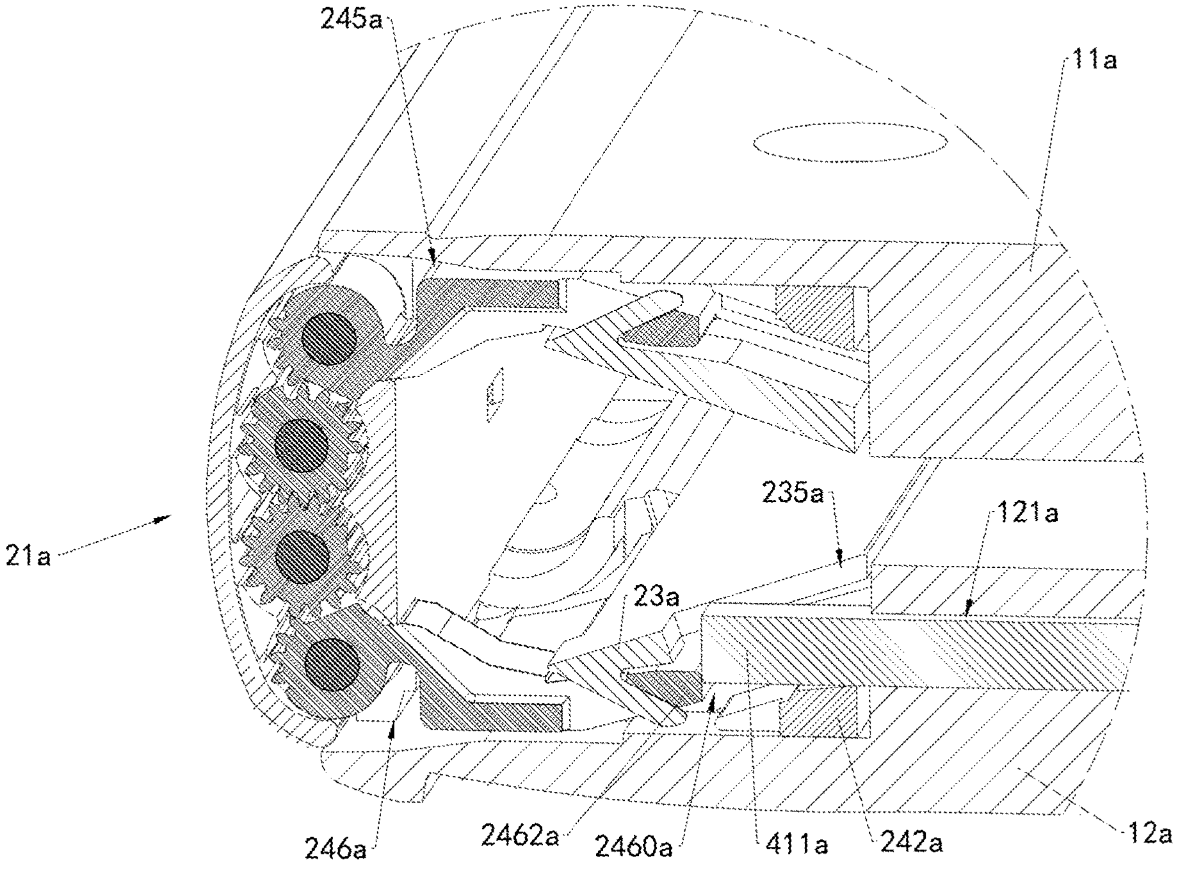
FIG. 39C is a diagram of a structure of the structure shown in FIG. 39A in a first closed state.
Figure 39D:
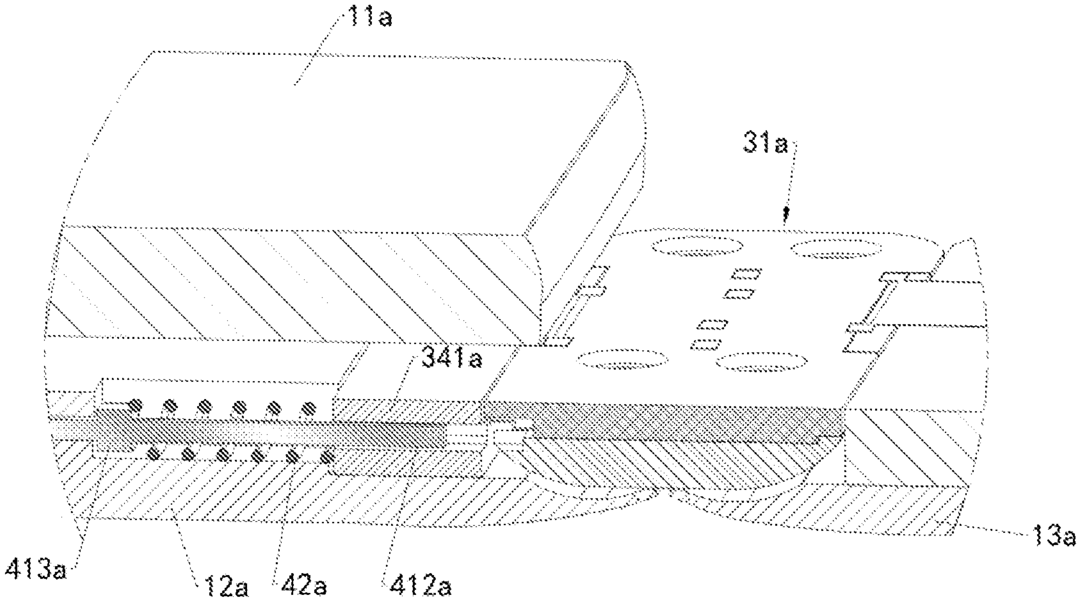
FIG. 39D is a diagram of a structure of the structure shown in FIG. 39B in a first closed state.

Refer to FIG. 39A to FIG. 39D. FIG. 39A is a diagram of a partial cross-sectional structure that is of the structure shown in FIG. 38 and that is cut along C1-C1 in Embodiment 1. FIG. 39B is a diagram of another partial cross-sectional structure that is of the structure shown in FIG. 38 and that is cut along C1-C1 in Embodiment 1. FIG. 39C is a diagram of a structure of the structure shown in FIG. 39A is in a first closed state. FIG. 39D is diagram of a structure of the structure shown in FIG. 39B is in a first closed state. A cross-sectional structure that is cut at FIG. 39A passes through the first housing 11*a*, the first hinge assembly 2*a*, the second housing 12*a*, and the connection apparatus 4*a*, and a cross-sectional structure that is cut at FIG. 39B passes through the second housing 12*a*, the second hinge assembly 3*a*, the third housing 13*a*, and the connection apparatus 4*a*.

When the second housing 12*a* and the third housing 13*a* are in an open state, and the first housing 11*a* and the second housing 12*a* are in an open state, as shown in FIG. 38 and FIG. 39B, the limiting flange 413*a* of the connector 41*a* squeezes the driving piece 42*a*, two ends of the driving piece 42*a* abut against the limiting flange 413*a* of the connector 41*a* and the first mounting bracket 341*a* of the second hinge assembly 3*a* respectively, the driving piece 42*a* is in a compressed state, and the second end 412*a* of the connector 41*a* passes through the first mounting bracket 341*a* of the second hinge assembly 3*a* and is clamped into the main shaft 31*a*, to prevent the second housing 12*a* and the third housing 13*a* from being folded relative to the second hinge assembly 3*a*.

As shown in FIG. 39D, when the second housing 12*a* and the third housing 13*a* are in the open state, and the first housing 11*a* and the second housing 12*a* are folded relative to each other from the open state to the first closed state through the first hinge assembly 2*a*, the driving piece 42*a* changes from the compressed state to a stretched state, to generate push force. The limiting flange 413*a* moves in a direction close to the first hinge assembly 2*a* under an action of the push force, so that the connector 41*a* moves in a direction away from the second hinge assembly 3*a* under an action of the push force, and leaves the main shaft 31*a*. The second end 412*a* of the connector 41*a* leaves the main shaft 31*a*. It may be understood that, when the driving piece 42*a* is not elastically deformed or is elastically deformed slightly, it may be considered that the driving piece 42*a* is in the stretched state. After being squeezed, the driving piece 42*a* in the stretched state changes to be in the compressed state, that is, the driving piece 42*a* in the compressed state is elastically deformed relative to the driving piece 42*a* in the stretched state, or elastic deformation amount of the driving piece 42*a* in the compressed state is greater than elastic deformation amount of the driving piece 42*a* in the stretched state.

On the contrary, when the second housing 12*a* and the third housing 13*a* are in the open state, and the first housing 11*a* and the second housing 12*a* are unfolded from the first closed state to the open state through the first hinge assembly 2*a*, the sliding end 2462*a* of the second swing arm 246*a* slides in a direction close to the second housing 12*a* relative to the second mounting bracket 242*a*, is in contact with and pushes the connector 41*a* to slide in a direction close to the second hinge assembly 3*a*, and the limiting flange 413*a* of the connector 41*a* squeezes the driving piece 42*a*, so that the driving piece 42*a* is in the compressed state.

Figure 40:
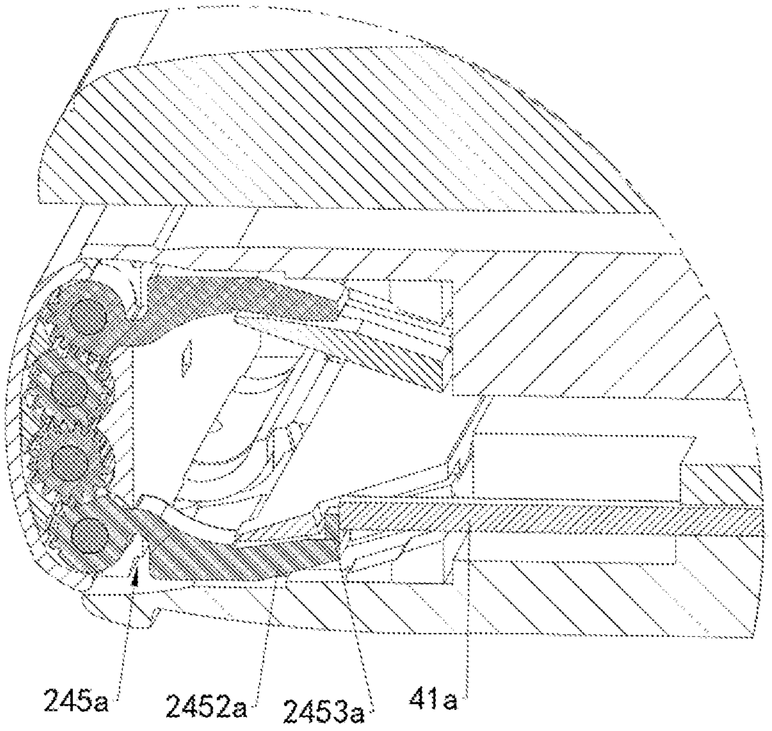
FIG. 40 is a diagram of the structure in FIG. 39C in some other embodiments.

FIG. 40 is a diagram of the structure in FIG. 39C in some other embodiments.

For example, the second swing arm 246*a* may be provided with a bump 2453*a*. The bump 2453*a* is fastened to the sliding end 2462*a*. A cross-sectional area of the bump 2453*a* may be greater than a cross-sectional area of the sliding end 2462*a*, to increase a contact area between the second swing arm 246*a* and the connector 41*a*, so that the sliding end 2462*a* of the second swing arm 246*a* pushes the connector 41*a*. It may be understood that a cross section of the structure of the second swing arm 246*a* in an extension direction perpendicular to the second swing arm 246*a* is a cross section of the structure of the second swing arm 246*a*.

In some other embodiments, the driving piece 42*a* may further include a first magnetic piece (not shown in the figure) and a second magnetic piece (not shown in the figure). The first magnetic piece and the second magnetic piece are respectively fastened to the sliding end 2462*a* of the second swing arm 246*a* and the first end 411*a* of the connector 41*a*. In this embodiment, attraction force may exist between the first magnetic piece and the second magnetic piece, that is, a magnetic pole that is of the first magnetic piece and that is close to the second magnetic piece and a magnetic pole that is of the second magnetic piece and that is close to the first magnetic piece are opposite in polarity. For example, an end that is of the first magnetic piece and that is close to the second magnetic piece is an N pole, and an end that is of the second magnetic piece and that is close to the first magnetic piece 421*a* is an S pole. It may be understood that the magnetic piece may also be referred to as a magnet, and is a substance or material that can generate a magnetic field. The magnetic piece may include a permanent magnet and a soft magnet. The permanent magnet can maintain magnetism for a long time, and is not easily demagnetized or magnetized. For example, the permanent magnet may include an alloy permanent magnet material, a ferrite permanent magnet material, and the like. The alloy permanent magnet material may include an alloy such as neodymium, iron, and boron ($Nd2Fe14B$), samarium cobalt (SmCo), or aluminum nickel cobalt (AlNiCo). A polarity of the soft magnet varies with a polarity of an added magnetic field, and the soft magnet may be used as a magnetizer and an electromagnet. For example, the soft magnet may include a ferro-silicon alloy (a silicon steel sheet), a soft magnetic ferrite material, iron, cobalt, nickel, and an alloy of iron, cobalt, and nickel. In this application, both the first magnetic piece and the second magnetic piece may be permanent magnets. Alternatively, one of the first magnetic piece and the second magnetic piece may be a permanent magnet, which can maintain magnetism for a long time, and the other may be a soft magnet, which can be magnetized by a permanent magnet. This is not limited in this application.

In some other embodiments, the driving piece 42*a* may further include a first magnetic piece and a second magnetic piece. The first magnetic piece may be fastened to the first mounting bracket 341*a* of the second hinge assembly 3*a* and/or the main shaft 31*a* of the second hinge assembly 3*a*, and the second magnetic piece may be fastened to the second end 412*a* of the connector 41*a*. In this embodiment, repulsion force may alternatively exist between the first magnetic piece and the second magnetic piece, that is, a magnetic pole that is of the first magnetic piece and that is close to the second magnetic piece and a magnetic pole that is of the second magnetic piece and that is close to the first magnetic piece are the same in polarity. For example, an end that is of the first magnetic piece and that is close to the second magnetic piece is an N pole, and an end that is of the second magnetic piece and that is close to the first magnetic piece 421*a* is also an N pole.

In still some embodiments, the driving piece 42*a* may further include a first magnetic piece, a second magnetic piece, a third magnetic piece (not shown in the figure), and a fourth magnetic piece (not shown in the figure). The first magnetic piece and the second magnetic piece may be respectively fastened to the sliding end 2462*a* of the second swing arm 246*a* and the first end 411*a* of the connector 41*a*. The third magnetic piece may be fastened to the first mounting bracket 341*a* of the second hinge assembly 3*a* and/or the main shaft 31*a* of the second hinge assembly 3*a*, and the fourth magnetic piece may be fastened to the second end 412*a* of the connector 41*a*. In this embodiment, attraction force may exist between the first magnetic piece and the second magnetic piece, and repulsion force may exist between the third magnetic piece and the fourth magnetic piece. In this application, both the third magnetic piece and the fourth magnetic piece may be permanent magnets. Alternatively, one of the third magnetic piece and the fourth magnetic piece may be a permanent magnet, and the other may be a soft magnet. This is not limited in this application.

Figure 41:
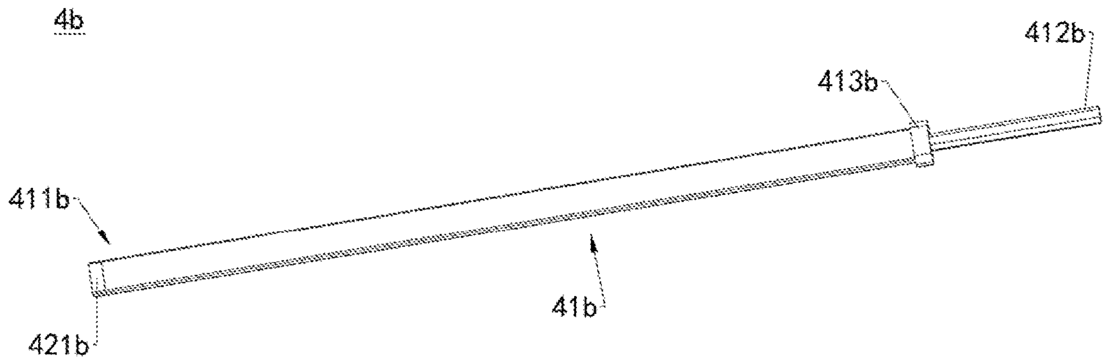
FIG. 41 is a diagram of a structure of a connection apparatus shown in FIG. 33A in Embodiment 2.
Figure 42A:
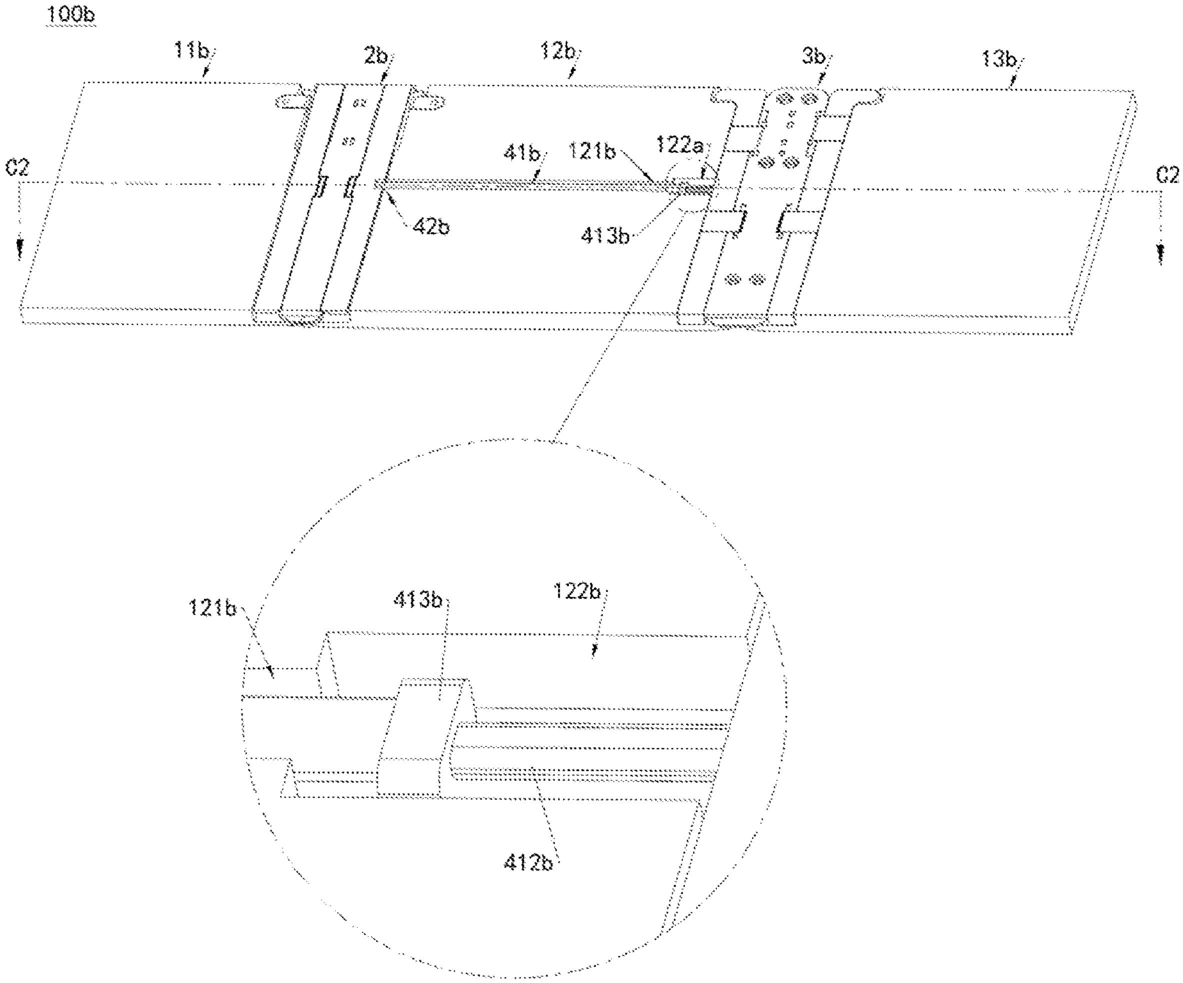
FIG. 42A is a diagram of a structure of a housing apparatus shown in FIG. 2 in Embodiment 2.
Figure 42B:
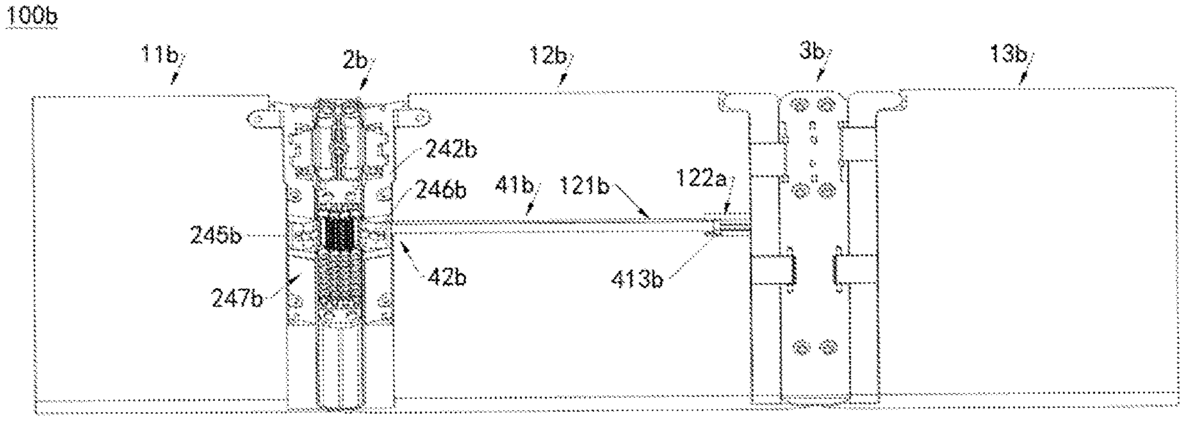
FIG. 42B is a diagram of a partial structure of the housing apparatus shown in FIG. 42A.
Figure 42C:
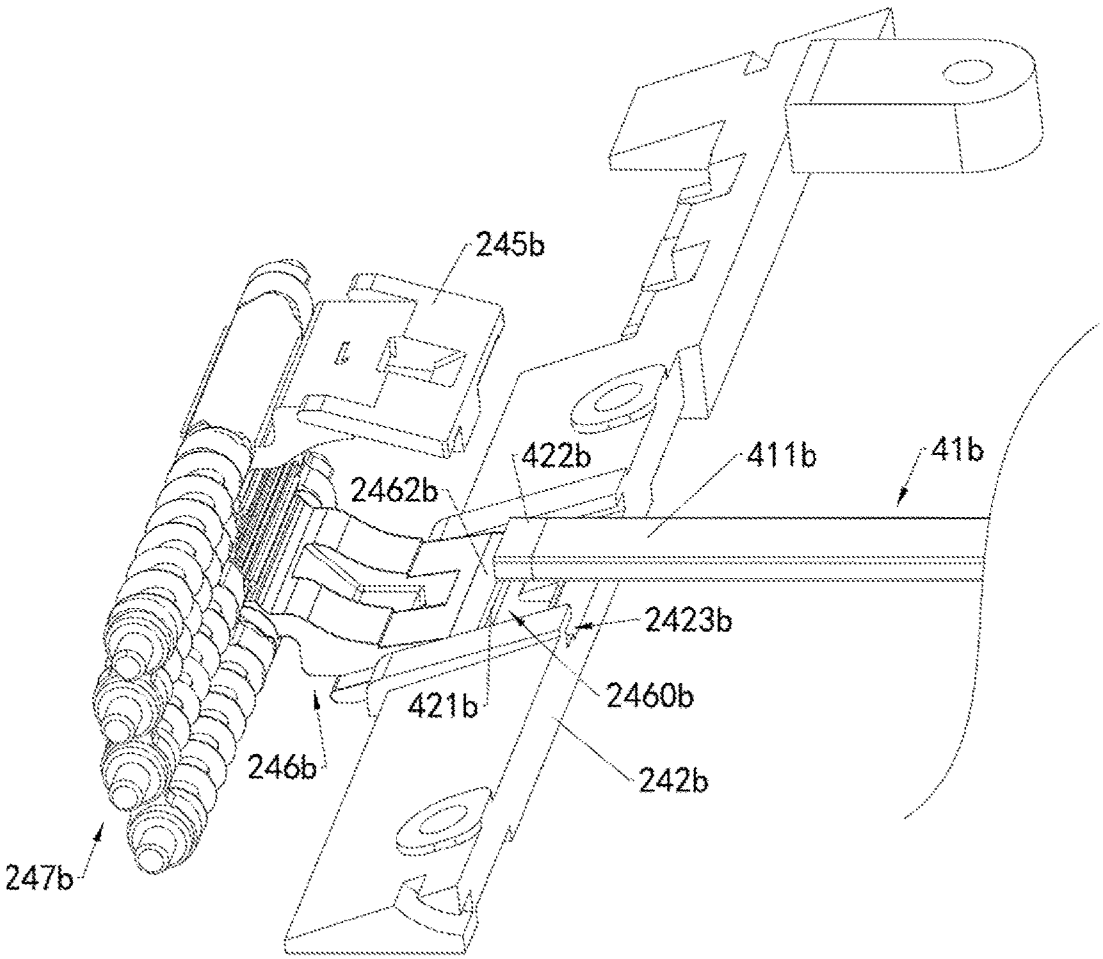
FIG. 42C is a diagram of a structure of the partial structure shown in FIG. 42B in a first closed state.

Refer to FIG. 41 and FIG. 42A to FIG. 42C. FIG. 41 is a diagram of a structure of the connection apparatus 4 shown in FIG. 33A in Embodiment 2. FIG. 42A is a diagram of a structure of the housing apparatus 100 shown in FIG. 2 in Embodiment 2. FIG. 42B is a diagram of a partial structure of the housing apparatus 100 shown in FIG. 42A. FIG. 42C is a diagram of the partial structure shown in FIG. 42B is in a first closed state. FIG. 42C shows structures of the first swing arm 245*b*, the damping assembly 247*b*, the second swing arm 246*b*, the second mounting bracket 242*b*, the connector 41*b*, and the driving piece 42*b*.

In Embodiment 2, for structures of a first housing 11*b*, a first hinge assembly 2*b*, a second housing 12*b*, a second hinge assembly 3*b*, a third housing 13*b*, and a connector 41*b* of a housing apparatus 100*b* of an electronic device 1000*b* and connection structures between components, refer to structures of the first housing 11, the first hinge assembly 2, the second housing 12, the second hinge assembly 3, the third housing 13, and the connector 41 of the electronic device 1000 shown in FIG. 36A to FIG. 36M and connection structures between components. Details are not described herein again.

The following describes only a structure of a driving piece 42*b*, a connection structure between the driving piece 42*b* and another structure, and a difference between the driving piece 42*b* and the connector 41*b*.

In Embodiment 2, the driving piece 42*b* may include a first magnetic piece 421*b* and a second magnetic piece 422*b*. The first magnetic piece 421*b* and the second magnetic piece 422*b* are respectively fastened to a sliding end 2462*b* of the second swing arm 246*b* and a first end 411*b* of the connector 41*b*. In this embodiment, attraction force may exist between the first magnetic piece 421*b* and the second magnetic piece 422*b*, that is, polarities of magnetic poles on opposite sides of the first magnetic piece 421*b* and the second magnetic piece 422*b* are opposite. For example, an end that is of the first magnetic piece 421*b* and that is close to the second magnetic piece 422*b* is an N pole, and an end that is of the second magnetic piece 422*b* and that is close to the first magnetic piece 421*b* is an S pole.

For example, the driving piece 42*b* may alternatively be an elastic piece (not shown in the figure). In this embodiment, the driving piece 42*b* is connected between the sliding end 2462*b* of the second swing arm 246*b* of the first hinge assembly 2*b* and the first end 411*b* of the connector 41*b*.

In some other embodiments, the first magnetic piece 421*b* may be fastened to the first mounting bracket 341*b* of the second hinge assembly 3*b* and/or the main shaft 31*b* of the second hinge assembly 3*b*, and the second magnetic piece 422*b* may be fastened to the second end 412*b* of the connector 41*b*. In this embodiment, repulsion force may exist between the first magnetic piece 421*b* and the second magnetic piece 422*b*, that is, polarities of magnetic poles on opposite sides of the first magnetic piece 421*b* and the second magnetic piece 422*b*, and polarities of magnetic poles on opposite sides of the second magnetic piece 422*b* and the first magnetic piece 421*b* are the same.

In still some embodiments, the driving piece 42*b* may further include the first magnetic piece 421*b*, the second magnetic piece 422*b*, a third magnetic piece (not shown in the figure), and a fourth magnetic piece (not shown in the figure). The first magnetic piece 421*b* and the second magnetic piece 422*b* may be respectively fastened to the sliding end 2462*b* of the second swing arm 246*b* and the first end 411*b* of the connector 41*b*. The third magnetic piece may be fastened to the first mounting bracket 341*b* of the second hinge assembly 3*b* and/or the main shaft 31*b* of the second hinge assembly 3*b*, and the fourth magnetic piece may be fastened to the second end 412*b* of the connector 41*b*. In this embodiment, attraction force may exist between the first magnetic piece 421*b* and the second magnetic piece 422*b*, and repulsion force may exist between the third magnetic piece and the fourth magnetic piece.

For example, as shown in FIG. 42A, the second housing 12*b* may also be provided with an accommodating groove 122*b* that communicates with a sliding slot 121*b*, and the connector 41*b* may also be provided with a limiting flange 413*b*. The limiting flange 413*b* is located in the accommodating groove 122*b*, to cooperate with the accommodating groove 122*b* to limit a movement stroke of the connector 41*b* between the first hinge assembly 2*b* and the second hinge assembly 3*b*. The driving piece 42*b* may also be provided with an elastic piece (not shown in the figure, refer to the structure of the driving piece 42*a* in Embodiment 1 shown in FIG. 37) sleeved on the connector 41*b*, and the elastic piece is located on a side that is of the limiting flange 413*b* and that is close to the second end 412*b*, and is pushed by the limiting flange 413*b* to move relative to the connector 41*b*. The elastic piece is configured to provide push force when the second housing 12*d* and the third housing 13*d* are in an open state, and the first housing 11*d* and the second housing 12*d* are folded relative to each other from an open state to a first closed state through the first hinge assembly 2*d*, the second end 412*b* of the connector 41*b* moves in a direction away from the second hinge assembly 3*b* under an action of the push force, so that the second housing 12*b* and the third housing 13*b* can be folded relative to the second hinge assembly 3*b*.

Figure 43A:
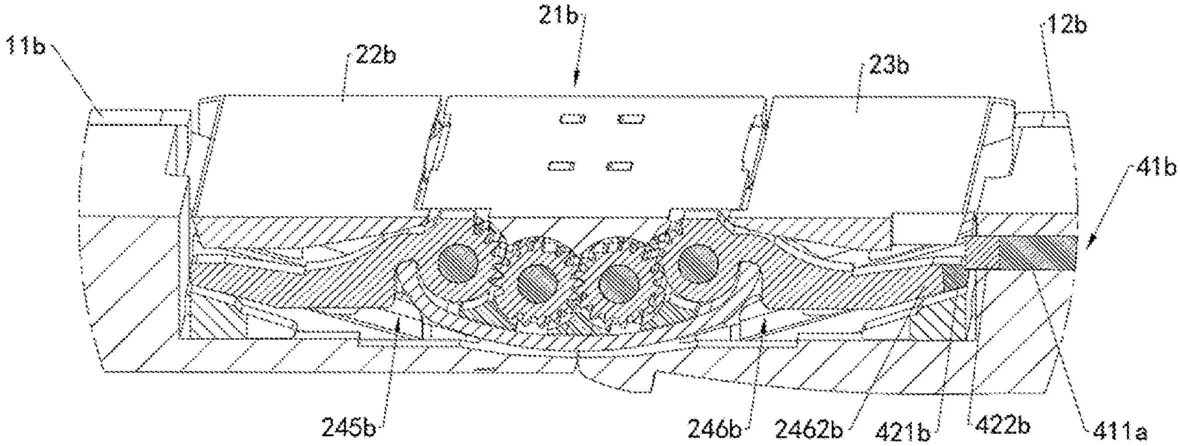
FIG. 43A is a diagram of a partial cross-sectional structure that is of the structure shown in FIG. 42A and that is cut along C2-C2 in Embodiment 2.
Figure 43B:
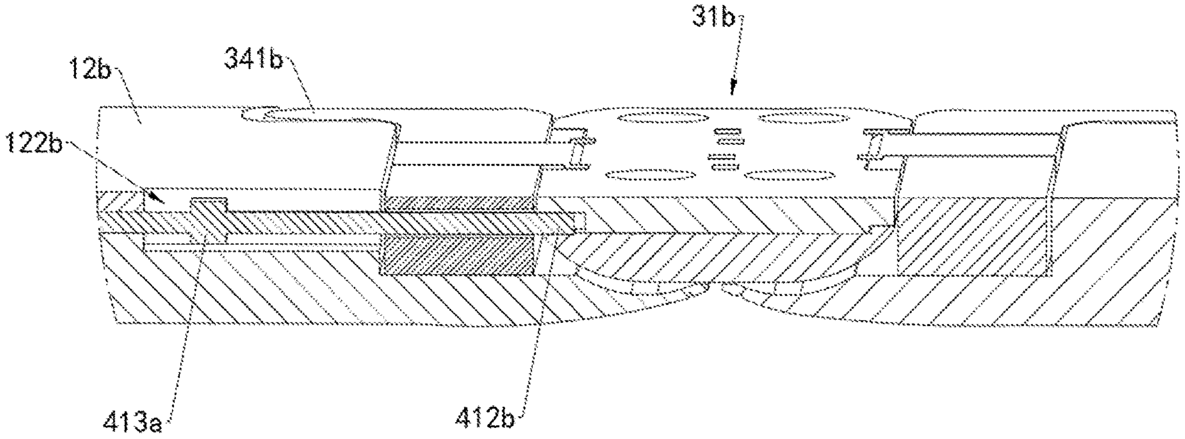
FIG. 43B is a diagram of another partial cross-sectional structure that is of the structure shown in FIG. 42A and that is cut along C2-C2 in Embodiment 2.
Figure 43C:
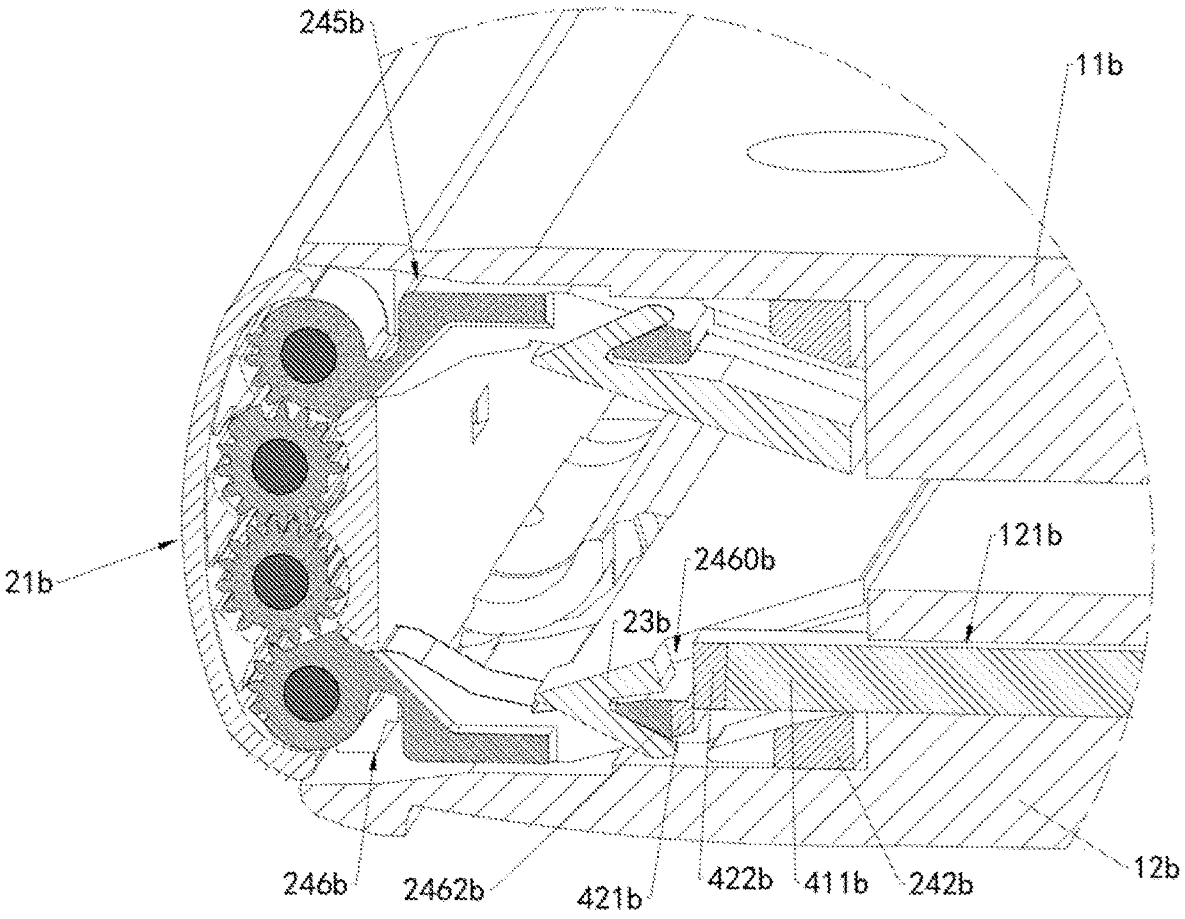
FIG. 43C is a diagram of a structure of the structure shown in FIG. 43A in a first closed state.
Figure 43D:
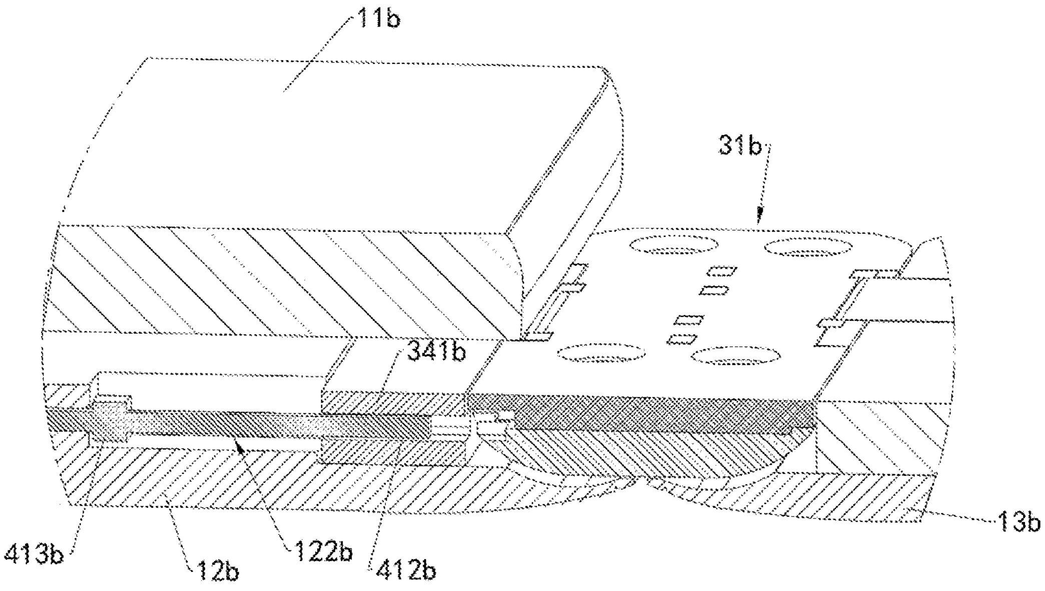
FIG. 43D is a diagram of a structure of the structure shown in FIG. 43B in a first closed state.

Refer to FIG. 43A to FIG. 43D. FIG. 43A is a diagram of a partial cross-sectional structure that is of the structure shown in FIG. 42A and that is cut along C2-C2 in Embodiment 2. FIG. 43B is a diagram of another partial cross-sectional structure that is of the structure shown in FIG. 42A and that is cut along C2-C2 in Embodiment 2. FIG. 43C is a diagram of a structure of the structure shown in FIG. 43A is in a first closed state. FIG. 43D is diagram of a structure of the structure shown in FIG. 43B is in a first closed state. A cross-sectional structure that is cut at FIG. 43A passes through the first housing 11*b*, the first hinge assembly 2*b*, the second housing 12*b*, and the connection apparatus 4*b*, and a cross-sectional structure that is cut at FIG. 43B passes through the second housing 12*b*, the second hinge assembly 3*b*, the third housing 13*b*, and the connection apparatus 4*b*.

As shown in FIG. 43A and FIG. 43B, when the second housing 12*b* and the third housing 13*b* are in an open state, and the first housing 11*b* and the second housing 12*b* are in an open state, the first end 411*b* of the connector 41*b* is magnetically connected to the sliding end 2462*b* of the second swing arm 246*b* of the first hinge assembly 2*b* through the driving piece 42*b*. Specifically, the first magnetic piece 421*b* fastened to the sliding end 2462*b* of the second swing arm 246*b* is magnetically connected to the second magnetic piece 422*b* fastened to the first end 411*b* of the connector 41*b*, and the second end 412*b* of the connector 41*b* passes through the first mounting bracket 341*b* of the second hinge assembly 3*b* and is clamped into the main shaft 31*b*, to prevent the first mounting bracket 341*b* of the second hinge assembly 3*b* from moving relative to the main shaft 31*b*, so as to prevent the second housing 12*b* and the third housing 13*b* from being folded relative to the second hinge assembly 3*b*.

As shown in FIG. 43C and FIG. 43D, when the second housing 12*b* and the third housing 13*b* are in the open state, and the first housing 11*b* and the second housing 12*b* are folded relative to each other from the open state to a first closed state through the first hinge assembly 2*b*, the sliding end 2462*b* of the second swing arm 246*b* is away from the second mounting bracket 242*b*. In addition, the connector 41*b* is driven by the driving piece 42*b* to move in a direction away from the second hinge assembly 3*b*, so that the second end 412*b* of the connector 41*b* leaves the main shaft 31*b*.

When the first housing 11*b* and the second housing 12*b* are in the first closed state, the first mounting bracket 341*b* of the second hinge assembly 3*b* can move relative to the main shaft 31*b*, that is, the second housing 12*b* and the third housing 13*b* can be folded relative to the second hinge assembly 3*b*.

Figure 44:
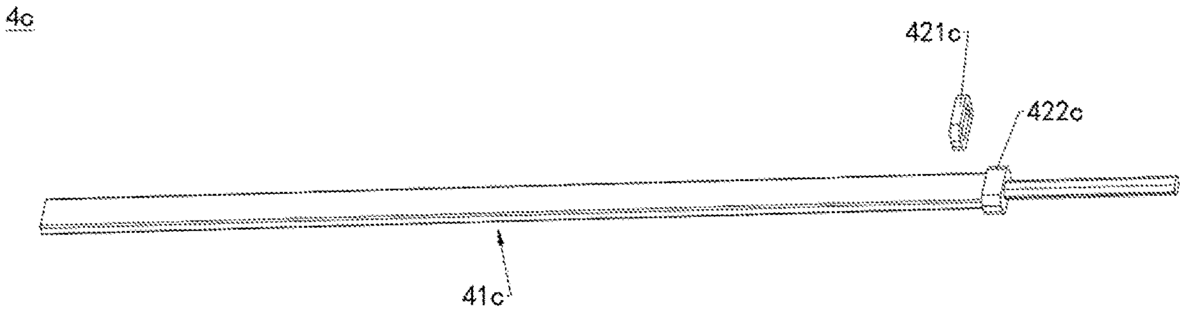
FIG. 44 is an exploded view of a structure of a connection apparatus shown in FIG. 33A in Embodiment 3.
Figure 45:
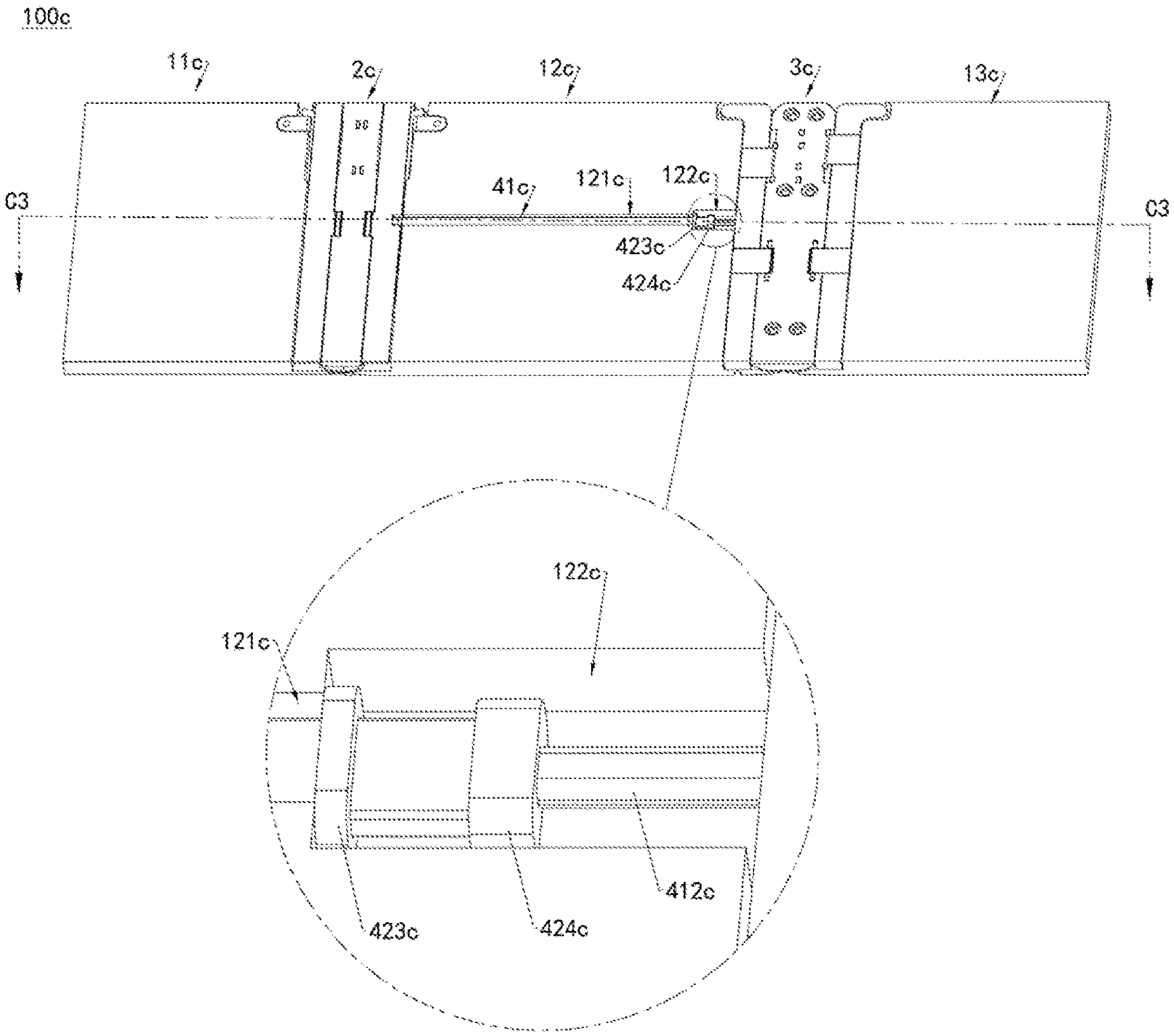
FIG. 45 is a diagram of a structure of a housing apparatus shown in FIG. 2 in Embodiment 3.

Refer to FIG. 44 and FIG. 45. FIG. 44 is an exploded view of a structure of a connection apparatus 4*c* shown in FIG. 33A in Embodiment 3. FIG. 45 is a diagram of a structure of a housing apparatus 100*c* shown in FIG. 2 in Embodiment 3.

In Embodiment 3, for structures of a first housing 11*c*, a first hinge assembly 2*c*, a second housing 12*c*, a second hinge assembly 3*c*, a third housing 13*c*, and a connector 41*c* of a housing apparatus 100*c* of an electronic device 1000*c* and connection structures between components, refer to structures of the first housing 11, the first hinge assembly 2, the second housing 12, the second hinge assembly 3, the third housing 13, and the connector 41 of the electronic device 1000 shown in FIG. 36A to FIG. 36M and connection structures between components. Details are not described herein again.

The following describes only a structure of a driving piece 42*c*, a connection structure between the driving piece 42*c* and another structure, and a difference between the driving piece 42*c* and the connector 41*c*.

In Embodiment 3, the second housing 12*c* may further be provided with an accommodating groove 122*c*, and the accommodating groove 122*c* communicates with a sliding slot 121*c*. The driving piece 42*c* is connected between the connector 41*c* and the accommodating groove 122*c* of the second housing 12*c*. The driving piece 42*c* may include a third magnetic piece 423*c* and a fourth magnetic piece 424*c*.

In some embodiments, the accommodating groove 122*c* has a first side wall perpendicular to an extension direction of the connector 41*c*, and the first side wall is close to the first hinge assembly 2*c*. The third magnetic piece 423*c* may be fastened to a first side wall that is of the accommodating groove 122*c* and that is close to the first hinge assembly 2*c*, and is movably sleeved on the connector 41*c*. The fourth magnetic piece 424*c* is fixedly sleeved on the connector 41*c*, and is located in the accommodating groove 122*c*. In this embodiment, attraction force may exist between the third magnetic piece 423*c* and the fourth magnetic piece 424*c*, that is, polarities of magnetic poles on opposite sides of the third magnetic piece 423*c* and the fourth magnetic piece 424*c* are opposite.

In some other embodiments, the accommodating groove 122*c* has a second side wall perpendicular to an extension direction of the connector 41*c*, and the second side wall is close to the second hinge assembly 3*c*. The third magnetic piece 423*c* may be fastened to the second side wall of the accommodating groove 122*c*, and the fourth magnetic piece 424*c* is fixedly sleeved on the connector 41*c* and located in the accommodating groove 122*c*. In this embodiment, repulsion force may exist between the third magnetic piece 423*c* and the fourth magnetic piece 424*c*, that is, polarities of magnetic poles on opposite sides of the third magnetic piece 423*c* and the fourth magnetic piece 424*c* are opposite.

Figure 46A:
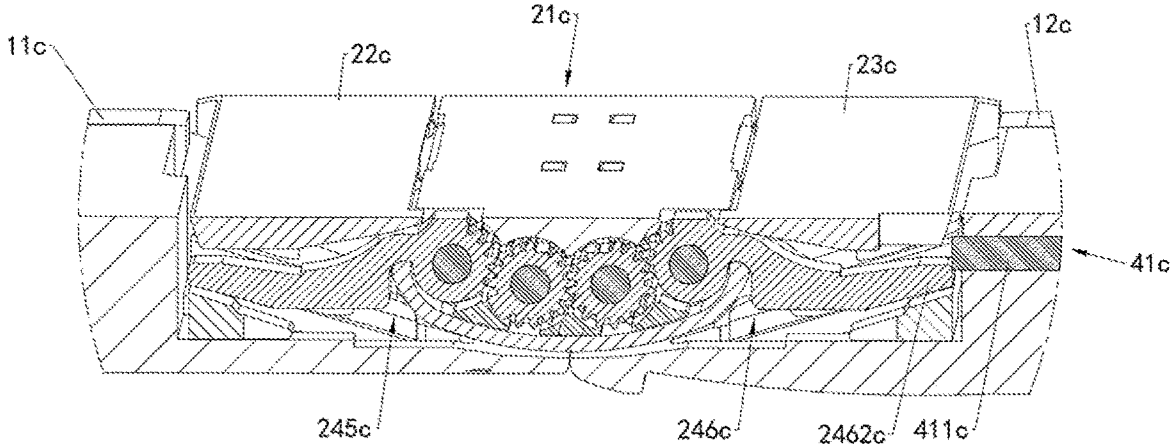
FIG. 46A is a diagram of a partial cross-sectional structure that is of the structure shown in FIG. 45 and that is cut along C3-C3 in Embodiment 3.
Figure 46B:
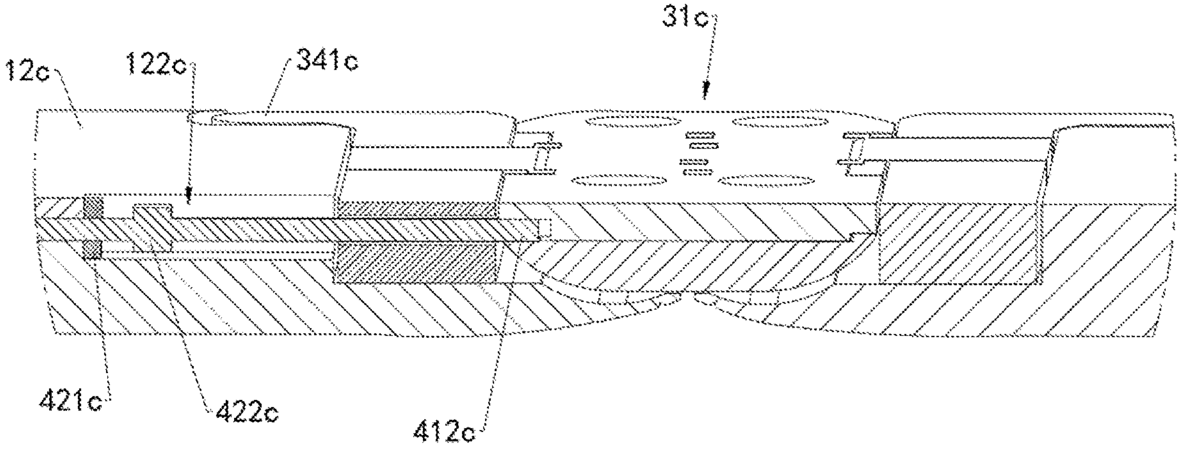
FIG. 46B is a diagram of another partial cross-sectional structure that is of the structure shown in FIG. 45 and that is cut along C3-C3 in Embodiment 3.
Figure 46C:
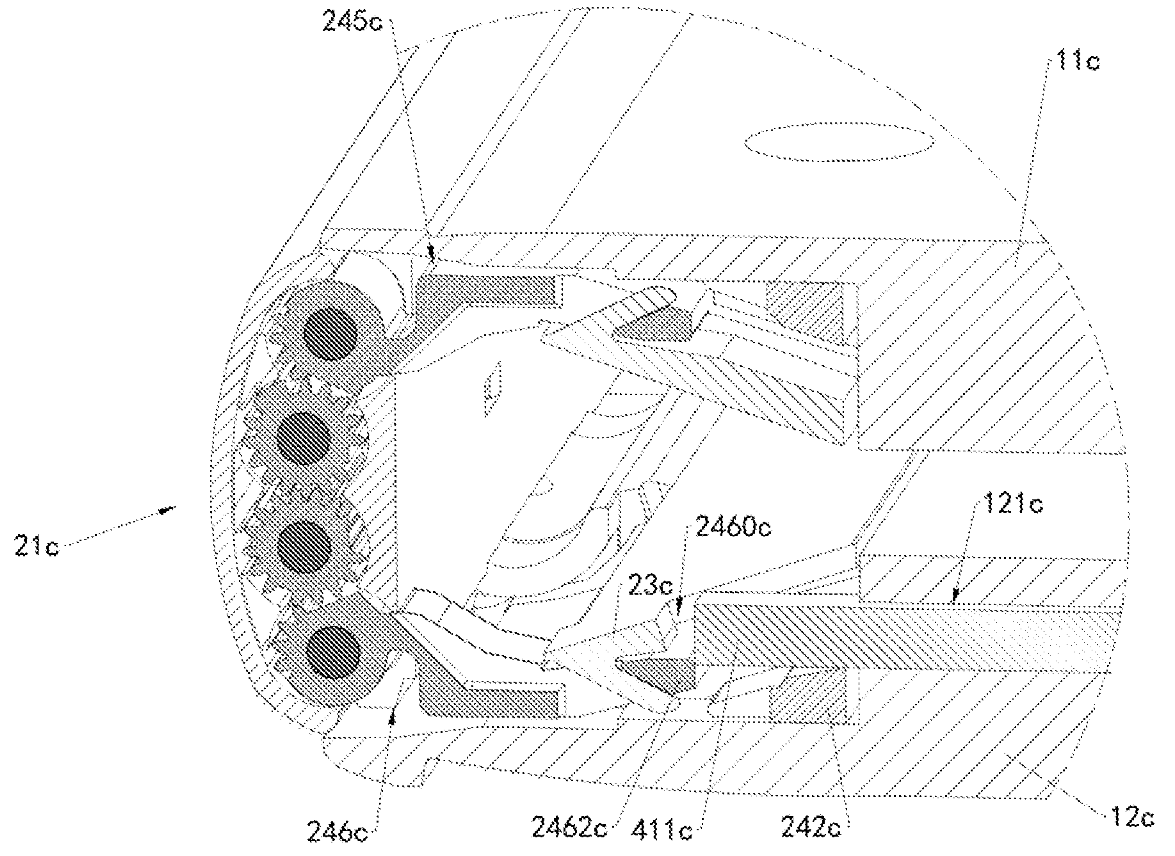
FIG. 46C is a diagram of a structure of the structure shown in FIG. 46A in a first closed state.
Figure 46D:
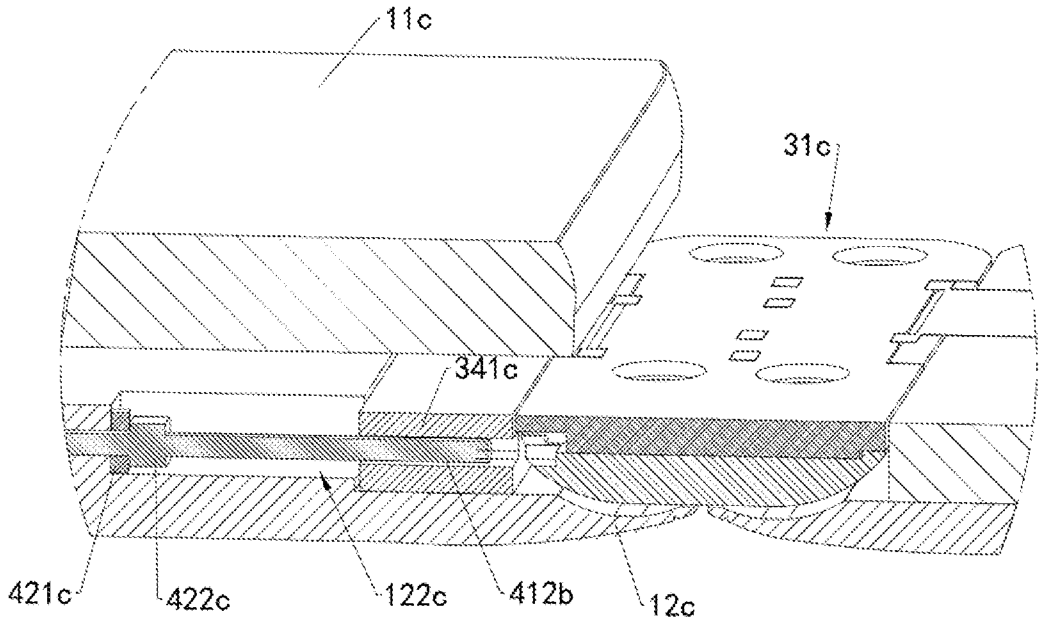
FIG. 46D is a diagram of a structure of the structure shown in FIG. 46B in a first closed state.

Refer to FIG. 45, and FIG. 46C to FIG. 46D. FIG. 46A is a diagram of a partial cross-sectional structure that is of the structure shown in FIG. 45 and that is cut along C3-C3 in Embodiment 3. FIG. 46B is a diagram of another partial cross-sectional structure that is of the structure shown in FIG. 45 and that is cut along C3-C3 in Embodiment 3. FIG. 46C is a diagram of a structure of the structure shown in FIG. 46A is in a first closed state. FIG. 46D is diagram of a structure of the structure shown in FIG. 46B is in a first closed state. A cross-sectional structure that is cut at FIG. 46A passes through the first housing 11*c*, the first hinge assembly 2*c*, the second housing 12*c*, and the connection apparatus 4*c*, and a cross-sectional structure that is cut at FIG. 46B passes through the second housing 12*c*, the second hinge assembly 3*c*, the third housing 13*c*, and the connection apparatus 4*c*.

As shown in FIG. 46A and FIG. 46B, when the second housing 12 and the third housing 13 are in the open state, and the first housing 11 and the second housing 12 are in the open state, a first end 411*c* of the connector 41*c* abuts against a sliding end 2462*c* of a second swing arm 246*c* of the first hinge assembly 2*c*, the fourth magnetic piece 424*c* is located on a side that is of the third magnetic piece 423*c* and that is close to the second hinge assembly 3, and there is a spacing between the fourth magnetic piece 424*c* and the third magnetic piece 423*c*. The second end 412*c* of the connector 41*c* passes through the first mounting bracket 341*c* of the second hinge assembly 3*c* and is clamped into the main shaft 31*c*, to prevent the second housing 12*c* and the third housing 13*c* from being folded relative to the second hinge assembly 3*c*.

As shown in FIG. 46C and FIG. 46D, when the second housing 12*c* and the third housing 13*c* are in the open state, and the first housing 11*c* and the second housing 12*c* are folded from the open state to the first closed state through the first hinge assembly 2*c*, the sliding end 2462*c* of the second swing arm 246*c* slides in a direction away from the second housing 12*c* relative to the second mounting bracket 242*c*, to reserve an avoidance space 2460*c* between the sliding end 2462*c* and the second mounting bracket 242*c*. Attraction force exists between the third magnetic piece 423*c* and the fourth magnetic piece 424*c*. The fourth magnetic piece 424*c* moves in a direction close to the third magnetic piece 423*c* under an action of the attraction force, and drives the connector 41*c* to move in a direction close to the first hinge assembly 2*c*, so that the first end 411*c* of the connector 41*c* enters the avoidance space 2460*c*, and the second end 412*c* of the connector 41*c* leaves the main shaft 31*c*. In addition, a distance between the third magnetic piece 423*c* and the fourth magnetic piece 424*c* decreases, or the third magnetic piece 423*c* is in contact with the fourth magnetic piece 424*c*.

When the first housing 11*c* and the second housing 12*c* are in the first closed state, the first mounting bracket 341*c* of the second hinge assembly 3*c* can move relative to the main shaft 31*c*, that is, the second housing 12*c* and the third housing 13*c* can be folded relative to the second hinge assembly 3*c*.

On the contrary, when the second housing 12*c* and the third housing 13*c* are in the open state, and the first housing 11*c* and the second housing 12*c* are unfolded from the first closed state to the open state through the first hinge assembly 2*c*, the sliding end 2462*c* of the second swing arm 246*c* slides in a direction close to the second housing 12*c* relative to the second mounting bracket 242*c*, and is in contact with and pushes the connector 41*c* to slide in a direction close to the second hinge assembly 3*c*, so that the second end 412*c* of the connector 41*c* passes through the first mounting bracket 341*c* of the second hinge assembly 3*c* and is clamped into the main shaft 31*c*. The fourth magnetic piece 424*c* is driven by the connector 41*c* to move in a direction away from the third magnetic piece 423*c*.

In some other embodiments, repulsion force may alternatively exist between the third magnetic piece 423*c* and the fourth magnetic piece 424*c*. The third magnetic piece 423*c* is fastened to the second housing 12*c* and is movably sleeved on the connector 41*c*. The fourth magnetic piece 424*c* is fixedly sleeved on the connector 41*c* and is located on a side that is of the third magnetic piece 423*c* and that is away from the second hinge assembly 3*c*. When the second housing 12*c* and the third housing 13*c* are in the open state, and the first housing 11*c* and the second housing 12*c* are in the open state, the third magnetic piece 423*c* and the fourth magnetic piece 424*c* are in contact with each other or have a spacing between each other. In a process in which the second housing 12*c* and the third housing 13*c* are in the open state, and the first housing 11*c* and the second housing 12*c* are folded relative to each other from the open state to the first closed state through the first hinge assembly 2*c*, the fourth magnetic piece 424*c* is away from the third magnetic piece 423*c* under an action of the repulsion force, and drives the connector 41*c* to move in a direction close to the first hinge assembly 2*c*, so as to drive the second end 412*c* of the connector 41*c* to move in a direction away from the second hinge assembly 3*c*.

For example, the driving piece 42*c* may further include a third magnetic piece and a fourth magnetic piece (not shown in the figure, refer to a structure of the driving piece 42*b* in Embodiment 2 shown in FIG. 41), and the third magnetic piece and the fourth magnetic piece are respectively fastened to the sliding end 2462*c* of the second swing arm 246*c* and the first end 411*c* of the connector 41*c*. Details are not described herein again.

Figure 47A:
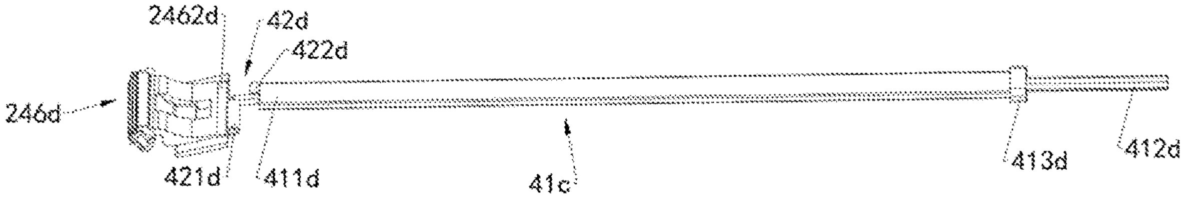
FIG. 47A is a diagram of an assembly structure of a connection apparatus shown in FIG. 33A and a second swing arm in Embodiment 4.
Figure 47B:
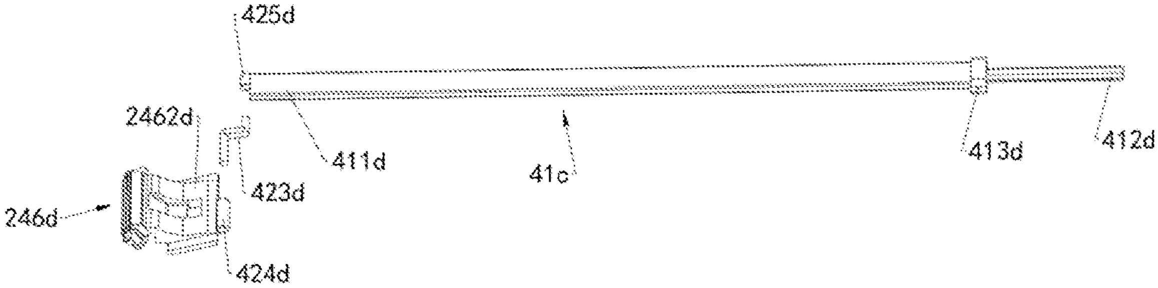
FIG. 47B is a schematic exploded view of the structure shown in FIG. 47A.
Figure 48:
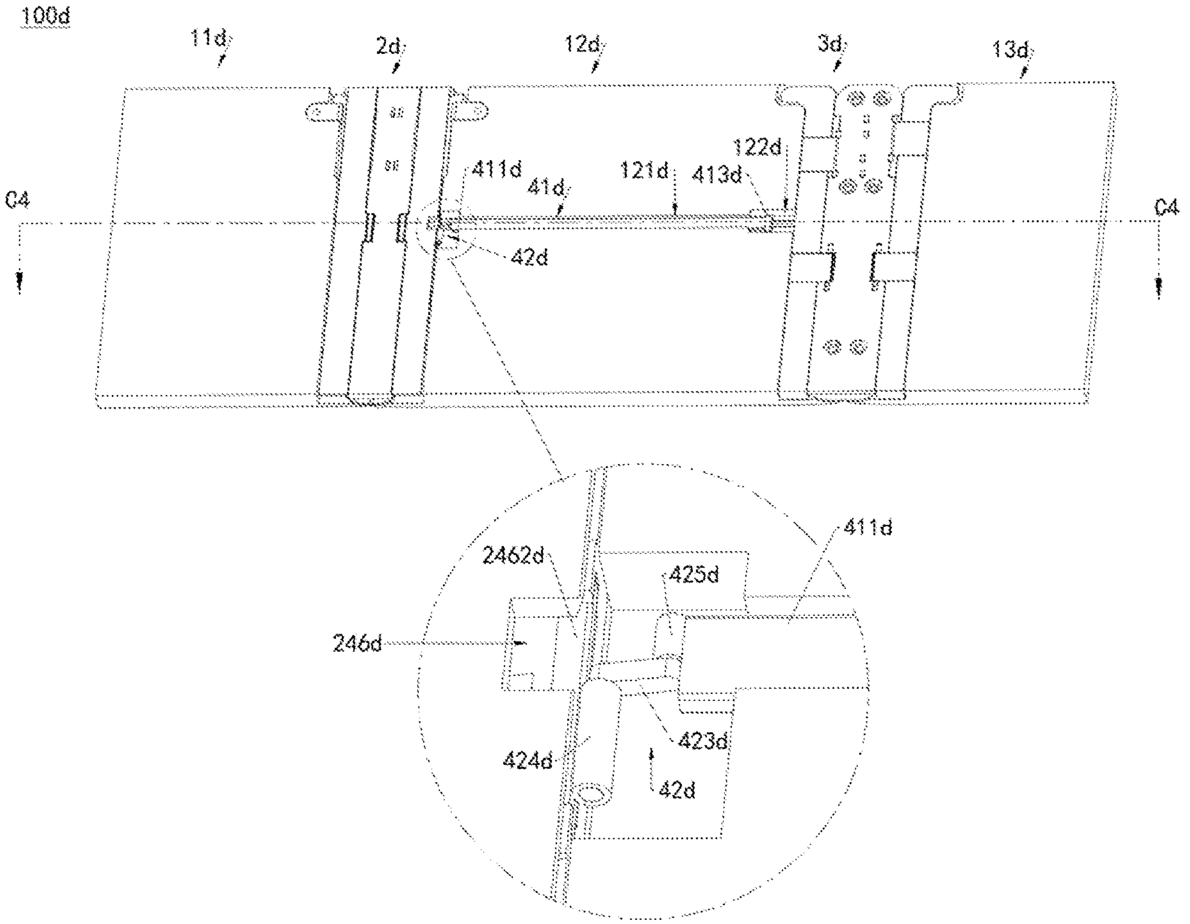
FIG. 48 is a diagram of a structure of a housing apparatus shown in FIG. 2 in Embodiment 4.

Refer to FIG. 47A, FIG. 47B, and FIG. 48. FIG. 47A is a diagram of an assembly structure of the connection apparatus 4 shown in FIG. 33A and the second swing arm 246 in Embodiment 4. FIG. 47B is a schematic exploded view of the structure shown in FIG. 47A. FIG. 48 is a diagram of a structure of the housing apparatus 100 shown in FIG. 2 in Embodiment 4. In Embodiment 4, for structures of a first housing 11*d*, a first hinge assembly 2*d*, a second housing 12*d*, a second hinge assembly 3*d*, a third housing 13*d*, and a connector 41*d* of a housing apparatus 100*d* of an electronic device 1000*d* and connection structures between components, refer to structures of the first housing 11, the first hinge assembly 2, the second housing 12, the second hinge assembly 3, the third housing 13, and the connector 41 of the electronic device 1000 shown in FIG. 36A to FIG. 36M and connection structures between components. Details are not described herein again.

The following describes only a structure of a driving piece 42*d*, a connection structure between the driving piece 42*d* and another structure, and a difference between the driving piece 42*d* and the connector 41*d*.

In Embodiment 4, the driving piece 42*d* is connected between the connector 41*d* and the sliding end 2462*d* of the second swing arm 246*d* of the first hinge assembly 2*d*. The driving piece 42*d* can generate pull force, and the driving piece 42*d* can further move or be deformed, so that the connector 41*d* can move with the second housing 12*d* and the second swing arm 246*d* of the first hinge assembly 2*d* under an action of the pull force.

For example, the driving piece 42*d* includes a first rotating end 421*d* and a second rotating end 422*d*. The first rotating end 421*d* of the driving piece 42*d* is rotatably connected to the sliding end 2462*d* of the second swing arm 246*d* of the first hinge assembly 2*d*, and the second rotating end 422*d* of the driving piece 42*d* is rotatably connected to the first end 411*d* of the connector 41*d*. For example, the first rotating end 421*d* and the second rotating end 422*d* of the driving piece 42*d* may be rotatably connected to another component through a structure like a pin shaft. Specifically, the driving piece 42*d* may include a connection shaft 423*d*, a first shaft sleeve 424*d*, and a second shaft sleeve 425*d*, where the first shaft sleeve 424*d* is fastened to the sliding end 2462*d* of the second swing arm 246*d* of the first hinge assembly 2*d*, the second shaft sleeve 425*d* is fastened to the first end 411*d* of the connector 41*d*, and rotating shafts are respectively disposed at two ends of the connection shaft 423*d*. The rotating shafts at the two ends of the connection shaft 423*d* are respectively inserted into shaft holes in the first shaft sleeve 424*d* and the second shaft sleeve 425*d*, and both rotate relative to the first shaft sleeve 424*d* and the second shaft sleeve 425*d*. In some other embodiments, the driving piece 42*d* may alternatively be a structure like an elastic piece. This is not limited in this application.

Figure 49A:
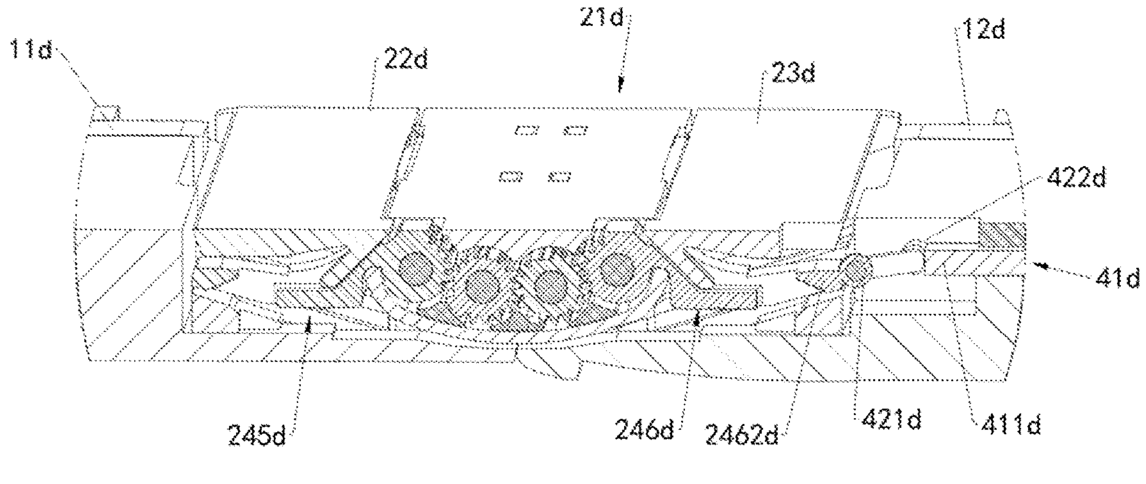
FIG. 49A is a diagram of a partial cross-sectional structure that is of the structure shown in FIG. 48 and that is cut along C4-C4 in Embodiment 4.
Figure 49B:
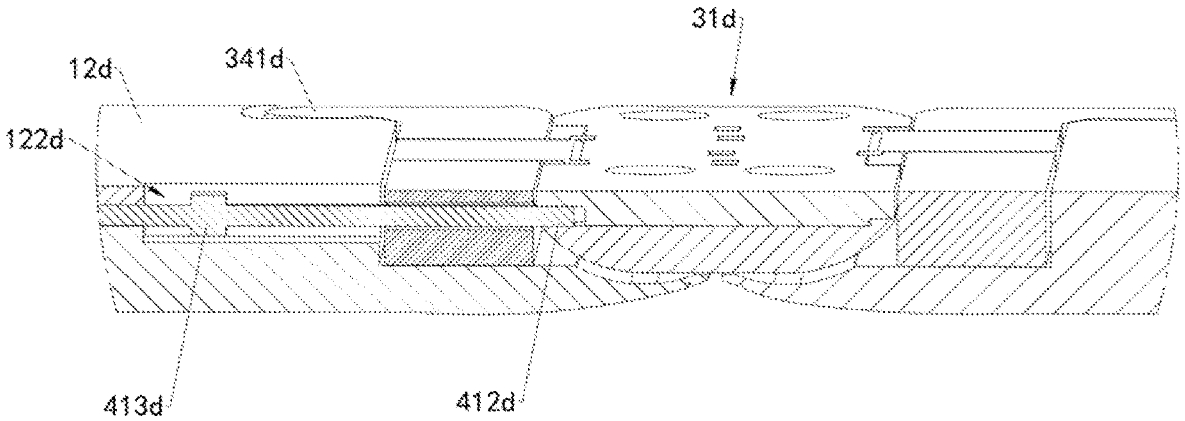
FIG. 49B is a diagram of another partial cross-sectional structure that is of the structure shown in FIG. 48 and that is cut along C4-C4 in Embodiment 4.
Figure 49C:
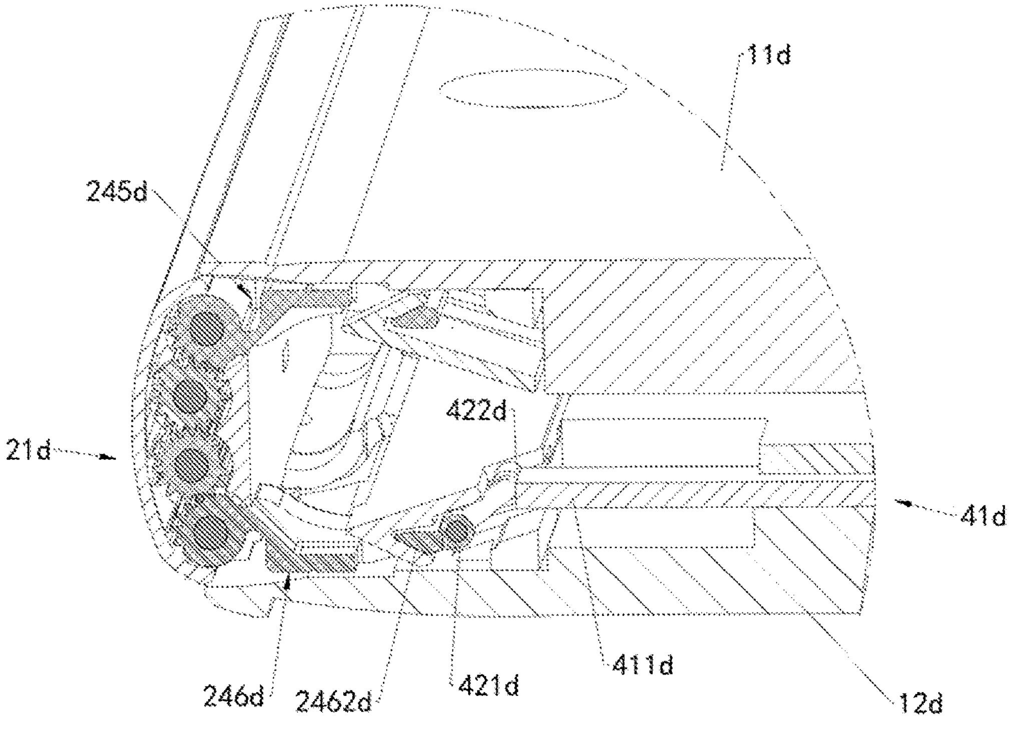
FIG. 49C is a diagram of a structure of the structure shown in FIG. 49A in a first closed state.
Figure 49D:
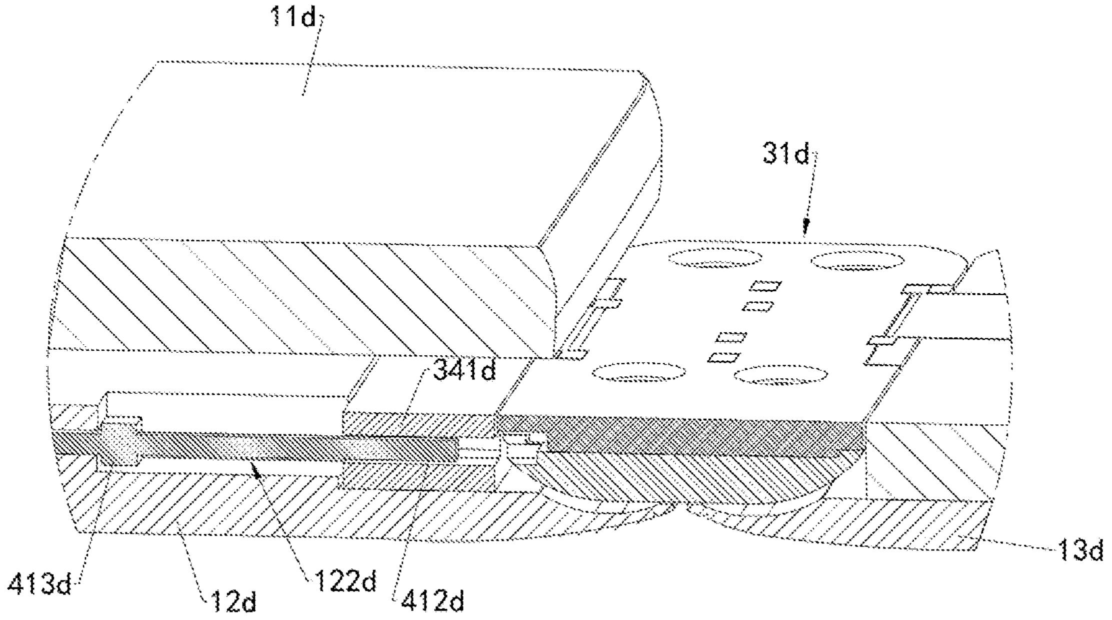
FIG. 49D is a diagram of a structure of the structure shown in FIG. 49B in a first closed state.

Refer to FIG. 48, and FIG. 49A to FIG. 49D. FIG. 49A is a diagram of a partial cross-sectional structure that is of the structure shown in FIG. 48 and that is cut along C4-C4 in Embodiment 4. FIG. 49B is a diagram of another partial cross-sectional structure that is of the structure shown in FIG. 48 and that is cut along C4-C4 in Embodiment 4. FIG. 49C is a diagram of a structure of the structure shown in FIG. 49A is in a first closed state. FIG. 49D is diagram of a structure of the structure shown in FIG. 49B is in a first closed state. A cross-sectional structure that is cut at FIG. 49A passes through the first housing 11*d*, the first hinge assembly 2*d*, and the second housing 12*d*, and a cross-sectional structure that is cut at FIG. 49B passes through the second housing 12*d*, the second hinge assembly 3*d*, and the third housing 13*d*.

As shown in FIG. 49A and FIG. 49B, when the second housing 12*d* and the third housing 13*d* are in the open state, and the first housing 11*d* and the second housing 12*d* are in the open state, the first end 411*d* of the connector 41*d* is connected to the sliding end 2462*d* of the second swing arm 246*d* of the first hinge assembly 2*d* through the driving piece 42*d*, and the second end 412*d* of the connector 41*d* passes through the first mounting bracket 341*d* of the second hinge assembly 3*d* and is clamped into the main shaft 31*d*, to prevent the second housing 12*d* and the third housing 13*d* from being folded relative to the second hinge assembly 3*d*.

As shown in FIG. 49C and FIG. 49D, when the second housing 12*d* and the third housing 13*d* are in the open state, and the first housing 11*d* and the second housing 12*d* are folded relative to each other from the open state to a first closed state through the first hinge assembly 2*d*, the sliding end 2462*d* of the second swing arm 246*d* is away from the second mounting bracket 242*d*, to reserve the avoidance space 2460*d*. The second swing arm 246*d* pulls the connector 41*d* to move in a direction away from the second hinge assembly 3*d* through the driving piece 42*d*, the first end 411*d* of the connector 41*d* enters the avoidance space 2460*d*, and the second end 412*d* of the connector 41*d* leaves the main shaft 31*d*.

On the contrary, when the second housing 12*d* and the third housing 13*d* are in the open state, and the first housing 11*d* and the second housing 12*d* are unfolded from the first closed state to the open state through the first hinge assembly 2*d*, the sliding end 2462*d* of the second swing arm 246*d* slides in a direction close to the second housing 12*d* relative to the second mounting bracket 242*d*, and pushes the connector 41*d* to slide in a direction close to the second hinge assembly 3*d* through the driving piece 42*d*, so that the second end 412*d* of the connector 41*d* passes through the first mounting bracket 341*d* of the second hinge assembly 3*d* and is clamped into the main shaft 31*d*.

In Embodiment 4, as shown in FIG. 47A, the connector 41*d* may be provided with a limiting flange 413*d*, and an outer diameter of the limiting flange 413*d* is greater than an outer diameter of a main body part of the connector 41*d*. The driving piece 42*d* may further include an elastic piece (not shown in the figure, refer to a structure of the driving piece 42*a* in Embodiment 1 shown in FIG. 37) sleeved on the connector 41*d*. The elastic piece is located on a side that is of the limiting flange 413*d* and that is close to the second end 412*d*, and is pushed by the limiting flange 413*d* to move relative to the connector 41*d*. The elastic piece is configured to provide push force when the second housing 12*d* and the third housing 13*d* are in the open state, and the first housing 11*d* and the second housing 12*d* are folded relative to each other from the open state to the first closed state through the first hinge assembly 2*d*, the connector 41*d* moves under an action of the push force, so that the second end 412*d* of the connector 41*d* moves in a direction away from the second hinge assembly 3*d*, and the second housing 12*d* and the third housing 13*d* can be folded relative to the second hinge assembly 3*d*. The second housing 12*d* may further be provided with an accommodating groove 122*d*, and the accommodating groove 122*d* communicates with a sliding slot 121*d*. The limiting flange 413*d* may be mounted in the accommodating groove 122*d*.

For example, the driving piece 42*d* may further include a first magnetic piece and a second magnetic piece (not shown in the figure, refer to a structure of the driving piece 42*c* in Embodiment 3 shown in FIG. 44). Details are not described herein again.

In some embodiments, as shown in FIG. 39B and FIG. 46B, the driving piece 42*a* may be connected between the connector 41*a* and the second hinge assembly 3*a*, or the driving piece 42*c* may be connected between the connector 41*c* and the second housing 12*c*. When the second housing (12*a*, 12*c*) and the third housing (13*a*, 13*c*) are in the open state, and the first housing (11*a*, 11*c*) and the second housing (12*a*, 12*c*) are folded relative to each other from the open state to the first closed state, the driving piece (42*a*, 42*c*) is configured to provide push force to push the connector (41*a*, 41*c*) to move, so that the second end (412*a*, 412*c*) of the connector (41*a*, 41*c*) moves in a direction away from the second hinge assembly (3*a*, 3*c*), and the second housing (12*a*, 12*c*), and the third housing (13*a*, 13*c*) can be folded relative to the second hinge assembly (3*a*, 3*c*).

In some other embodiments, as shown in FIG. 43B and FIG. 49B, the driving piece (42*b*, 42*d*) may be connected between the first hinge assembly (2*b*, 2*d*) and the connector (41*b*, 41*d*). When the second housing (12*b*, 12*d*) and the third housing (13*b*, 13*d*) are in the open state, and the first housing (11*b*, 11*d*) and the second housing (12*b*, 12*d*) are folded relative to each other from the open state to the first closed state, the driving piece (42*b*, 42*d*) is configured to provide pull force or attraction force to pull the connector (41*b*, 41*d*) to move, so that the second end (412*b*, 412*d*) of the connector (41*b*, 41*d*) moves in a direction away from the second hinge assembly (3*b*, 3*d*), and the second housing (12*b*, 12*d*) and the third housing (13*b*, 13*d*) can be folded relative to the second hinge assembly (3*b*, 3*d*).

In this application, in addition to the structures of the driving pieces (41*a*, 41*b*, 41*c*, and 41*d*) in the foregoing four embodiments, another structure may be used. This is not limited in this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Embodiments of this application and features in embodiments may be mutually combined provided that no conflict occurs. Therefore, the protection scope of this application shall be subject to the protection scope of the claims.

The invention claimed is:

1. A foldable electronic device (1000), wherein the foldable electronic device (1000) comprises a first housing (11), a second housing (12), a third housing (13), a first hinge assembly (2), and a second hinge assembly (3), wherein the first hinge assembly (2) is connected between the first housing (11) and the second housing (12), the first housing (11) and the second housing (12) are capable of being unfolded or folded relative to each other through the first hinge assembly (2), the second hinge assembly (3) is connected between the second housing (12) and the third housing (13), and the second housing (12) and the third housing (13) are capable of being unfolded or folded relative to each other through the second hinge assembly (3);

the foldable electronic device (1000) further comprises a connector (41), wherein the connector (41) comprises a first end (411) and a second end (412), the first end (411) of the connector (41) is close to the first hinge assembly (2), and the second end (412) of the connector (41) is close to the second hinge assembly (3);

when the first housing (11) and the second housing (12) are in an open state, and the second housing (12) and the third housing (13) are in an open state, the second end (412) of the connector (41) is connected between the second housing (12) and the second hinge assembly (3), to prevent the second housing (12) and the third housing (13) from being folded relative to the second hinge assembly (3);

when the second housing (12) and the third housing (13) are in the open state, and the first housing (11) and the second housing (12) are folded relative to each other from the open state to a first closed state through the first hinge assembly (2), the second end (412) of the connector (41) moves in a direction away from the second hinge assembly (3); and when the first housing (11) and the second housing (12) are in the first closed state, the second housing (12) and the third housing (13) are capable of being folded relative to the second hinge assembly (3).

2. The foldable electronic device (1000) according to claim 1, wherein the connector (41) is slidably connected to the second housing (12).

3. The foldable electronic device (1000) according to claim 1, wherein when the first housing (11) and the second housing (12) are in the first closed state, the second housing (12) and the third housing (13) are capable of being unfolded relative to the second hinge assembly (3); and when the second housing (12) and the third housing (13) are in the open state, and the first housing (11) and the second housing (12) are unfolded relative to each other from the first closed state to the open state through the first hinge assembly (2), the second end (412) of the connector (41) moves in a direction close to the second hinge assembly (3), so that the second end (412) of the connector (41) is connected between the second housing (12) and the second hinge assembly (3).

4. The foldable electronic device (1000) according to claim 1, wherein the first hinge assembly (2) comprises a first moving member (20); and when the second housing (12) and the third housing (13) are in the open state, and the first housing (11) and the second housing (12) are folded relative to each other from the open state to the first closed state through the first hinge assembly (2), the first moving member (20) of the first hinge assembly (2) moves in a direction away from the second housing (12), to form an avoidance space (2460) between the first moving member (20) and the second housing (12); and the first end (411) of the connector (41) enters the avoidance space (2460), and the second end (412) of the connector (41) moves in the direction away from the second hinge assembly (3).

5. The foldable electronic device (1000) according to claim 4, wherein the first hinge assembly (2) comprises a main shaft (21), a first swing arm (245), and a second swing arm (246), the second swing arm (246) comprises a rotating end (2461) and a sliding end (2462), the rotating end (2461) of the second swing arm (246) is rotatably connected to the main shaft (21) of the first hinge assembly (2), and the sliding end (2462) of the second swing arm (246) is slidably connected to the second housing (12); and the first moving member (20) comprises the second swing arm (246);

when the first housing (11) and the second housing (12) are in the open state, the first end (411) of the connector (41) is close to the sliding end (2462) of the second swing arm (246) of the first hinge assembly (2); and when the second housing (12) and the third housing (13) are in the open state, and the first housing (11) and the second housing (12) are folded relative to each other from the open state to the first closed state through the first hinge assembly (2), the first swing arm (245) and the second swing arm (246) of the first hinge assembly (2) are folded relative to each other, and the sliding end (2462) of the second swing arm (246) of the first hinge assembly (2) moves in the direction away from the second housing (12), to form the avoidance space (2460) between the sliding end (2462) of the second swing arm (246) and the second housing (12).

6. The foldable electronic device (1000) according to claim 1, wherein the second hinge assembly (3) comprises a main shaft (31), a first mounting bracket (341), and a second mounting bracket (342), wherein the first mounting bracket (341) is fastened to the second housing (12);

the second mounting bracket (342) is fastened to the third housing (13);

when the first housing (11) and the second housing (12) are in the open state, and the second housing (12) and the third housing (13) are in the open state, the first mounting bracket (341) and the second mounting bracket (342) of the second hinge assembly (3) are unfolded relative to each other, and the first mounting bracket (341) is fastened to the main shaft (31) of the second hinge assembly (3) through the second end (412) of the connector (41);

when the second housing (12) and the third housing (13) are in the open state, and the first housing (11) and the second housing (12) are folded relative to each other from the open state to the first closed state, the second end (412) of the connector (41) moves in the direction away from the main shaft (31) of the second hinge assembly (3); and when the first housing (11) and the second housing (12) are in the first closed state, the first mounting bracket (341) and the main shaft (31) of the second hinge assembly (3) are capable of moving relative to each other.

7. The foldable electronic device (1000) according to claim 6, wherein a through hole (3415) is provided on the first mounting bracket (341) of the second hinge assembly (3), a groove (313) is provided on the main shaft (31) of the second hinge assembly (3), and an opening of the groove (313) faces the through hole (3415) of the first mounting bracket (341) of the second hinge assembly (3);

when the first housing (11) and the second housing (12) are in the open state, and the second housing (12) and the third housing (13) are in the open state, the second end (412) of the connector (41) passes through the first mounting bracket (341) of the second hinge assembly (3) through the through hole (3415), and is inserted into the groove (313), to fasten the first mounting bracket (341) to the main shaft (31) of the second hinge assembly (3);

when the second housing (12) and the third housing (13) are in the open state, and the first housing (11) and the second housing (12) are folded relative to each other from the open state to the first closed state, the second end (412) of the connector (41) moves in the direction away from the groove (313); and when the first housing (11) and the second housing (12) are in the first closed state, the second end (412) of the connector (41) leaves the groove (313), and the first mounting bracket (341) and the main shaft (31) of the second hinge assembly (3) are capable of moving relative to each other.

8. The foldable electronic device (1000) according to claim 1, wherein the foldable electronic device (1000) further comprises a driving piece (42), and at least one of the connector (41), the first hinge assembly (2), the second hinge assembly (3), or the second housing (12) is provided with the driving piece (42); and when the second housing (12) and the third housing (13) are in the open state, and the first housing (11) and the second housing (12) are folded relative to each other from the open state to the first closed state through the first hinge assembly (2), the driving piece (42) is configured to drive the second end (412) of the connector (41) to move in the direction away from the second hinge assembly (3).

9. The foldable electronic device (**1000*a*) according to claim 8, wherein the driving piece (42*a*) is an elastic piece, the driving piece (42*a*) is disposed at the second end of the connector (41*a*), one end of the driving piece (42*a*) abuts against the connector (41*a*), and the other end of the driving piece (42*a*) abuts against the second hinge assembly (3*a***).

10. The foldable electronic device (1000*b*) according to claim 8, wherein the driving piece (42*b*) comprises a first magnetic piece (421*b*) and a second magnetic piece (422*b*), the first magnetic piece (421*b*) and the second magnetic piece (422*b*) are respectively fastened to the sliding end (2462*b*) of the second swing arm (246*b*) of the first hinge assembly (2*b*) and the first end (411*b*) of the connector (41*b*), attraction force exists between the first magnetic piece (421*b*) and the second magnetic piece (422*b*), and the first end (411*b*) of the connector (41*b*) moves with the sliding end (2462*b*) of the second swing arm (246*b*) of the first hinge assembly (2*b*) under an action of the attraction force.

11. The foldable electronic device (1000*c*) according to claim 8, wherein the driving piece (42*c*) comprises a third magnetic piece (423*c*) and a fourth magnetic piece (424*c*), the third magnetic piece (423*c*) is fastened to the second housing (12*c*) and is movably sleeved on the connector (41*c*), the fourth magnetic piece (424*c*) is fixedly sleeved on the connector (41*c*) and is located on a side that is of the third magnetic piece (423*c*) and that is close to the second hinge assembly (3*c*), and attraction force exists between the third magnetic piece (423*c*) and the fourth magnetic piece (424*c*);

when the first housing (11*c*) and the second housing (12*c*) are in the open state, and the second housing (12*c*) and the third housing (13*c*) are in the open state, there is a spacing between the third magnetic piece (423*c*) and the fourth magnetic piece (424*c*); and when the first housing (11*c*) and the second housing (12*c*) are folded relative to each other from the open state to the first closed state through the first hinge assembly (2*c*), the fourth magnetic piece (424*c*) moves in a direction close to the third magnetic piece (423*c*) under an action of the attraction force, so that the second end (412*c*) of the connector (41*c*) moves in the direction away from the second hinge assembly (3*c*).

12. The foldable electronic device (1000*c*) according to claim 8, wherein the driving piece (42*c*) comprises a third magnetic piece (423*c*) and a fourth magnetic piece (424*c*), the third magnetic piece (423*c*) is fastened to the second housing (12*c*) and is movably sleeved on the connector (41*c*), the fourth magnetic piece (424*c*) is fixedly sleeved on the connector (41*c*) and located on a side that is of the third magnetic piece (423*c*) and that is away from the second hinge assembly (3*c*), and repulsion force exists between the third magnetic piece (423*c*) and the fourth magnetic piece (424*c*); and when the first housing (11*c*) and the second housing (12*c*) are in the open state, and the second housing (12*c*) and the third housing (13*c*) are in the open state, the third magnetic piece (423*c*) and the fourth magnetic piece (424*c*) are in contact with each other or have a spacing between each other; and when the first housing (11*c*) and the second housing (12*c*) are folded relative to each other from the open state to the first closed state through the first hinge assembly (2*c*), the fourth magnetic piece (424*c*) is away from the third magnetic piece (423*c*) under an action of the repulsion force, so that the second end (412*c*) of the connector (41*c*) moves in the direction away from the second hinge assembly (3*c*).

13. The foldable electronic device (1000*d*) according to claim 8, wherein the driving piece (42*d*) comprises a first rotating end (421*d*) and a second rotating end (422*d*), the first rotating end (421*d*) of the driving piece (42*d*) is rotatably connected to the sliding end (2462*d*) of the second swing arm (246*d*) of the first hinge assembly (2*d*), and the second rotating end (422*d*) of the driving piece (42*b*) is rotatably connected to the first end (411*d*) of the connector (41*d*).

14. The foldable electronic device (1000) according to claim 1, wherein the foldable electronic device (1000) further comprises a screen (200), and the first housing (11), the second housing (12), the third housing (13), the first hinge assembly (2), and the second hinge assembly (3) jointly support the screen (200).

15. A housing apparatus (100), used in a foldable electronic device (1000), wherein the housing apparatus (100) comprises a first housing (11), a second housing (12), a third housing (13), a first hinge assembly (2), and a second hinge assembly (3), wherein the first hinge assembly (2) is connected between the first housing (11) and the second housing (12), the first housing (11) and the second housing (12) are capable of being unfolded or folded relative to each other through the first hinge assembly (2), the second hinge assembly (3) is connected between the second housing (12) and the third housing (13), and the second housing (12) and the third housing (13) are capable of being unfolded or folded relative to each other through the second hinge assembly (3);

the housing apparatus (100) further comprises a connector (41), wherein the connector (41) comprises a first end (411) and a second end (412), the first end (411) of the connector (41) is close to the first hinge assembly (2), and the second end (412) of the connector (41) is close to the second hinge assembly (3);

when the first housing (11) and the second housing (12) are in an open state, and the second housing (12) and the third housing (13) are in an open state, the second end (412) of the connector (41) is connected between the second housing (12) and the second hinge assembly (3), to prevent the second housing (12) and the third housing (13) from being folded relative to the second hinge assembly (3);

when the second housing (12) and the third housing (13) are in the open state, and the first housing (11) and the second housing (12) are folded relative to each other from the open state to a first closed state through the first hinge assembly (2), the second end (412) of the connector (41) moves in a direction away from the second hinge assembly (3); and when the first housing (11) and the second housing (12) are in the first closed state, the second housing (12) and the third housing (13) are capable of being folded relative to the second hinge assembly (3).

16. The housing apparatus (100) according to claim 15, wherein the connector (41) is slidably connected to the second housing (12).

17. The housing apparatus (100) according to claim 15, wherein when the first housing (11) and the second housing (12) are in the first closed state, the second housing (12) and the third housing (13) are capable of being unfolded relative to the second hinge assembly (3); and when the second housing (12) and the third housing (13) are in the open state, and the first housing (11) and the second housing (12) are unfolded relative to each other from the first closed state to the open state through the first hinge assembly (2), the second end (412) of the connector (41) moves in a direction close to the second hinge assembly (3), so that the second end (412) of the connector (41) is connected between the second housing (12) and the second hinge assembly (3).

18. The housing apparatus (100) according to claim 15, wherein the first hinge assembly (2) comprises a first moving member (20);

when the second housing (12) and the third housing (13) are in the open state, and the first housing (11) and the second housing (12) are folded relative to each other from the open state to the first closed state through the first hinge assembly (2), the first moving member (20) of the first hinge assembly (2) moves in a direction away from the second housing (12), to form an avoidance space (2460) between the first moving member (20) and the second housing (12); and the first end (411) of the connector (41) enters the avoidance space (2460), and the second end (412) of the connector (41) moves in the direction away from the second hinge assembly (3).

19. The housing apparatus (100) according to claim 18, wherein the first hinge assembly (2) comprises a main shaft (21), a first swing arm (245), and a second swing arm (246), the second swing arm (246) comprises a rotating end (2461) and a sliding end (2462), the rotating end (2461) of the second swing arm (246) is rotatably connected to the main shaft (21) of the first hinge assembly (2), and the sliding end (2462) of the second swing arm (246) is slidably connected to the second housing (12); and the first moving member (20) comprises the second swing arm (246);

when the first housing (11) and the second housing (12) are in the open state, the first end (411) of the connector (41) is close to the sliding end (2462) of the second swing arm (246) of the first hinge assembly (2); and when the second housing (12) and the third housing (13) are in the open state, and the first housing (11) and the second housing (12) are folded relative to each other from the open state to the first closed state through the first hinge assembly (2), the first swing arm (245) and the second swing arm (246) of the first hinge assembly (2) are folded relative to each other, and the sliding end (2462) of the second swing arm (246) of the first hinge assembly (2) moves in the direction away from the second housing (12), to form the avoidance space (2460) between the sliding end (2462) of the second swing arm (246) and the second housing (12).

20. The housing apparatus (100) according to claim 15, wherein the second hinge assembly (3) comprises a main shaft (31), a first mounting bracket (341), and a second mounting bracket (342), wherein the first mounting bracket (341) is fastened to the second housing (12);

the second mounting bracket (342) is fastened to the third housing (13);

when the first housing (11) and the second housing (12) are in the open state, and the second housing (12) and the third housing (13) are in the open state, the first mounting bracket (341) and the second mounting bracket (342) of the second hinge assembly (3) are unfolded relative to each other, and the first mounting bracket (341) is fastened to the main shaft (31) of the second hinge assembly (3) through the second end (412) of the connector (41);

when the second housing (12) and the third housing (13) are in the open state, and the first housing (11) and the second housing (12) are folded relative to each other from the open state to the first closed state, the second end (412) of the connector (41) moves in the direction away from the main shaft (31) of the second hinge assembly (3); and when the first housing (11) and the second housing (12) are in the first closed state, the first mounting bracket (341) and the main shaft (31) of the second hinge assembly (3) are capable of moving relative to each other.

* * * * *